United States Patent
Hyde et al.

(10) Patent No.: US 9,199,549 B2
(45) Date of Patent: Dec. 1, 2015

(54) COMMUNICATION AND CONTROL SYSTEM AND METHOD REGARDING ELECTRIC VEHICLE FOR WIRELESS ELECTRIC VEHICLE ELECTRICAL ENERGY TRANSFER

(71) Applicant: Elwha LLC, Bellevue, WA (US)

(72) Inventors: Roderick A. Hyde, Redmond, WA (US); Jordin T. Kare, Seattle, WA (US); Richard T. Lord, Tacoma, WA (US); Robert W. Lord, Seattle, WA (US); Clarence T. Tegreene, Mercer Island, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 153 days.

(21) Appl. No.: 14/092,082

(22) Filed: Nov. 27, 2013

(65) Prior Publication Data

US 2015/0091505 A1    Apr. 2, 2015

Related U.S. Application Data

(63) Continuation-in-part of application No. 14/092,126, filed on Nov. 27, 2013, and a continuation-in-part of application No. 14/091,702, filed on Nov. 27, 2013, and a continuation-in-part of application No.

(Continued)

(51) Int. Cl.
*H02J 7/00* (2006.01)
*H02J 7/14* (2006.01)

(Continued)

(52) U.S. Cl.
CPC ........... *B60L 11/1848* (2013.01); *B60L 11/182* (2013.01); *B60L 11/184* (2013.01);

(Continued)

(58) Field of Classification Search
USPC ......... 320/109, 108, 107, 104, 103, 106, 110, 320/134, 136, 152, 124
See application file for complete search history.

(56) References Cited

U.S. PATENT DOCUMENTS

| | | | | |
|---|---|---|---|---|
| 4,102,273 A | * | 7/1978 | Merkle et al. | 104/34 |
| 5,202,617 A | * | 4/1993 | Nor | 320/130 |

(Continued)

FOREIGN PATENT DOCUMENTS

| | | |
|---|---|---|
| JP | 2009/106136 A | 5/2009 |
| JP | 2010/246271 A | 10/2010 |

(Continued)

OTHER PUBLICATIONS

PCT International Search Report; International App. No. PCT/US2014/066785; Mar. 16, 2015; pp. 1-4.

*Primary Examiner* — Edward Tso
*Assistant Examiner* — Alexis A Boateng

(57) ABSTRACT

A computationally implemented system and method that is designed to, but is not limited to: electronically receiving electric vehicle prospective use information associated with aspects indicating one or more future travel plans involving prospective use of an electric vehicle, the electric vehicle including one or more wireless electrical energy transfer receiving devices and one or more electrical energy storage devices; and electronically obtaining electrical energy transfer aspect information regarding wireless electrical energy transfer from one or more wireless electrical energy transfer imparting stations to the one or more wireless electrical energy transfer receiving devices of the electric vehicle for storage by the one or more electrical energy storage devices of the electric vehicle. In addition to the foregoing, other method aspects are described in the claims, drawings, and text forming a part of the present disclosure.

43 Claims, 49 Drawing Sheets

Related U.S. Application Data

14/092,306, filed on Nov. 27, 2013, and a continuation-in-part of application No. 14/089,513, filed on Nov. 25, 2013, and a continuation of application No. 14/086,903, filed on Nov. 21, 2013, and a continuation-in-part of application No. 14/041,443, filed on Sep. 30, 2013.

(51) Int. Cl.
  *B60L 11/18* (2006.01)
  *H02J 7/02* (2006.01)

(52) U.S. Cl.
  CPC .......... *B60L 11/185* (2013.01); *B60L 11/1811* (2013.01); *B60L 11/1816* (2013.01); *B60L 11/1838* (2013.01); *B60L 11/1842* (2013.01); *B60L 11/1844* (2013.01); *B60L 11/1846* (2013.01); *B60L 11/1861* (2013.01); *B60L 2220/12* (2013.01); *B60L 2220/16* (2013.01); *B60L 2230/16* (2013.01); *B60L 2230/22* (2013.01); *B60L 2230/24* (2013.01); *B60L 2240/12* (2013.01); *B60L 2240/14* (2013.01); *B60L 2240/622* (2013.01); *B60L 2240/662* (2013.01); *B60L 2240/665* (2013.01); *B60L 2240/667* (2013.01); *B60L 2250/12* (2013.01); *B60L 2250/20* (2013.01); *B60L 2250/22* (2013.01); *B60L 2260/52* (2013.01); *B60L 2260/54* (2013.01); *H02J 7/00* (2013.01); *H02J 7/0027* (2013.01); *H02J 7/0054* (2013.01); *H02J 7/025* (2013.01)

(56) References Cited

U.S. PATENT DOCUMENTS

| | | | | |
|---|---|---|---|---|
| 5,283,513 | A | | 2/1994 | Fujita et al. |
| 5,349,535 | A | * | 9/1994 | Gupta ............................ 702/63 |
| 5,585,205 | A | | 12/1996 | Kohchi |
| 5,594,318 | A | * | 1/1997 | Nor et al. ....................... 320/108 |
| 5,656,916 | A | * | 8/1997 | Hotta ............................ 320/160 |
| 5,821,731 | A | * | 10/1998 | Kuki et al. ..................... 320/108 |
| 5,927,938 | A | | 7/1999 | Hammerslag |
| 5,951,229 | A | * | 9/1999 | Hammerslag ................. 414/398 |
| 5,952,813 | A | * | 9/1999 | Ochiai ........................... 320/104 |
| 5,998,963 | A | | 12/1999 | Aarseth |
| 6,218,796 | B1 | | 4/2001 | Kozlowski |
| 6,614,204 | B2 | | 9/2003 | Pellegrino et al. |
| 6,934,603 | B1 | | 8/2005 | Kochanneck |
| 7,201,384 | B2 | * | 4/2007 | Chaney ......................... 180/68.5 |
| 7,602,143 | B2 | * | 10/2009 | Capizzo ........................ 320/109 |
| 2004/0142733 | A1 | * | 7/2004 | Parise ............................ 455/572 |
| 2005/0002263 | A1 | * | 1/2005 | Iwase et al. .............. 365/230.03 |
| 2008/0258682 | A1 | | 10/2008 | Li |
| 2010/0145717 | A1 | * | 6/2010 | Hoeltzel ........................ 705/1.1 |
| 2010/0300323 | A1 | * | 12/2010 | Ennis ........................... 104/172.3 |
| 2011/0057816 | A1 | | 3/2011 | Noble et al. |
| 2011/0123309 | A1 | * | 5/2011 | Berdelle-Hilge et al. .... 414/800 |
| 2011/0303509 | A1 | * | 12/2011 | Agassi et al. ................. 198/604 |
| 2013/0029595 | A1 | | 1/2013 | Widmer et al. |

FOREIGN PATENT DOCUMENTS

| | | | |
|---|---|---|---|
| JP | 2013/034323 A | 2/2013 | |
| WO | WO 2009113268 A1 * | 9/2009 | ............ B62D 65/18 |
| WO | WO 2011/037322 A2 | 3/2011 | |

* cited by examiner

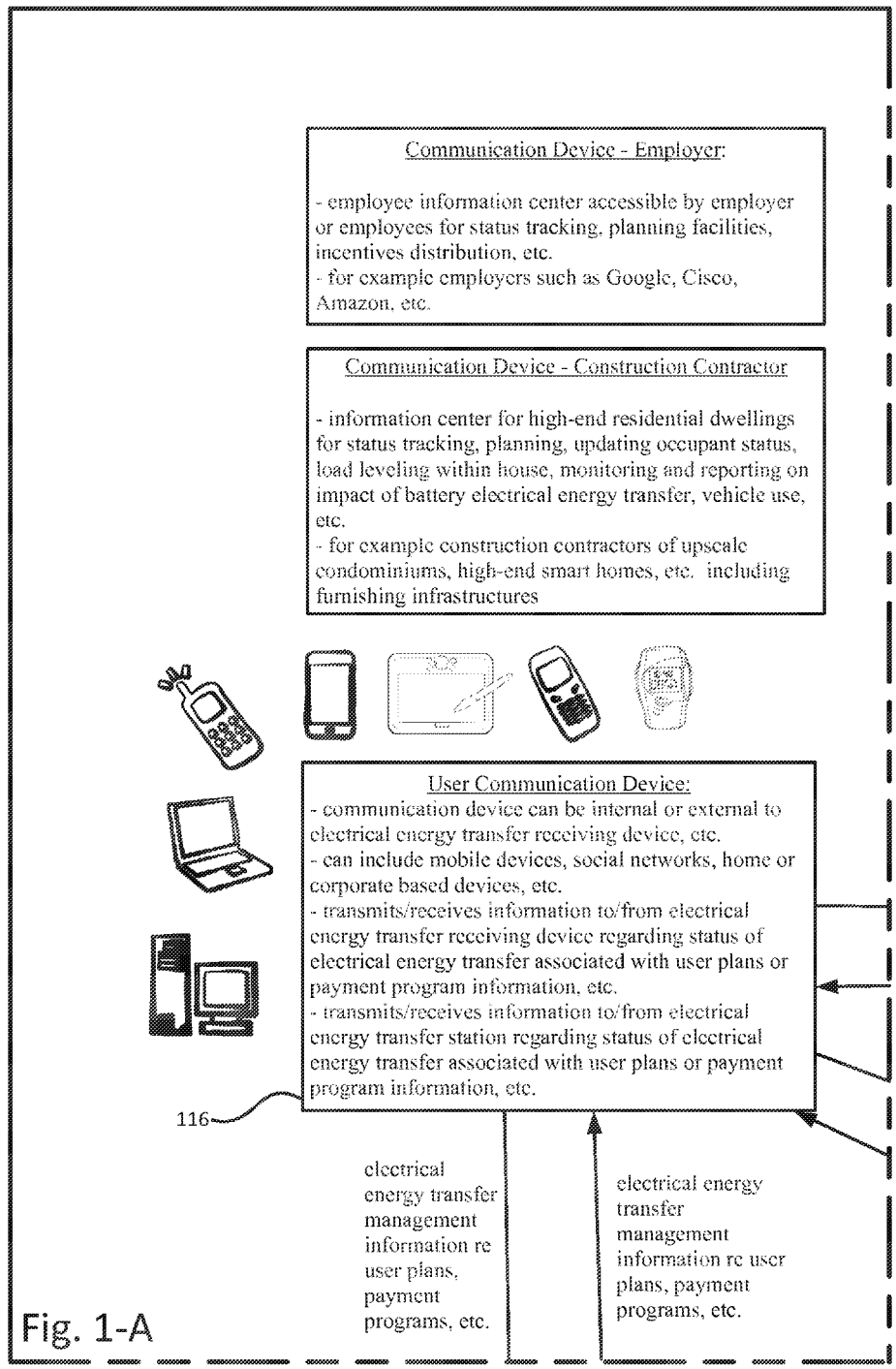
Fig. 1-A

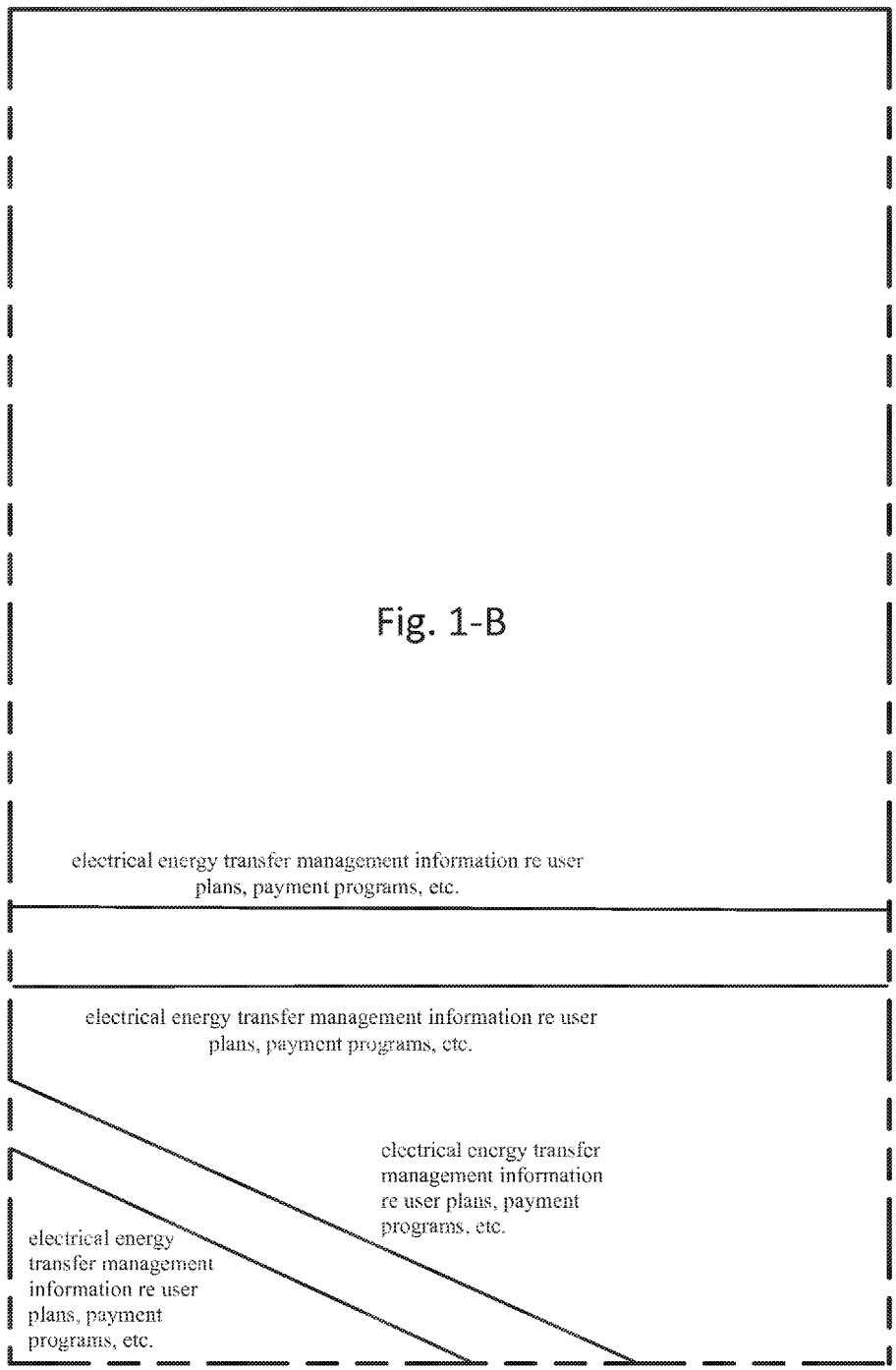
Fig. 1-B

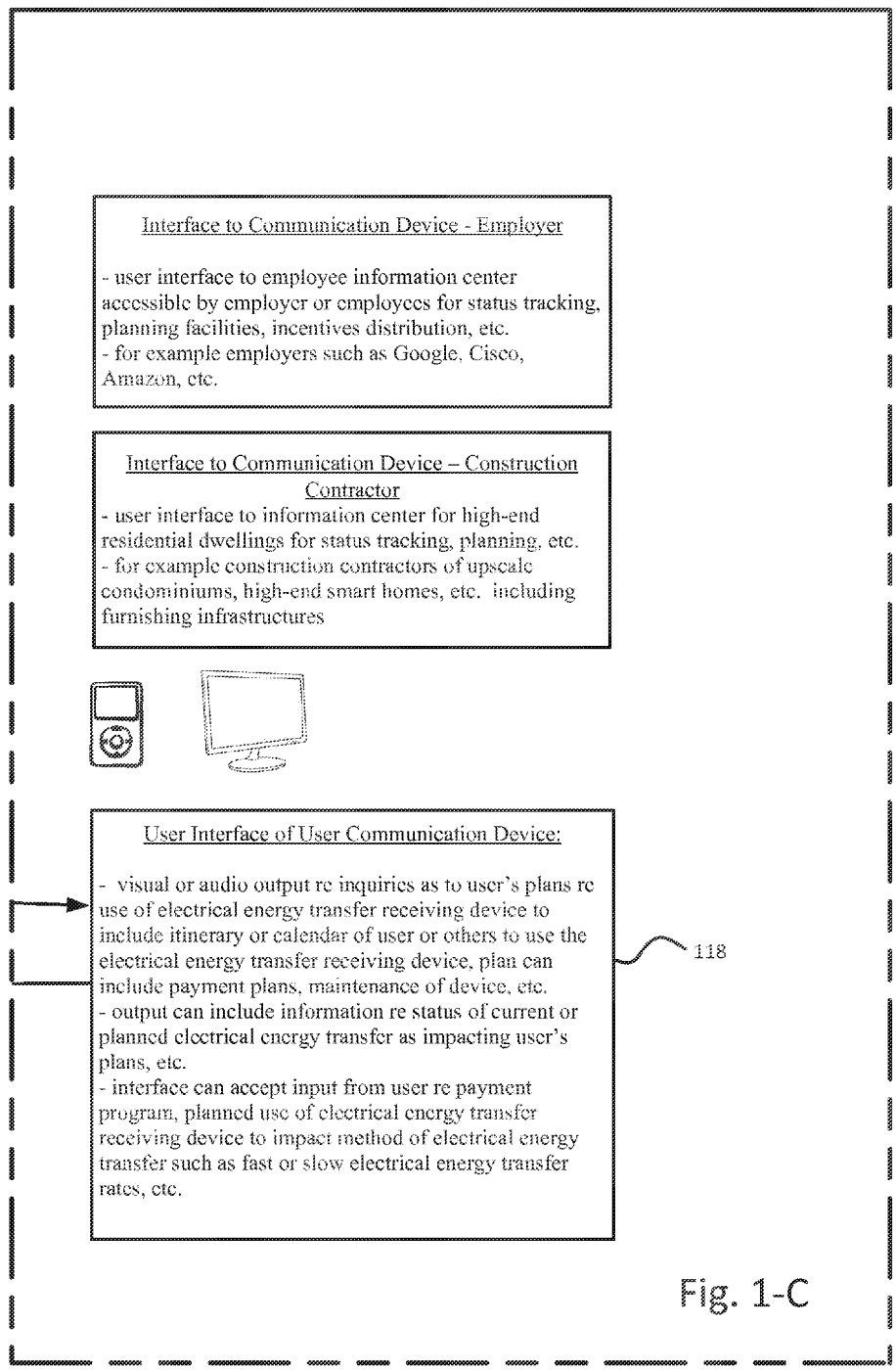
Fig. 1-C

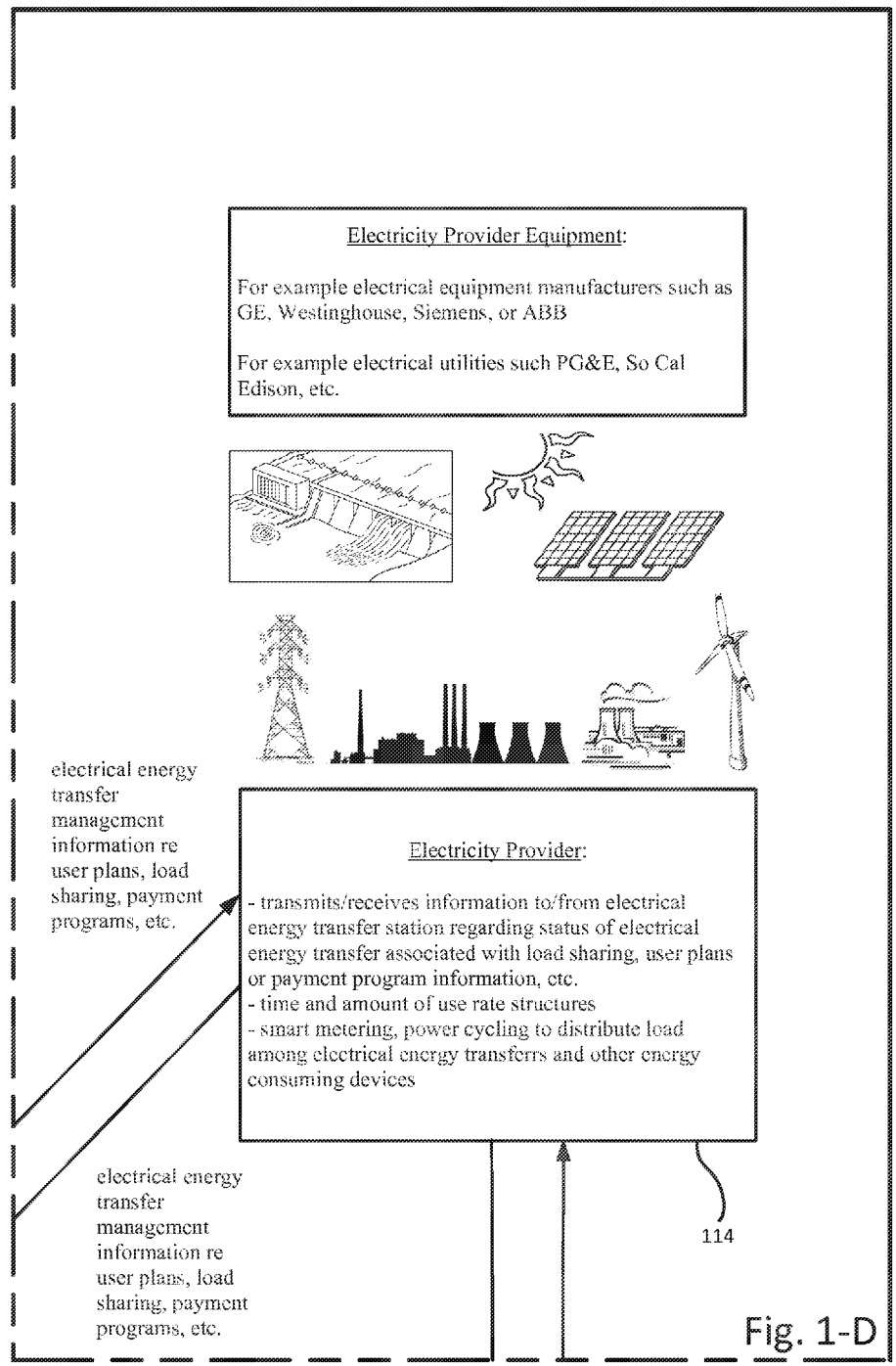
Fig. 1-D

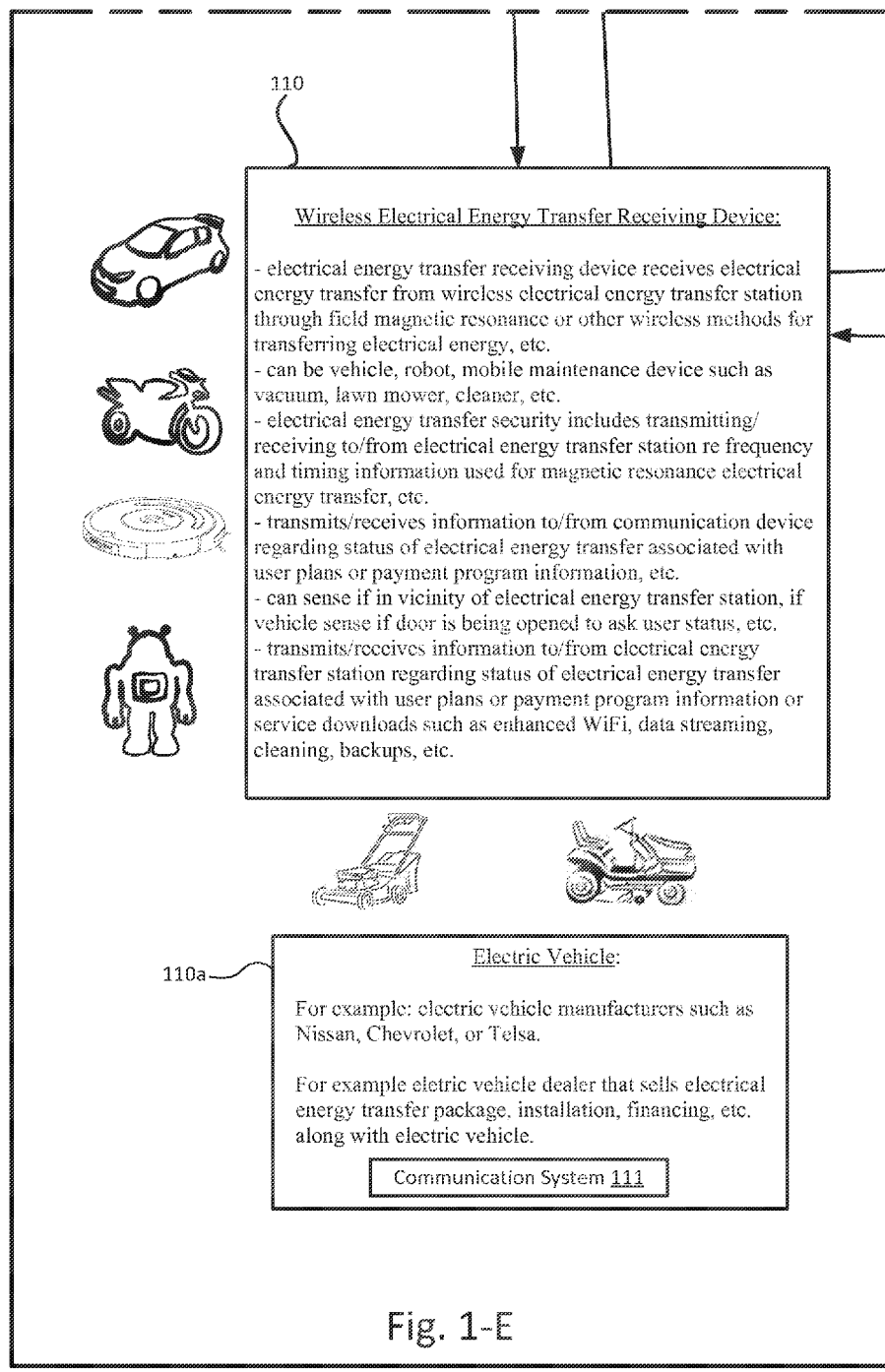
Fig. 1-E

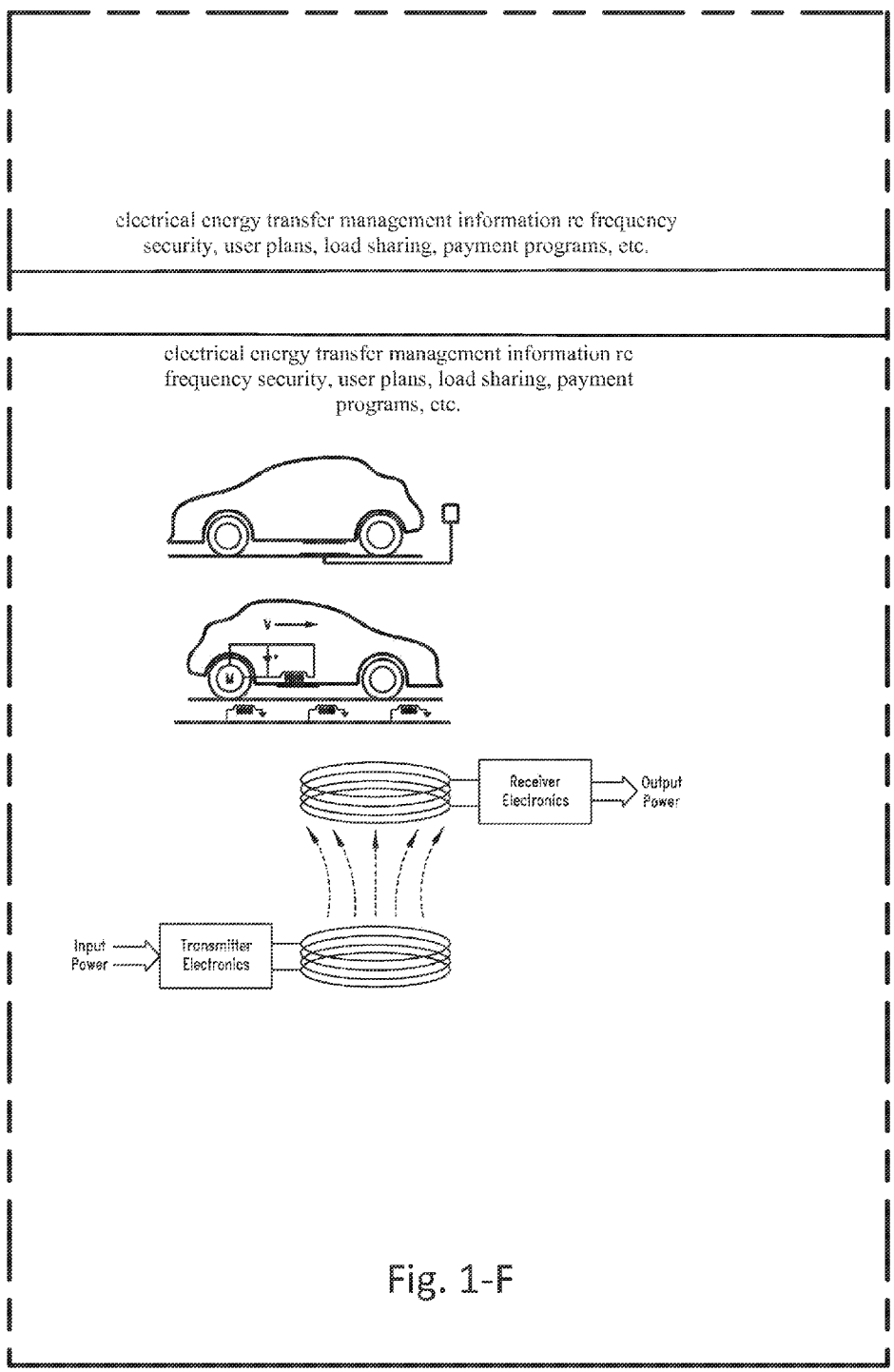
Fig. 1-F

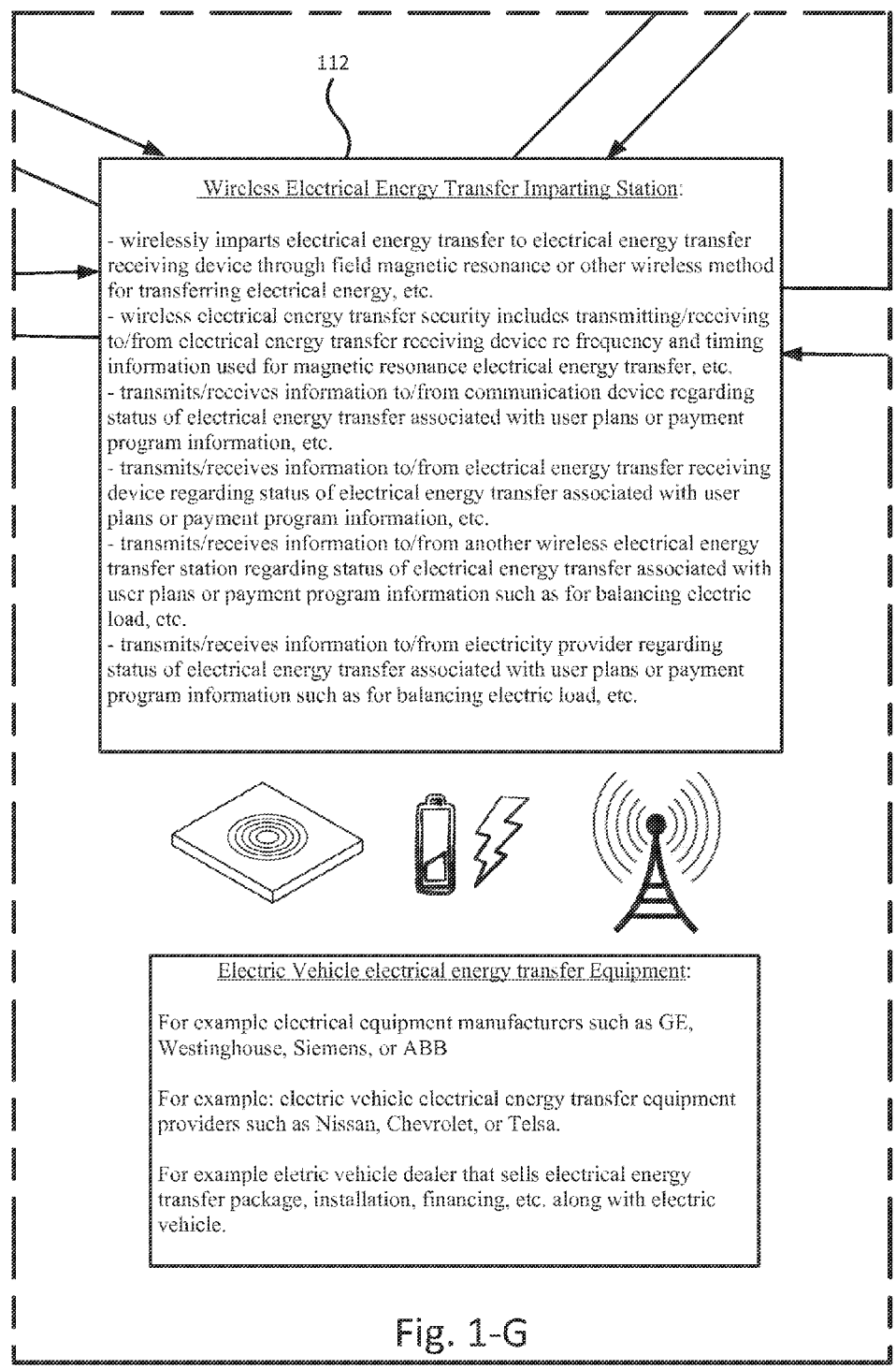
Fig. 1-G

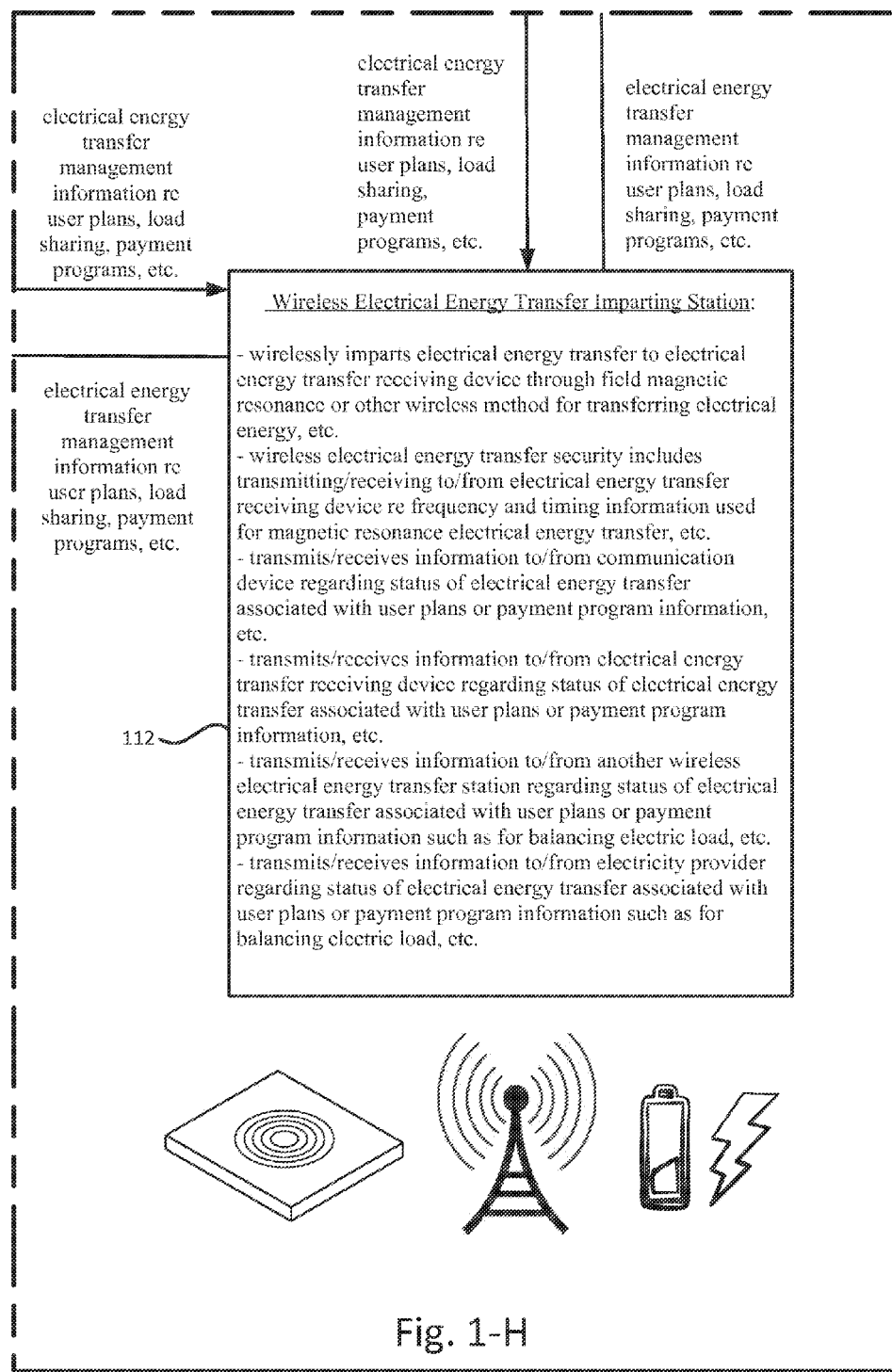
Fig. 1-H m11 electronically receiving electric vehicle prospective use information associated with aspects indicating future travel plans involving prospective use of an electric vehicle...

m1101 wirelessly receiving electric vehicle prospective use information wirelessly module m1102 wirelessly receiving electric vehicle prospective use information facilitated through RFID tags module m1103 wirelessly receiving electric vehicle prospective use information through blue tooth supported communication module m1104 wirelessly receiving electric vehicle prospective use information through WiFi facilitated communication module m1105 wirelessly receiving electric vehicle prospective use information through FM radio wave communication module m1106 wirelessly receiving electric vehicle prospective use information through infrared supported communication module m1107 receiving electric vehicle prospective use information through direct non-wireless communication module m1108 receiving electric vehicle prospective use information through direct wire connections module m1109 receiving electric vehicle prospective use information through direct audio sound wave broadcasts module m1110 receiving electric vehicle prospective use information through other than overt action by prospective vehicle users to provide for the receiving module m1111 receiving electric vehicle prospective use information through access of employer databases module m1112 receiving electric vehicle prospective use information through data calls to electronic calendaring systems module m1113 receiving electric vehicle prospective use information through access to scheduling programs module m1114 receiving electric vehicle prospective use information through electronic tapping into cell phone conversations module

Fig. 5-A

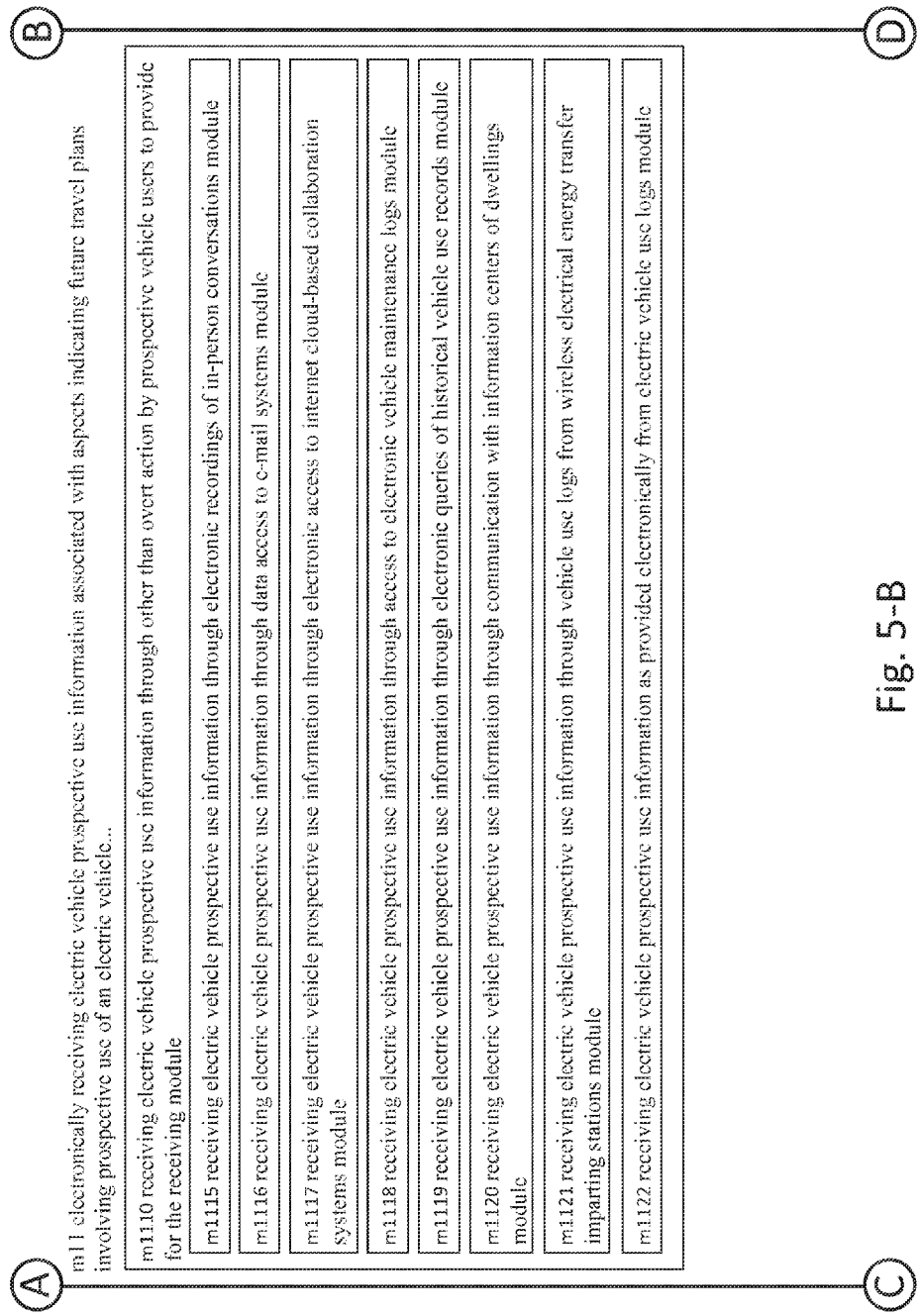
Fig. 5-B

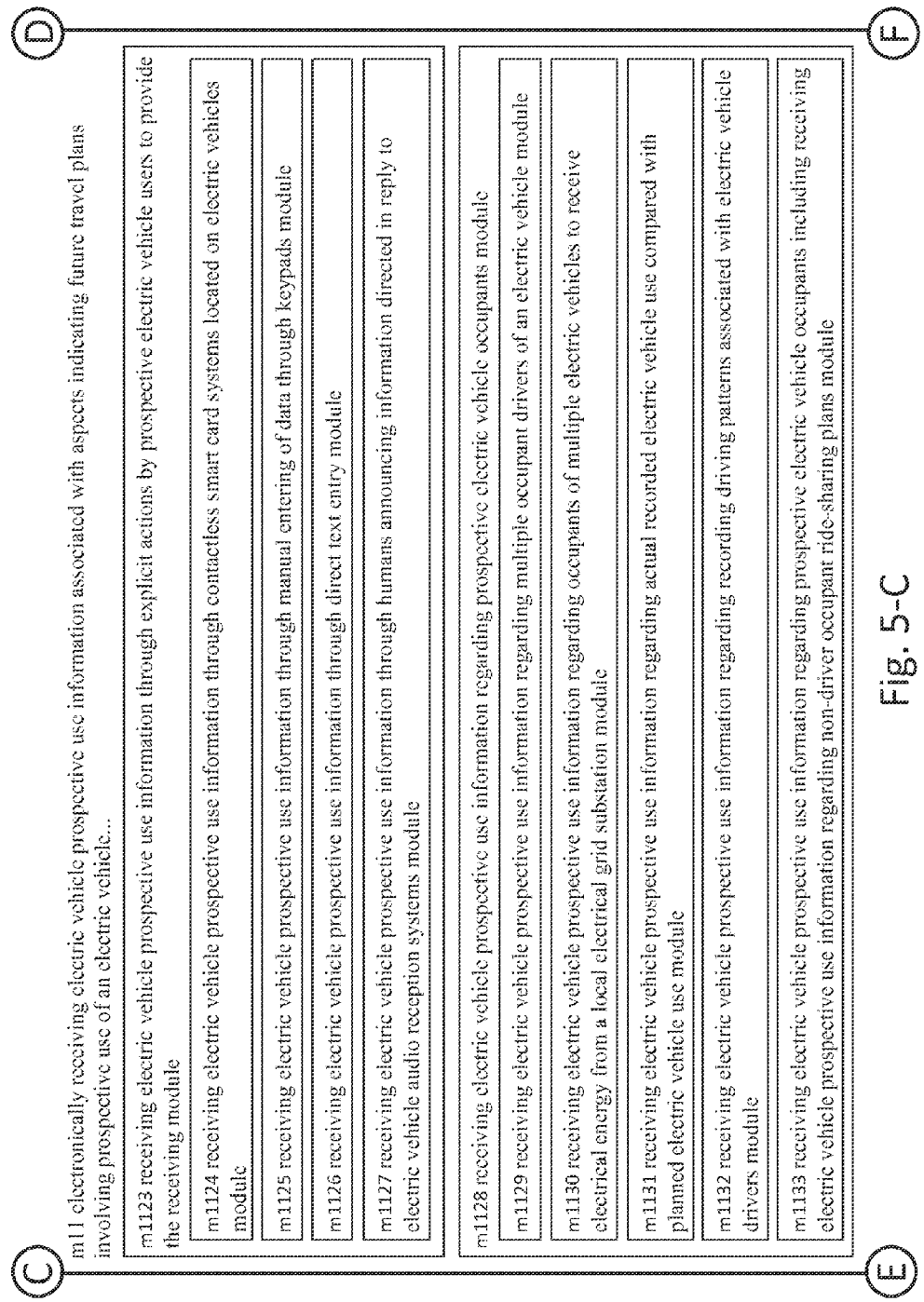
Fig. 5-C

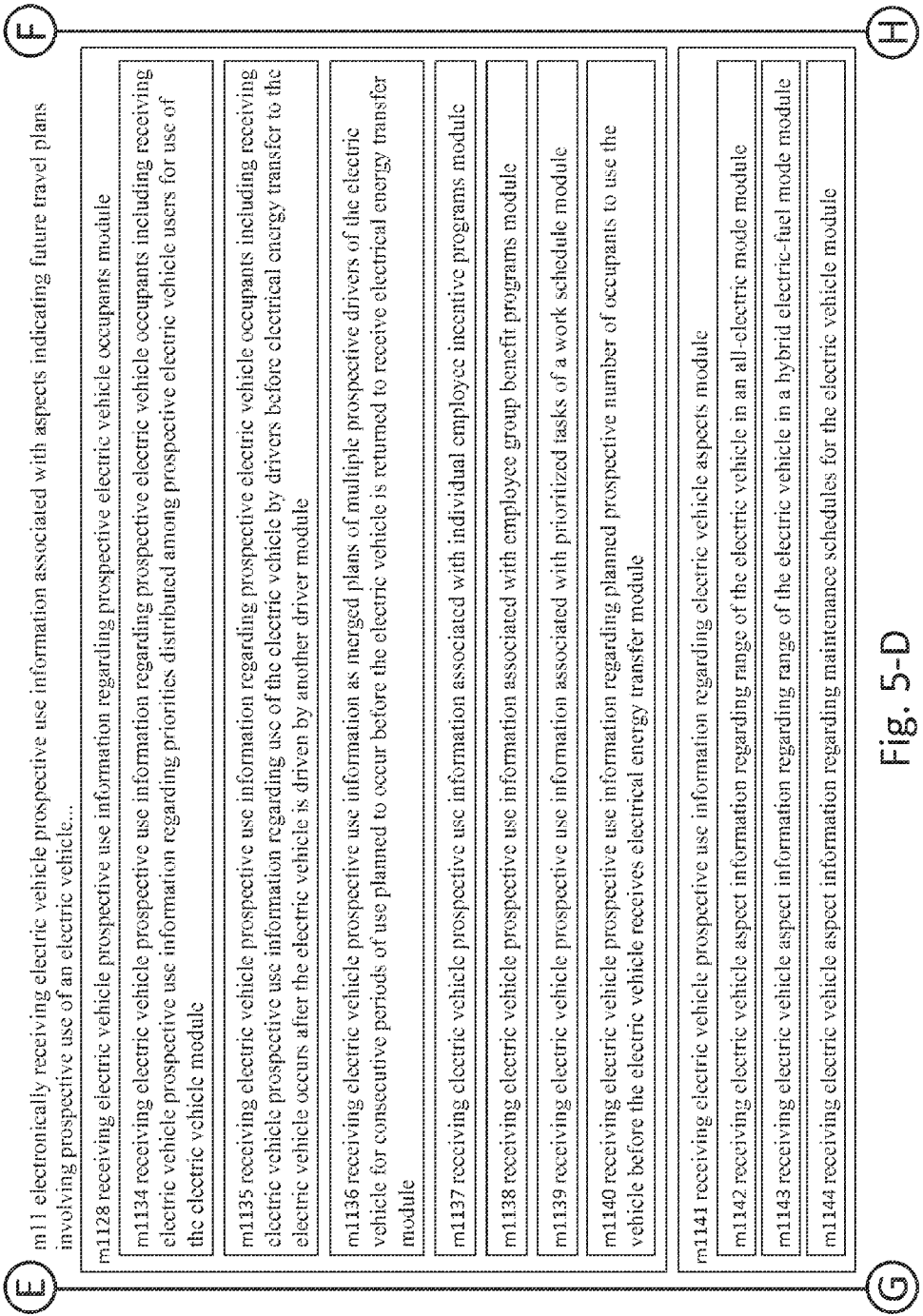
Fig. 5-D m1141 electronically receiving electric vehicle prospective use information associated with aspects indicating future travel plans involving prospective use of an electric vehicle...

m1144 receiving electric vehicle prospective use information regarding electric vehicle aspects module m1145 receiving electric vehicle aspect information regarding fueling capacity of the electric vehicle as a hybrid electric vehicle module m1146 receiving electric vehicle aspect information regarding specifications of another electric vehicle other than the electric vehicle, the another electric vehicle involved with plans to receive electric energy transfer from electrical equipment shared with the electric vehicle module m1147 receiving electric vehicle aspect information regarding the electric vehicle as an all-electric vehicle module m1148 receiving electric vehicle aspect information regarding the electric vehicle as a hybrid-electric vehicle module m1149 receiving electric vehicle aspect information regarding the electric vehicle including electrical wireless electrical energy transfer receiving devices to receive electrical energy transfer through field magnetic resonance induction module m1150 receiving electric vehicle aspect information regarding the electric vehicle including electrical wireless electrical energy transfer receiving devices to receive electrical energy transfer through highly resonant inductive wireless power transfer module m1151 receiving electric vehicle aspect information regarding the electric vehicle including electrical wireless electrical energy transfer receiving devices to receive electrical energy transfer through wireless capacitive charging module m1152 receiving electric vehicle aspect information regarding the electric vehicle including electrical energy storage devices module m1153 receiving electric vehicle aspect information regarding the electric vehicle including the electrical energy storage devices as capacitive electrical energy storage devices module m1154 receiving electric vehicle aspect information regarding the electric vehicle including the electrical energy storage devices as lithium ion, lead acid, or nickel cadmium electrical energy storage devices module

Fig. 5-E

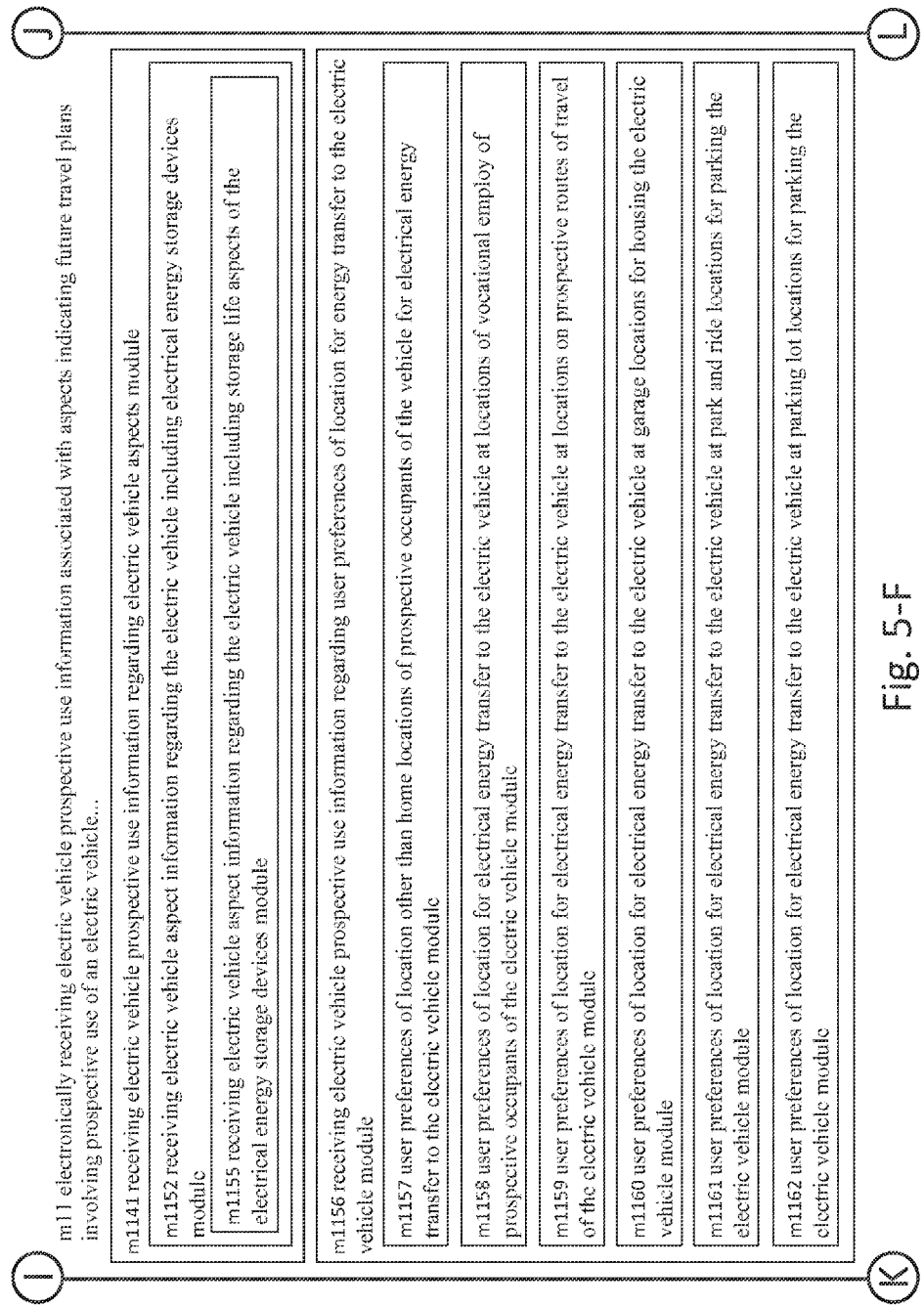
Fig. 5-F

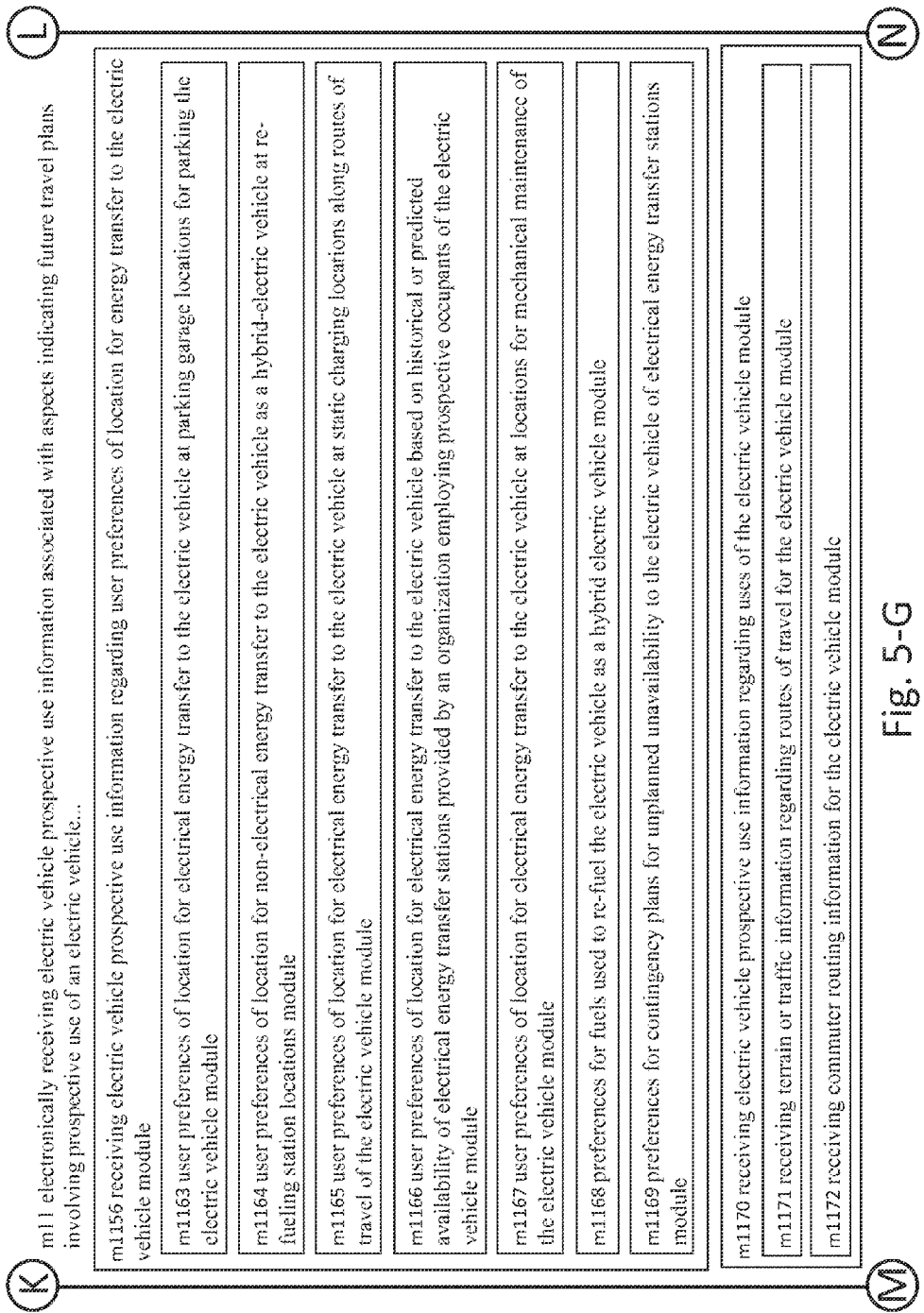
Fig. 5-G m11 electronically receiving electric vehicle prospective use information associated with aspects indicating future travel plans involving prospective use of an electric vehicle...

m1170 receiving electric vehicle prospective use information regarding uses of the electric vehicle module m1173 receiving trip advisory information regarding routes of travel for the electric vehicle module m1174 receiving information regarding alternative modes of transportation along routes travel for the electric vehicle module m1175 receiving information regarding periods in which the electric vehicle will be unavailable for use module m1176 receiving information regarding planned errands to be run by users of the electric vehicle module m1177 receiving information regarding commercial delivery schedules utilizing the electric vehicle module m1178 receiving information regarding courier service use for the electric vehicle module m1179 receiving information regarding industrial cargo transport by the electric vehicle module m1180 receiving information regarding driving habits of users of the electric vehicle module m1181 receiving information regarding itineraries associated with use of the electric vehicle module m1182 receiving information regarding weather forecasts associated with travel through use of the electric vehicle module m1183 receiving information regarding news broadcasts associated with travel through use of the electric vehicle module m1184 receiving information regarding emergency warning messages associated with use of the electric vehicle module m1185 receiving information regarding availability of alternate transportation within a designated distance from electrical energy transfer stations for transferring electrical energy to the electric vehicle module m1186 receiving information regarding ride-share programs associated with travel routes traveled by the electric vehicle module

Fig. 5-H m12 electronically obtaining electrical energy transfer aspect information regarding wireless electrical energy transfer from wireless electrical energy transfer imparting stations to the wireless electrical energy transfer receiving devices of the electric vehicle...

m1201 obtaining electrical energy transfer aspect information from wireless electrical energy transfer imparting stations module m1202 obtaining information regarding schedules for electrical load sharing for electrical devices sharing electrical power sources with electrical energy transfer stations associated with the electric vehicle module m1203 obtaining information regarding charging rate capacity of electrical energy transfer stations for the electric vehicle module m1204 obtaining information regarding consumer incentive programs based on electricity cost schedules module m1205 obtaining information regarding electricity financial cost rate schedules module m1206 obtaining information regarding electricity load share capacity schedules module m1207 obtaining information regarding electric utility capacity information passed through communication channels of electrical energy transfer stations for the electric vehicle module m1208 obtaining information regarding electrical energy charging appointments reserved for electrical vehicles other than the electric vehicle module m1209 obtaining information regarding maximum charging rate capacities of electrical energy transfer stations useable by the electric vehicle module m1210 obtaining information regarding cost information for priority handling of charging of the electric vehicle by of the electrical energy transfer stations module m1211 obtaining information regarding electrical energy transfer station availability schedules for the electric vehicle module m1212 obtaining information regarding histories of electrical energy consumption by electrical energy transfer stations for the electric vehicle module

Fig. 6-A

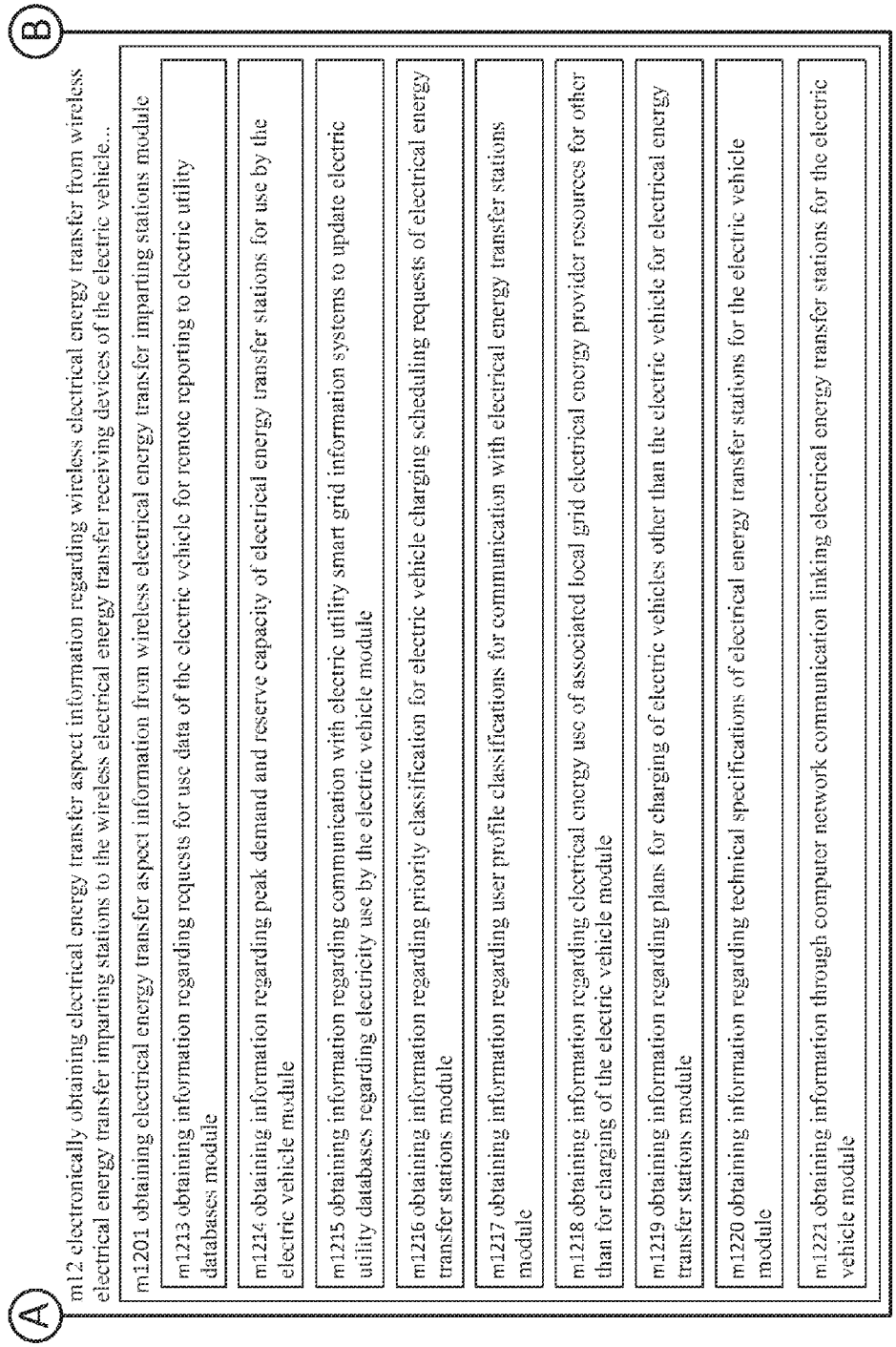
Fig. 6-B m13 electronically providing electrical energy transfer guidance information to in part provide possible guidance for the wireless electrical energy transfer from the wireless electrical energy transfer for imparting stations....

| |
|---|
| m1301 providing electrical energy transfer guidance information to electrical energy transfer stations for the electric vehicle module |
| m1302 providing guidance information regarding itinerary and route information of the electric vehicle module |
| m1303 providing guidance information regarding verification of identification of users of the electric vehicle module |
| m1304 providing guidance information regarding verification of selection of electrical energy transfer stations for the electrical vehicle module |
| m1305 providing guidance information regarding financial status information for user accounts of the electric vehicle module |
| m1306 providing guidance information requests as to charging rate capacity of electrical energy transfer stations for the electric vehicle module |
| m1307 providing guidance information concerning electrical charge status of electrical energy storage devices of the electric vehicle module |
| m1308 providing guidance information concerning use data for the electric vehicle module |
| m1309 providing guidance information concerning amount of time the electric vehicle is available for charging by electrical energy transfer stations module |
| m1310 providing guidance information regarding amount of electrical energy required to be transferred to the electric vehicle by electrical energy transfer stations module |
| m1311 providing guidance information regarding consumer profile of users of the electric vehicle module |
| m1312 providing guidance information regarding itinerary and route information of the electric vehicle module |

Fig. 7-A

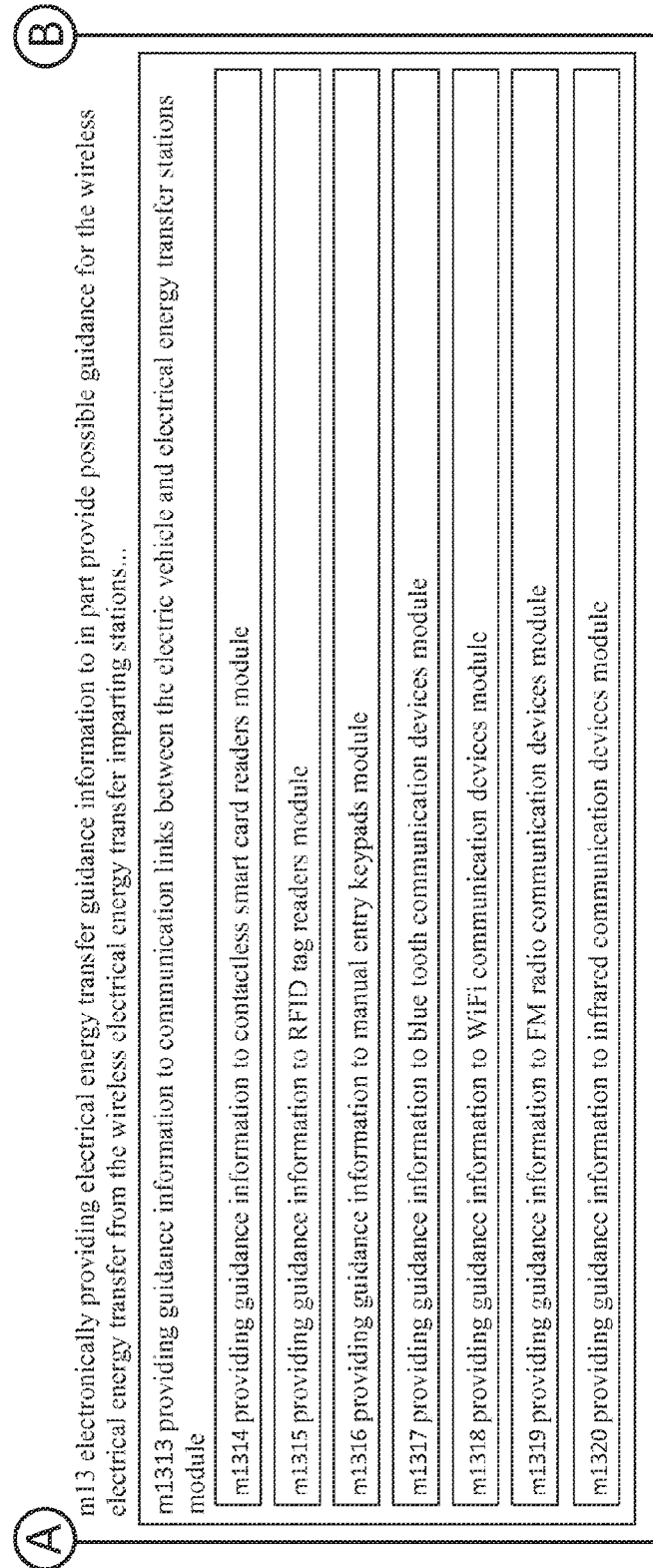
Fig. 7-B

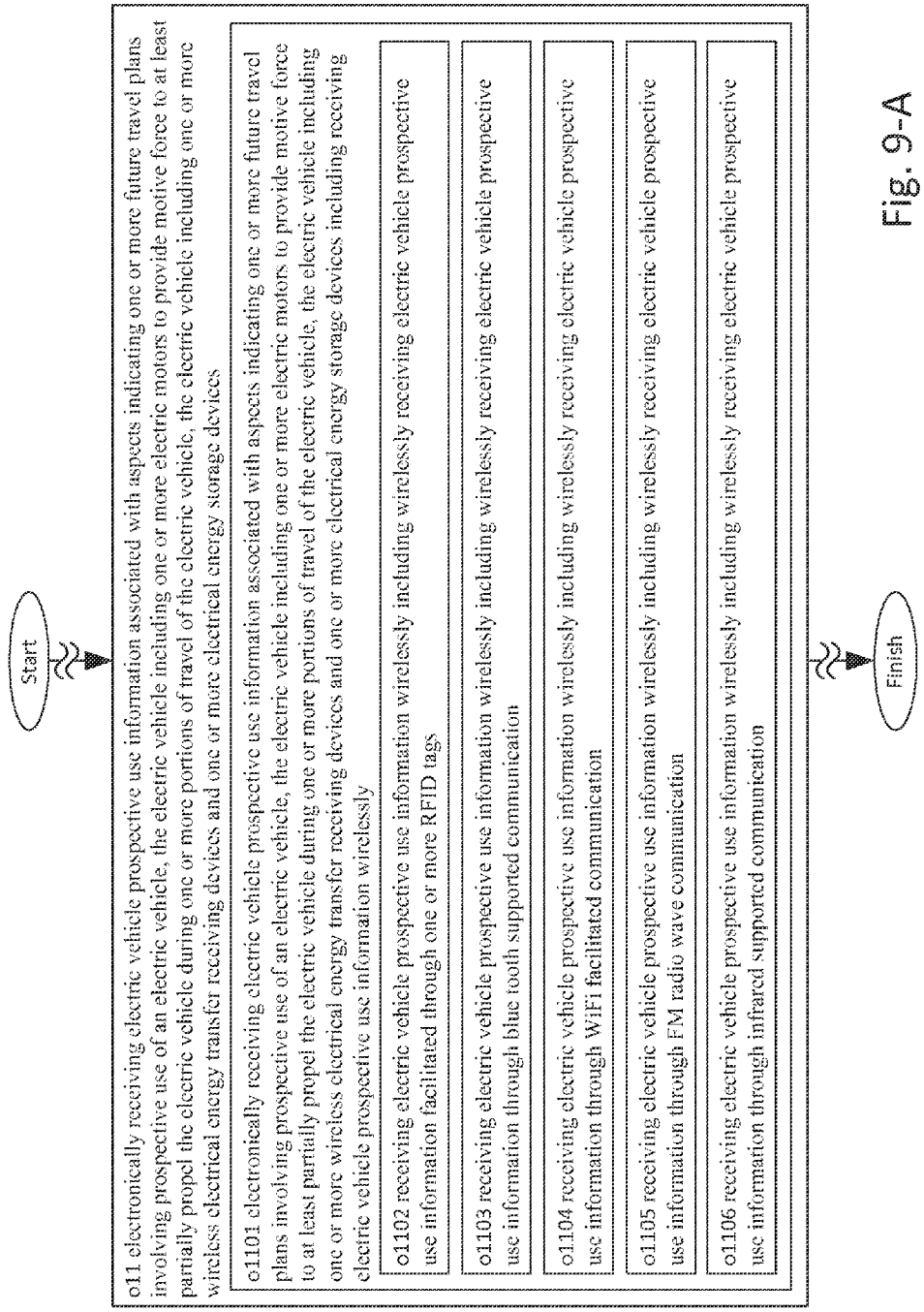
Fig. 9-A

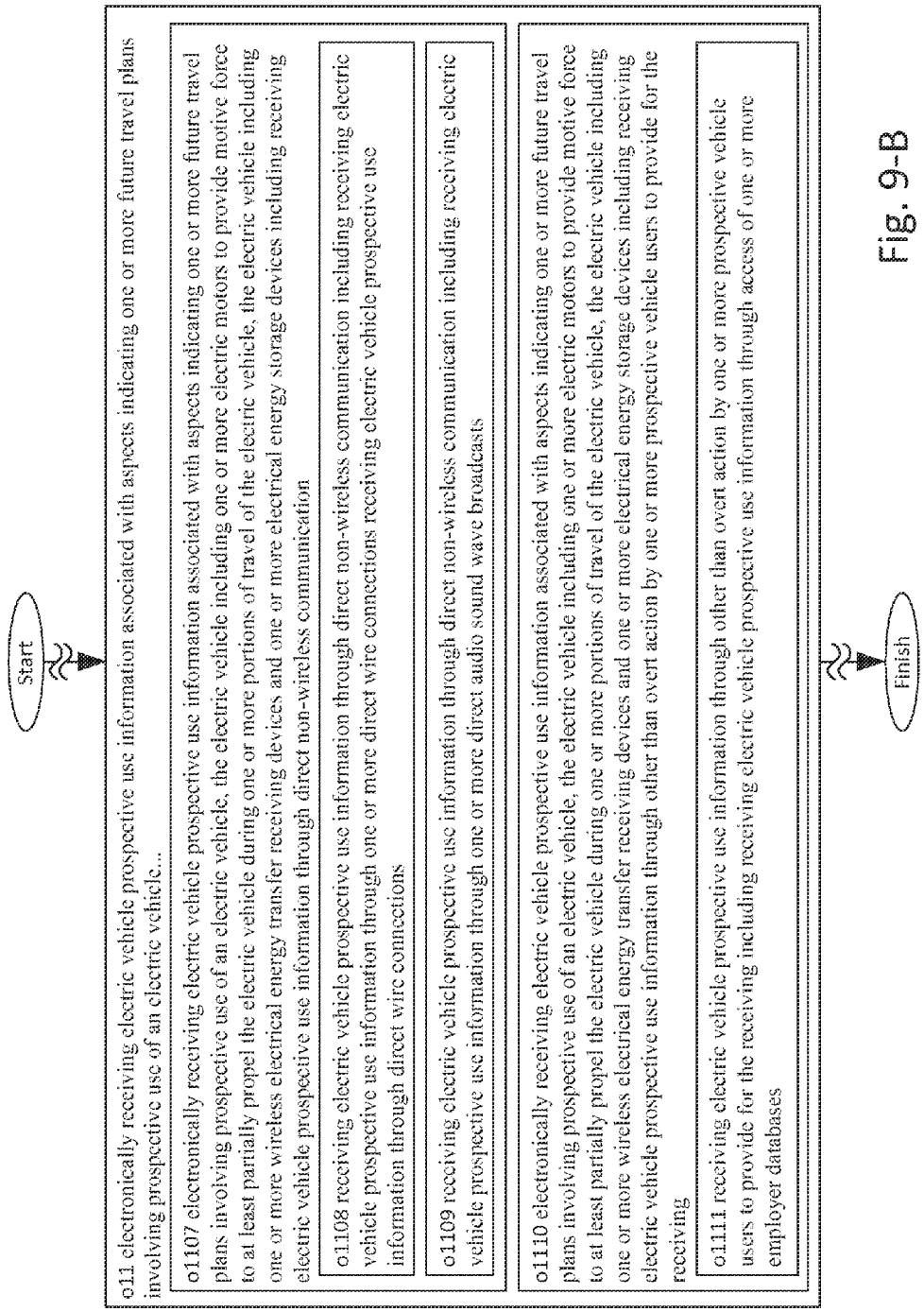
Fig. 9-B

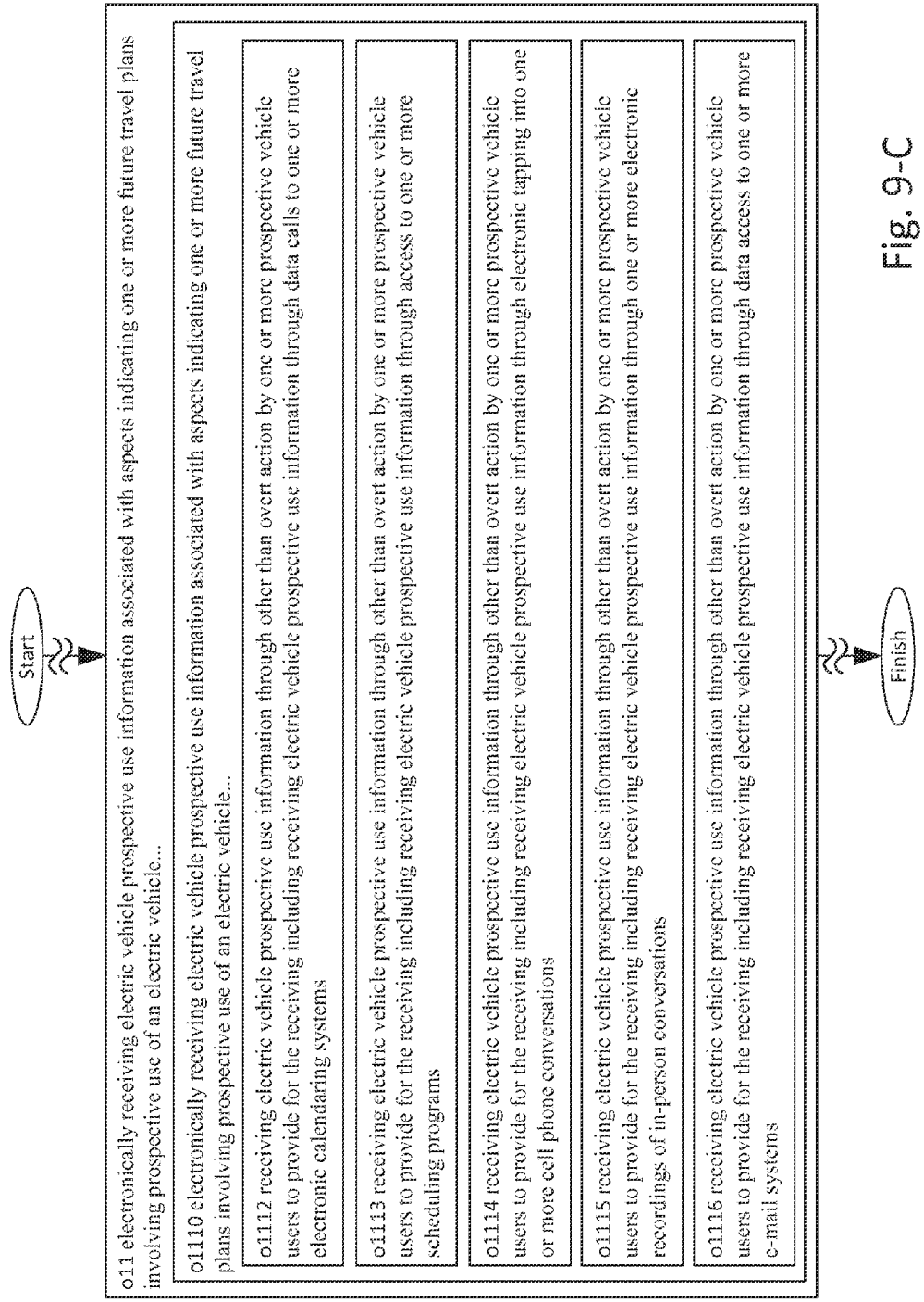
Fig. 9-C

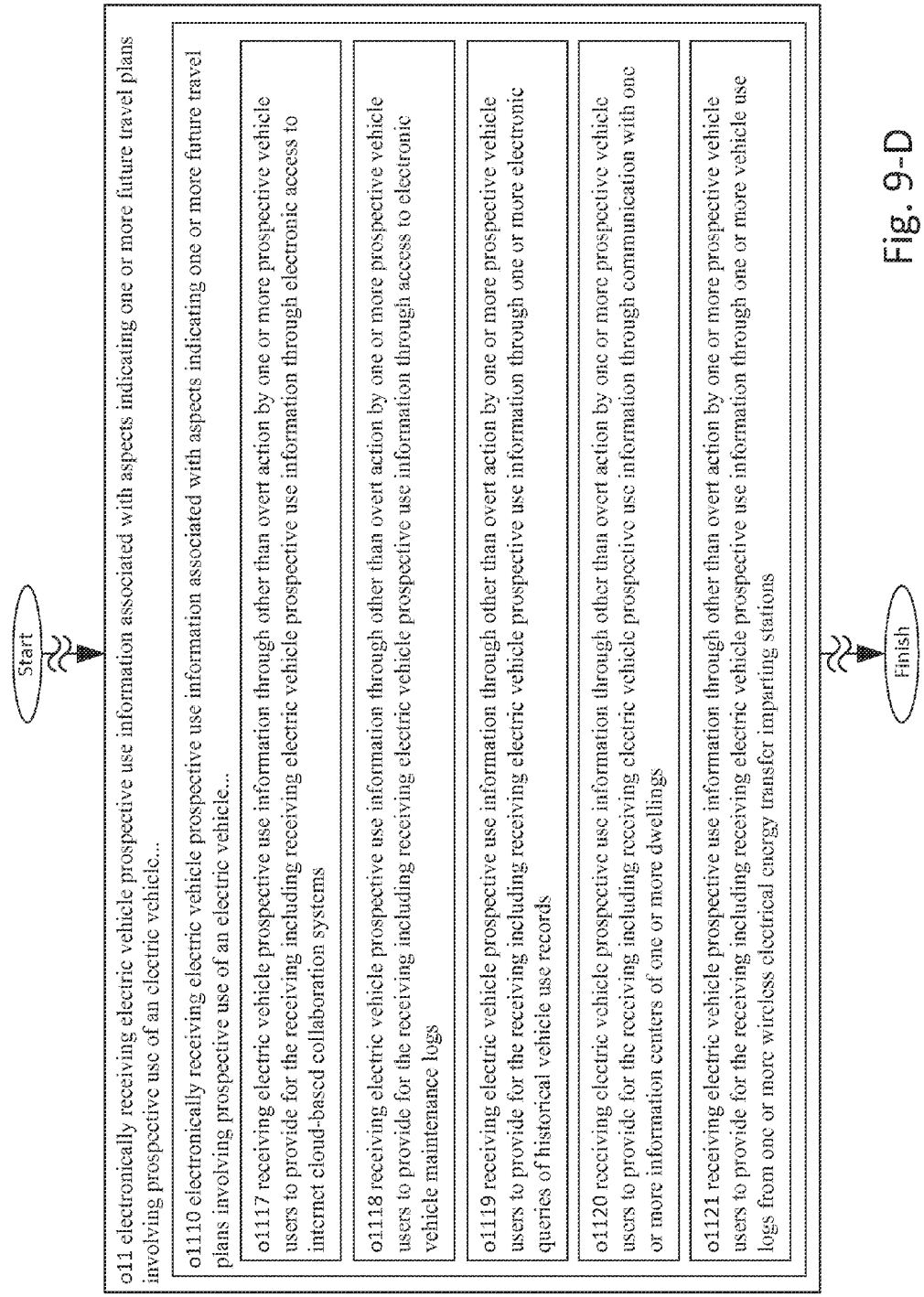
Fig. 9-D

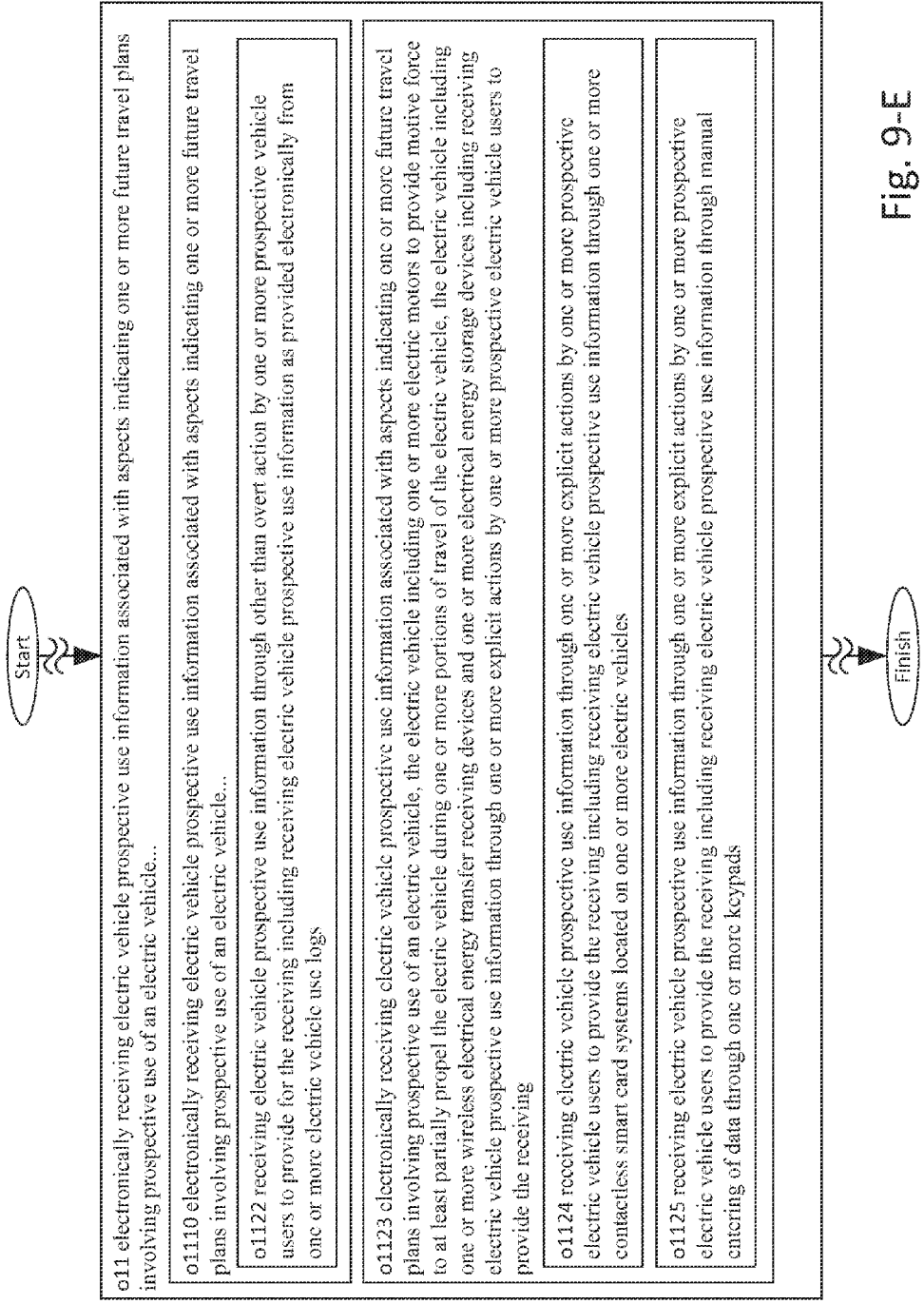
Fig. 9-E

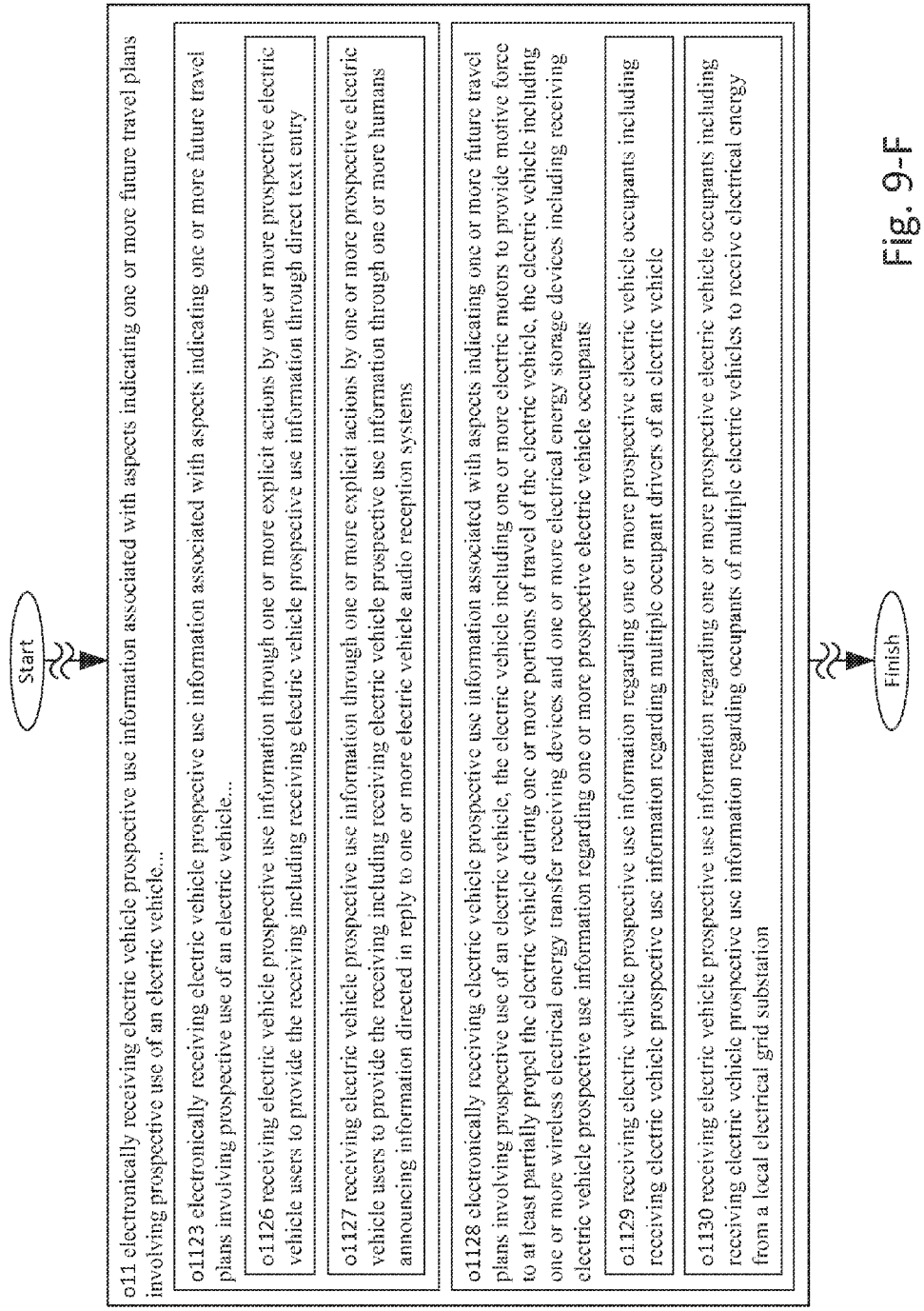
Fig. 9-F

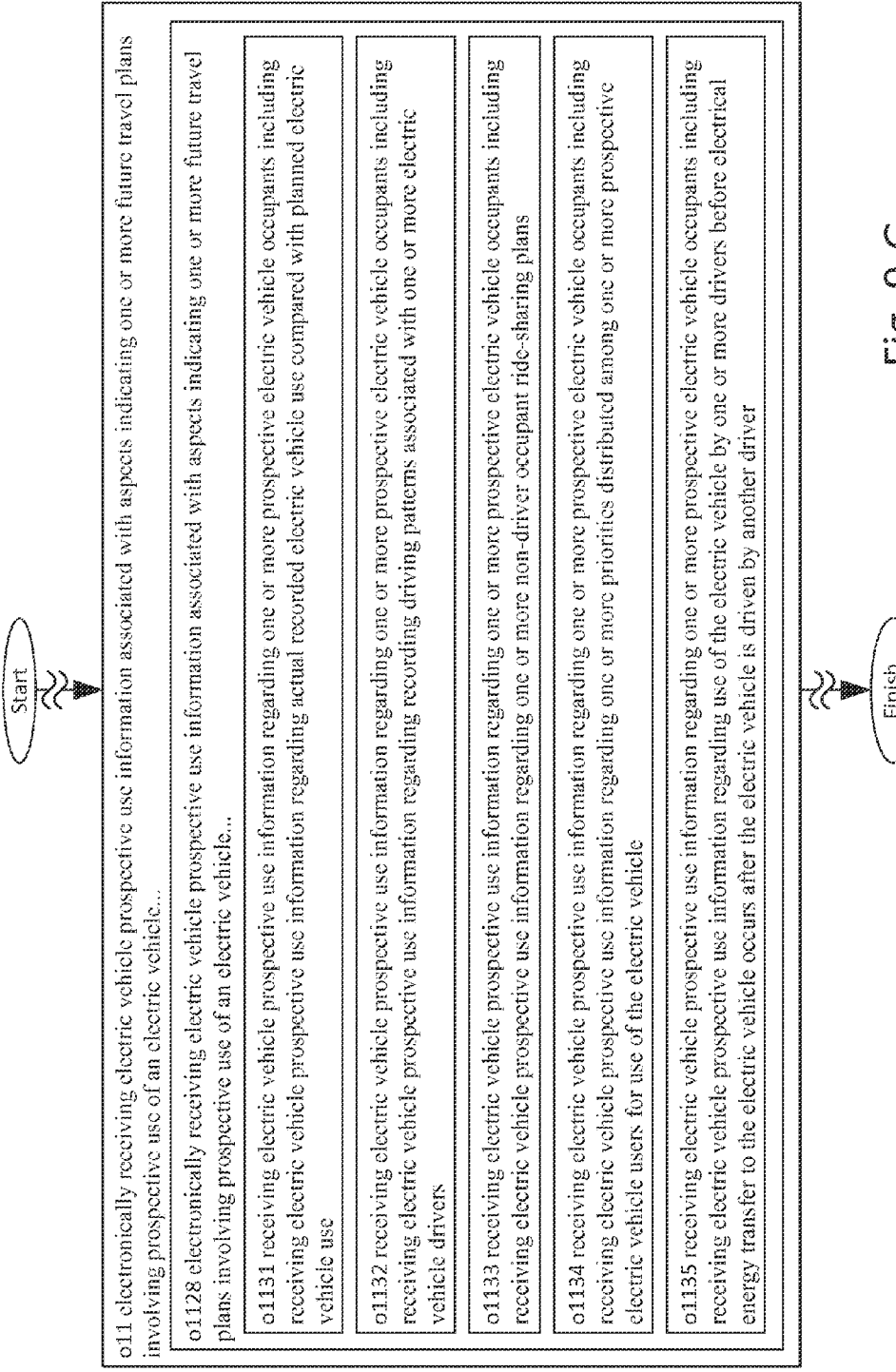
Fig. 9-G

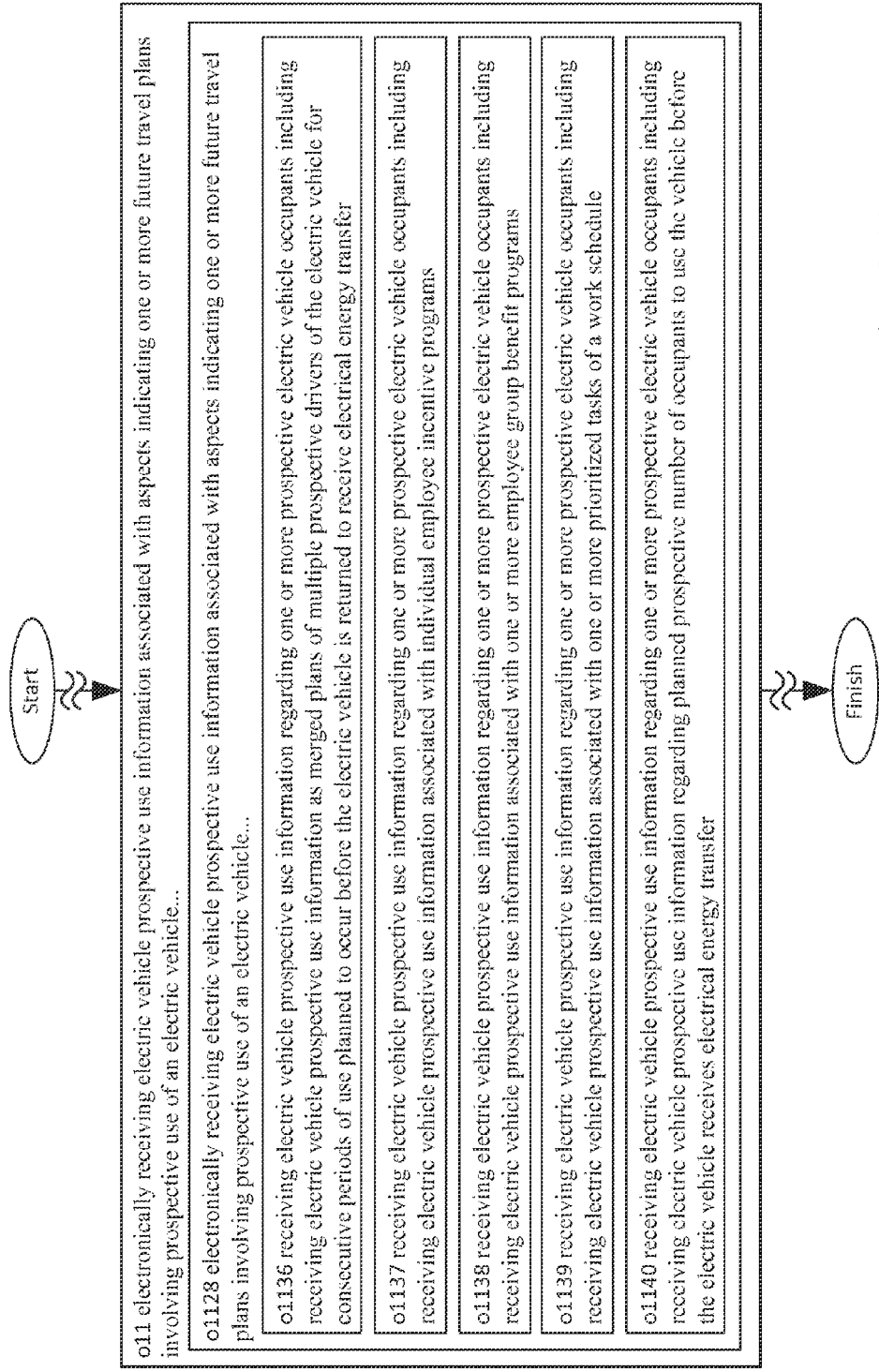
Fig. 9-H

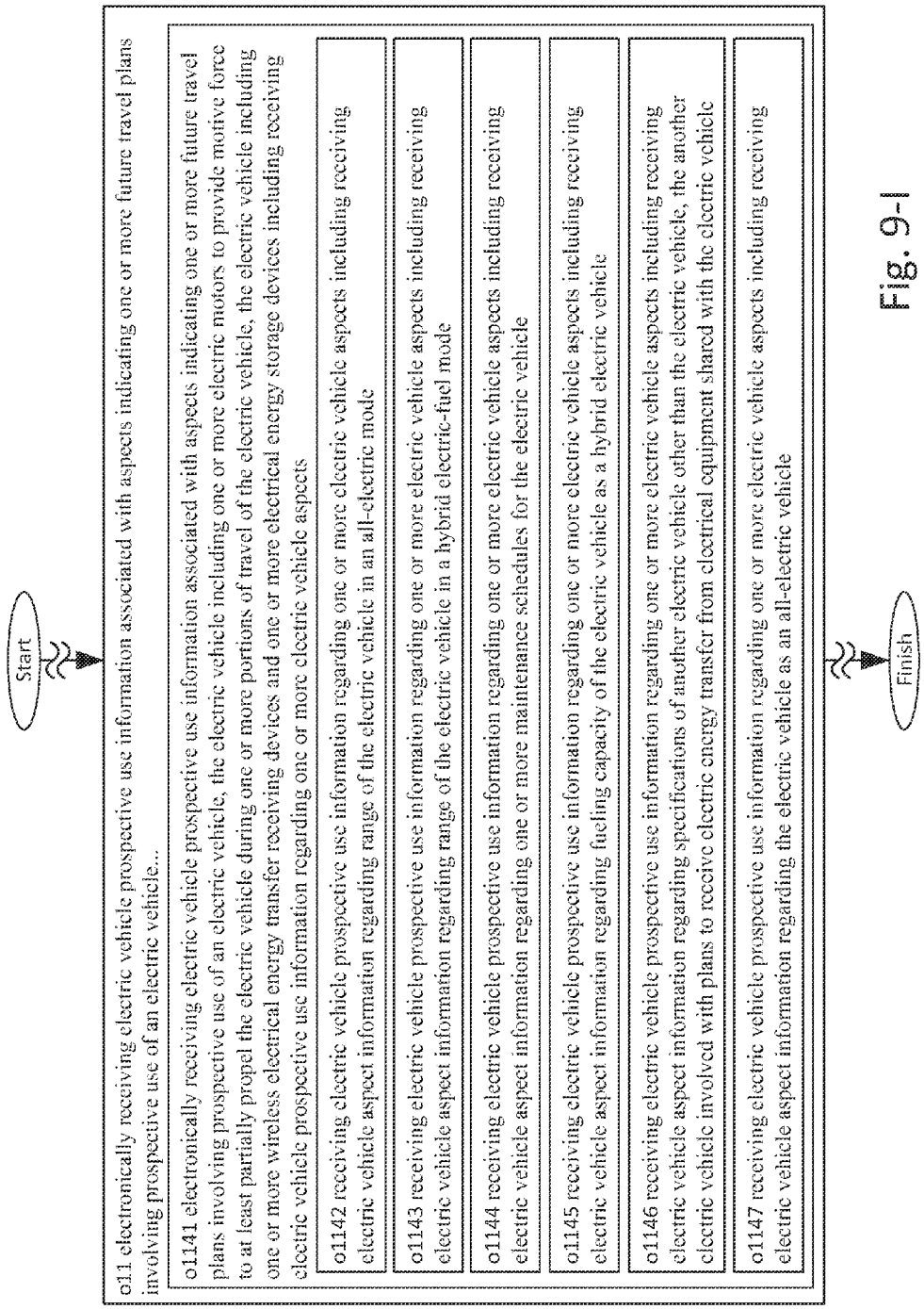
Fig. 9-I

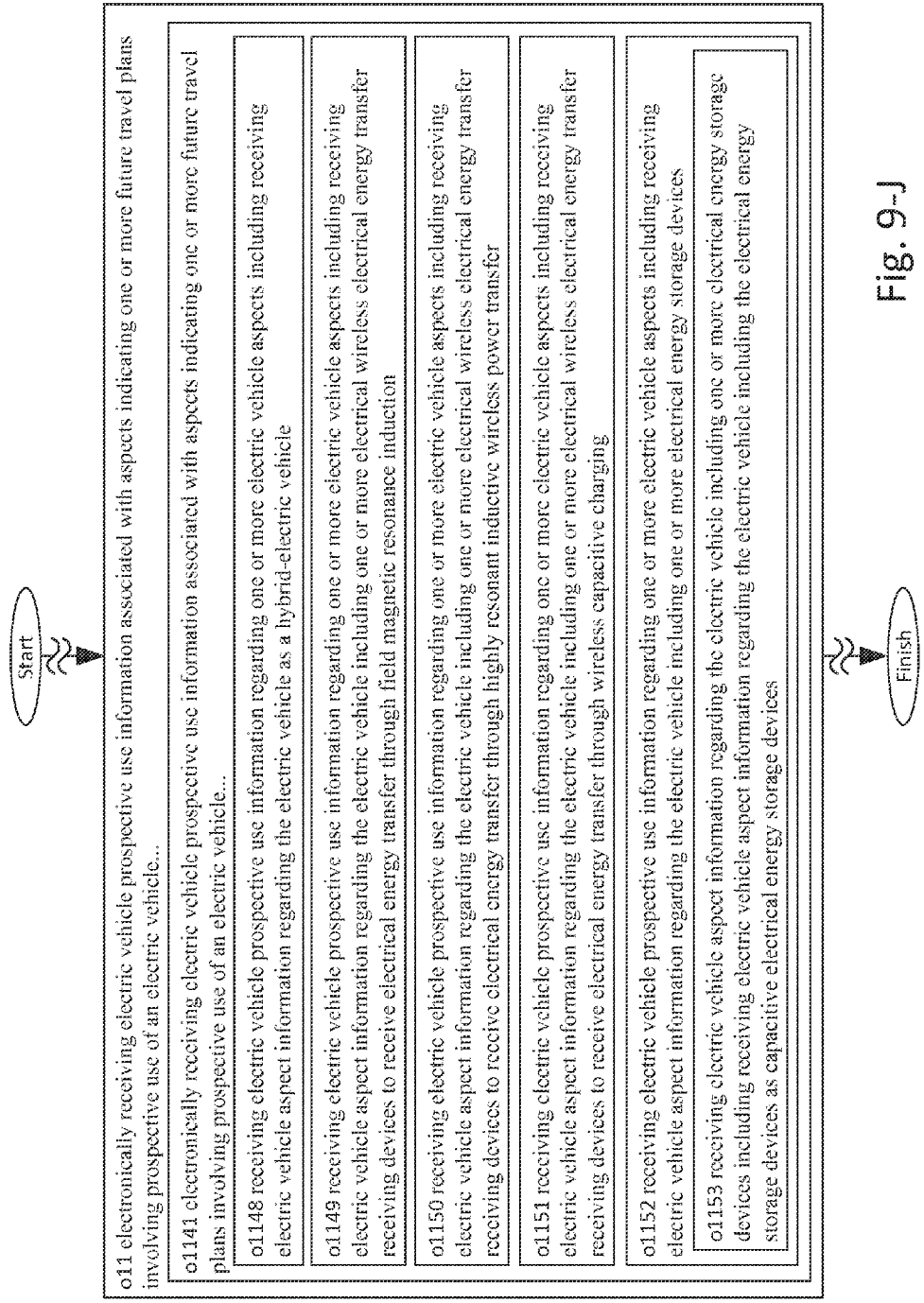
Fig. 9-J

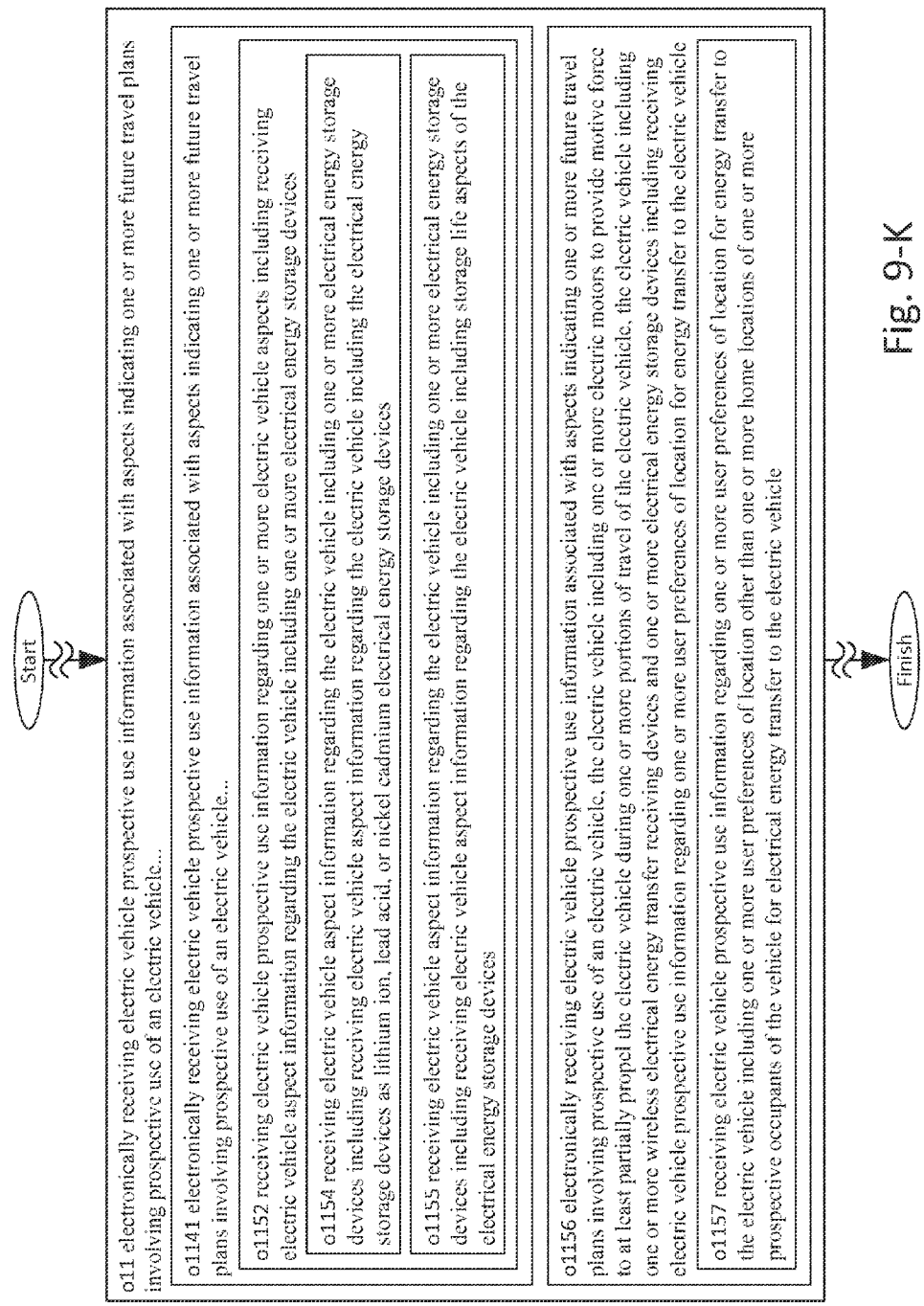
Fig. 9-K

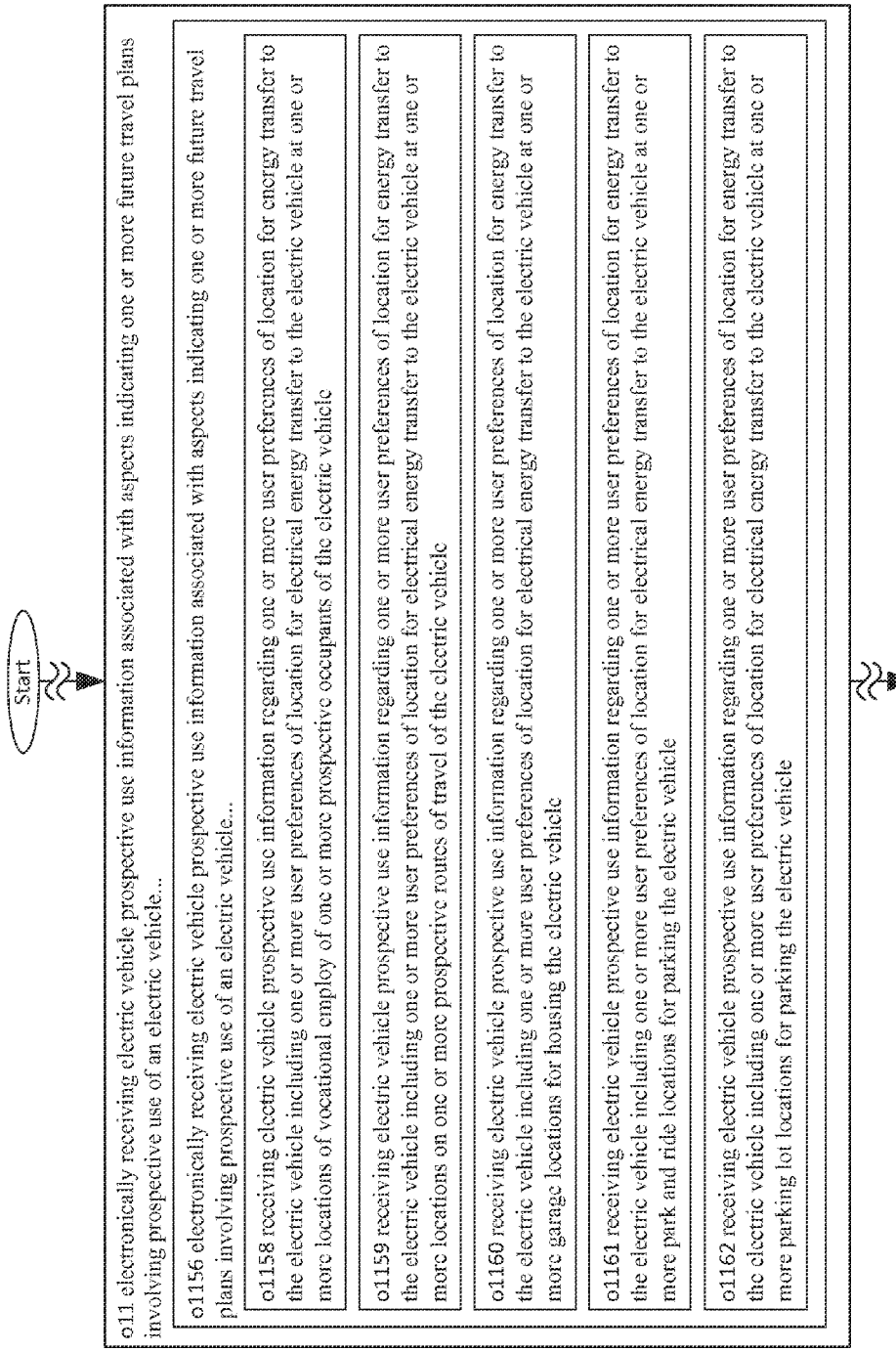
Fig. 9-L

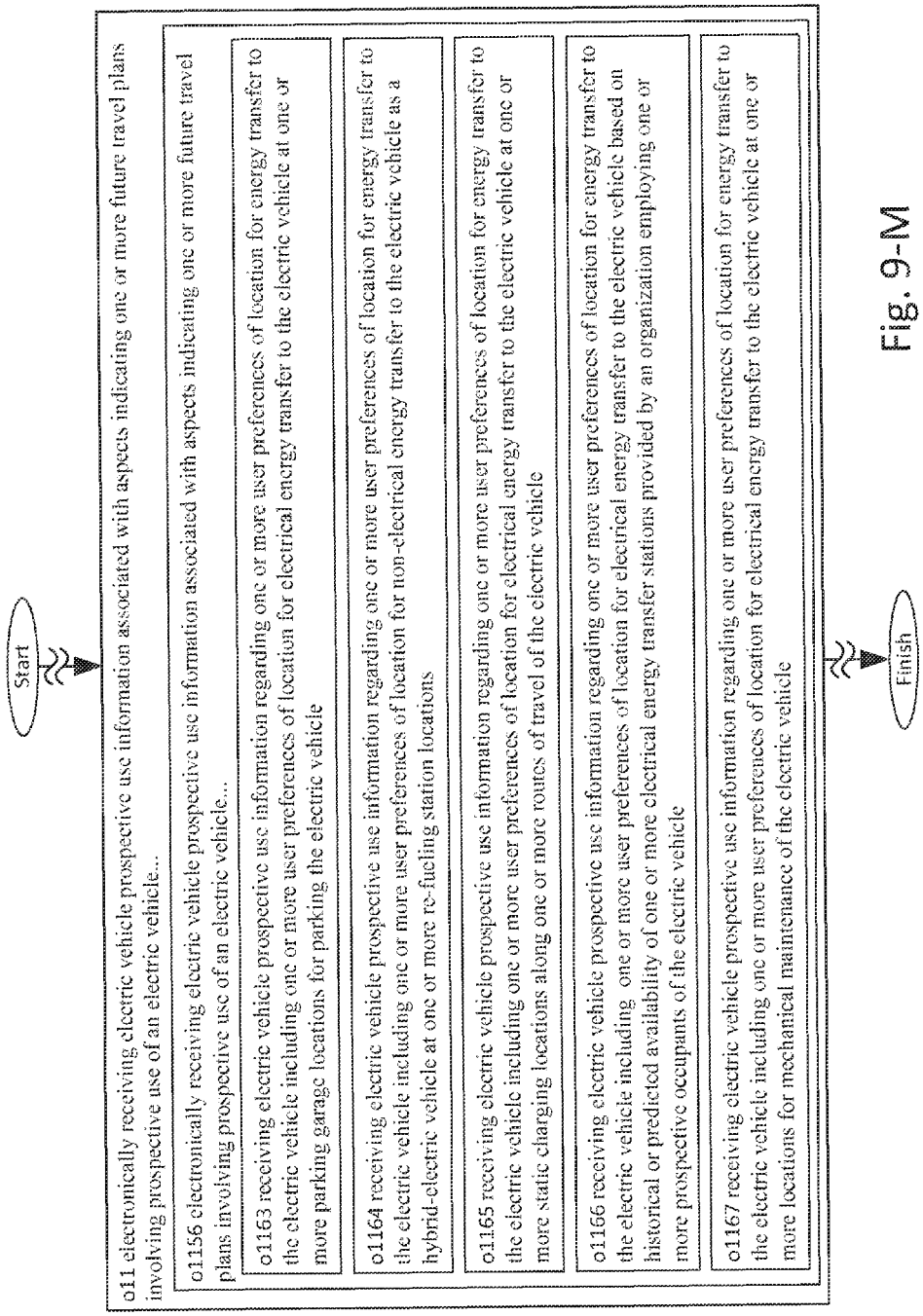
Fig. 9-M

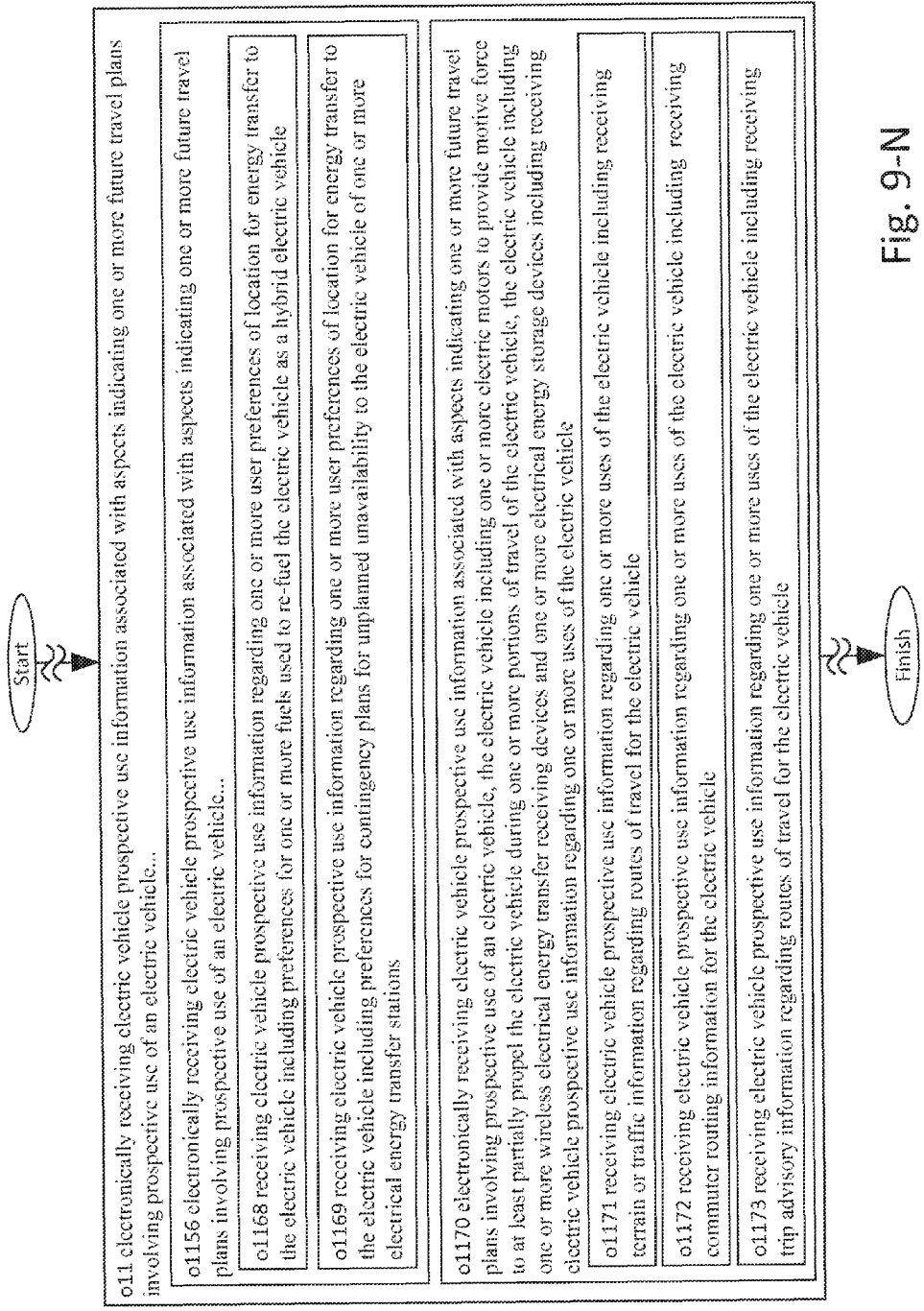
Fig. 9-N

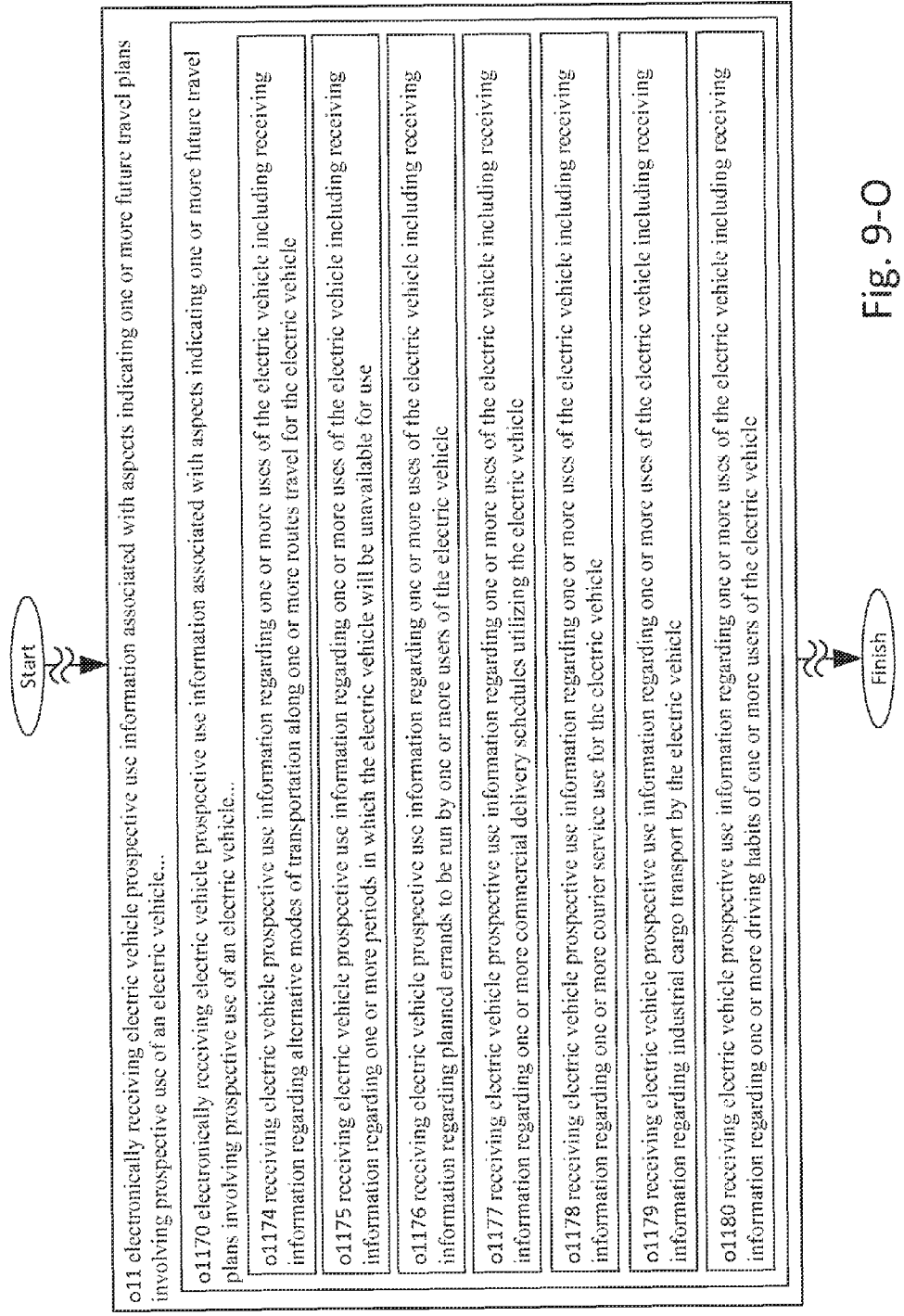
Fig. 9-O

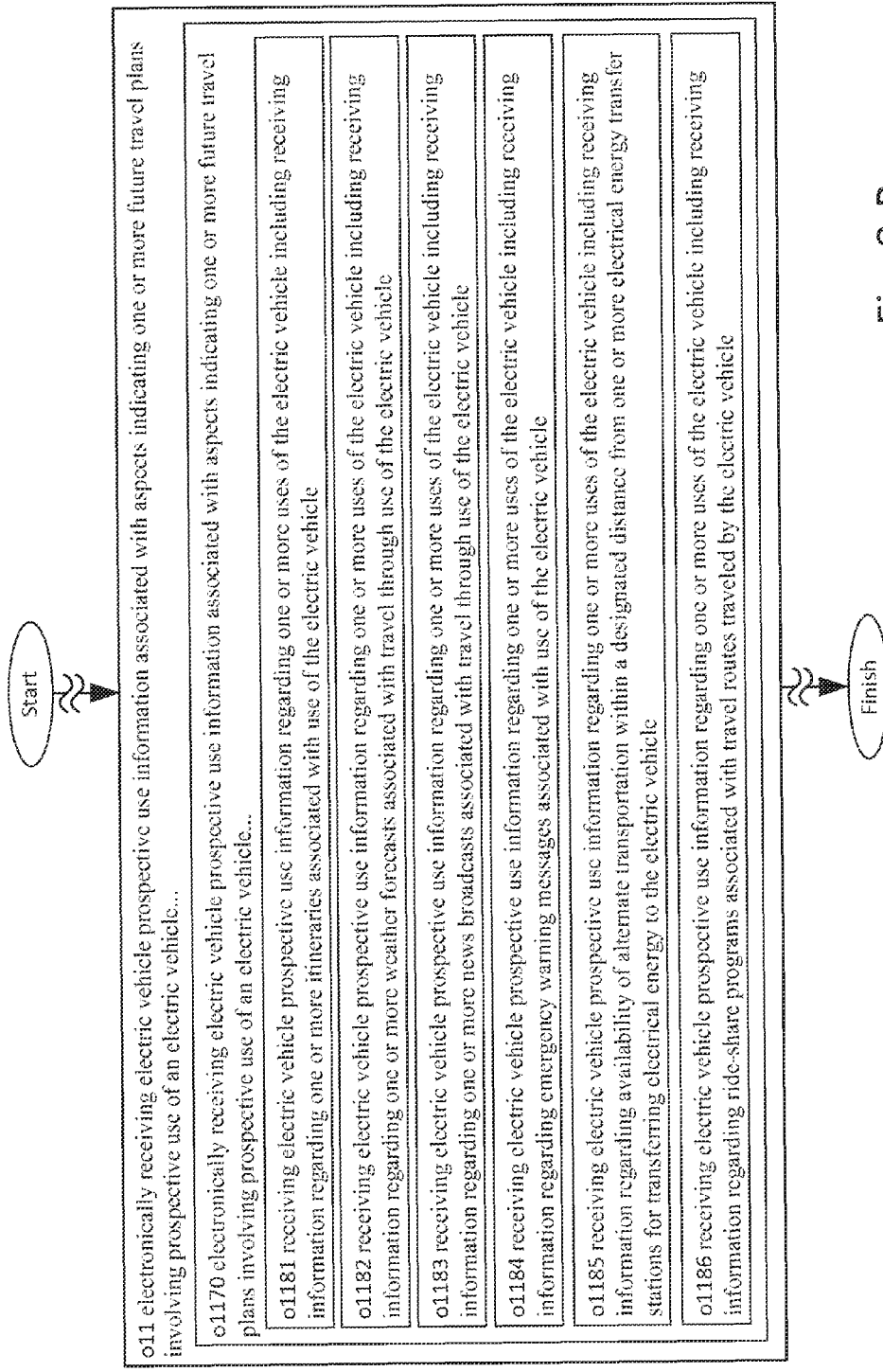
Fig. 9-P

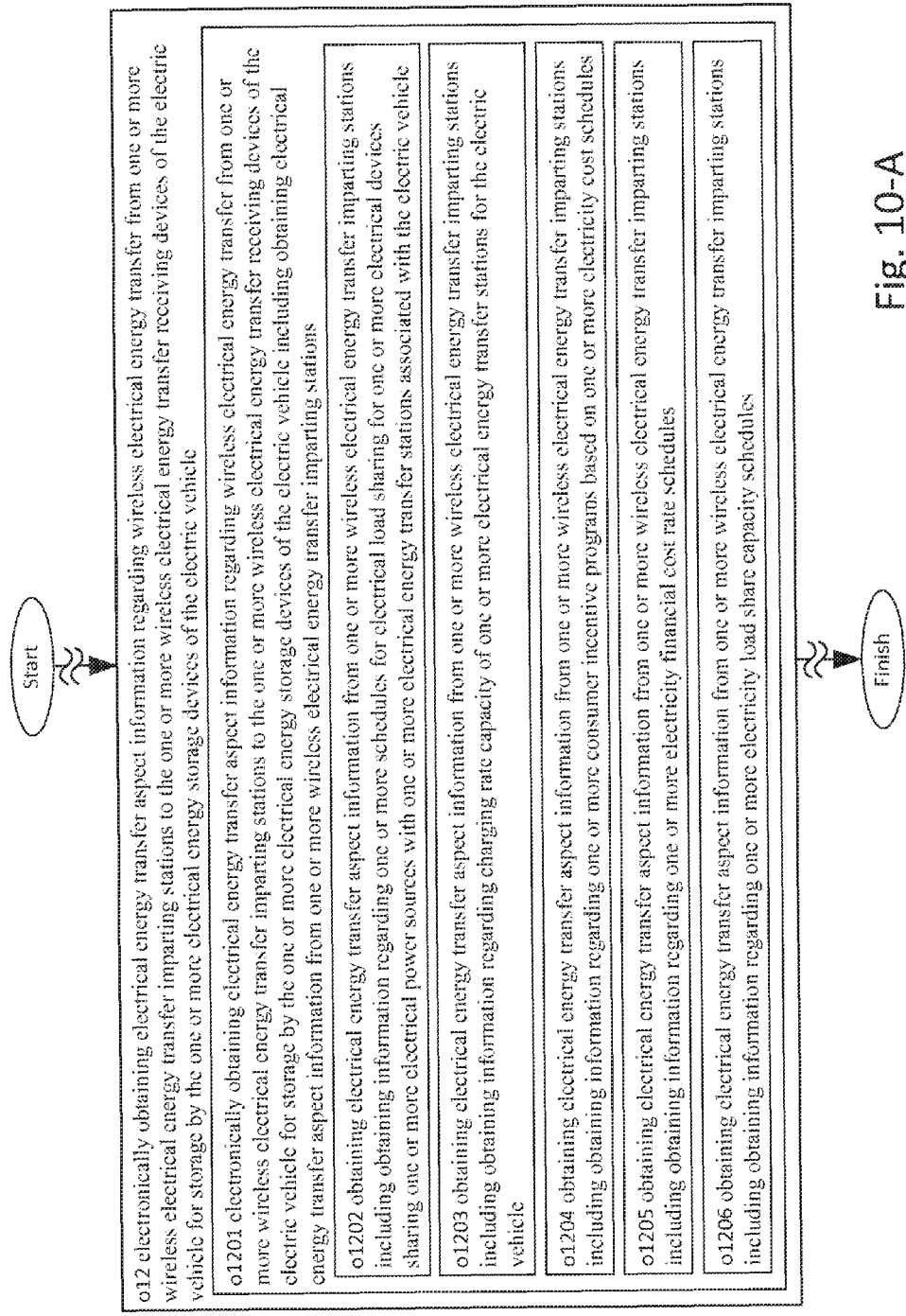
Fig. 10-A

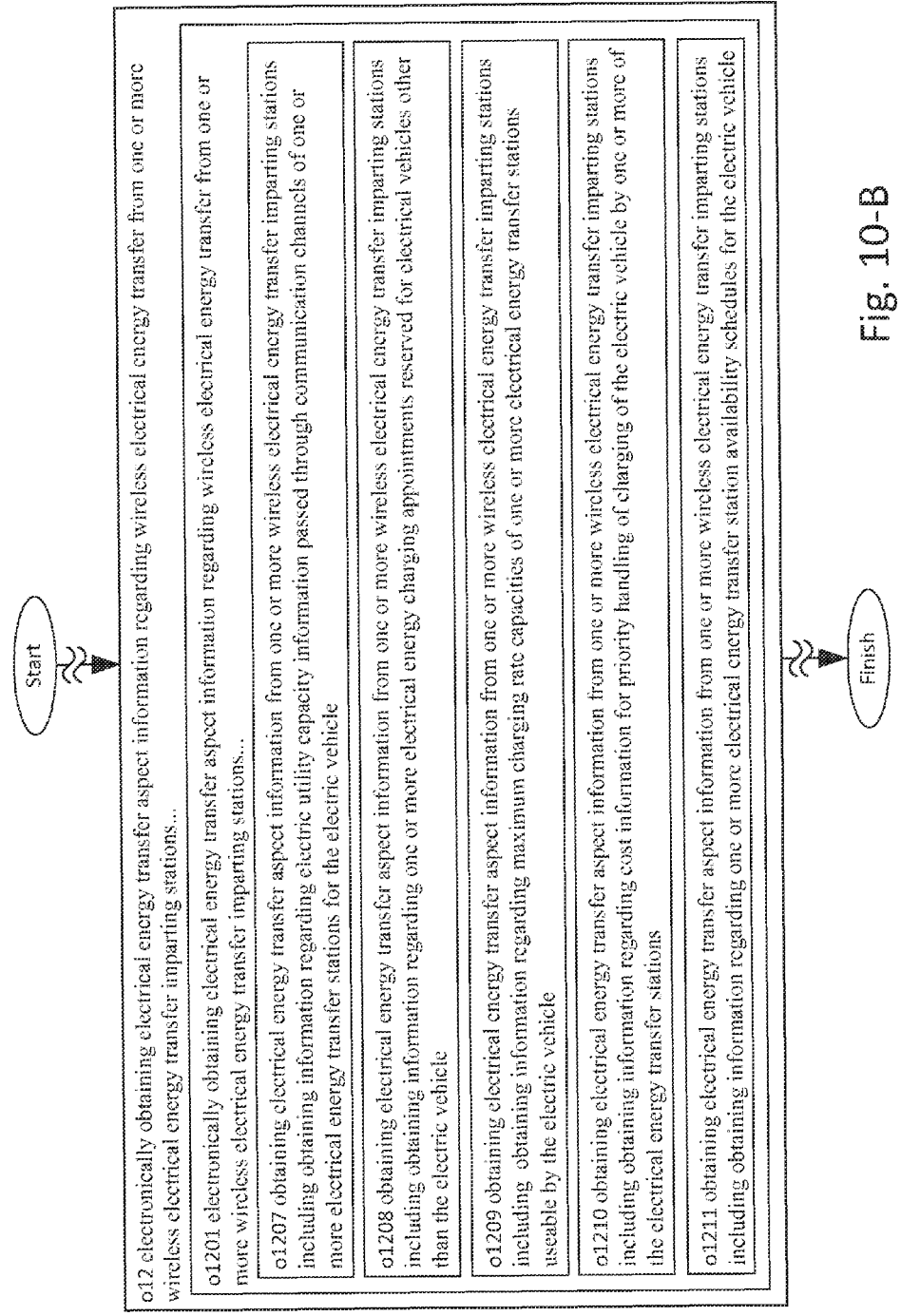
Fig. 10-B

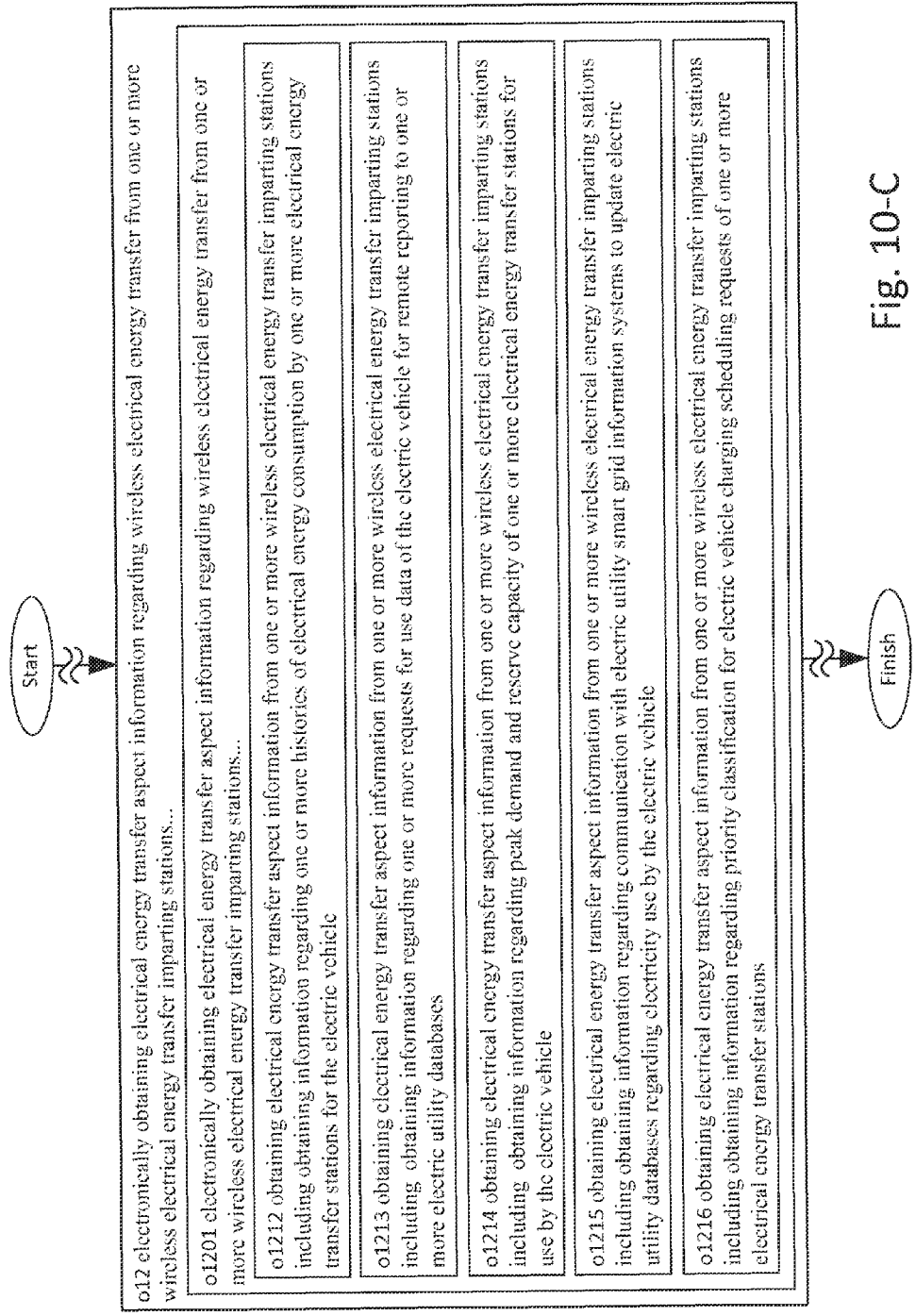
Fig. 10-C

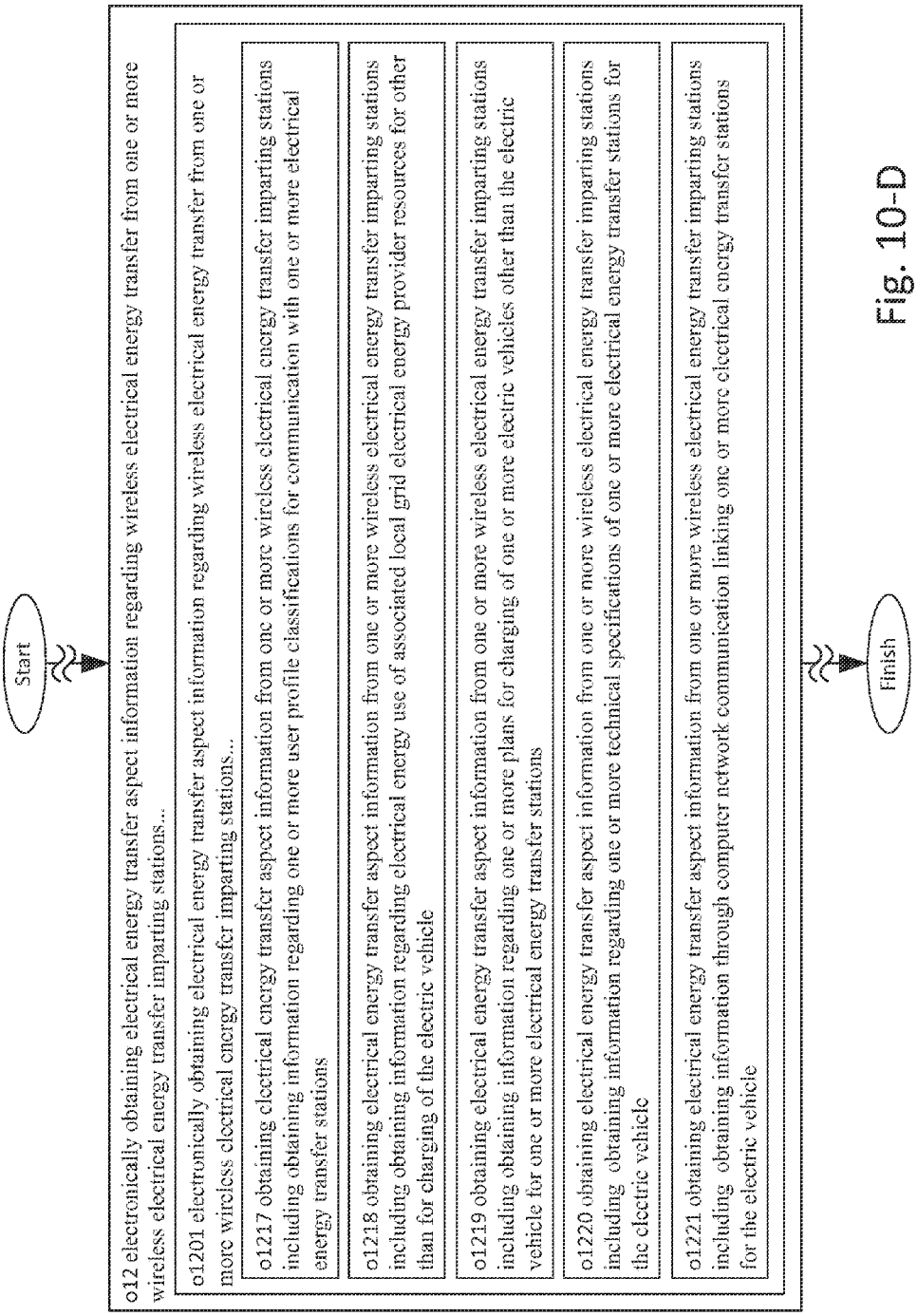
Fig. 10-D

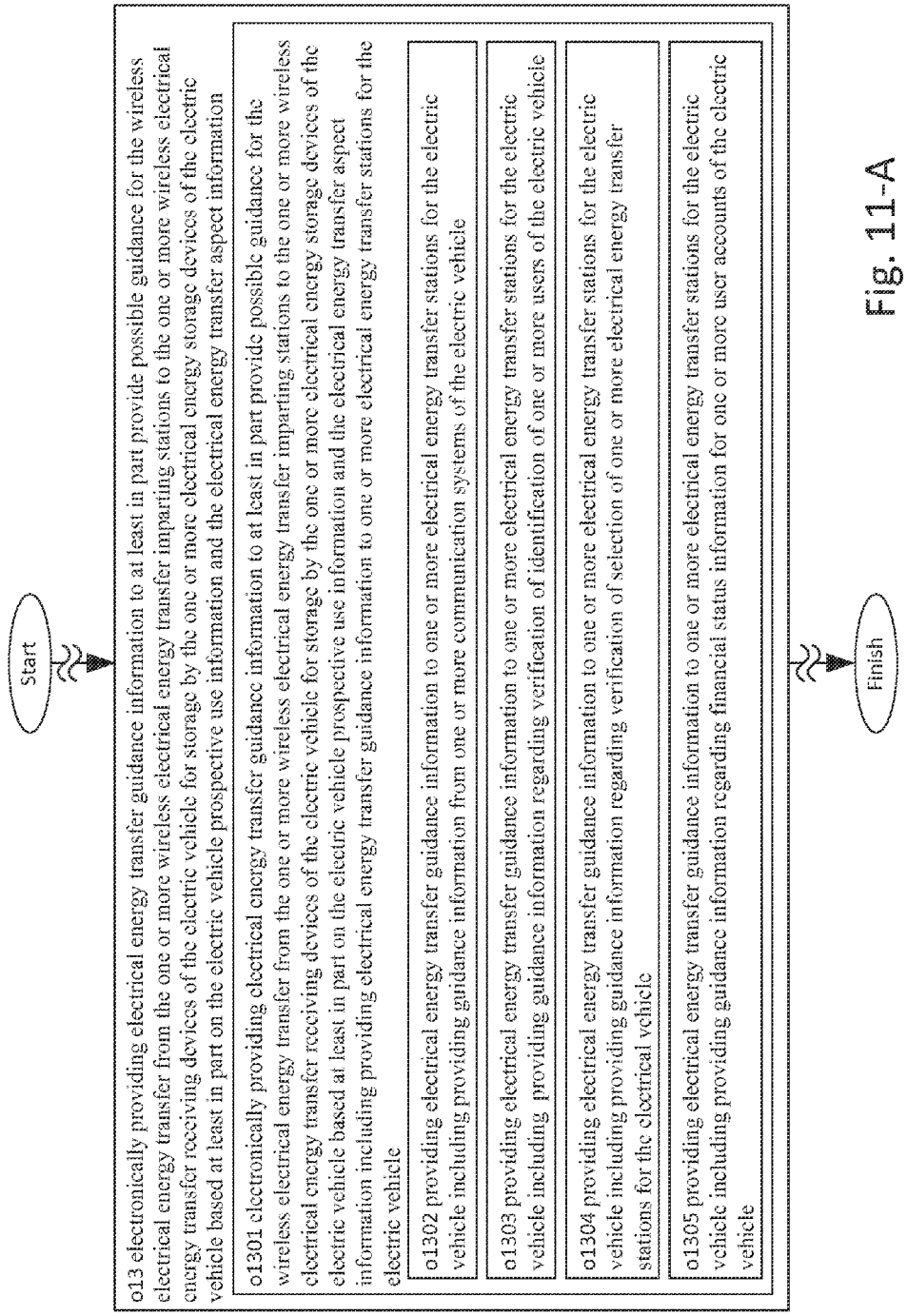
Fig. 11-A

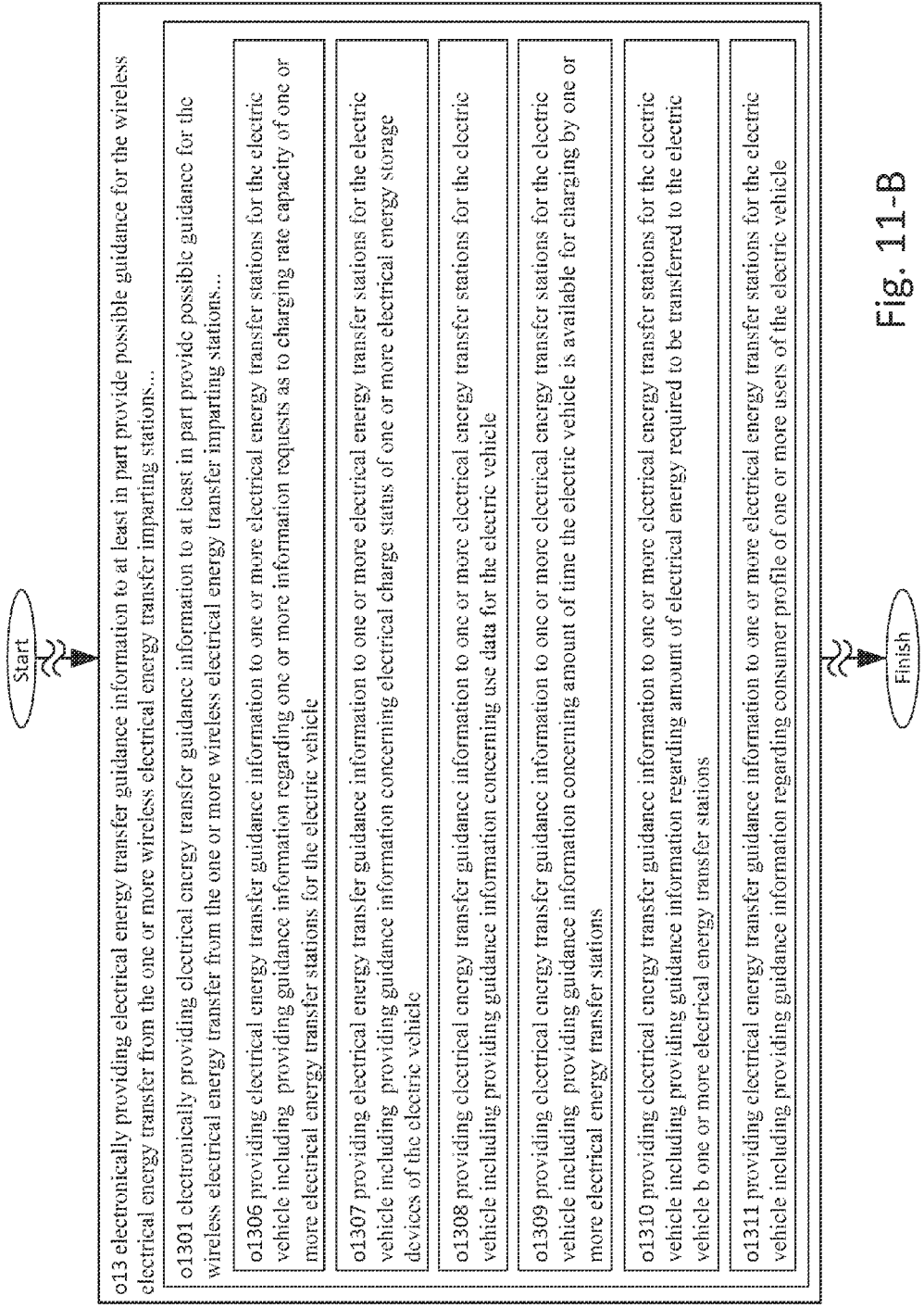
Fig. 11-B

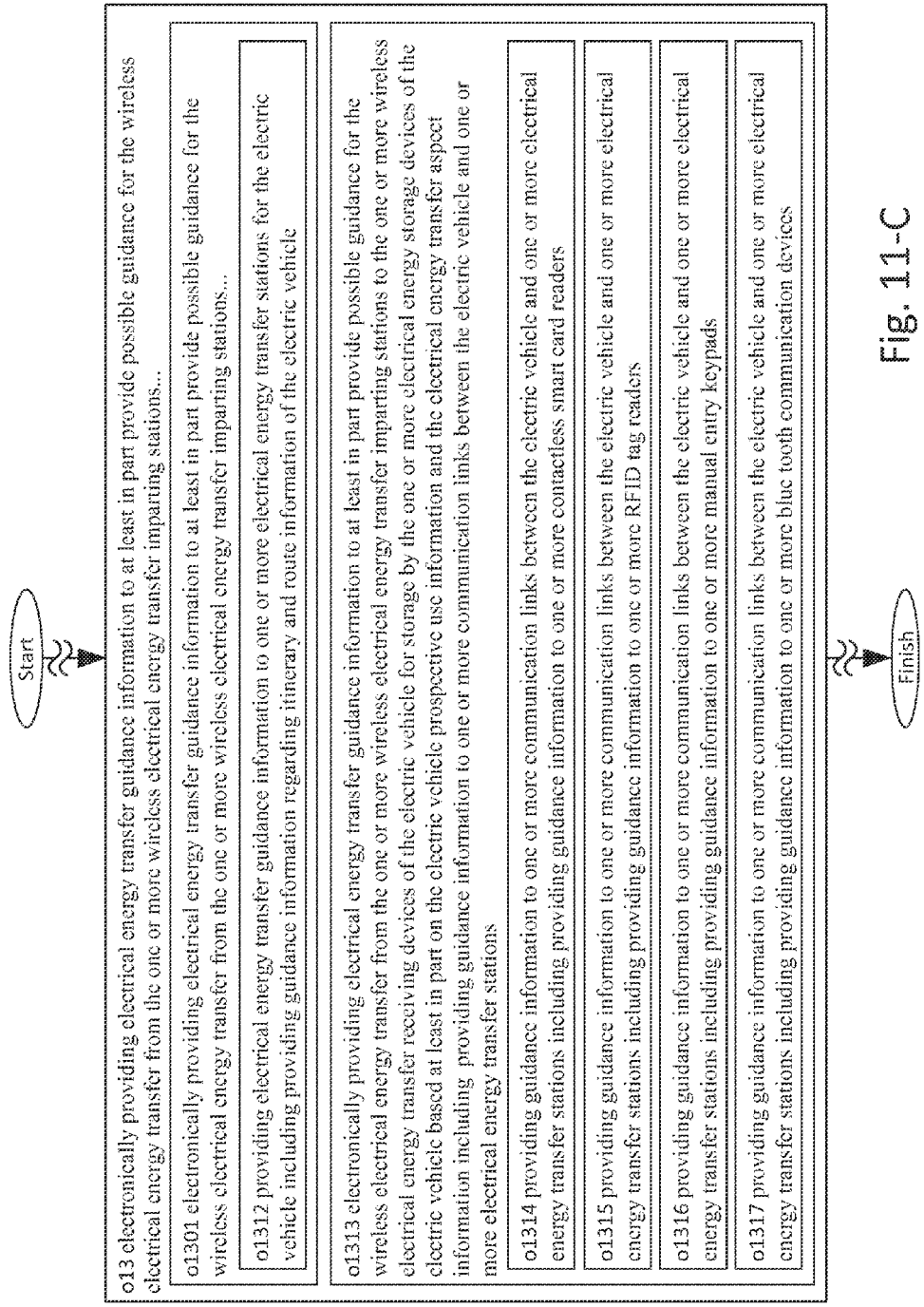
Fig. 11-C

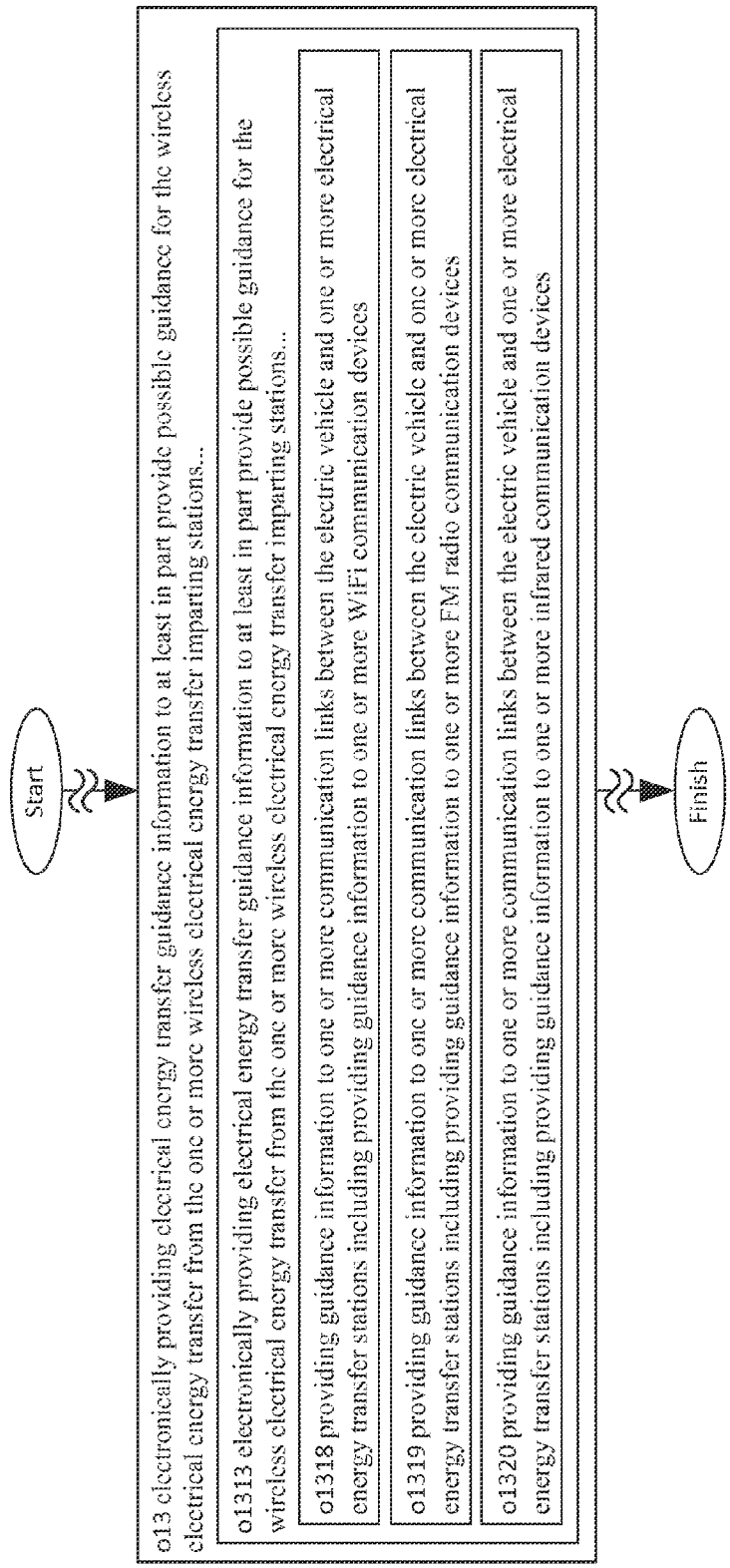
Fig. 11-D

COMMUNICATION AND CONTROL SYSTEM AND METHOD REGARDING ELECTRIC VEHICLE FOR WIRELESS ELECTRIC VEHICLE ELECTRICAL ENERGY TRANSFER

CROSS-REFERENCE TO RELATED APPLICATIONS

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

The present application constitutes a continuation of U.S. patent application Ser. No. 14/086,903, entitled COMMUNICATION AND CONTROL SYSTEM AND METHOD REGARDING ELECTRIC VEHICLE FOR WIRELESS ELECTRIC VEHICLE ELECTRICAL ENERGY TRANSFER, naming Roderick A. Hyde, Jordin T. Kare, Richard T. Lord, Robert W. Lord, Clarence T. Tegreene, Lowell L. Wood, Jr. as inventors, filed 21, Nov., 2013, which is currently co-pending or is an application of which a currently co-pending application is entitled to the benefit of the filing date.

The present application constitutes a continuation-in-part of U.S. patent application Ser. No. 14/041,443, entitled COMMUNICATION AND CONTROL REGARDING WIRELESS ELECTRIC VEHICLE ELECTRICAL ENERGY TRANSFER, naming Roderick A. Hyde, Jordin T. Kare, Richard T. Lord, Robert W. Lord, Clarence T. Tegreene, Lowell L. Wood, Jr. as inventors, filed 30, Sep., 2013, which is currently co-pending or is an application of which a currently co-pending application is entitled to the benefit of the filing date.

The present application constitutes a continuation-in-part of U.S. patent application Ser. No. 14/092,126, entitled COMMUNICATION AND CONTROL REGARDING ELECTRICITY PROVIDER FOR WIRELESS ELECTRIC VEHICLE ELECTRICAL ENERGY TRANSFER, naming Roderick A. Hyde, Jordin T. Kare, Richard T. Lord, Robert W. Lord, Clarence T. Tegreene, Lowell L. Wood, Jr. as inventors, filed 27, Nov., 2013, which is currently co-pending or is an application of which a currently co-pending application is entitled to the benefit of the filing date.

The present application constitutes a continuation-in-part of U.S. patent application Ser. No. 14/091,702, entitled COMMUNICATION AND CONTROL REGARDING ELECTRICITY PROVIDER FOR WIRELESS ELECTRIC VEHICLE ELECTRICAL ENERGY TRANSFER, naming Roderick A. Hyde, Jordin T. Kare, Richard T. Lord, Robert W. Lord, Clarence T. Tegreene, Lowell L. Wood, Jr. as inventors, filed 27, Nov., 2013, which is currently co-pending or is an application of which a currently co-pending application is entitled to the benefit of the filing date.

The present application constitutes a continuation-in-part of U.S. patent application Ser. No. 14/092,306, COMMUNICATION AND CONTROL SYSTEM AND METHOD REGARDING ELECTRIC VEHICLE CHARGING EQUIPMENT FOR WIRELESS ELECTRIC VEHICLE ELECTRICAL ENERGY TRANSFER, naming Roderick A. Hyde, Jordin T. Kare, Richard T. Lord, Robert W. Lord, Clarence T. Tegreene, Lowell L. Wood, Jr. as inventors, filed 27, Nov., 2013, which is currently co-pending or is an application of which a currently co-pending application is entitled to the benefit of the filing date.

The present application constitutes a continuation-in-part of U.S. patent application Ser. No. 14/089,513, entitled COMMUNICATION AND CONTROL SYSTEM AND METHOD REGARDING ELECTRIC VEHICLE CHARGING EQUIPMENT FOR WIRELESS ELECTRIC VEHICLE ELECTRICAL ENERGY TRANSFER, naming Roderick A. Hyde, Jordin T. Kare, Richard T. Lord, Robert W. Lord, Clarence T. Tegreene, Lowell L. Wood, Jr. as inventors, filed 25, Nov., 2013, which is currently co-pending or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

In one aspect, a computationally-implemented method includes, but is not limited to electronically receiving electric vehicle prospective use information associated with aspects indicating one or more future travel plans involving prospective use of an electric vehicle, the electric vehicle including one or more electric motors to provide motive force to at least partially propel the electric vehicle during one or more portions of travel of the electric vehicle, the electric vehicle including one or more wireless electrical energy transfer receiving devices and one or more electrical energy storage devices; electronically obtaining electrical energy transfer aspect information regarding wireless electrical energy transfer from one or more wireless electrical energy transfer imparting stations to the one or more wireless electrical energy transfer receiving devices of the electric vehicle for storage by the one or more electrical energy storage devices of the electric vehicle; and electronically providing electrical energy transfer guidance information to at least in part provide possible guidance for the wireless electrical energy transfer from the one or more wireless electrical energy transfer imparting stations to the one or more wireless electrical energy transfer receiving devices of the electric vehicle for storage by the one or more electrical energy storage devices of the electric vehicle based at least in part on the electric vehicle prospective use information and the electrical energy transfer aspect information. In addition to the foregoing, other method aspects are described in the claims, drawings, and text forming a part of the disclosure set forth herein.

In one or more various aspects, related machines, compositions of matter, or manufactures of systems may include, but are not limited to, circuitry and/or programming for effecting the herein-referenced method aspects; the circuitry and/or programming can be virtually any combination of hardware, software, and/or firmware configured to effect the herein-referenced method aspects depending upon the design choices of the system designer (limited to patentable subject matter under 35 USC 101).

A computationally-implemented system includes, but is not limited to: means for electronically receiving electric vehicle prospective use information associated with aspects indicating one or more future travel plans involving prospective use of an electric vehicle, the electric vehicle including one or more electric motors to provide motive force to at least partially propel the electric vehicle during one or more portions of travel of the electric vehicle, the electric vehicle including one or more wireless electrical energy transfer receiving devices and one or more electrical energy storage devices; means for electronically obtaining electrical energy transfer aspect information regarding wireless electrical energy transfer from one or more wireless electrical energy transfer imparting stations to the one or more wireless electrical energy transfer receiving devices of the electric vehicle for storage by the one or more electrical energy storage devices of the electric vehicle; and means for electronically providing electrical energy transfer guidance information to at least in part provide possible guidance for the wireless electrical energy transfer from the one or more wireless electrical energy transfer imparting stations to the one or more wireless electrical energy transfer receiving devices of the electric vehicle for storage by the one or more electrical energy storage devices of the electric vehicle based at least in part on the electric vehicle prospective use information and the electrical energy transfer aspect information. In addition to the foregoing, other system aspects are described in the claims, drawings, and text forming a part of the disclosure set forth herein.

A computationally-implemented system includes, but is not limited to electrical circuitry arrangement for electronically receiving electric vehicle prospective use information associated with aspects indicating future travel plans involving prospective use of an electric vehicle, the electric vehicle including electric motors to provide motive force to partially propel the electric vehicle during portions of travel of the electric vehicle, the electric vehicle including wireless electrical energy transfer receiving devices and electrical energy storage devices; electrical circuitry arrangement for electronically obtaining electrical energy transfer aspect information regarding wireless electrical energy transfer from wireless electrical energy transfer imparting stations to the wireless electrical energy transfer receiving devices of the electric vehicle for storage by the electrical energy storage devices of the electric vehicle; and electrical circuitry arrangement for electronically providing electrical energy transfer guidance information to in part provide possible guidance for the wireless electrical energy transfer from the wireless electrical energy transfer imparting stations to the wireless electrical energy transfer receiving devices of the electric vehicle for storage by the electrical energy storage devices of the electric vehicle based in part on the electric vehicle prospective use information and the electrical energy transfer aspect information. In addition to the foregoing, other system aspects are described in the claims, drawings, and text forming a part of the disclosure set forth herein.

A system includes, but is not limited to electronically receiving electric vehicle prospective use information associated with aspects indicating future travel plans involving prospective use of an electric vehicle, the electric vehicle including electric motors to provide motive force to partially propel the electric vehicle during portions of travel of the electric vehicle, the electric vehicle including wireless electrical energy transfer receiving devices and electrical energy storage devices module configured to operate in accordance with electronically receiving electric vehicle prospective use information associated with aspects indicating one or more future travel plans involving prospective use of an electric vehicle, the electric vehicle including one or more electric motors to provide motive force to at least partially propel the electric vehicle during one or more portions of travel of the electric vehicle, the electric vehicle including one or more wireless electrical energy transfer receiving devices and one or more electrical energy storage devices; electronically obtaining electrical energy transfer aspect information regarding wireless electrical energy transfer from wireless electrical energy transfer imparting stations to the wireless electrical energy transfer receiving devices of the electric vehicle for storage by the electrical energy storage devices of the electric vehicle module configured to operate in accordance with electronically obtaining electrical energy transfer aspect information regarding wireless electrical energy transfer from one or more wireless electrical energy transfer imparting stations to the one or more wireless electrical energy transfer receiving devices of the electric vehicle for storage by the one or more electrical energy storage devices of the electric vehicle; electronically providing electrical energy transfer guidance information to in part provide possible guidance for the wireless electrical energy transfer from the wireless electrical energy transfer imparting stations to the wireless electrical energy transfer receiving devices of the electric vehicle for storage by the electrical energy storage devices of the electric vehicle based in part on the electric vehicle prospective use information and the electrical energy transfer aspect information module configured to operate in accordance with electronically providing electrical energy transfer guidance information to at least in part provide possible guidance for the wireless electrical energy transfer from the one or more wireless electrical energy transfer imparting stations to the one or more wireless electrical energy transfer receiving devices of the electric vehicle for storage by the one or more electrical energy storage devices of the electric vehicle based at least in part on the electric vehicle prospective use information and the electrical energy transfer aspect information. In addition to the foregoing, other system aspects are described in the claims, drawings, and text forming a part of the disclosure set forth herein.

An article of manufacture including one or more non-transitory signal-bearing storage medium bearing one or more instructions for electronically receiving electric vehicle prospective use information associated with aspects indicating one or more future travel plans involving prospective use of an electric vehicle, the electric vehicle including one or more electric motors to provide motive force to at least partially propel the electric vehicle during one or more portions of travel of the electric vehicle, the electric vehicle including one or more wireless electrical energy transfer receiving devices and one or more electrical energy storage devices; one or more instructions for electronically obtaining electrical energy transfer aspect information regarding wireless electrical energy transfer from one or more wireless electrical energy transfer imparting stations to the one or more wireless electrical energy transfer receiving devices of the electric vehicle for storage by the one or more electrical energy storage devices of the electric vehicle; and one or more instructions for electronically providing electrical energy transfer guidance information to at least in part provide possible guidance for the wireless electrical energy transfer from the one or more wireless electrical energy transfer imparting stations to the one or more wireless electrical energy transfer receiving devices of the electric vehicle for storage by the one or more electrical energy storage devices of the electric vehicle based at least in part on the electric vehicle prospective use information and the electrical energy transfer aspect information. In addition to the foregoing, other computer program product aspects are described in the claims, drawings, and text forming a part of the disclosure set forth herein.

A system including one or more computing devices; and one or more instructions when executed on the one or more computing devices cause the one or more computing devices to perform electronically receiving electric vehicle prospective use information associated with aspects indicating one or more future travel plans involving prospective use of an electric vehicle, the electric vehicle including one or more electric motors to provide motive force to at least partially propel the electric vehicle during one or more portions of travel of the electric vehicle, the electric vehicle including one or more wireless electrical energy transfer receiving devices and one or more electrical energy storage devices; electronically obtaining electrical energy transfer aspect information regarding wireless electrical energy transfer from one or more wireless electrical energy transfer imparting stations to the one or more wireless electrical energy transfer receiving devices of the electric vehicle for storage by the one or more electrical energy storage devices of the electric vehicle; and electronically providing electrical energy transfer guidance information to at least in part provide possible guidance for the wireless electrical energy transfer from the one or more wireless electrical energy transfer imparting stations to the one or more wireless electrical energy transfer receiving devices of the electric vehicle for storage by the one or more electrical energy storage devices of the electric vehicle based at least in part on the electric vehicle prospective use information and the electrical energy transfer aspect information. In addition to the foregoing, other computer program product aspects are described in the claims, drawings, and text forming a part of the disclosure set forth herein.

In addition to the foregoing, various other method and/or system and/or program product aspects are set forth and described in the teachings such as text (e.g., claims and/or detailed description) and/or drawings of the present disclosure.

In one or more various aspects, a method includes but is not limited to that which is illustrated in the drawings. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise.

With reference now to the figures, shown are one or more examples of Communication and Control System and Method Regarding Electric Vehicle for Wireless Electric Vehicle Electrical Energy Transfer that may provide context, for instance, in introducing one or more processes and/or devices described herein.

In accordance with 37 CFR 1.84(h)(2)

Figure 1:
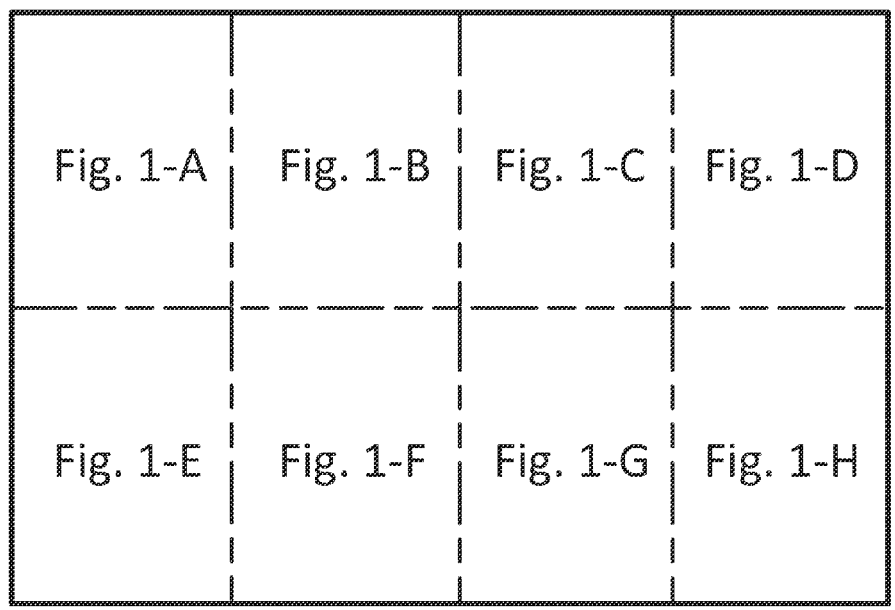
FIG. 1 shows how FIG. 1-A through FIG. 1-H (Sheets 2-9) are to be arranged and assembled to form "a view of a large machine or device in its entirety . . . broken into partial views . . . extended over several sheets" labeled. The "views on two or more sheets form, in effect, a single complete view, [and] the views on the several sheets . . . [are] so arranged that the complete figure can be assembled" from "partial views drawn on separate sheets . . . linked edge to edge," in that the partial-view FIGS. 1-A to 1-H are ordered alphabetically, by increasing column from left to right, as shown in the following table (with further orientation as indicated by phantom-lines on the partial-view figures)

| FIG. 1-A | FIG. 1-B | FIG. 1-C | FIG. 1-D |
| FIG. 1-E | FIG. 1-F | FIG. 1-G | FIG. 1-H |

Figure 2:
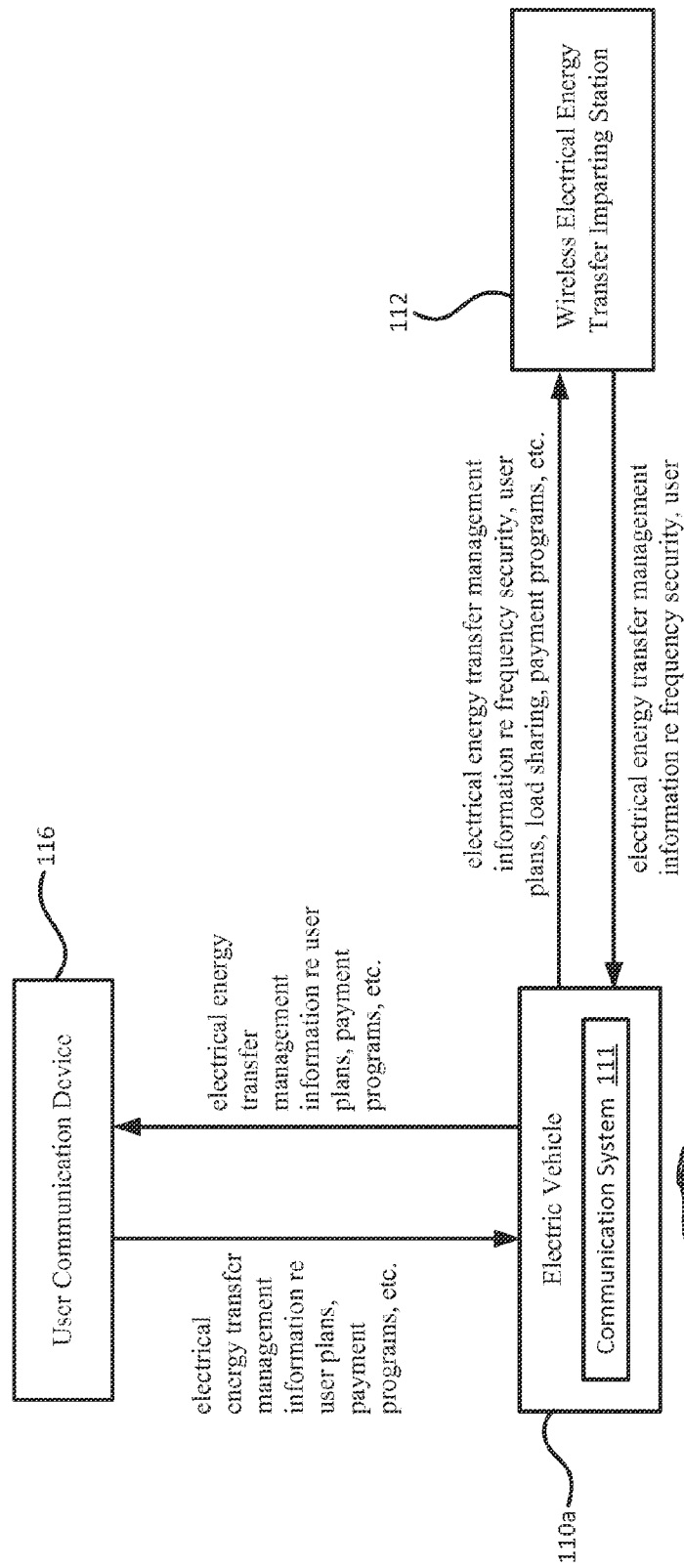

FIG. 2 shows a schematic diagram of implementation(s) of environment(s) and/or implementations(s) of one or more technologies described herein including electric vehicle implementation(s) in communication with user communication device implementation(s) and with wireless electrical energy transfer imparting station implementation(s).

Figure 3:
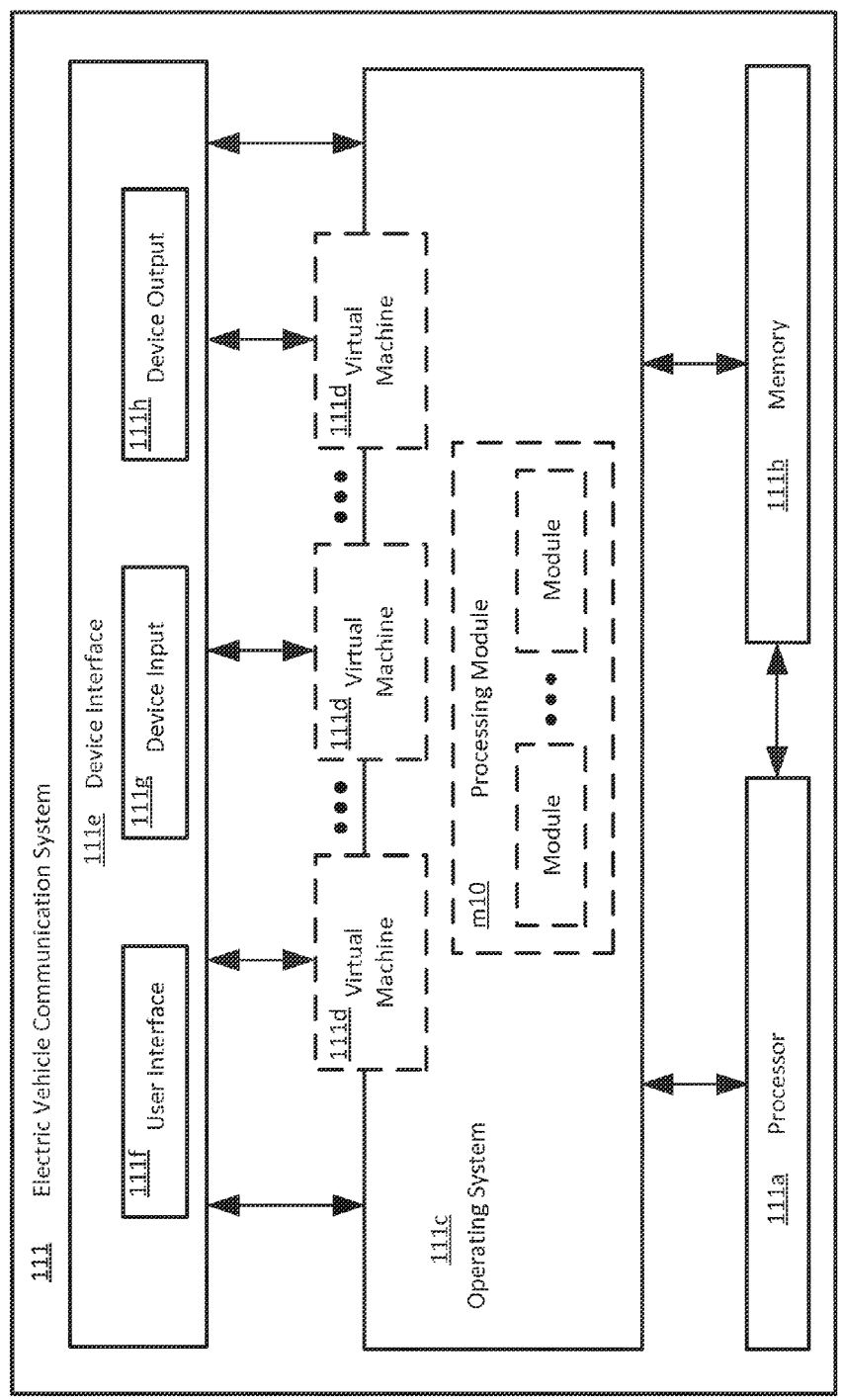

FIG. 3 shows a schematic diagram of implementation(s) of environment(s) and/or implementations(s) of one or more technologies described herein including electric vehicle communication system implementation(s).

Figure 4:
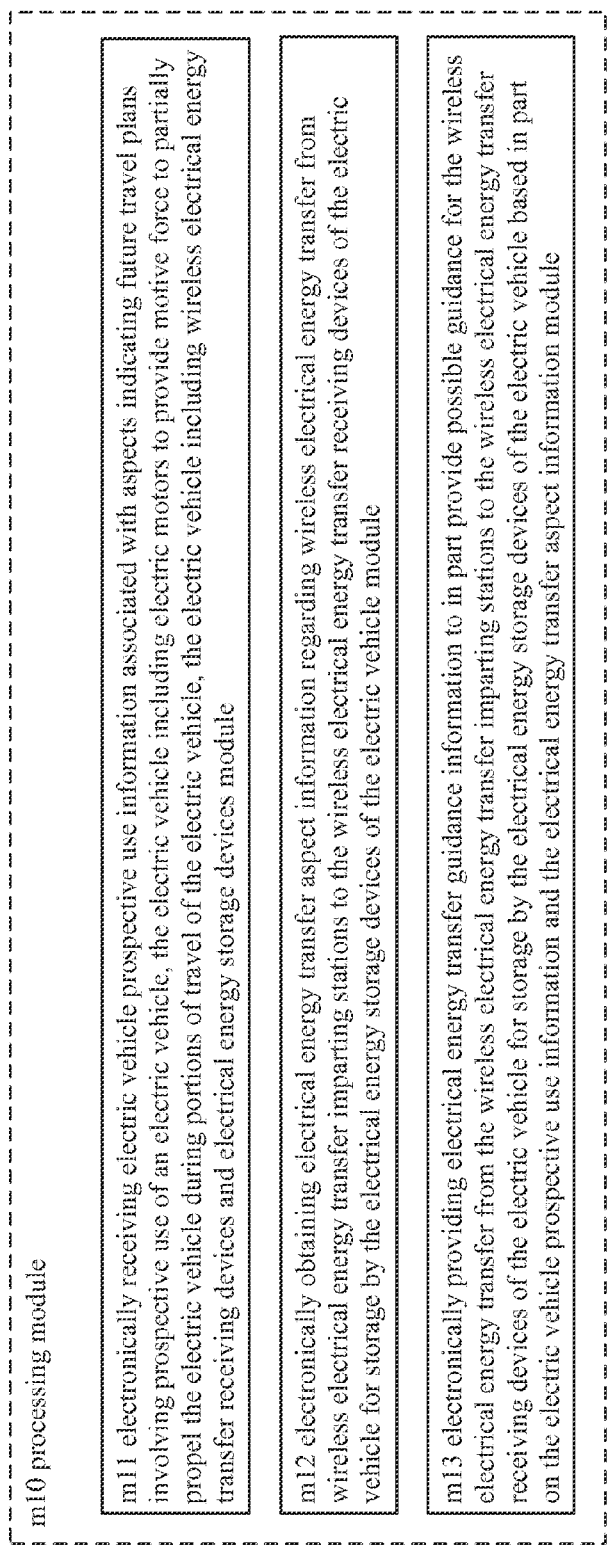

FIG. 4 shows a schematic diagram of implementation(s) of environment(s) and/or implementations(s) of one or more technologies described herein including processing module implementation(s).

FIG. 5-A through FIG. 5-H (Sheets 13-20) show a partially schematic diagram of implementation(s) of electronically receiving electric vehicle prospective use information associated with aspects indicating future travel plans involving prospective use of an electric vehicle, the electric vehicle including electric motors to provide motive force to partially propel the electric vehicle during portions of travel of the electric vehicle, the electric vehicle including wireless electrical energy transfer receiving devices and electrical energy storage devices module(s).

FIG. 6-A through FIG. 6-B (Sheets 21-22) show a partially schematic diagram of implementation(s) of electronically obtaining electrical energy transfer aspect information regarding wireless electrical energy transfer from wireless electrical energy transfer imparting stations to the wireless electrical energy transfer receiving devices of the electric vehicle for storage by the electrical energy storage devices of the electric vehicle module(s).

FIG. 7-A through FIG. 7-B (Sheets 23-24) show a partially schematic diagram of implementation(s) of electronically providing electrical energy transfer guidance information to in part provide possible guidance for the wireless electrical energy transfer from the wireless electrical energy transfer imparting stations to the wireless electrical energy transfer receiving devices of the electric vehicle for storage by the electrical energy storage devices of the electric vehicle based in part on the electric vehicle prospective use information and the electrical energy transfer aspect information module(s).

Figure 8:
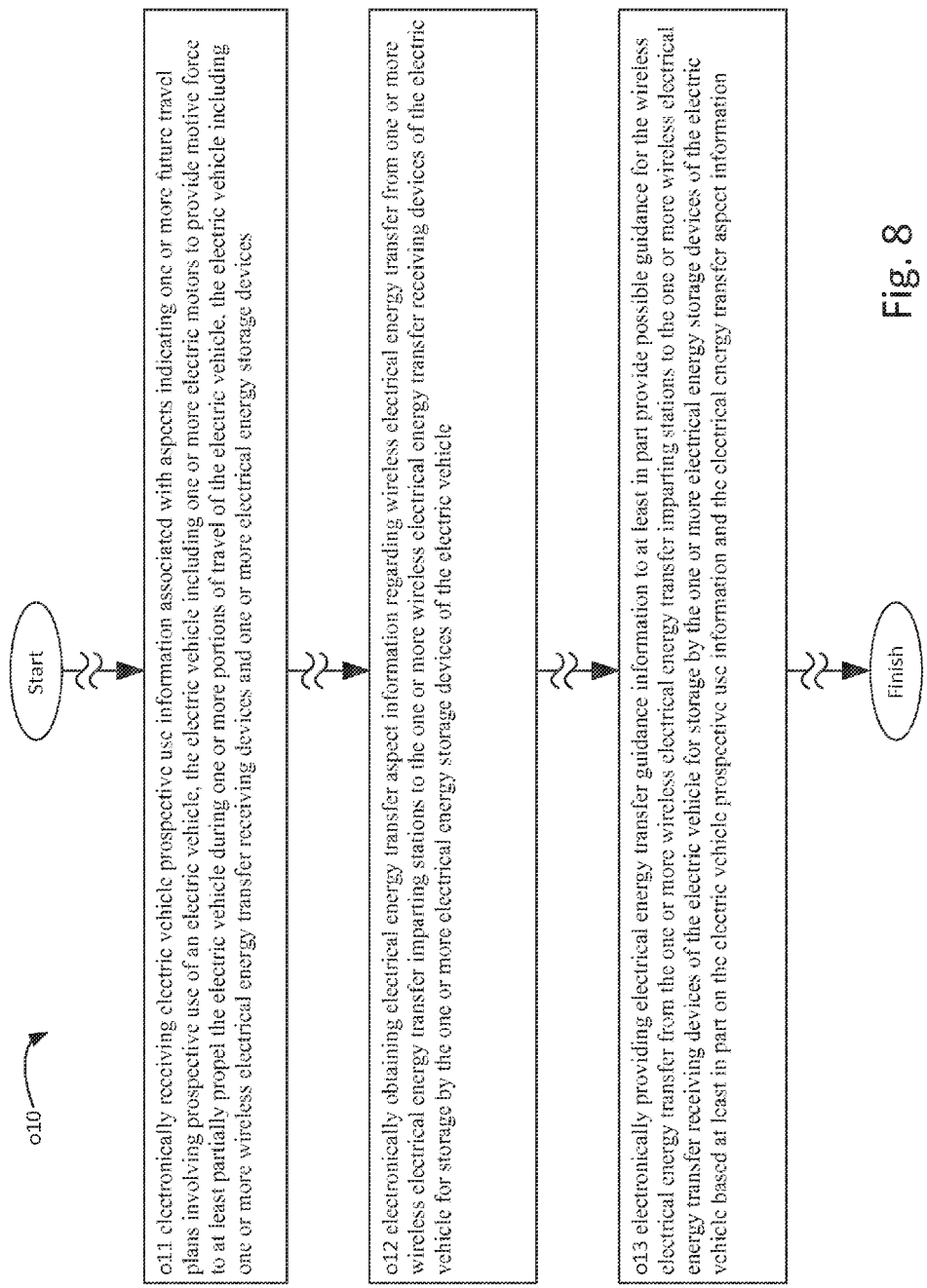

FIG. 8 shows a high-level flowchart illustrating an operational flow o10 representing exemplary operations related to operation o11, operation o12, and operation o13.

FIG. 9-A through FIG. 9-P (Sheets 26-41) show a high-level flowchart including exemplary implementations of operation o11 of FIG. 8.

FIG. 10-A through FIG. 10-D (Sheets 42-45) show a high-level flowchart including exemplary implementations of operation o12 of FIG. 8.

FIG. 11-A through FIG. 11-D (Sheets 46-49) show a high-level flowchart including exemplary implementations of operation o13 of FIG. 8.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The present application may use formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

Thus, in accordance with various embodiments, computationally implemented methods, systems, circuitry, articles of manufacture, ordered chains of matter, and computer program products are designed to, among other things, provide an interface for the environment illustrated in FIG. 1.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats-tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructionsle to perform as described herein. In some variants, for example, implementations may include an update or modification of existing software or firmware, or of gate arrays or programmable hardware, such as by performing a reception of or a transmission of one or more instructionslation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electromagnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scalable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangementmponents to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

To the extent that formal outline headings are present in this application, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, any use of formal outline headings in this application is for presentation purposes, and is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although one or more users may be shown and/or described herein, e.g., in FIG. 1-A through FIG. 1-H, and other places, as a single illustrated figure, those skilled in the art will appreciate that one or more users may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

As depicted in FIG. 1-A through FIG. 1-H, a communication and control system and method regarding wireless electric vehicle electrical energy transfer is shown to include a wireless electrical energy transfer receiving device 110, wireless electrical energy transfer imparting station(s) 112, an electricity provider 114, and a user communication device 116 with a user interface of the user communication device 118. The wireless electrical energy transfer receiving device 110, wireless electrical energy transfer imparting station(s) 112, electricity provider 114, and user communication device 116 with user interface 118 can communicate with each other using wired or wireless communication networks such as but not limited to internet, cellular, point-to-point and other network modes. Other methods of communication between one or more of these various devices and/or systems can include but are not limited to one or more of the following such as contactless smart card located on vehicle, RFID tag, manual entering of data into keypad, blue tooth communication, WiFi communication, FM radio wave communication, infrared communication, direct connection via wired communication, audio (e.g. voice recognition, etc.). Communication between these devices and/or systems can include purposes such as identification and verification of consumer, user, or other individual(s), identification and verification of energy transfer source and/or receiver, finance status of user or other account, energy available at source and/or point of reception, condition of electrical receiving device (e.g. vehicle, energy storage system (e.g. batteries, etc.)), use history (how vehicle or other electrical energy receiving device was used) such as information provided by a vehicle log, use or energy transfer scheduling, or energy transfer logs or project energy transfer deadline(s), etc., projected energy transfer completion time with respect to an adequate energy amount in storage for next destination of a vehicle, user or other individual profile and/or account information, projected user itinerary and/or route planning. Itinerary planning can also include route planning, travel objectives, daily commuter schedule and routes, planned versus actual vehicle routes, various planned and actual tasks and errands associated with vehicle or other device use.

In some implementations there are singular or multiple of wireless electrical energy transfer receiving device 110, wireless electrical energy transfer imparting station(s) 112, electricity provider 114, or user communication device 116 with user interface 118.

In one or more implementations of the wireless electrical energy transfer receiving device 110 can be involved with receiving electrical energy transfer from wireless electrical energy transfer station through field magnetic resonance or other wireless methods for transferring electrical energy, etc. Examples of such can include vehicle(s), robot(s), mobile maintenance device(s) such as vacuum(s), lawn mower(s), cleaner(s), etc. The wireless electrical energy transfer receiving device 110 can be involved with electrical energy transfer security including transmitting/receiving to/from electrical energy transfer imparting station(s) re frequency and timing information used for magnetic resonance electrical energy transfer, etc. By coordinating changes in frequencies regarding what frequency electrical energy is transferred theft of electrical energy transferred can be deterred. Other aspects can include the wireless electrical energy transfer receiving device 110 transmitting/receiving information to/from the user communication device user 116 regarding status of electrical energy transfer associated with user plans or payment program information, etc. The wireless electrical energy transfer receiving device 110 can sense if it is in the vicinity of the wireless electrical energy transfer imparting station 112, and/or sensing if its door (e.g. in an electrical vehicle implementation) is being opened to ask user status, etc. The wireless electrical energy transfer receiving device 110 can transmit/receive information to/from electrical the electrical energy transfer imparting station 112 regarding status of electrical energy transfer associated with user plans or payment program information or service downloads such as enhanced WiFi, data streaming, cleaning, backups, etc. The wireless electrical energy transfer receiving device 110 can send to the wireless electrical energy transfer imparting station(s) 112 electrical energy transfer management information re frequency security, user plans, load sharing, payment programs, etc. The wireless electrical energy transfer receiving device 110 can receive from the wireless electrical energy transfer imparting station(s) 112 electrical energy transfer management information re frequency security, user plans, load sharing, payment programs, etc. The wireless electrical energy transfer receiving device 110 can send to the user communication device 116 electrical energy transfer management information re user plans, payment programs, etc. The wireless electrical energy transfer receiving device 110 can receive from the user communication device 116 electrical energy transfer management information re user plans, payment programs, etc.

Exemplary implementations of the wireless electrical energy transfer receiving device 110 can include one or more electric vehicles such as manufactured by such manufacturers as Nissan, Chevrolet, or Tesla. Furthermore exemplary implementation can include electric vehicle dealers that sell electrical energy transfer packages including equipment, installation, financing, etc. along with electric vehicle. Exemplary implementations of electric vehicle can include aspects such as batteries such as lithium ion, lead acid, nickel cadmium, capacitors, etc. Other aspects of electric vehicles can include charging (wireless energy transfer) technology such as wireless changing of the vehicle. Considerations regarding wireless energy transfer imparted to the vehicle can include how the vehicle is driven, commuting details such as distance, routes, errands, tasks, commercial deliveries, courier services, industrial cargo transport, location of electrical energy transfer, garage configuration, park and ride details, parking lot layout, commercial charging station infrastructure, etc. Other exemplary implementations can include aspects involving the alliance for wireless power (A4WP) such as involving Qualcomm Inc., Apple Inc., Intel, Inc. and/or Samsung Inc.'s implementation(s) of near field magnetic resonance or simply field magnetic resonance electrical energy transfer or other wireless electrical energy transfer technologies such as for transferring electrical energy from millimeters up to meters in distance. Such implementations can include electrical energy transfer for airport parking lots, employee parking lots, private of public garages, and other locations where one or more vehicles may be stationary for short or long term durations. Exemplary implementations can include charging one or more vehicles through induction pads located in parking spaces beneath where the one or more vehicles are parked.

The wireless electrical energy transfer imparting station(s) 112 can wirelessly impart electrical energy transfer to the electrical energy transfer receiving device 110 through field magnetic resonance or other wireless method for transferring electrical energy, etc. The wireless electrical energy transfer imparting station(s) 112 can accomplish wireless electrical energy transfer security such as through transmitting/receiving to/from the electrical energy transfer receiving device 110 regarding frequency and timing information used for field magnetic resonance electrical energy transfer, etc. The wireless electrical energy transfer imparting station(s) 112 can transmit/receive information to/from the user communication device 116 regarding status of electrical energy transfer associated with user plans or payment program information, etc. The wireless electrical energy transfer imparting station(s) 112 can transmit/receive information to/from the electrical energy transfer receiving device 110 regarding status of electrical energy transfer associated with user plans or payment program information, etc. The wireless electrical energy transfer imparting station(s) 112 can transmit/receive information to/from another wireless electrical energy transfer imparting station 112 regarding status of electrical energy transfer associated with user plans or payment program information such as for balancing electric load, etc. The wireless electrical energy transfer imparting station(s) 112 can transmits/receive information to/from electricity provider 114 regarding status of electrical energy transfer associated with user plans or payment program information such as for balancing electric load, etc. As shown, the wireless electrical energy transfer imparting station(s) 112 can send to the electrical energy transfer receiving device 110 electrical energy transfer management information re frequency security, user plans, load sharing, payment programs, etc. The wireless electrical energy transfer imparting station(s) 112 can receive from the electrical energy transfer receiving device 110 electrical energy transfer management information re frequency security, user plans, load sharing, payment programs, etc. The wireless electrical energy transfer imparting station(s) 112 can send to the user communication device 116 electrical energy transfer management information re user plans, payment programs, etc. The wireless electrical energy transfer imparting station(s) 112 can receive from the user communication device 116 electrical energy transfer management information re user plans, payment programs, etc. The wireless electrical energy transfer imparting station(s) 112 can send to another wireless electrical energy transfer imparting station(s) 112 electrical energy transfer management information re user plans, load sharing, payment programs, etc. The wireless electrical energy transfer imparting station(s) 112 can receive from another wireless electrical energy transfer imparting station(s) 112 electrical energy transfer management information re user plans, load sharing, payment programs, etc. The wireless electrical energy transfer imparting station(s) 112 can send to electricity provider 114 electrical energy transfer management information re user plans, load sharing, payment programs, etc. The wireless electrical energy transfer imparting station(s) 112 can receive from electricity provider 114 electrical energy transfer management information re user plans, load sharing, payment programs, etc.

Exemplary implementations of the wireless electrical energy transfer imparting station(s) 112 can include electric vehicle electrical energy transfer equipment. For example, example electrical equipment manufactured by manufacturers such as GE, Westinghouse, Siemens, or ABB. Other exemplary implementations can include electric vehicle electrical energy transfer equipment provided by electric vehicle manufacturers such as Nissan, Chevrolet, or Tesla or dealers thereof. For example, one or more electric vehicle dealers can sells electrical energy transfer packages including equipment installation, financing, etc. along with electric vehicle.

Exemplary implementations of the wireless electrical energy transfer imparting station(s) 112 can include smart metering such as including recorded consumption energy based on time period of other intervals of time, coordination of energy transfer based on electricity demand put on the electricity provider 114 by various parties, two-way communication between the metering at the wireless electrical energy transfer imparting station(s) 112 and the electricity provider 114 for control and/or reporting of energy transfer at the site of the metering. Further, load balancing at the wireless electrical energy transfer imparting station(s) 112 or the electricity provider 114 can be accomplished through load matching, daily peak demand reserve, storage of excess electrical power during low demand periods to release as demand rises, store of energy during peak times and release energy during off peak times, use of a battery bank to store energy, use of an electricity providing grid to balance energy production and consumption, use of smart grid technology to allow consumers and other users to communicate with utility using digital means, and control from the electricity provider 114 to switch electrical energy transfer at the wireless electrical energy transfer imparting station(s) 112 on or off.

In implementations of the wireless electrical energy transfer imparting station(s) 112 there may be multiple priorities from various perspectives (such as user, vehicle, charging station, electricity provider, etc.) for electrical energy transfer such as urgent or immediate need, when lower rate/cost is available, when next lower (lowest) rate/cost is available, or dependent on charging optimization or electrical energy supply optimization. Exemplary implementations can include the electric vehicle or other implementations of the wireless electrical energy transfer receiving device 110 receiving charge when rate/cost is lowest, and allowing grid to receive electrical energy when rates are higher. Implementations can utilize server technology with communication networks to implement communication. Such server technology can be used to store user profiles and utility power grid load balancing history and other data.

The wireless electrical energy transfer imparting station(s) 112 can utilize field magnetic resonance technology or resonant inductive coupling which can involve wireless transmission of electrical energy between two coils that are tuned to resonate at the same frequency and include electrical equipment such as resonance transformers. Further aspects can include the wireless electrical energy transfer imparting station(s) 112 having one or more voltage-controlled oscillator electrical circuits with one or more first transducers and one or more second transducers to electrically charge an energy storage device using electromagnetic or inductive charging. Exemplary implementations can include one or more electric vehicles equipped with one or more translocators for transmitting one or more coded signals to the wireless electrical energy transfer imparting station(s) 112 corresponding to the location of an electric vehicle or other wireless electrical energy transfer receiving device 110 and further activating the wireless electrical energy transfer imparting station(s) 112.

In implementations the wireless electrical energy transfer imparting station(s) 112 could communicate with the wireless electrical energy transfer receiving device 110 and/or the electricity provider 114 through an encrypted link so that both the electrical energy transfer receiving device 110 and the wireless electrical energy transfer imparting station(s) 112 know ahead of time what frequency to use for electrical energy transfer to hinder theft of electrical energy. Frequencies can be varied in this manner to thwart prediction of such frequencies. Further modes of electrical energy transfer can include fast and slow transfers depending upon plans, efficiencies, cost rates, and other factors discussed herein such as an electrical vehicle could audibly ask the driver the driver's plans, financial membership status (such as a "gold membership" status), input from social network associates or monitoring, smart metering by electricity provider 114 and/or other user aspects as the driver exits the vehicle and then factors such aspects into subsequent electrical energy transfer rates and timing. The wireless electrical energy transfer imparting station(s) 112 can also provide various data downloads including news updates, software, data maintenance, etc. as the electrical energy transfer is occurring.

The wireless electrical energy transfer imparting station(s) 112 can also include communication not only with one or more electric vehicles but also other electricity consuming devices in a dwelling or other structure or location such as involving load leveling or balancing between charging an electric vehicle and powering household air conditioning, refrigeration, and hot water heating.

In implementations the electricity provider 114 can transmit/receive information to/from the wireless electrical energy transfer imparting station(s) 112 regarding status of electrical energy transfer associated with load sharing, user plans or payment program information, etc. including time and amount of use rate structures and smart metering, power cycling to distribute load among electrical energy transfers and other energy consuming devices. The electricity provider 114 can send to the wireless electrical energy transfer imparting station(s) 112 electrical energy transfer management information re user plans, load sharing, payment programs, etc. The electricity provider can receive from the wireless electrical energy transfer imparting station(s) 112 electrical energy transfer management information re user plans, load sharing, payment programs, etc. Exemplary implementations of the electricity provider 114 can include electricity provider equipment such as equipment manufactured by electrical equipment manufacturers such as GE, Westinghouse, Siemens, or ABB and electricity providers including electrical utilities such PG&E, So Cal Edison, and/or locally owned equipment such as solar panels, wind generators, etc. Other aspects can be involved such as smart metering and/or load balancing mentioned above.

Implementations of the user communication device 116 can include the user communication device being internal or external to electrical energy transfer receiving device, etc. The user communication device 116 can include mobile devices, social networks, home or corporate based devices, etc. The user communication device 116 can transmit/receive information to/from the wireless electrical energy transfer receiving device 110 regarding status of electrical energy transfer associated with user plans or payment program information, etc. The user communication device 116 can transmit/receive information to/from the wireless electrical energy transfer imparting station(s) 112 regarding status of electrical energy transfer associated with user plans or payment program information, etc. The user communication device 116 can send to the wireless electrical energy transfer receiving device 110 electrical energy transfer management information re user plans, payment programs, etc. The user communication device 116 can receive from the wireless electrical energy transfer receiving device 110 electrical energy transfer management information re user plans, payment programs, etc. The user communication device 116 can send to the wireless electrical energy transfer imparting station(s) 112 electrical energy transfer management information re user plans, payment programs, etc. The user communication device 116 can receive from the wireless electrical energy transfer imparting station(s) 112 electrical energy transfer management information re user plans, payment programs, etc. The user communication device 116 can send to the user interface 118 electrical energy transfer management information re user plans, payment programs, etc. The user communication device 116 can receive from the user interface 118 electrical energy transfer management information re user plans, payment programs, etc.

The user communication device 116 with the user interface 118 can include but are not limited to one or more of the following: a mobile device, a tablet, a cell phone, a smart phone, a gaming unit, a laptop, a walkie-talkie, a notebook computer, a tablet, using operating systems including Android, iOS, Win 8 or other operating systems and/or including one or more other types of wireless mobile device.

Exemplary implementations of the user communication device 116 can include an employer based information system such as an employee information center accessible by employer or employees for status tracking, planning facilities, incentives distribution, etc. For instance, employers could include Google Inc., Cisco Inc., Amazon Inc., etc. Employee perks could be tracked and otherwise utilized by the employee information center such as including the employer coving costs of electrical energy transfer to charge an employee's electric vehicle parked in an employee parking space provided by the employer as a convenience to the employee.

Other implementations of the user communication device 116 can include an information center for high-end residential dwellings for status tracking, planning, updating occupant status, load leveling within house, monitoring and reporting on impact of battery electrical energy transfer, vehicle use, etc. For example construction contractors of upscale condominiums, high-end smart homes, etc. Including furnishing infrastructures could be involved with installation of such exemplary implementations. Aspects can include smart home information centers that can provide such functions as establishment of appropriate time(s) to charge electric vehicle(s) based on upon predicted use by occupants of such vehicle(s) based on input from such occupants through active and passive means such as direct inquiry of occupants or review of occupant itineraries stored in calendaring databases and other databases.

Implementations of the user interface 118 of the user communication device 116 can include visual or audio output re inquiries as to user's plans re use of electrical energy transfer receiving device to include itinerary or calendar of user or others to use the electrical energy transfer receiving device, plan can include payment plans, maintenance of device, etc. Other output can include information re status of current or planned electrical energy transfer as impacting user's plans, etc. The user interface 118 can accept input from user re payment program, planned use of electrical energy transfer receiving device to impact method of electrical energy transfer such as fast or slow electrical energy transfer rates, etc. The user interface 118 can send to user communication device 116 electrical energy transfer management information re user plans, payment programs, etc. The user interface 118 can receive from the user communication device 116 electrical energy transfer management information re user plans, payment programs, etc.

Exemplary implementations of the user interface 118 can include a user interface to an employee information center accessible by employer or employees for status tracking, planning facilities, incentives distribution, etc. Such employers can include Google Inc., Cisco Inc., Amazon Inc., etc. Other implementations of the user interface 118 can include a user interface to information center for high-end residential dwellings for status tracking, planning, etc. For example implementations can be provided by construction contractors of upscale condominiums, high-end smart homes, etc. including furnishing infrastructures such as using smart home information centers as discussed above.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in implementation(s)," 'in one embodiment," "in some embodiments," "in several embodiments," "in at least one embodiment," "in various embodiments," etc., may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

Turning now to FIG. 2, FIG. 2 depicts some aspects also depicted in FIG. 1-A through FIG. 1-H and discussed above regarding communication between electric vehicle 110a to include electric vehicle communication system 111, wireless electrical energy transfer imparting station 112, and user communication device 116.

Turning now to FIG. 3, electric vehicle communication system 111 is depicted in FIG. 3 to include processor 111a, memory 111b, operating system 111c, and device interface 111e.

Processor(s)

Processor 111a may include one or more microprocessors, central processing units ("cpu"), graphics processing units ("gpu"), physics processing units, digital signal processors, network processors, floating point processors, and the other processors. In implementation(s), processor 111a may be a server. In implementation(s), processor 111a may be a distributed-core processor. Although processor 111a can be understood in one sense as depicted as a single processor that is part of a single electric vehicle communication system 111, processor 111a may be multiple processors distributed over one or many electric vehicle communication systems 111, which may or may not be configured to operate together. Processor 111a is illustrated as being configured to execute computer readable instructionsder to execute one or more operations described above, and as illustrated in FIGS. 8-11D.

Memory System(s)

Further shown in FIG. 3, electric vehicle communication system 111 includes memory 111b, which may include memory, cache memory such as random access memory (RAM), flash memory, synchronous random access memory (SRAM), dynamic random access memory (DRAM), or other types of memory such as read only memory ("ROM"), programmable read only memory ("PROM"), flash memory, hard drives, erasable programmable read-only memory (EPROM), disk-based media, disc-based media, magnetic storage, optical storage, volatile memory, nonvolatile memory, mass storage devices, and any combination thereof. In implementation(s), memory 111b may be at single network site(s) or separated from the communication system 111, e.g., available on different system(s) on a network, wired or wirelessly. For example, in a networked system, there may be many communication systems 111 having memory 111a as located at central server(s) that may be a few feet away or located across an ocean. In implementation(s) memory 111b may be located at multiple network sites, including sites that are distant from each other.

Operating System(s)

Referring again to FIG. 3, electric vehicle communication system 111 includes operating system 111c, some versions thereof being mobile or otherwise, and may include processing module m10, which may further include modules (some of which are described below), and may further include virtual machines 111d (such as process virtual machines, virtual machines of hardware, virtual machines of virtual machines, Java virtual machines, Dalvik virtual machines, virtual machines for use with Android operating systems such as Samsung or Google mobile devices or for use with other mobile operating systems such as Apple iOS on Microsoft Windows based mobile operating systems, etc.).

Device Interface(s)

As shown also in FIG. 3, electric vehicle communication system 111 can include device interface 111e, which can include user interface 111f, device input 111g, and device output 111h.

In implementation(s), device interface 111e can include any component that allows interaction with its environment. For example, in implementation(s) device interface 111e can include one or more sensors, e.g., a camera, a microphone, an accelerometer, a thermometer, a satellite positioning system (SPS) sensor, a barometer, a humidity sensor, a compass, a gyroscope, a magnetometer, a pressure sensor, an oscillation detector, a light sensor, an inertial measurement unit (IMU), a tactile sensor, a touch sensor, a flexibility sensor, a microelectromechanical system (MEMS), a radio, including a wireless radio, a transmitter, a receiver, an emitter, a broadcaster, etc.

In implementation(s), device interface 111e also may include one or more user interface components, e.g., user interface 111f (e.g., although they are drawn separately, in implementation(s), user interface 111f is a type of device interface 111e)), and in implementation(s) including one or more device inputs 111g and one or more device outputs 111h. User interface 111f may include any hardware, software, firmware, and combination thereof that allows one or more users to interact with electric vehicle communication system 111, and for vice versa. In implementation(s), user interface 111f may include a monitor, screen, touchscreen, liquid crystal display ("LCD") screen, light emitting diode ("LED") screen, speaker, handset, earpiece, keyboard, keypad, touchpad, mouse, trackball, remote control, button set, microphone, video camera, still camera, a charge-coupled device ("CCD") element, a photovoltaic element, etc.

Referring again to FIG. 3, implementation(s) of device interface 111e may include one or more components in addition to or integrated with user interface 111f to provide ways that communication system 111 can input and output information with its environment(s) and/or user(s). These components of device interface 111e for user interface 111f, device input 111g, and/or device output 111h may include one or more sensors, e.g., a camera, a microphone, an accelerometer, a thermometer, a satellite positioning system (SPS) sensor, a barometer, a humidity sensor, a compass, a gyroscope, a magnetometer, a pressure sensor, an oscillation detector, a light sensor, an inertial measurement unit (IMU), a tactile sensor, a touch sensor, a flexibility sensor, a microelectromechanical system (MEMS), a radio, including a wireless radio, a transmitter, a receiver, an emitter, a broadcaster, etc., and other components as well to serve user interface, input and/or output function(s) for device interface 111e such as for user interface 111f, device input 111g and device output 111h.

Further examples of user interface 111f, device input 111g, and/or device output 111h may include any hardware, software, firmware, and combination thereof, to provide capability for a user thereof to interact with electric vehicle communication system 111. Implementation(s) of user interface 111f, device input 111g, and/or device output 111h can include monitor(s), screen(s), touchscreen(s), liquid crystal display ("LCD") screen(s), light emitting diode ("LED") screen(s), speaker(s), handset(s), earpiece(s), keyboard(s), keypad(s), touchpad(s), mouse(s), trackball(s), remote control(s), button set(s), microphone(s), video camera(s), still camera(s), a charge-coupled device ("CCD") element(s), a photovoltaic element(s), etc.

As other examples, implementation(s) of device interface 111e can include including portions for outputting information, inputting information, and/or controlling aspects thereof. Various arrangements such as display window(s), audio emitter(s), tactile interface(s), button(s), slider(s), gesture interface(s), articulation(s), knob(s), icon(s), desktop(s), ribbon(s), bar(s), tool(s), stylus area(s), keypad(s), keyboard(s), and other audio, video, graphic, tactile, etc., input, output, or control aspects can be used. For instance, graphical user interface presentations can be presented upon display surfaces while other input and/or output aspects can be utilized.

Modules

Implementations of modules can involve different combinations (limited to patentable subject matter under 35 U.S.C. 101) of one or more aspects from one or more electrical circuitry arrangements and/or one or more aspects from one or more instructions.

In one or more implementations, as shown in FIG. 4, the processing module m10 may include electronically receiving electric vehicle prospective use information associated with aspects indicating future travel plans involving prospective use of an electric vehicle, the electric vehicle including electric motors to provide motive force to partially propel the electric vehicle during portions of travel of the electric vehicle, the electric vehicle including wireless electrical energy transfer receiving devices and electrical energy storage devices module m11.

In one or more implementations, as shown in FIG. 4, the processing module m10 may include electronically obtaining electrical energy transfer aspect information regarding wireless electrical energy transfer from wireless electrical energy transfer imparting stations to the wireless electrical energy transfer receiving devices of the electric vehicle for storage by the electrical energy storage devices of the electric vehicle module m12.

In one or more implementations, as shown in FIG. 4, the processing module m10 may include electronically providing electrical energy transfer guidance information to in part provide possible guidance for the wireless electrical energy transfer from the wireless electrical energy transfer imparting stations to the wireless electrical energy transfer receiving devices of the electric vehicle for storage by the electrical energy storage devices of the electric vehicle based in part on the electric vehicle prospective use information and the electrical energy transfer aspect information module m13.

In one or more implementations, as shown in FIG. 5-A, module m11 may include receiving electric vehicle prospective use information wirelessly module m1101.

In one or more implementations, as shown in FIG. 5-A, module m1101 may include wirelessly receiving electric vehicle prospective use information facilitated through RFID tags module m1102.

In one or more implementations, as shown in FIG. 5-A, module m1101 may include wirelessly receiving electric vehicle prospective use information through blue tooth supported communication module m1103.

In one or more implementations, as shown in FIG. 5-A, module m1101 may include wirelessly receiving electric vehicle prospective use information through WiFi facilitated communication module m1104.

In one or more implementations, as shown in FIG. 5-A, module m1101 may include wirelessly receiving electric vehicle prospective use information through FM radio wave communication module m1105.

In one or more implementations, as shown in FIG. 5-A, module m1101 may include wirelessly receiving electric vehicle prospective use information through infrared supported communication module m1106.

In one or more implementations, as shown in FIG. 5-A, module m11 may include receiving electric vehicle prospective use information through direct non-wireless communication module m1107.

In one or more implementations, as shown in FIG. 5-A, module m1107 may include receiving electric vehicle prospective use information through direct wire connections module m1108.

In one or more implementations, as shown in FIG. 5-A, module m1107 may include receiving electric vehicle prospective use information through direct audio sound wave broadcasts module m1109.

In one or more implementations, as shown in FIG. 5-A, module m11 may include receiving electric vehicle prospective use information through other than overt action by prospective vehicle users to provide for the receiving module m1110.

In one or more implementations, as shown in FIG. 5-A, module m1110 may include receiving electric vehicle prospective use information through access of employer databases module m1111.

In one or more implementations, as shown in FIG. 5-A, module m1110 may include receiving electric vehicle prospective use information through data calls to electronic calendaring systems module m1112.

In one or more implementations, as shown in FIG. 5-A, module m1110 may include receiving electric vehicle prospective use information through access to scheduling programs module m1113.

In one or more implementations, as shown in FIG. 5-A, module m1110 may include receiving electric vehicle prospective use information through electronic tapping into cell phone conversations module m1114.

In one or more implementations, as shown in FIG. 5-B, module m1110 may include receiving electric vehicle prospective use information through electronic recordings of in-person conversations module m1115.

In one or more implementations, as shown in FIG. 5-B, module m1110 may include receiving electric vehicle prospective use information through data access to e-mail systems module m1116.

In one or more implementations, as shown in FIG. 5-B, module m1110 may include receiving electric vehicle prospective use information through electronic access to internet cloud-based collaboration systems module m1117.

In one or more implementations, as shown in FIG. 5-B, module m1110 may include receiving electric vehicle prospective use information through access to electronic vehicle maintenance logs module m1118.

In one or more implementations, as shown in FIG. 5-B, module m1110 may include receiving electric vehicle prospective use information through electronic queries of historical vehicle use records module m1119.

In one or more implementations, as shown in FIG. 5-B, module m1110 may include receiving electric vehicle prospective use information through communication with information centers of dwellings module m1120.

In one or more implementations, as shown in FIG. 5-B, module m1110 may include receiving electric vehicle prospective use information through vehicle use logs from wireless electrical energy transfer imparting stations module m1121.

In one or more implementations, as shown in FIG. 5-B, module m1110 may include receiving electric vehicle prospective use information as provided electronically from electric vehicle use logs module m1122.

In one or more implementations, as shown in FIG. 5-C, module m11 may include receiving electric vehicle prospective use information through explicit actions by prospective electric vehicle users to provide the receiving module m1123.

In one or more implementations, as shown in FIG. 5-C, module m1123 may include receiving electric vehicle prospective use information through contactless smart card systems located on electric vehicles module m1124.

In one or more implementations, as shown in FIG. 5-C, module m1123 may include receiving electric vehicle prospective use information through manual entering of data through keypads module m1125.

In one or more implementations, as shown in FIG. 5-C, module m1123 may include receiving electric vehicle prospective use information through direct text entry module m1126.

In one or more implementations, as shown in FIG. 5-C, module m1123 may include receiving electric vehicle prospective use information through humans announcing information directed in reply to electric vehicle audio reception systems module m1127.

In one or more implementations, as shown in FIG. 5-C, module m11 may include receiving electric vehicle prospective use information regarding prospective electric vehicle occupants module m1128.

In one or more implementations, as shown in FIG. 5-C, module m1128 may include receiving electric vehicle prospective use information regarding multiple occupant drivers of an electric vehicle module m1129.

In one or more implementations, as shown in FIG. 5-C, module m1128 may include receiving electric vehicle prospective use information regarding occupants of multiple electric vehicles to receive electrical energy from a local electrical grid substation module m1130.

In one or more implementations, as shown in FIG. 5-C, module m1128 may include receiving electric vehicle prospective use information regarding actual recorded electric vehicle use compared with planned electric vehicle use module m1131.

In one or more implementations, as shown in FIG. 5-C, module m1128 may include receiving electric vehicle prospective use information regarding recording driving patterns associated with electric vehicle drivers module m1132.

In one or more implementations, as shown in FIG. 5-C, module m1128 may include receiving electric vehicle prospective use information regarding prospective electric vehicle occupants including receiving electric vehicle prospective use information regarding non-driver occupant ride-sharing plans module m1133.

In one or more implementations, as shown in FIG. 5-D, module m1128 may include receiving electric vehicle prospective use information regarding prospective electric vehicle occupants including receiving electric vehicle prospective use information regarding priorities distributed among prospective electric vehicle users for use of the electric vehicle module m1134.

In one or more implementations, as shown in FIG. 5-D, module m1128 may include receiving electric vehicle prospective use information regarding prospective electric vehicle occupants including receiving electric vehicle prospective use information regarding use of the electric vehicle by drivers before electrical energy transfer to the electric vehicle occurs after the electric vehicle is driven by another driver module m1135.

In one or more implementations, as shown in FIG. 5-D, module m1128 may include receiving electric vehicle prospective use information as merged plans of multiple prospective drivers of the electric vehicle for consecutive periods of use planned to occur before the electric vehicle is returned to receive electrical energy transfer module m1136.

In one or more implementations, as shown in FIG. 5-D, module m1128 may include receiving electric vehicle prospective use information associated with individual employee incentive programs module m1137.

In one or more implementations, as shown in FIG. 5-D, module m1128 may include receiving electric vehicle prospective use information associated with employee group benefit programs module m1138.

In one or more implementations, as shown in FIG. 5-D, module m1128 may include receiving electric vehicle prospective use information associated with prioritized tasks of a work schedule module m1139.

In one or more implementations, as shown in FIG. 5-D, module m1128 may include receiving electric vehicle prospective use information regarding planned prospective number of occupants to use the vehicle before the electric vehicle receives electrical energy transfer module m1140.

In one or more implementations, as shown in FIG. 5-D, module m11 may include receiving electric vehicle prospective use information regarding electric vehicle aspects module m1141.

In one or more implementations, as shown in FIG. 5-D, module m1141 may include receiving electric vehicle aspect information regarding range of the electric vehicle in an all-electric mode module m1142.

In one or more implementations, as shown in FIG. 5-D, module m1141 may include receiving electric vehicle aspect information regarding range of the electric vehicle in a hybrid electric-fuel mode module m1143.

In one or more implementations, as shown in FIG. 5-D, module m1141 may include receiving electric vehicle aspect information regarding maintenance schedules for the electric vehicle module m1144.

In one or more implementations, as shown in FIG. 5-E, module m1141 may include receiving electric vehicle aspect information regarding fueling capacity of the electric vehicle as a hybrid electric vehicle module m1145.

In one or more implementations, as shown in FIG. 5-E, module m1141 may include receiving electric vehicle aspect information regarding specifications of another electric vehicle other than the electric vehicle, the another electric vehicle involved with plans to receive electric energy transfer from electrical equipment shared with the electric vehicle module m1146.

In one or more implementations, as shown in FIG. 5-E, module m1141 may include receiving electric vehicle aspect information regarding the electric vehicle as an all-electric vehicle module m1147.

In one or more implementations, as shown in FIG. 5-E, module m1141 may include receiving electric vehicle aspect information regarding the electric vehicle as a hybrid-electric vehicle module m1148.

In one or more implementations, as shown in FIG. 5-E, module m1141 may include receiving electric vehicle aspect information regarding the electric vehicle including electrical wireless electrical energy transfer receiving devices to receive electrical energy transfer through field magnetic resonance induction module m1149.

In one or more implementations, as shown in FIG. 5-E, module m1141 may include receiving electric vehicle aspect information regarding the electric vehicle including electrical wireless electrical energy transfer receiving devices to receive electrical energy transfer through highly resonant inductive wireless power transfer module m1150.

In one or more implementations, as shown in FIG. 5-E, module m1141 may include receiving electric vehicle aspect information regarding the electric vehicle including electrical wireless electrical energy transfer receiving devices to receive electrical energy transfer through wireless capacitive charging module m1151.

In one or more implementations, as shown in FIG. 5-E, module m1141 may include receiving electric vehicle aspect information regarding the electric vehicle including electrical energy storage devices module m1152.

In one or more implementations, as shown in FIG. 5-E, module m1152 may include receiving electric vehicle aspect information regarding the electric vehicle including the electrical energy storage devices as capacitive electrical energy storage devices module m1153.

In one or more implementations, as shown in FIG. 5-E, module m1152 may include receiving electric vehicle aspect information regarding the electric vehicle including the electrical energy storage devices as lithium ion, lead acid, or nickel cadmium electrical energy storage devices module m1154.

In one or more implementations, as shown in FIG. 5-F, module m1152 may include receiving electric vehicle aspect information regarding the electric vehicle including storage life aspects of the electrical energy storage devices module m1155.

In one or more implementations, as shown in FIG. 5-F, module m11 may include receiving electric vehicle prospective use information regarding user preferences of location for energy transfer to the electric vehicle module m1156.

In one or more implementations, as shown in FIG. 5-F, module m1156 may include user preferences of location other than home locations of prospective occupants of the vehicle for electrical energy transfer to the electric vehicle module m1157.

In one or more implementations, as shown in FIG. 5-F, module m1156 may include user preferences of location for electrical energy transfer to the electric vehicle at locations of vocational employ of prospective occupants of the electric vehicle module m1158.

In one or more implementations, as shown in FIG. 5-F, module m1156 may include user preferences of location for electrical energy transfer to the electric vehicle at locations on prospective routes of travel of the electric vehicle module m1159.

In one or more implementations, as shown in FIG. 5-F, module m1156 may include user preferences of location for electrical energy transfer to the electric vehicle at garage locations for housing the electric vehicle module m1160.

In one or more implementations, as shown in FIG. 5-F, module m1156 may include user preferences of location for electrical energy transfer to the electric vehicle at park and ride locations for parking the electric vehicle module m1161.

In one or more implementations, as shown in FIG. 5-F, module m1156 may include user preferences of location for electrical energy transfer to the electric vehicle at parking lot locations for parking the electric vehicle module m1162.

In one or more implementations, as shown in FIG. 5-G, module m1156 may include user preferences of location for electrical energy transfer to the electric vehicle at parking garage locations for parking the electric vehicle module m1163.

In one or more implementations, as shown in FIG. 5-G, module m1156 may include user preferences of location for non-electrical energy transfer to the electric vehicle as a hybrid-electric vehicle at re-fueling station locations module m1164.

In one or more implementations, as shown in FIG. 5-G, module m1156 may include user preferences of location for electrical energy transfer to the electric vehicle at static charging locations along routes of travel of the electric vehicle module m1165.

In one or more implementations, as shown in FIG. 5-G, module m1156 may include user preferences of location for electrical energy transfer to the electric vehicle based on historical or predicted availability of electrical energy transfer stations provided by an organization employing prospective occupants of the electric vehicle module m1166.

In one or more implementations, as shown in FIG. 5-G, module m1156 may include user preferences of location for electrical energy transfer to the electric vehicle at locations for mechanical maintenance of the electric vehicle module m1167.

In one or more implementations, as shown in FIG. 5-G, module m1156 may include preferences for fuels used to re-fuel the electric vehicle as a hybrid electric vehicle module m1168.

In one or more implementations, as shown in FIG. 5-G, module m1156 may include preferences for contingency plans for unplanned unavailability to the electric vehicle of electrical energy transfer stations module m1169.

In one or more implementations, as shown in FIG. 5-G, module m11 may include receiving electric vehicle prospective use information regarding uses of the electric vehicle module m1170.

In one or more implementations, as shown in FIG. 5-G, module m1170 may include receiving terrain or traffic information regarding routes of travel for the electric vehicle module m1171.

In one or more implementations, as shown in FIG. 5-G, module m1170 may include receiving commuter routing information for the electric vehicle module m1172.

In one or more implementations, as shown in FIG. 5-H, module m1170 may include receiving trip advisory information regarding routes of travel for the electric vehicle module m1173.

In one or more implementations, as shown in FIG. 5-H, module m1170 may include receiving information regarding alternative modes of transportation along routes travel for the electric vehicle module m1174.

In one or more implementations, as shown in FIG. 5-H, module m1170 may include receiving information regarding periods in which the electric vehicle will be unavailable for use module m1175.

In one or more implementations, as shown in FIG. 5-H, module m1170 may include receiving information regarding planned errands to be run by users of the electric vehicle module m1176.

In one or more implementations, as shown in FIG. 5-H, module m1170 may include receiving information regarding commercial delivery schedules utilizing the electric vehicle module m1177.

In one or more implementations, as shown in FIG. 5-H, module m1170 may include receiving information regarding courier service use for the electric vehicle module m1178.

In one or more implementations, as shown in FIG. 5-H, module m1170 may include receiving information regarding industrial cargo transport by the electric vehicle module m1179.

In one or more implementations, as shown in FIG. 5-H, module m1170 may include receiving information regarding driving habits of users of the electric vehicle module m1180.

In one or more implementations, as shown in FIG. 5-H, module m1170 may include receiving information regarding itineraries associated with use of the electric vehicle module m1181.

In one or more implementations, as shown in FIG. 5-H, module m1170 may include receiving information regarding weather forecasts associated with travel through use of the electric vehicle module m1182.

In one or more implementations, as shown in FIG. 5-H, module m1170 may include receiving information regarding news broadcasts associated with travel through use of the electric vehicle module m1183.

In one or more implementations, as shown in FIG. 5-H, module m1170 may include receiving information regarding emergency warning messages associated with use of the electric vehicle module m1184.

In one or more implementations, as shown in FIG. 5-H, module m1170 may include receiving information regarding availability of alternate transportation within a designated distance from electrical energy transfer stations for transferring electrical energy to the electric vehicle module m1185.

In one or more implementations, as shown in FIG. 5-H, module m1170 may include receiving information regarding ride-share programs associated with travel routes traveled by the electric vehicle module m1186.

In one or more implementations, as shown in FIG. 6-A, module m12 may include obtaining electrical energy transfer aspect information from wireless electrical energy transfer imparting stations module m1201.

In one or more implementations, as shown in FIG. 6-A, module m1201 may include obtaining information regarding schedules for electrical load sharing for electrical devices sharing electrical power sources with electrical energy transfer stations associated with the electric vehicle module m1202.

In one or more implementations, as shown in FIG. 6-A, module m1201 may include obtaining information regarding charging rate capacity of electrical energy transfer stations for the electric vehicle module m1203.

In one or more implementations, as shown in FIG. 6-A, module m1201 may include obtaining information regarding consumer incentive programs based on electricity cost schedules module m1204.

In one or more implementations, as shown in FIG. 6-A, module m1201 may include obtaining information regarding electricity financial cost rate schedules module m1205.

In one or more implementations, as shown in FIG. 6-A, module m1201 may include obtaining information regarding electricity load share capacity schedules module m1206.

In one or more implementations, as shown in FIG. 6-A, module m1201 may include obtaining information regarding electric utility capacity information passed through communication channels of electrical energy transfer stations for the electric vehicle module m1207.

In one or more implementations, as shown in FIG. 6-A, module m1201 may include obtaining information regarding electrical energy charging appointments reserved for electrical vehicles other than the electric vehicle module m1208.

In one or more implementations, as shown in FIG. 6-A, module m1201 may include obtaining information regarding maximum charging rate capacities of electrical energy transfer stations useable by the electric module m1209.

In one or more implementations, as shown in FIG. 6-A, module m1201 may include obtaining information regarding cost information for priority handling of charging of the electric vehicle by of the electrical energy transfer stations module m1210.

In one or more implementations, as shown in FIG. 6-A, module m1201 may include obtaining information regarding electrical energy transfer station availability schedules for the electric vehicle module m1211.

In one or more implementations, as shown in FIG. 6-A, module m1201 may include obtaining information regarding histories of electrical energy consumption by electrical energy transfer stations for the electric vehicle module m1212.

In one or more implementations, as shown in FIG. 6-B, module m1201 may include obtaining information regarding requests for use data of the electric vehicle for remote reporting to electric utility databases module m1213.

In one or more implementations, as shown in FIG. 6-B, module m1201 may include obtaining information regarding peak demand and reserve capacity of electrical energy transfer stations for use by the electric vehicle module m1214.

In one or more implementations, as shown in FIG. 6-B, module m1201 may include obtaining information regarding communication with electric utility smart grid information systems to update electric utility databases regarding electricity use by the electric vehicle module m1215.

In one or more implementations, as shown in FIG. 6-B, module m1201 may include obtaining information regarding priority classification for electric vehicle charging scheduling requests of electrical energy transfer stations module m1216.

In one or more implementations, as shown in FIG. 6-B, module m1201 may include obtaining information regarding user profile classifications for communication with electrical energy transfer stations module m1217.

In one or more implementations, as shown in FIG. 6-B, module m1201 may include obtaining information regarding electrical energy use of associated local grid electrical energy provider resources for other than for charging of the electric vehicle module m1218.

In one or more implementations, as shown in FIG. 6-B, module m1201 may include obtaining information regarding plans for charging of electric vehicles other than the electric vehicle for electrical energy transfer stations module m1219.

In one or more implementations, as shown in FIG. 6-B, module m1201 may include obtaining information regarding technical specifications of electrical energy transfer stations for the electric vehicle module m1220.

In one or more implementations, as shown in FIG. 6-B, module m1201 may include obtaining information through computer network communication linking electrical energy transfer stations for the electric vehicle module m1221.

In one or more implementations, as shown in FIG. 7-A, module m13 may include providing electrical energy transfer guidance information to electrical energy transfer stations for the electric vehicle module m1301.

In one or more implementations, as shown in FIG. 7-A, module m1301 may include providing guidance information regarding itinerary and route information of the electric vehicle module m1302.

In one or more implementations, as shown in FIG. 7-A, module m1301 may include providing guidance information regarding verification of identification of users of the electric vehicle module m1303.

In one or more implementations, as shown in FIG. 7-A, module m1301 may include providing guidance information regarding verification of selection of electrical energy transfer stations for the electrical vehicle module m1304.

In one or more implementations, as shown in FIG. 7-A, module m1301 may include providing guidance information regarding financial status information for user accounts of the electric vehicle module m1305.

In one or more implementations, as shown in FIG. 7-A, module m1301 may include providing guidance information regarding information requests as to charging rate capacity of electrical energy transfer stations for the electric vehicle module m1306.

In one or more implementations, as shown in FIG. 7-A, module m1301 may include providing guidance information concerning electrical charge status of electrical energy storage devices of the electric vehicle module m1307.

In one or more implementations, as shown in FIG. 7-A, module m1301 may include providing guidance information concerning use data for the electric vehicle module m1308.

In one or more implementations, as shown in FIG. 7-A, module m1301 may include providing guidance information concerning amount of time the electric vehicle is available for charging by electrical energy transfer stations module m1309.

In one or more implementations, as shown in FIG. 7-A, module m1301 may include providing guidance information regarding amount of electrical energy required to be transferred to the electric vehicle by electrical energy transfer stations module m1310.

In one or more implementations, as shown in FIG. 7-A, module m1301 may include providing guidance information regarding consumer profile of users of the electric vehicle module m1311.

In one or more implementations, as shown in FIG. 7-A, module m1301 may include providing guidance information regarding itinerary and route information of the electric vehicle module m1312.

In one or more implementations, as shown in FIG. 7-B, module m13 may include providing guidance information to communication links between the electric vehicle and electrical energy transfer stations module m1313.

In one or more implementations, as shown in FIG. 7-B, module m1313 may include providing guidance information to contactless smart card readers module m1314.

In one or more implementations, as shown in FIG. 7-B, module m1313 may include providing guidance information to RFID tag readers module m1315.

In one or more implementations, as shown in FIG. 7-B, module m1313 may include providing guidance information to manual entry keypads module m1316.

In one or more implementations, as shown in FIG. 7-B, module m1313 may include providing guidance information to blue tooth communication devices module m1317.

In one or more implementations, as shown in FIG. 7-B, module m1313 may include providing guidance information to WiFi communication devices module m1318.

In one or more implementations, as shown in FIG. 7-B, module m1313 may include providing guidance information to FM radio communication devices module m1319.

In one or more implementations, as shown in FIG. 7-B, module m1313 may include providing guidance information to infrared communication devices module m1320.

Flowcharts

An operational flow o10 as shown in FIG. 8 represents example operations related to electronically receiving electric vehicle prospective use information associated with aspects indicating one or more future travel plans involving prospective use of an electric vehicle, the electric vehicle including one or more electric motors to provide motive force to at least partially propel the electric vehicle during one or more portions of travel of the electric vehicle, the electric vehicle including one or more wireless electrical energy transfer receiving devices and one or more electrical energy storage devices; electronically obtaining electrical energy transfer aspect information regarding wireless electrical energy transfer from one or more wireless electrical energy transfer imparting stations to the one or more wireless electrical energy transfer receiving devices of the electric vehicle for storage by the one or more electrical energy storage devices of the electric vehicle; and electronically providing electrical energy transfer guidance information to at least in part provide possible guidance for the wireless electrical energy transfer from the one or more wireless electrical energy transfer imparting stations to the one or more wireless electrical energy transfer receiving devices of the electric vehicle for storage by the one or more electrical energy storage devices of the electric vehicle based at least in part on the electric vehicle prospective use information and the electrical energy transfer aspect information.

FIG. 8 and those figures that follow may have various examples of operational flows, and explanation may be provided with respect to the above-described examples and/or with respect to other examples and contexts. Nonetheless, it should be understood that the operational flows may be executed in a number of other environments and contexts, and/or in modified versions. Furthermore, although the various operational flows are presented in the sequence(s) illustrated, it should be understood that the various operations may be performed in other orders than those which are illustrated, or may be performed concurrently.

In FIG. 8 and those figures that follow, various operations may be depicted in a box-within-a-box manner. Such depictions may indicate that an operation in an internal box may comprise an optional exemplary implementation of the operational step illustrated in one or more external boxes. However, it should be understood that internal box operations may be viewed as independent operations separate from any associated external boxes and may be performed in any sequence with respect to all other illustrated operations, or may be performed concurrently.

For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

In one or more implementations, as shown in FIG. 8, the operational flow o10 proceeds to operation o11 for electronically receiving electric vehicle prospective use information associated with aspects indicating one or more future travel plans involving prospective use of an electric vehicle, the electric vehicle including one or more electric motors to provide motive force to at least partially propel the electric vehicle during one or more portions of travel of the electric vehicle, the electric vehicle including one or more wireless electrical energy transfer receiving devices and one or more electrical energy storage devices. Origination of a physically tangible component group can be accomplished through skilled in the art design choice selection including use of one or more components and/or subsystems explicitly and/or implicitly referred to herein for at least in part implementing execution of one or more instructions operation o11, for performance of the operation o11 by an electrical circuitry arrangement as activated thereto, and/or otherwise fulfillment of the operation o11. One or more non-transitory signal bearing physical media can bear the one or more instructions that when executed can direct performance of the operation o11. Furthermore, electronically receiving electric vehicle prospective use information associated with aspects indicating future travel plans involving prospective use of an electric vehicle, the electric vehicle including electric motors to provide motive force to partially propel the electric vehicle during portions of travel of the electric vehicle, the electric vehicle including wireless electrical energy transfer receiving devices and electrical energy storage devices module m11 depicted in FIG. 4 as being included in the processing module m10, when executed and/or activated, can direct performance of and/or perform the operation o11. Illustratively, in one or more implementations, the operation o11 can be carried out, for example, by electronically receiving (e.g. by wireless or wired through digitized, packetized or other electronic communication, etc.) electric vehicle (e.g. hybrid or full electric car, truck, cycle or other vehicle, etc.) prospective use information (e.g. tentative, scheduled, projected, estimated, determined, speculative or other regarding long or short term use as driver, passenger through ownership or leasing or borrowing, etc.) associated (e.g. directly or indirectly related, etc.) with aspects (e.g. calendaring, scheduling, topical, itemized, tangential, or other aspects, etc.) indicating (e.g. deductively or inductively signaling, alerting, suggesting, etc.) one or more future (e.g. immediate, advanced in future, etc.) travel plans (e.g. erratic, spontaneous, methodical, commuting, long distance, touring, vacation, errands, ad hoc, etc.) involving (e.g. implicitly or explicitly related, etc.) prospective use (e.g. possible, tentative, routine, etc.) of an electric vehicle (e.g. short range, long range car, truck, van, etc.), the electric vehicle including one or more electric motors (e.g. alternative current, direct current, all wheel propulsion, under hood mounting, inside wheel mounting, etc.) to provide motive force (e.g. partial or full motive force, etc.) to at least partially propel (e.g. intermediate, constant, or backup propulsion, etc.) the electric vehicle (e.g. hybrid or full electric, etc.) during one or more portions (e.g. city driving, acceleration, initial portion of trip, entire trip, etc.) of travel (e.g. road, rail, commute, touring, etc.) of the electric vehicle, the electric vehicle including one or more wireless electrical energy transfer receiving devices (e.g. field magnetic resonance, capacitive charging, etc.) and one or more electrical energy storage devices (e.g. lead acid, nickel cadmium, capacitive, etc.).

In one or more implementations, as shown in FIG. 8, the operational flow o10 proceeds to operation o12 for electronically obtaining electrical energy transfer aspect information regarding wireless electrical energy transfer from one or more wireless electrical energy transfer imparting stations to the one or more wireless electrical energy transfer receiving devices of the electric vehicle for storage by the one or more electrical energy storage devices of the electric vehicle. Origination of a physically tangible component group can be accomplished through skilled in the art design choice selection including use of one or more components and/or subsystems explicitly and/or implicitly referred to herein for at least in part implementing execution of one or more instructions operation o12, for performance of the operation o12 by an electrical circuitry arrangement as activated thereto, and/or otherwise fulfillment of the operation o12. One or more non-transitory signal bearing physical media can bear the one or more instructions that when executed can direct performance of the operation o12. Furthermore, electronically obtaining electrical energy transfer aspect information regarding wireless electrical energy transfer from wireless electrical energy transfer imparting stations to the wireless electrical energy transfer receiving devices of the electric vehicle for storage by the electrical energy storage devices of the electric vehicle module m12 depicted in FIG. 4 as being included in the processing module m10, when executed and/or activated, can direct performance of and/or perform the operation o12. Illustratively, in one or more implementations, the operation o12 can be carried out, for example, by electronically obtaining (e.g. data calls, search queries, response receipt, etc.) electrical energy transfer aspect information (e.g. energy transfer rates, transfer scheduling, timing, synchronizing data, frequency matching of sending and receiving equipment, etc.) regarding wireless (e.g. magnetic resonance frequency, capacitive charging, etc.) electrical energy transfer (e.g. electrical charge transfer, etc.) from one or more wireless electrical energy transfer imparting stations (e.g. mounted in floor, portable, in parking stall, in private garage, in employer's parking lots, in service station, etc.) to the one or more wireless electrical energy transfer receiving devices (e.g. mounted in vehicle interior, attachable and detachable from vehicle, etc.) of the electric vehicle (e.g. car, van, scooter, truck, hybrid, full electric, etc.) for storage (e.g. quick charging for short term storage for small distance trips, lengthy charging for long distance trips, etc.) by the one or more electrical energy storage devices (e.g. lead acid, nickel hydride, high density capacitors, etc.) of the electric vehicle (e.g. truck, car, cycle, van, etc.).

In one or more implementations, as shown in FIG. 8, the operational flow o10 proceeds to operation o13 for electronically providing electrical energy transfer guidance information to at least in part provide possible guidance for the wireless electrical energy transfer from the one or more wireless electrical energy transfer imparting stations to the one or more wireless electrical energy transfer receiving devices of the electric vehicle for storage by the one or more electrical energy storage devices of the electric vehicle based at least in part on the electric vehicle prospective use information and the electrical energy transfer aspect information. Origination of a physically tangible component group can be accomplished through skilled in the art design choice selection including use of one or more components and/or subsystems explicitly and/or implicitly referred to herein for at least in part implementing execution of one or more instructions operation o13, for performance of the operation o13 by an electrical circuitry arrangement as activated thereto, and/or otherwise fulfillment of the operation o13. One or more non-transitory signal bearing physical media can bear the one or more instructions that when executed can direct performance of the operation o13. Furthermore, electronically providing electrical energy transfer guidance information to in part provide possible guidance for the wireless electrical energy transfer from the wireless electrical energy transfer imparting stations to the wireless electrical energy transfer receiving devices of the electric vehicle for storage by the electrical energy storage devices of the electric vehicle based in part on the electric vehicle prospective use information and the electrical energy transfer aspect information module m13 depicted in FIG. 4 as being included in the processing module m10, when executed and/or activated, can direct performance of and/or perform the operation o13. Illustratively, in one or more implementations, the operation o13 can be carried out, for example, by electronically providing (e.g. transmission, displaying, report generation, etc. through vehicle console, communication device associated with vehicle, etc.) electrical energy transfer guidance information (e.g. how much electrical energy vehicle requires, or requests, or minimally sufficient, etc., with specified transfer rate, timing of transfer, calendaring of transfer, one or more frequencies used for transfer, etc.) to at least in part provide possible guidance (e.g. transfer specification for use by imparting equipment, for use by vehicle owner, for use by utility management system, etc.) for the wireless electrical energy transfer (e.g. through frequency magnetic resonance or capacitive charging, etc.) from the one or more wireless electrical energy transfer imparting stations (e.g. floor mounted, portable, parking lot installed, etc.) to the one or more wireless electrical energy transfer receiving devices (e.g. integral with vehicle, detachable from vehicle, etc.) of the electric vehicle (e.g. truck, van, car, cycle, hybrid, full electric, etc.) for storage (e.g. for commuting or long distance, etc.) by the one or more electrical energy storage devices (e.g. deep cycle, minimal cycle, etc.) of the electric vehicle (e.g. commuter vehicle, delivery vehicle, commercial vehicle, etc.) based at least in part on the electric vehicle prospective use information (e.g. projected, estimated, forecast, intended, scheduled driving or passenger use, etc.) and the electrical energy transfer aspect information (e.g. information regarding wireless transfer from ground installed or portable stations, etc.).

In one or more implementations, as shown in FIG. 9-A, the operation o11 can include operation o1101 for electronically receiving electric vehicle prospective use information associated with aspects indicating one or more future travel plans involving prospective use of an electric vehicle, the electric vehicle including one or more electric motors to provide motive force to at least partially propel the electric vehicle during one or more portions of travel of the electric vehicle, the electric vehicle including one or more wireless electrical energy transfer receiving devices and one or more electrical energy storage devices including receiving electric vehicle prospective use information wirelessly. Origination of a physically tangible component group can be accomplished through skilled in the art design choice selection including use of one or more components and/or subsystems explicitly and/or implicitly referred to herein for at least in part implementing execution of one or more instructions operation o1101, for performance of the operation o1101 by an electrical circuitry arrangement as activated thereto, and/or otherwise fulfillment of the operation o1101. One or more non-transitory signal bearing physical media can bear the one or more instructions that when executed can direct performance of the operation o1101. Furthermore, receiving electric vehicle prospective use information wirelessly module m1101 depicted in FIG. 5-A as being included in the module m11, when executed and/or activated, can direct performance of and/or perform the operation o1101. Illustratively, in one or more implementations, the operation o1101 can be carried out, for example, by electronically receiving (e.g. by wireless or wired through digitized, packetized or other electronic communication, etc.) electric vehicle (e.g. hybrid or full electric car, truck, cycle or other vehicle, etc.) prospective use information (e.g. tentative, scheduled, projected, estimated, determined, speculative or other regarding long or short term use as driver, passenger through ownership or leasing or borrowing, etc.) associated (e.g. directly or indirectly related, etc.) with aspects (e.g. calendaring, scheduling, topical, itemized, tangential, or other aspects, etc.) indicating (e.g. deductively or inductively signaling, alerting, suggesting, etc.) one or more future (e.g. immediate, advanced in future, etc.) travel plans (e.g. erratic, spontaneous, methodical, commuting, long distance, touring, vacation, errands, ad hoc, etc.) involving (e.g. implicitly or explicitly related, etc.) prospective use (e.g. possible, tentative, routine, etc.) of an electric vehicle (e.g. short range, long range car, truck, van, etc.), the electric vehicle including one or more electric motors (e.g. alternative current, direct current, all wheel propulsion, under hood mounting, inside wheel mounting, etc.) to provide motive force (e.g. partial or full motive force, etc.) to at least partially propel (e.g. intermediate, constant, or backup propulsion, etc.) the electric vehicle (e.g. hybrid or full electric, etc.) during one or more portions (e.g. city driving, acceleration, initial portion of trip, entire trip, etc.) of travel (e.g. road, rail, commute, touring, etc.) of the electric vehicle, the electric vehicle including one or more wireless electrical energy transfer receiving devices (e.g. field magnetic resonance, capacitive charging, etc.) and one or more electrical energy storage devices (e.g. lead acid, nickel cadmium, capacitive, etc.) including receiving electric vehicle prospective use information wirelessly (e.g. cellular communication, packetized communication, networked communication, broadband communication, gigahertz frequency communication, etc.).

In one or more implementations, as shown in FIG. 9-A, the operation o1101 can include operation o1102 for receiving electric vehicle prospective use information wirelessly including wirelessly receiving electric vehicle prospective use information facilitated through one or more RFID tags. Origination of a physically tangible component group can be accomplished through skilled in the art design choice selection including use of one or more components and/or subsystems explicitly and/or implicitly referred to herein for at least in part implementing execution of one or more instructions operation o1102, for performance of the operation o1102 by an electrical circuitry arrangement as activated thereto, and/or otherwise fulfillment of the operation o1102. One or more non-transitory signal bearing physical media can bear the one or more instructions that when executed can direct performance of the operation o1102. Furthermore, wirelessly receiving electric vehicle prospective use information facilitated through RFID tags module m1102 depicted in FIG. 5-A as being included in the module m1101, when executed and/or activated, can direct performance of and/or perform the operation o1102. Illustratively, in one or more implementations, the operation o1102 can be carried out, for example, by receiving electric vehicle prospective use information wirelessly (e.g. cellular communication, packetized communication, networked communication, broadband communication, gigahertz frequency communication, etc.) including wirelessly receiving electric vehicle prospective use information facilitated through one or more RFID tags (e.g. RFID tags associated with vehicle users or associated with vehicle being read by RFID readers mounted with vehicle or in parking area, etc.).

In one or more implementations, as shown in FIG. 9-A, the operation o1101 can include operation o1103 for receiving electric vehicle prospective use information wirelessly including wirelessly receiving electric vehicle prospective use information through blue tooth supported communication. Origination of a physically tangible component group can be accomplished through skilled in the art design choice selection including use of one or more components and/or subsystems explicitly and/or implicitly referred to herein for at least in part implementing execution of one or more instructions operation o1103, for performance of the operation o1103 by an electrical circuitry arrangement as activated thereto, and/or otherwise fulfillment of the operation o1103. One or more non-transitory signal bearing physical media can bear the one or more instructions that when executed can direct performance of the operation o1103. Furthermore, wirelessly receiving electric vehicle prospective use information through blue tooth supported communication module m1103 depicted in FIG. 5-A as being included in the module m1101, when executed and/or activated, can direct performance of and/or perform the operation o1103. Illustratively, in one or more implementations, the operation o1103 can be carried out, for example, by receiving electric vehicle prospective use information wirelessly (e.g. cellular communication, packetized communication, networked communication, broadband communication, gigahertz frequency communication, etc.) including wirelessly receiving electric vehicle prospective use information through blue tooth supported communication (e.g. blue tooth communication from user mobile calendaring device to blue tooth receiver affixed to vehicle, etc.).

In one or more implementations, as shown in FIG. 9-A, the operation o1101 can include operation o1104 for receiving electric vehicle prospective use information wirelessly including wirelessly receiving electric vehicle prospective use information through WiFi facilitated communication. Origination of a physically tangible component group can be accomplished through skilled in the art design choice selection including use of one or more components and/or subsystems explicitly and/or implicitly referred to herein for at least in part implementing execution of one or more instructions operation o1104, for performance of the operation o1104 by an electrical circuitry arrangement as activated thereto, and/or otherwise fulfillment of the operation o1104. One or more non-transitory signal bearing physical media can bear the one or more instructions that when executed can direct performance of the operation o1104. Furthermore, wirelessly receiving electric vehicle prospective use information through WiFi facilitated communication module m1104 depicted in FIG. 5-A as being included in the module m1101, when executed and/or activated, can direct performance of and/or perform the operation o1104. Illustratively, in one or more implementations, the operation o1104 can be carried out, for example, by receiving electric vehicle prospective use information wirelessly (e.g. cellular communication, packetized communication, networked communication, broadband communication, gigahertz frequency communication, etc.) including wirelessly receiving electric vehicle prospective use information through WiFi facilitated communication (e.g. WiFi communication from user laptop to WiFi reception device integrated into vehicle console, etc.).

In one or more implementations, as shown in FIG. 9-A, the operation o1101 can include operation o1105 for receiving electric vehicle prospective use information wirelessly including wirelessly receiving electric vehicle prospective use information through FM radio wave communication. Origination of a physically tangible component group can be accomplished through skilled in the art design choice selection including use of one or more components and/or subsystems explicitly and/or implicitly referred to herein for at least in part implementing execution of one or more instructions operation o1105, for performance of the operation o1105 by an electrical circuitry arrangement as activated thereto, and/or otherwise fulfillment of the operation o1105. One or more non-transitory signal bearing physical media can bear the one or more instructions that when executed can direct performance of the operation o1105. Furthermore, wirelessly receiving electric vehicle prospective use information through FM radio wave communication module m1105 depicted in FIG. 5-A as being included in the module m1101, when executed and/or activated, can direct performance of and/or perform the operation o1105. Illustratively, in one or more implementations, the operation o1105 can be carried out, for example, by receiving electric vehicle prospective use information wirelessly (e.g. cellular communication, packetized communication, networked communication, broadband communication, gigahertz frequency communication, etc.) including wirelessly receiving electric vehicle prospective use information through FM radio wave communication (e.g. FM radio broadcast from handheld user personal information management system being received by electric vehicle communication system, etc.).

In one or more implementations, as shown in FIG. 9-A, the operation o1101 can include operation o1106 for receiving electric vehicle prospective use information wirelessly including wirelessly receiving electric vehicle prospective use information through infrared supported communication. Origination of a physically tangible component group can be accomplished through skilled in the art design choice selection including use of one or more components and/or subsystems explicitly and/or implicitly referred to herein for at least in part implementing execution of one or more instructions operation o1106, for performance of the operation o1106 by an electrical circuitry arrangement6 as activated thereto, and/or otherwise fulfillment of the operation o1106. One or more non-transitory signal bearing physical media can bear the one or more instructions that when executed can direct performance of the operation o1106. Furthermore, wirelessly receiving electric vehicle prospective use information through infrared supported communication module m1106 depicted in FIG. 5-A as being included in the module m1101, when executed and/or activated, can direct performance of and/or perform the operation o1106. Illustratively, in one or more implementations, the operation o1106 can be carried out, for example, by receiving electric vehicle prospective use information wirelessly (e.g. cellular communication, packetized communication, networked communication, broadband communication, gigahertz frequency communication, etc.) including wirelessly receiving electric vehicle prospective use information through infrared supported communication (e.g. receiving communication between one or more infrared transmitters located near one or more parking locations for electric vehicles and one or more infrared receivers located on the electric vehicle, etc.).

In one or more implementations, as shown in FIG. 9-B, the operation o11 can include operation o1107 for electronically receiving electric vehicle prospective use information associated with aspects indicating one or more future travel plans involving prospective use of an electric vehicle, the electric vehicle including one or more electric motors to provide motive force to at least partially propel the electric vehicle during one or more portions of travel of the electric vehicle, the electric vehicle including one or more wireless electrical energy transfer receiving devices and one or more electrical energy storage devices including receiving electric vehicle prospective use information through direct non-wireless communication. Origination of a physically tangible component group can be accomplished through skilled in the art design choice selection including use of one or more components and/or subsystems explicitly and/or implicitly referred to herein for at least in part implementing execution of one or more instructions operation o1107, for performance of the operation o1107 by an electrical circuitry arrangement as activated thereto, and/or otherwise fulfillment of the operation o1107. One or more non-transitory signal bearing physical media can bear the one or more instructions that when executed can direct performance of the operation o1107. Furthermore, receiving electric vehicle prospective use information through direct non-wireless communication module m1107 depicted in FIG. 5-A as being included in the module m11, when executed and/or activated, can direct performance of and/or perform the operation o1107. Illustratively, in one or more implementations, the operation o1107 can be carried out, for example, by electronically receiving (e.g. by wireless or wired through digitized, packetized or other electronic communication, etc.) electric vehicle (e.g. hybrid or full electric car, truck, cycle or other vehicle, etc.) prospective use information (e.g. tentative, scheduled, projected, estimated, determined, speculative or other regarding long or short term use as driver, passenger through ownership or leasing or borrowing, etc.) associated (e.g. directly or indirectly related, etc.) with aspects (e.g. calendaring, scheduling, topical, itemized, tangential, or other aspects, etc.) indicating (e.g. deductively or inductively signaling, alerting, suggesting, etc.) one or more future (e.g. immediate, advanced in future, etc.) travel plans (e.g. erratic, spontaneous, methodical, commuting, long distance, touring, vacation, errands, ad hoc, etc.) involving (e.g. implicitly or explicitly related, etc.) prospective use (e.g. possible, tentative, routine, etc.) of an electric vehicle (e.g. short range, long range car, truck, van, etc.), the electric vehicle including one or more electric motors (e.g. alternative current, direct current, all wheel propulsion, under hood mounting, inside wheel mounting, etc.) to provide motive force (e.g. partial or full motive force, etc.) to at least partially propel (e.g. intermediate, constant, or backup propulsion, etc.) the electric vehicle (e.g. hybrid or full electric, etc.) during one or more portions (e.g. city driving, acceleration, initial portion of trip, entire trip, etc.) of travel (e.g. road, rail, commute, touring, etc.) of the electric vehicle, the electric vehicle including one or more wireless electrical energy transfer receiving devices (e.g. field magnetic resonance, capacitive charging, etc.) and one or more electrical energy storage devices (e.g. lead acid, nickel cadmium, capacitive, etc.) including receiving electric vehicle prospective use information through direct non-wireless communication (e.g. receiving information through hard wired network cable connecting one or more databases containing scheduling information, etc.).

In one or more implementations, as shown in FIG. 9-B, the operation o1107 can include operation o1108 for receiving electric vehicle prospective use information through direct non-wireless communication including receiving electric vehicle prospective use information through one or more direct wire connections. Origination of a physically tangible component group can be accomplished through skilled in the art design choice selection including use of one or more components and/or subsystems explicitly and/or implicitly referred to herein for at least in part implementing execution of one or more instructions of the operation o1108, for performance of the operation o1108 by an electrical circuitry arrangement as activated thereto, and/or otherwise fulfillment of the operation o1108. One or more non-transitory signal bearing physical media can bear the one or more instructions that when executed can direct performance of the operation o1108. Furthermore, receiving electric vehicle prospective use information through direct wire connections module m1108 depicted in FIG. 5-A as being included in the module m1107, when executed and/or activated, can direct performance of and/or perform the operation o1108. Illustratively, in one or more implementations, the operation o1108 can be carried out, for example, by receiving electric vehicle prospective use information through direct non-wireless communication (e.g. receiving information through hard wired network cable connecting one or more databases containing scheduling information, etc.) including receiving electric vehicle prospective use information through one or more direct wire connections (e.g. receiving information through electrical grid wiring from central planning station on through to communication device located adjacent to charging of electric vehicle, etc.).

In one or more implementations, as shown in FIG. 9-B, the operation o1107 can include operation o1109 for receiving electric vehicle prospective use information through direct non-wireless communication including receiving electric vehicle prospective use information through one or more direct audio sound wave broadcasts. Origination of a physically tangible component group can be accomplished through skilled in the art design choice selection including use of one or more components and/or subsystems explicitly and/or implicitly referred to herein for at least in part implementing execution of one or more instructions operation o1109, for performance of the operation o1109 by an electrical circuitry arrangement as activated thereto, and/or otherwise fulfillment of the operation o1109. One or more non-transitory signal bearing physical media can bear the one or more instructions that when executed can direct performance of the operation o1109. Furthermore, receiving electric vehicle prospective use information through direct audio sound wave broadcasts module m1109 depicted in FIG. 5-A as being included in the module m1107, when executed and/or activated, can direct performance of and/or perform the operation o1109. Illustratively, in one or more implementations, the operation o1109 can be carried out, for example, by receiving electric vehicle prospective use information through direct non-wireless communication (e.g. receiving information through hard wired network cable connecting one or more databases containing scheduling information, etc.) including receiving electric vehicle prospective use information through one or more direct audio sound wave broadcasts (e.g. receiving information content from one or more verbal responses of one or more electric vehicle users to one or more audible queries of the one or more users in vicinity of electric vehicle parking station, etc.).

In one or more implementations, as shown in FIG. 9-B, the operation o11 can include operation o1110 for electronically receiving electric vehicle prospective use information associated with aspects indicating one or more future travel plans involving prospective use of an electric vehicle, the electric vehicle including one or more electric motors to provide motive force to at least partially propel the electric vehicle during one or more portions of travel of the electric vehicle, the electric vehicle including one or more wireless electrical energy transfer receiving devices and one or more electrical energy storage devices including receiving electric vehicle prospective use information through other than overt action by one or more prospective vehicle users to provide for the receiving. Origination of a physically tangible component group can be accomplished through skilled in the art design choice selection including use of one or more components and/or subsystems explicitly and/or implicitly referred to herein for at least in part implementing execution of one or more instructions operation o1110, for performance of the operation o1110 by an electrical circuitry arrangement as activated thereto, and/or otherwise fulfillment of the operation o1110. One or more non-transitory signal bearing physical media can bear the one or more instructions that when executed can direct performance of the operation o1110. Furthermore, receiving electric vehicle prospective use information through other than overt action by prospective vehicle users to provide for the receiving module m1110 depicted in FIG. 5-A as being included in the module m11, when executed and/or activated, can direct performance of and/or perform the operation o1110. Illustratively, in one or more implementations, the operation o1110 can be carried out, for example, by electronically receiving (e.g. by wireless or wired through digitized, packetized or other electronic communication, etc.) electric vehicle (e.g. hybrid or full electric car, truck, cycle or other vehicle, etc.) prospective use information (e.g. tentative, scheduled, projected, estimated, determined, speculative or other regarding long or short term use as driver, passenger through ownership or leasing or borrowing, etc.) associated (e.g. directly or indirectly related, etc.) with aspects (e.g. calendaring, scheduling, topical, itemized, tangential, or other aspects, etc.) indicating (e.g. deductively or inductively signaling, alerting, suggesting, etc.) one or more future (e.g. immediate, advanced in future, etc.) travel plans (e.g. erratic, spontaneous, methodical, commuting, long distance, touring, vacation, errands, ad hoc, etc.) involving (e.g. implicitly or explicitly related, etc.) prospective use (e.g. possible, tentative, routine, etc.) of an electric vehicle (e.g. short range, long range car, truck, van, etc.), the electric vehicle including one or more electric motors (e.g. alternative current, direct current, all wheel propulsion, under hood mounting, inside wheel mounting, etc.) to provide motive force (e.g. partial or full motive force, etc.) to at least partially propel (e.g. intermediate, constant, or backup propulsion, etc.) the electric vehicle (e.g. hybrid or full electric, etc.) during one or more portions (e.g. city driving, acceleration, initial portion of trip, entire trip, etc.) of travel (e.g. road, rail, commute, touring, etc.) of the electric vehicle, the electric vehicle including one or more wireless electrical energy transfer receiving devices (e.g. field magnetic resonance, capacitive charging, etc.) and one or more electrical energy storage devices (e.g. lead acid, nickel cadmium, capacitive, etc.) including receiving electric vehicle prospective use information through other than overt action by one or more prospective vehicle users to provide for the receiving (e.g. receiving information by eaves-dropping on one or more audible conversations of one or more electric vehicle users, etc.).

In one or more implementations, as shown in FIG. 9-B, the operation o1110 can include operation o1111 for receiving electric vehicle prospective use information through other than overt action by one or more prospective vehicle users to provide for the receiving including receiving electric vehicle prospective use information through access of one or more employer databases. Origination of a physically tangible component group can be accomplished through skilled in the art design choice selection including use of one or more components and/or subsystems explicitly and/or implicitly referred to herein for at least in part implementing execution of one or more instructions of the operation o1111, for performance of the operation o1111 by an electrical circuitry arrangement as activated thereto, and/or otherwise fulfillment of the operation o1111. One or more non-transitory signal bearing physical media can bear the one or more instructions that when executed can direct performance of the operation o1111. Furthermore, receiving electric vehicle prospective use information through access of employer databases module m1111 depicted in FIG. 5-A as being included in the module m1110, when executed and/or activated, can direct performance of and/or perform the operation o1111. Illustratively, in one or more implementations, the operation o1111 can be carried out, for example, by receiving electric vehicle prospective use information through other than overt action by one or more prospective vehicle users to provide for the receiving (e.g. receiving information by eaves-dropping on one or more audible conversations of one or more electric vehicle users, etc.) including receiving electric vehicle prospective use information through access of one or more employer databases (e.g. receiving information through access into one or more human relations databases regarding perks, bonuses, rewards, incentives or other compensation associated with one or more electric vehicle users that are drive or otherwise ride in one or more electric vehicles potentially available for charging at one or more vicinities of an employer of the one or more electric vehicle users, etc.).

In one or more implementations, as shown in FIG. 9-C, the operation o1110 can include operation o1112 for receiving electric vehicle prospective use information through other than overt action by one or more prospective vehicle users to provide for the receiving including receiving electric vehicle prospective use information through data calls to one or more electronic calendaring systems. Origination of a physically tangible component group can be accomplished through skilled in the art design choice selection including use of one or more components and/or subsystems explicitly and/or implicitly referred to herein for at least in part implementing execution of one or more instructions operation o1112, for performance of the operation o1112 by an electrical circuitry arrangement as activated thereto, and/or otherwise fulfillment of the operation o1112. One or more non-transitory signal bearing physical media can bear the one or more instructions that when executed can direct performance of the operation o1112. Furthermore, receiving electric vehicle prospective use information through data calls to electronic calendaring systems module m1112 depicted in FIG. 5-A as being included in the module m1110, when executed and/or activated, can direct performance of and/or perform the operation o1112. Illustratively, in one or more implementations, the operation o1112 can be carried out, for example, by receiving electric vehicle prospective use information through other than overt action by one or more prospective vehicle users to provide for the receiving (e.g. receiving information by eaves-dropping on one or more audible conversations of one or more electric vehicle users, etc.) including receiving electric vehicle prospective use information through data calls to one or more electronic calendaring systems (e.g. receiving information by querying into one or more calendaring systems to determine how one or more electric vehicles are to be used over a course of time by factoring in relevant activity listed in the one or more calendaring systems, etc.).

In one or more implementations, as shown in FIG. 9-C, the operation o1110 can include operation o1113 for receiving electric vehicle prospective use information through other than overt action by one or more prospective vehicle users to provide for the receiving including receiving electric vehicle prospective use information through access to one or more scheduling programs. Origination of a physically tangible component group can be accomplished through skilled in the art design choice selection including use of one or more components and/or subsystems explicitly and/or implicitly referred to herein for at least in part implementing execution of one or more instructions operation o1113, for performance of the operation o1113 by an electrical circuitry arrangement as activated thereto, and/or otherwise fulfillment of the operation o1113. One or more non-transitory signal bearing physical media can bear the one or more instructions that when executed can direct performance of the operation o1113. Furthermore, receiving electric vehicle prospective use information through access to scheduling programs module m1113 depicted in FIG. 5-A as being included in the module m1110, when executed and/or activated, can direct performance of and/or perform the operation o1113. Illustratively, in one or more implementations, the operation o1113 can be carried out, for example, by receiving electric vehicle prospective use information through other than overt action by one or more prospective vehicle users to provide for the receiving (e.g. receiving information by eaves-dropping on one or more audible conversations of one or more electric vehicle users, etc.) including receiving electric vehicle prospective use information through access to one or more scheduling programs (e.g. receiving information by analyzing one or more scheduled activities containing in one or more scheduling programs associated with one or more group projects and/or personal errands of one or more electric vehicle users, etc.).

In one or more implementations, as shown in FIG. 9-C, the operation o1110 can include operation o1114 for receiving electric vehicle prospective use information through other than overt action by one or more prospective vehicle users to provide for the receiving including receiving electric vehicle prospective use information through electronic tapping into one or more cell phone conversations. Origination of a physically tangible component group can be accomplished through skilled in the art design choice selection including use of one or more components and/or subsystems explicitly and/or implicitly referred to herein for at least in part implementing execution of one or more instructions operation o1114, for performance of the operation o1114 by an electrical circuitry arrangement as activated thereto, and/or otherwise fulfillment of the operation o1114. One or more non-transitory signal bearing physical media can bear the one or more instructions that when executed can direct performance of the operation o1114. Furthermore, receiving electric vehicle prospective use information through electronic tapping into cell phone conversations module m1114 depicted in FIG. 5-A as being included in the module m1110, when executed and/or activated, can direct performance of and/or perform the operation o1114. Illustratively, in one or more implementations, the operation o1114 can be carried out, for example, by receiving electric vehicle prospective use information through other than overt action by one or more prospective vehicle users to provide for the receiving (e.g. receiving information by eaves-dropping on one or more audible conversations of one or more electric vehicle users, etc.) including receiving electric vehicle prospective use information through electronic tapping into one or more cell phone conversations (e.g. receiving information be extracting relevant information of one or more cell phone calls either in real time or through accessing recorded information either of oral or textual content, etc.).

In one or more implementations, as shown in FIG. 9-C, the operation o1110 can include operation o1115 for receiving electric vehicle prospective use information through other than overt action by one or more prospective vehicle users to provide for the receiving including receiving electric vehicle prospective use information through one or more electronic recordings of in-person conversations. Origination of a physically tangible component group can be accomplished through skilled in the art design choice selection including use of one or more components and/or subsystems explicitly and/or implicitly referred to herein for at least in part implementing execution of one or more instructions of the operation o1115, for performance of the operation o1115 by an electrical circuitry arrangement as activated thereto, and/or otherwise fulfillment of the operation o1115. One or more non-transitory signal bearing physical media can bear the one or more instructions that when executed can direct performance of the operation o1115. Furthermore, receiving electric vehicle prospective use information through electronic recordings of in-person conversations module m1115 depicted in FIG. 5-B as being included in the module m1110, when executed and/or activated, can direct performance of and/or perform the operation o1115. Illustratively, in one or more implementations, the operation o1115 can be carried out, for example, by receiving electric vehicle prospective use information through other than overt action by one or more prospective vehicle users to provide for the receiving (e.g. receiving information by eaves-dropping on one or more audible conversations of one or more electric vehicle users, etc.) including receiving electric vehicle prospective use information through one or more electronic recordings of in-person conversations (e.g. receiving information through mining recording of oral conversations by one or more electric vehicle users regarding plans associated with use of the electric vehicle, etc.).

In one or more implementations, as shown in FIG. 9-C, the operation o1110 can include operation o1116 for receiving electric vehicle prospective use information through other than overt action by one or more prospective vehicle users to provide for the receiving including receiving electric vehicle prospective use information through data access to one or more e-mail systems. Origination of a physically tangible component group can be accomplished through skilled in the art design choice selection including use of one or more components and/or subsystems explicitly and/or implicitly referred to herein for at least in part implementing execution of one or more instructions of the operation o1116, for performance of the operation o1116 by an electrical circuitry arrangement as activated thereto, and/or otherwise fulfillment of the operation o1116. One or more non-transitory signal bearing physical media can bear the one or more instructions that when executed can direct performance of the operation o1116. Furthermore, receiving electric vehicle prospective use information through data access to e-mail systems module m1116 depicted in FIG. 5-B as being included in the module m1110, when executed and/or activated, can direct performance of and/or perform the operation o1116. Illustratively, in one or more implementations, the operation o1116 can be carried out, for example, by receiving electric vehicle prospective use information through other than overt action by one or more prospective vehicle users to provide for the receiving (e.g. receiving information by eaves-dropping on one or more audible conversations of one or more electric vehicle users, etc.) including receiving electric vehicle prospective use information through data access to one or more e-mail systems (e.g. receiving information by extracting relevant planning information associated with use of the electric vehicle by one or more users of the electric vehicle through textual analysis of one or more e-mails sent or received by the one or more users, etc.).

In one or more implementations, as shown in FIG. 9-D, the operation o1110 can include operation o1117 for receiving electric vehicle prospective use information through other than overt action by one or more prospective vehicle users to provide for the receiving including receiving electric vehicle prospective use information through electronic access to internet cloud-based collaboration systems. Origination of a physically tangible component group can be accomplished through skilled in the art design choice selection including use of one or more components and/or subsystems explicitly and/or implicitly referred to herein for at least in part implementing execution of one or more instructions operation o1117, for performance of the operation o1117 by an electrical circuitry arrangement as activated thereto, and/or otherwise fulfillment of the operation o1117. One or more non-transitory signal bearing physical media can bear the one or more instructions that when executed can direct performance of the operation o1117. Furthermore, receiving electric vehicle prospective use information through electronic access to internet cloud-based collaboration systems module m1117 depicted in FIG. 5-B as being included in the module m1110, when executed and/or activated, can direct performance of and/or perform the operation o1117. Illustratively, in one or more implementations, the operation o1117 can be carried out, for example, by receiving electric vehicle prospective use information through other than overt action by one or more prospective vehicle users to provide for the receiving (e.g. receiving information by eaves-dropping on one or more audible conversations of one or more electric vehicle users, etc.) including receiving electric vehicle prospective use information through electronic access to internet cloud-based collaboration systems (e.g. receiving information by mining data contained in scheduling, planning, conferencing, or other cloud based content, etc.).

In one or more implementations, as shown in FIG. 9-D, the operation o1110 can include operation o1118 for receiving electric vehicle prospective use information through other than overt action by one or more prospective vehicle users to provide for the receiving including receiving electric vehicle prospective use information through access to electronic vehicle maintenance logs. Origination of a physically tangible component group can be accomplished through skilled in the art design choice selection including use of one or more components and/or subsystems explicitly and/or implicitly referred to herein for at least in part implementing execution of one or more instructions of the operation o1118, for performance of the operation o1118 by an electrical circuitry arrangement as activated thereto, and/or otherwise fulfillment of the operation o1118. One or more non-transitory signal bearing physical media can bear the one or more instructions that when executed can direct performance of the operation o1118. Furthermore, receiving electric vehicle prospective use information through access to electronic vehicle maintenance logs module m1118 depicted in FIG. 5-B as being included in the module m1110, when executed and/or activated, can direct performance of and/or perform the operation o1118. Illustratively, in one or more implementations, the operation o1118 can be carried out, for example, by receiving electric vehicle prospective use information through other than overt action by one or more prospective vehicle users to provide for the receiving (e.g. receiving information by eaves-dropping on one or more audible conversations of one or more electric vehicle users, etc.) including receiving electric vehicle prospective use information through access to electronic vehicle maintenance logs (e.g. receiving information by analyzing data contained in electronic logs of the electric vehicle regarding trip length, velocity, acceleration, idling, and other performance profiles, etc.).

In one or more implementations, as shown in FIG. 9-D, the operation o1110 can include operation o1119 for receiving electric vehicle prospective use information through other than overt action by one or more prospective vehicle users to provide for the receiving including receiving electric vehicle prospective use information through one or more electronic queries of historical vehicle use records. Origination of a physically tangible component group can be accomplished through skilled in the art design choice selection including use of one or more components and/or subsystems explicitly and/or implicitly referred to herein for at least in part implementing execution of one or more instructions9 of the operation o1119, for performance of the operation o1119 by an electrical circuitry arrangement as activated thereto, and/or otherwise fulfillment of the operation o1119. One or more non-transitory signal bearing physical media can bear the one or more instructions that when executed can direct performance of the operation o1119. Furthermore, receiving electric vehicle prospective use information through electronic queries of historical vehicle use records module m1119 depicted in FIG. 5-B as being included in the module m1110, when executed and/or activated, can direct performance of and/or perform the operation o1119. Illustratively, in one or more implementations, the operation o1119 can be carried out, for example, by receiving electric vehicle prospective use information through other than overt action by one or more prospective vehicle users to provide for the receiving (e.g. receiving information by eaves-dropping on one or more audible conversations of one or more electric vehicle users, etc.) including receiving electric vehicle prospective use information through one or more electronic queries of historical vehicle use records (e.g. receiving information by determining patterns of use regarding duration, trip length, frequency of use, weekly use profiles, monthly use profiles, impact by outside events such as holidays, weekends, work schedule as contain in use logs, etc.).

In one or more implementations, as shown in FIG. 9-D, the operation o1110 can include operation o1120 for receiving electric vehicle prospective use information through other than overt action by one or more prospective vehicle users to provide for the receiving including receiving electric vehicle prospective use information through communication with one or more information centers of one or more dwellings. Origination of a physically tangible component group can be accomplished through skilled in the art design choice selection including use of one or more components and/or subsystems explicitly and/or implicitly referred to herein for at least in part implementing execution of one or more instructions operation o1120, for performance of the operation o1120 by an electrical circuitry arrangement as activated thereto, and/or otherwise fulfillment of the operation o1120. One or more non-transitory signal bearing physical media can bear the one or more instructions that when executed can direct performance of the operation o1120. Furthermore, receiving electric vehicle prospective use information through communication with information centers of dwellings module m1120 depicted in FIG. 5-B as being included in the module m1110, when executed and/or activated, can direct performance of and/or perform the operation o1120. Illustratively, in one or more implementations, the operation o1120 can be carried out, for example, by receiving electric vehicle prospective use information through other than overt action by one or more prospective vehicle users to provide for the receiving (e.g. receiving information by eaves-dropping on one or more audible conversations of one or more electric vehicle users, etc.) including receiving electric vehicle prospective use information through communication with one or more information centers of one or more dwellings (e.g. receiving information through data queries of one or more home databases such as located in a central planning area of the house such as the kitchen, den, or home office, as accessed through a local network to determine planned or estimated activity, etc.).

In one or more implementations, as shown in FIG. 9-D, the operation o1110 can include operation o1121 for receiving electric vehicle prospective use information through other than overt action by one or more prospective vehicle users to provide for the receiving including receiving electric vehicle prospective use information through one or more vehicle use logs from one or more wireless electrical energy transfer imparting stations. Origination of a physically tangible component group can be accomplished through skilled in the art design choice selection including use of one or more components and/or subsystems explicitly and/or implicitly referred to herein for at least in part implementing execution of one or more instructions operation o1121, for performance of the operation o1121 by an electrical circuitry arrangement as activated thereto, and/or otherwise fulfillment of the operation o1121. One or more non-transitory signal bearing physical media can bear the one or more instructions that when executed can direct performance of the operation o1121. Furthermore, receiving electric vehicle prospective use information through vehicle use logs from wireless electrical energy transfer imparting stations module m1121 depicted in FIG. 5-B as being included in the module m1110, when executed and/or activated, can direct performance of and/or perform the operation o1121. Illustratively, in one or more implementations, the operation o1121 can be carried out, for example, by receiving electric vehicle prospective use information through other than overt action by one or more prospective vehicle users to provide for the receiving (e.g. receiving information by eaves-dropping on one or more audible conversations of one or more electric vehicle users, etc.) including receiving electric vehicle prospective use information through one or more vehicle use logs from one or more wireless electrical energy transfer imparting stations (e.g. receiving information from one or more charging stations located along paths of use of the electric vehicle such as located at a home garage, or a parking lot of a place of employ of one or more of the electric vehicle users regarding frequency of use, duration of charging, amplitude or rate of charging, etc.).

In one or more implementations, as shown in FIG. 9-E, the operation o1110 can include operation o1122 for receiving electric vehicle prospective use information through other than overt action by one or more prospective vehicle users to provide for the receiving including receiving electric vehicle prospective use information as provided electronically from one or more electric vehicle use logs. Origination of a physically tangible component group can be accomplished through skilled in the art design choice selection including use of one or more components and/or subsystems explicitly and/or implicitly referred to herein for at least in part implementing execution of one or more instructions of the operation o1122, for performance of the operation o1122 by an electrical circuitry arrangement as activated thereto, and/or otherwise fulfillment of the operation o1122. One or more non-transitory signal bearing physical media can bear the one or more instructions that when executed can direct performance of the operation o1122. Furthermore, receiving electric vehicle prospective use information as provided electronically from electric vehicle use logs module m1122 depicted in FIG. 5-B as being included in the module m1110, when executed and/or activated, can direct performance of and/or perform the operation o1122. Illustratively, in one or more implementations, the operation o1122 can be carried out, for example, by receiving electric vehicle prospective use information through other than overt action by one or more prospective vehicle users to provide for the receiving (e.g. receiving information by eaves-dropping on one or more audible conversations of one or more electric vehicle users, etc.) including receiving electric vehicle prospective use information as provided electronically from one or more electric vehicle use logs (e.g. receiving information through direct access to use logs contained onboard in the electric vehicle regarding performance metrics of the electric vehicle showing characteristics of use including kinematic and dynamic parameters including acceleration, deceleration, cruising, parking, waiting, idling, GPS location data and other patterns of use, etc.).

In one or more implementations, as shown in FIG. 9-E, the operation o11 can include operation o1123 for electronically receiving electric vehicle prospective use information associated with aspects indicating one or more future travel plans involving prospective use of an electric vehicle, the electric vehicle including one or more electric motors to provide motive force to at least partially propel the electric vehicle during one or more portions of travel of the electric vehicle, the electric vehicle including one or more wireless electrical energy transfer receiving devices and one or more electrical energy storage devices including receiving electric vehicle prospective use information through one or more explicit actions by one or more prospective electric vehicle users to provide the receiving. Origination of a physically tangible component group can be accomplished through skilled in the art design choice selection including use of one or more components and/or subsystems explicitly and/or implicitly referred to herein for at least in part implementing execution of one or more instructions of the operation o1123, for performance of the operation o1123 by an electrical circuitry arrangement as activated thereto, and/or otherwise fulfillment of the operation o1123. One or more non-transitory signal bearing physical media can bear the one or more instructions that when executed can direct performance of the operation o1123. Furthermore, receiving electric vehicle prospective use information through explicit actions by prospective electric vehicle users to provide the receiving module m1123 depicted in FIG. 5-C as being included in the module m11, when executed and/or activated, can direct performance of and/or perform the operation o1123. Illustratively, in one or more implementations, the operation o1123 can be carried out, for example, by electronically receiving (e.g. by wireless or wired through digitized, packetized or other electronic communication, etc.) electric vehicle (e.g. hybrid or full electric car, truck, cycle or other vehicle, etc.) prospective use information (e.g. tentative, scheduled, projected, estimated, determined, speculative or other regarding long or short term use as driver, passenger through ownership or leasing or borrowing, etc.) associated (e.g. directly or indirectly related, etc.) with aspects (e.g. calendaring, scheduling, topical, itemized, tangential, or other aspects, etc.) indicating (e.g. deductively or inductively signaling, alerting, suggesting, etc.) one or more future (e.g. immediate, advanced in future, etc.) travel plans (e.g. erratic, spontaneous, methodical, commuting, long distance, touring, vacation, errands, ad hoc, etc.) involving (e.g. implicitly or explicitly related, etc.) prospective use (e.g. possible, tentative, routine, etc.) of an electric vehicle (e.g. short range, long range car, truck, van, etc.), the electric vehicle including one or more electric motors (e.g. alternative current, direct current, all wheel propulsion, under hood mounting, inside wheel mounting, etc.) to provide motive force (e.g. partial or full motive force, etc.) to at least partially propel (e.g. intermediate, constant, or backup propulsion, etc.) the electric vehicle (e.g. hybrid or full electric, etc.) during one or more portions (e.g. city driving, acceleration, initial portion of trip, entire trip, etc.) of travel (e.g. road, rail, commute, touring, etc.) of the electric vehicle, the electric vehicle including one or more wireless electrical energy transfer receiving devices (e.g. field magnetic resonance, capacitive charging, etc.) and one or more electrical energy storage devices (e.g. lead acid, nickel cadmium, capacitive, etc.) including receiving electric vehicle prospective use information through one or more explicit actions by one or more prospective electric vehicle users to provide the receiving (e.g. receiving information through active data entry by one or more of the electric vehicle users such as downloading data of a personal data assistant device of the users, or through text of voice entry directed to an interface found in the dashboard of the electric vehicle, etc.).

In one or more implementations, as shown in FIG. 9-E, the operation o1123 can include operation o1124 for receiving electric vehicle prospective use information through one or more explicit actions by one or more prospective electric vehicle users to provide the receiving including receiving electric vehicle prospective use information through one or more contactless smart card systems located on one or more electric vehicles. Origination of a physically tangible component group can be accomplished through skilled in the art design choice selection including use of one or more components and/or subsystems explicitly and/or implicitly referred to herein for at least in part implementing execution of one or more instructions of the operation o1124, for performance of the operation o1124 by an electrical circuitry arrangement as activated thereto, and/or otherwise fulfillment of the operation o1124. One or more non-transitory signal bearing physical media can bear the one or more instructions that when executed can direct performance of the operation o1124. Furthermore, receiving electric vehicle prospective use information through contactless smart card systems located on electric vehicles module m1124 depicted in FIG. 5-C as being included in the module m1123, when executed and/or activated, can direct performance of and/or perform the operation o1124. Illustratively, in one or more implementations, the operation o1124 can be carried out, for example, by receiving electric vehicle prospective use information through one or more explicit actions by one or more prospective electric vehicle users to provide the receiving (e.g. receiving information through active data entry by one or more of the electric vehicle users such as downloading data of a personal data assistant device of the users, or through text of voice entry directed to an interface found in the dashboard of the electric vehicle, etc.) including receiving electric vehicle prospective use information through one or more contactless smart card systems located on one or more electric vehicles (e.g. receiving information through one or more electric vehicle users swiping cards, cell phones, wallets or other smart cards type devices containing information regarding either the user profile information, past or future itineraries, etc.).

In one or more implementations, as shown in FIG. 9-E, the operation o1123 can include operation o1125 for receiving electric vehicle prospective use information through one or more explicit actions by one or more prospective electric vehicle users to provide the receiving including receiving electric vehicle prospective use information through manual entering of data through one or more keypads. Origination of a physically tangible component group can be accomplished through skilled in the art design choice selection including use of one or more components and/or subsystems explicitly and/or implicitly referred to herein for at least in part implementing execution of one or more instructions of the operation o1125, for performance of the operation o1125 by an electrical circuitry arrangement as activated thereto, and/or otherwise fulfillment of the operation o1125. One or more non-transitory signal bearing physical media can bear the one or more instructions that when executed can direct performance of the operation o1125. Furthermore, receiving electric vehicle prospective use information through manual entering of data through keypads module m1125 depicted in FIG. 5-C as being included in the module m1123, when executed and/or activated, can direct performance of and/or perform the operation o1125. Illustratively, in one or more implementations, the operation o1125 can be carried out, for example, by receiving electric vehicle prospective use information through one or more explicit actions by one or more prospective electric vehicle users to provide the receiving (e.g. receiving information through active data entry by one or more of the electric vehicle users such as downloading data of a personal data assistant device of the users, or through text of voice entry directed to an interface found in the dashboard of the electric vehicle, etc.) including receiving electric vehicle prospective use information through manual entering of data through one or more keypads (e.g. receiving information through use of data entry on one or more keypads such as located on a console within the electric vehicle or sear a charging station of the electric vehicle, etc.).

In one or more implementations, as shown in FIG. 9-F, the operation o1123 can include operation o1126 for receiving electric vehicle prospective use information through one or more explicit actions by one or more prospective electric vehicle users to provide the receiving including receiving electric vehicle prospective use information through direct text entry. Origination of a physically tangible component group can be accomplished through skilled in the art design choice selection including use of one or more components and/or subsystems explicitly and/or implicitly referred to herein for at least in part implementing execution of one or more instructions of the operation o1126, for performance of the operation o1126 by an electrical circuitry arrangement as activated thereto, and/or otherwise fulfillment of the operation o1126. One or more non-transitory signal bearing physical media can bear the one or more instructions that when executed can direct performance of the operation o1126. Furthermore, receiving electric vehicle prospective use information through direct text entry module m1126 depicted in FIG. 5-C as being included in the module m1123, when executed and/or activated, can direct performance of and/or perform the operation o1126. Illustratively, in one or more implementations, the operation o1126 can be carried out, for example, by receiving electric vehicle prospective use information through one or more explicit actions by one or more prospective electric vehicle users to provide the receiving (e.g. receiving information through active data entry by one or more of the electric vehicle users such as downloading data of a personal data assistant device of the users, or through text of voice entry directed to an interface found in the dashboard of the electric vehicle, etc.) including receiving electric vehicle prospective use information through direct text entry (e.g. receiving information regarding intended use of the electric vehicle through responses typed into a text entry device such as on a smart phone or keypad or other text entry device by one or more users of the electric vehicle, etc.).

In one or more implementations, as shown in FIG. 9-F, the operation o1123 can include operation o1127 for receiving electric vehicle prospective use information through one or more explicit actions by one or more prospective electric vehicle users to provide the receiving including receiving electric vehicle prospective use information through one or more humans announcing information directed in reply to one or more electric vehicle audio reception systems. Origination of a physically tangible component group can be accomplished through skilled in the art design choice selection including use of one or more components and/or subsystems explicitly and/or implicitly referred to herein for at least in part implementing execution of one or more instructions of the operation o1127, for performance of the operation o1127 by an electrical circuitry arrangement as activated thereto, and/or otherwise fulfillment of the operation o1127. One or more non-transitory signal bearing physical media can bear the one or more instructions that when executed can direct performance of the operation o1127. Furthermore, receiving electric vehicle prospective use information through humans announcing information directed in reply to electric vehicle audio reception systems module m1127 depicted in FIG. 5-C as being included in the module m1123, when executed and/or activated, can direct performance of and/or perform the operation o1127. Illustratively, in one or more implementations, the operation o1127 can be carried out, for example, by receiving electric vehicle prospective use information through one or more explicit actions by one or more prospective electric vehicle users to provide the receiving (e.g. receiving information through active data entry by one or more of the electric vehicle users such as downloading data of a personal data assistant device of the users, or through text of voice entry directed to an interface found in the dashboard of the electric vehicle, etc.) including receiving electric vehicle prospective use information through one or more humans announcing information directed in reply to one or more electric vehicle audio reception systems (e.g. receiving information from one or more users of the electric vehicle by the users verbally responding to audio cues announced by an audio system to the users based upon determined location of the users by the audio system, etc.).

In one or more implementations, as shown in FIG. 9-F, the operation o11 can include operation o1128 for electronically receiving electric vehicle prospective use information associated with aspects indicating one or more future travel plans involving prospective use of an electric vehicle, the electric vehicle including one or more electric motors to provide motive force to at least partially propel the electric vehicle during one or more portions of travel of the electric vehicle, the electric vehicle including one or more wireless electrical energy transfer receiving devices and one or more electrical energy storage devices including receiving electric vehicle prospective use information regarding one or more prospective electric vehicle occupants. Origination of a physically tangible component group can be accomplished through skilled in the art design choice selection including use of one or more components and/or subsystems explicitly and/or implicitly referred to herein for at least in part implementing execution of one or more instructions of the operation o1128, for performance of the operation o1128 by an electrical circuitry arrangement as activated thereto, and/or otherwise fulfillment of the operation o1128. One or more non-transitory signal bearing physical media can bear the one or more instructions that when executed can direct performance of the operation o1128. Furthermore, receiving electric vehicle prospective use information regarding prospective electric vehicle occupants module m1128 depicted in FIG. 5-C as being included in the module m11, when executed and/or activated, can direct performance of and/or perform the operation o1128. Illustratively, in one or more implementations, the operation o1128 can be carried out, for example, by electronically receiving (e.g. by wireless or wired through digitized, packetized or other electronic communication, etc.) electric vehicle (e.g. hybrid or full electric car, truck, cycle or other vehicle, etc.) prospective use information (e.g. tentative, scheduled, projected, estimated, determined, speculative or other regarding long or short term use as driver, passenger through ownership or leasing or borrowing, etc.) associated (e.g. directly or indirectly related, etc.) with aspects (e.g. calendaring, scheduling, topical, itemized, tangential, or other aspects, etc.) indicating (e.g. deductively or inductively signaling, alerting, suggesting, etc.) one or more future (e.g. immediate, advanced in future, etc.) travel plans (e.g. erratic, spontaneous, methodical, commuting, long distance, touring, vacation, errands, ad hoc, etc.) involving (e.g. implicitly or explicitly related, etc.) prospective use (e.g. possible, tentative, routine, etc.) of an electric vehicle (e.g. short range, long range car, truck, van, etc.), the electric vehicle including one or more electric motors (e.g. alternative current, direct current, all wheel propulsion, under hood mounting, inside wheel mounting, etc.) to provide motive force (e.g. partial or full motive force, etc.) to at least partially propel (e.g. intermediate, constant, or backup propulsion, etc.) the electric vehicle (e.g. hybrid or full electric, etc.) during one or more portions (e.g. city driving, acceleration, initial portion of trip, entire trip, etc.) of travel (e.g. road, rail, commute, touring, etc.) of the electric vehicle, the electric vehicle including one or more wireless electrical energy transfer receiving devices (e.g. field magnetic resonance, capacitive charging, etc.) and one or more electrical energy storage devices (e.g. lead acid, nickel cadmium, capacitive, etc.) including receiving electric vehicle prospective use information regarding one or more prospective electric vehicle occupants (e.g. receiving information including commute information such as residence location, work location, employment scheduling, or other errand information of one or more passengers associated with one or more drivers of the electric vehicle, etc.).

In one or more implementations, as shown in FIG. 9-F, the operation o1128 can include operation o1129 for receiving electric vehicle prospective use information regarding one or more prospective electric vehicle occupants including receiving electric vehicle prospective use information regarding multiple occupant drivers of an electric vehicle. Origination of a physically tangible component group can be accomplished through skilled in the art design choice selection including use of one or more components and/or subsystems explicitly and/or implicitly referred to herein for at least in part implementing execution of one or more instructions of the operation o1129, for performance of the operation o1129 by an electrical circuitry arrangement as activated thereto, and/or otherwise fulfillment of the operation o1129. One or more non-transitory signal bearing physical media can bear the one or more instructions that when executed can direct performance of the operation o1129. Furthermore, receiving electric vehicle prospective use information regarding multiple occupant drivers of an electric vehicle module m1129 depicted in FIG. 5-C as being included in the module m1128, when executed and/or activated, can direct performance of and/or perform the operation o1129. Illustratively, in one or more implementations, the operation o1129 can be carried out, for example, by receiving electric vehicle prospective use information regarding one or more prospective electric vehicle occupants (e.g. receiving information including commute information such as residence location, work location, employment scheduling, or other errand information of one or more passengers associated with one or more drivers of the electric vehicle, etc.) including receiving electric vehicle prospective use information regarding multiple occupant drivers of an electric vehicle (e.g. receiving information associated with driving habits of one or more drivers of the electric vehicle such as their driving styles, favorite places to drive, compliance with driving rules, etc.).

In one or more implementations, as shown in FIG. 9-F, the operation o1128 can include operation o1130 for receiving electric vehicle prospective use information regarding one or more prospective electric vehicle occupants including receiving electric vehicle prospective use information regarding occupants of multiple electric vehicles to receive electrical energy from a local electrical grid substation. Origination of a physically tangible component group can be accomplished through skilled in the art design choice selection including use of one or more components and/or subsystems explicitly and/or implicitly referred to herein for at least in part implementing execution of one or more instructions of the operation o1130, for performance of the operation o1130 by an electrical circuitry arrangement as activated thereto, and/or otherwise fulfillment of the operation o1130. One or more non-transitory signal bearing physical media can bear the one or more instructions that when executed can direct performance of the operation o1130. Furthermore, receiving electric vehicle prospective use information regarding occupants of multiple electric vehicles to receive electrical energy from a local electrical grid substation module m1130 depicted in FIG. 5-C as being included in the module m1128, when executed and/or activated, can direct performance of and/or perform the operation o1130. Illustratively, in one or more implementations, the operation o1130 can be carried out, for example, by receiving electric vehicle prospective use information regarding one or more prospective electric vehicle occupants (e.g. receiving information including commute information such as residence location, work location, employment scheduling, or other errand information of one or more passengers associated with one or more drivers of the electric vehicle, etc.) including receiving electric vehicle prospective use information regarding occupants of multiple electric vehicles to receive electrical energy from a local electrical grid substation (e.g. receiving information from a utility substation, a local solar panel, or a local wind generator associated with load sharing activity with other electrical energy consuming devices in addition to the electrical energy imparting stations, etc.).

In one or more implementations, as shown in FIG. 9-G, the operation o1128 can include operation o1131 for receiving electric vehicle prospective use information regarding one or more prospective electric vehicle occupants including receiving electric vehicle prospective use information regarding actual recorded electric vehicle use compared with planned electric vehicle use. Origination of a physically tangible component group can be accomplished through skilled in the art design choice selection including use of one or more components and/or subsystems explicitly and/or implicitly referred to herein for at least in part implementing execution of one or more instructions operation o1131, for performance of the operation o1131 by an electrical circuitry arrangement as activated thereto, and/or otherwise fulfillment of the operation o1131. One or more non-transitory signal bearing physical media can bear the one or more instructions that when executed can direct performance of the operation o1131. Furthermore, receiving electric vehicle prospective use information regarding actual recorded electric vehicle use compared with planned electric vehicle use module m1131 depicted in FIG. 5-C as being included in the module m1128, when executed and/or activated, can direct performance of and/or perform the operation o1131. Illustratively, in one or more implementations, the operation o1131 can be carried out, for example, by receiving electric vehicle prospective use information regarding one or more prospective electric vehicle occupants (e.g. receiving information including commute information such as residence location, work location, employment scheduling, or other errand information of one or more passengers associated with one or more drivers of the electric vehicle, etc.) including receiving electric vehicle prospective use information regarding actual recorded electric vehicle use compared with planned electric vehicle use (e.g. receiving information regarding itineraries posted prior to travel and comparing such with vehicle logs to determine discrepancies between planned activity and actual accomplished activities, etc.).

In one or more implementations, as shown in FIG. 9-G, the operation o1128 can include operation o1132 for receiving electric vehicle prospective use information regarding one or more prospective electric vehicle occupants including receiving electric vehicle prospective use information regarding recording driving patterns associated with one or more electric vehicle drivers. Origination of a physically tangible component group can be accomplished through skilled in the art design choice selection including use of one or more components and/or subsystems explicitly and/or implicitly referred to herein for at least in part implementing execution of one or more instructions operation o1132, for performance of the operation o1132 by an electrical circuitry arrangement as activated thereto, and/or otherwise fulfillment of the operation o1132. One or more non-transitory signal bearing physical media can bear the one or more instructions that when executed can direct performance of the operation o1132. Furthermore, receiving electric vehicle prospective use information regarding recording driving patterns associated with electric vehicle drivers module m1132 depicted in FIG. 5-C as being included in the module m1128, when executed and/or activated, can direct performance of and/or perform the operation o1132. Illustratively, in one or more implementations, the operation o1132 can be carried out, for example, by receiving electric vehicle prospective use information regarding one or more prospective electric vehicle occupants (e.g. receiving information including commute information such as residence location, work location, employment scheduling, or other errand information of one or more passengers associated with one or more drivers of the electric vehicle, etc.) including receiving electric vehicle prospective use information regarding recording driving patterns associated with one or more electric vehicle drivers (e.g. receiving information regarding detours from planned routes, departures from compliance with driving rules or regulations, statistical data regarding frequency or duration of waits or stops, historical data regarding weight of loads transported, etc.).

In one or more implementations, as shown in FIG. 9-G, the operation o1128 can include operation o1133 for receiving electric vehicle prospective use information regarding one or more prospective electric vehicle occupants including receiving electric vehicle prospective use information regarding one or more non-driver occupant ride-sharing plans. Origination of a physically tangible component group can be accomplished through skilled in the art design choice selection including use of one or more components and/or subsystems explicitly and/or implicitly referred to herein for at least in part implementing execution of one or more instructions operation o1133, for performance of the operation o1133 by an electrical circuitry arrangement as activated thereto, and/or otherwise fulfillment of the operation o1133. One or more non-transitory signal bearing physical media can bear the one or more instructions that when executed can direct performance of the operation o1133. Furthermore, receiving electric vehicle prospective use information regarding prospective electric vehicle occupants including receiving electric vehicle prospective use information regarding non-driver occupant ride-sharing plans module m1133 depicted in FIG. 5-C as being included in the module m1128, when executed and/or activated, can direct performance of and/or perform the operation o1133. Illustratively, in one or more implementations, the operation o1133 can be carried out, for example, by receiving electric vehicle prospective use information regarding one or more prospective electric vehicle occupants (e.g. receiving information including commute information such as residence location, work location, employment scheduling, or other errand information of one or more passengers associated with one or more drivers of the electric vehicle, etc.) including receiving electric vehicle prospective use information regarding one or more non-driver occupant ride-sharing plans (e.g. receiving information regarding designated one or more car pool riders that frequent use of the electric vehicle along with one or more designated drivers, etc.).

In one or more implementations, as shown in FIG. 9-G, the operation o1128 can include operation o1134 for receiving electric vehicle prospective use information regarding one or more prospective electric vehicle occupants including receiving electric vehicle prospective use information regarding one or more priorities distributed among one or more prospective electric vehicle users for use of the electric vehicle. Origination of a physically tangible component group can be accomplished through skilled in the art design choice selection including use of one or more components and/or subsystems explicitly and/or implicitly referred to herein for at least in part implementing execution of one or more instructions operation o1134, for performance of the operation o1134 by an electrical circuitry arrangement as activated thereto, and/or otherwise fulfillment of the operation o1134. One or more non-transitory signal bearing physical media can bear the one or more instructions that when executed can direct performance of the operation o1134. Furthermore, receiving electric vehicle prospective use information regarding prospective electric vehicle occupants including receiving electric vehicle prospective use information regarding priorities distributed among prospective electric vehicle users for use of the electric vehicle module m1134 depicted in FIG. 5-D as being included in the module m1128, when executed and/or activated, can direct performance of and/or perform the operation o1134. Illustratively, in one or more implementations, the operation o1134 can be carried out, for example, by receiving electric vehicle prospective use information regarding one or more prospective electric vehicle occupants (e.g. receiving information including commute information such as residence location, work location, employment scheduling, or other errand information of one or more passengers associated with one or more drivers of the electric vehicle, etc.) including receiving electric vehicle prospective use information regarding one or more priorities distributed among one or more prospective electric vehicle users for use of the electric vehicle (e.g. receiving information indicating how scheduling conflicts are generally resolved through use of the electric vehicle by a plurality of users such that one or more rules of priority are generated for use in predicting future use of the electric vehicle, etc.).

In one or more implementations, as shown in FIG. 9-G, the operation o1128 can include operation o1135 for receiving electric vehicle prospective use information regarding one or more prospective electric vehicle occupants including receiving electric vehicle prospective use information regarding use of the electric vehicle by one or more drivers before electrical energy transfer to the electric vehicle occurs after the electric vehicle is driven by another driver. Origination of a physically tangible component group can be accomplished through skilled in the art design choice selection including use of one or more components and/or subsystems explicitly and/or implicitly referred to herein for at least in part implementing execution of one or more instructions operation o1135, for performance of the operation o1135 by an electrical circuitry arrangement as activated thereto, and/or otherwise fulfillment of the operation o1135. One or more non-transitory signal bearing physical media can bear the one or more instructions that when executed can direct performance of the operation o1135. Furthermore, receiving electric vehicle prospective use information regarding prospective electric vehicle occupants including receiving electric vehicle prospective use information regarding use of the electric vehicle by drivers before electrical energy transfer to the electric vehicle occurs after the electric vehicle is driven by another driver module m1135 depicted in FIG. 5-D as being included in the module m1128, when executed and/or activated, can direct performance of and/or perform the operation o1135. Illustratively, in one or more implementations, the operation o1135 can be carried out, for example, by receiving electric vehicle prospective use information regarding one or more prospective electric vehicle occupants (e.g. receiving information including commute information such as residence location, work location, employment scheduling, or other errand information of one or more passengers associated with one or more drivers of the electric vehicle, etc.) including receiving electric vehicle prospective use information regarding use of the electric vehicle by one or more drivers before electrical energy transfer to the electric vehicle occurs after the electric vehicle is driven by another driver (e.g. receiving information regarding a first sets of uses to determine how the electric vehicle may be used for a second set of uses before the electric vehicle is charged for the second set of uses, etc.).

In one or more implementations, as shown in FIG. 9-H, the operation o1128 can include operation o1136 for receiving electric vehicle prospective use information regarding one or more prospective electric vehicle occupants including receiving electric vehicle prospective use information as merged plans of multiple prospective drivers of the electric vehicle for consecutive periods of use planned to occur before the electric vehicle is returned to receive electrical energy transfer. Origination of a physically tangible component group can be accomplished through skilled in the art design choice selection including use of one or more components and/or subsystems explicitly and/or implicitly referred to herein for at least in part implementing execution of one or more instructions operation o1136, for performance of the operation o1136 by an electrical circuitry arrangement as activated thereto, and/or otherwise fulfillment of the operation o1136. One or more non-transitory signal bearing physical media can bear the one or more instructions that when executed can direct performance of the operation o1136. Furthermore, receiving electric vehicle prospective use information as merged plans of multiple prospective drivers of the electric vehicle for consecutive periods of use planned to occur before the electric vehicle is returned to receive electrical energy transfer module m1136 depicted in FIG. 5-D as being included in the module m1128, when executed and/or activated, can direct performance of and/or perform the operation o1136. Illustratively, in one or more implementations, the operation o1136 can be carried out, for example, by receiving electric vehicle prospective use information regarding one or more prospective electric vehicle occupants (e.g. receiving information including commute information such as residence location, work location, employment scheduling, or other errand information of one or more passengers associated with one or more drivers of the electric vehicle, etc.) including receiving electric vehicle prospective use information as merged plans of multiple prospective drivers of the electric vehicle for consecutive periods of use planned to occur before the electric vehicle is returned to receive electrical energy transfer (e.g. receiving information by extracting data from multiple calendars to generate a composite calendar for use in forecasting use of the electric vehicle, etc.).

In one or more implementations, as shown in FIG. 9-H, the operation o1128 can include operation o1137 for receiving electric vehicle prospective use information regarding one or more prospective electric vehicle occupants including receiving electric vehicle prospective use information associated with individual employee incentive programs. Origination of a physically tangible component group can be accomplished through skilled in the art design choice selection including use of one or more components and/or subsystems explicitly and/or implicitly referred to herein for at least in part implementing execution of one or more instructions operation o1137, for performance of the operation o1137 by an electrical circuitry arrangement as activated thereto, and/or otherwise fulfillment of the operation o1137. One or more non-transitory signal bearing physical media can bear the one or more instructions that when executed can direct performance of the operation o1137. Furthermore, receiving electric vehicle prospective use information associated with individual employee incentive programs module m1137 depicted in FIG. 5-D as being included in the module m1128, when executed and/or activated, can direct performance of and/or perform the operation o1137. Illustratively, in one or more implementations, the operation o1137 can be carried out, for example, by receiving electric vehicle prospective use information regarding one or more prospective electric vehicle occupants (e.g. receiving information including commute information such as residence location, work location, employment scheduling, or other errand information of one or more passengers associated with one or more drivers of the electric vehicle, etc.) including receiving electric vehicle prospective use information associated with individual employee incentive programs (e.g. receiving information from one or more human relations database implemented incentive programs for employees to avail themselves of charging stations located in one or more parking garages on the vicinity of an employer of one or more users of the electric vehicle, etc.).

In one or more implementations, as shown in FIG. 9-H, the operation o1128 can include operation o1138 for receiving electric vehicle prospective use information regarding one or more prospective electric vehicle occupants including receiving electric vehicle prospective use information associated with one or more employee group benefit programs. Origination of a physically tangible component group can be accomplished through skilled in the art design choice selection including use of one or more components and/or subsystems explicitly and/or implicitly referred to herein for at least in part implementing execution of one or more instructions operation o1138, for performance of the operation o1138 by an electrical circuitry arrangement as activated thereto, and/or otherwise fulfillment of the operation o1138. One or more non-transitory signal bearing physical media can bear the one or more instructions that when executed can direct performance of the operation o1138. Furthermore, receiving electric vehicle prospective use information associated with employee group benefit programs module m1138 depicted in FIG. 5-D as being included in the module m1128, when executed and/or activated, can direct performance of and/or perform the operation o1138. Illustratively, in one or more implementations, the operation o1138 can be carried out, for example, by receiving electric vehicle prospective use information regarding one or more prospective electric vehicle occupants (e.g. receiving information including commute information such as residence location, work location, employment scheduling, or other errand information of one or more passengers associated with one or more drivers of the electric vehicle, etc.) including receiving electric vehicle prospective use information associated with one or more employee group benefit programs (e.g. receiving information regarding terms and conditions of contractually obligated benefits to be distributed to one or more employees concerning use of charging stations provided by their employer for charging of the electric vehicle as used by the employee, the terms and conditions such as including total energy obtained for a designated period of time, frequency and amount of use of the one or more charging stations located at the employer, etc.).

In one or more implementations, as shown in FIG. 9-H, the operation o1128 can include operation o1139 for receiving electric vehicle prospective use information regarding one or more prospective electric vehicle occupants including receiving electric vehicle prospective use information associated with one or more prioritized tasks of a work schedule. Origination of a physically tangible component group can be accomplished through skilled in the art design choice selection including use of one or more components and/or subsystems explicitly and/or implicitly referred to herein for at least in part implementing execution of one or more instructions operation o1139, for performance of the operation o1139 by an electrical circuitry arrangement as activated thereto, and/or otherwise fulfillment of the operation o1139. One or more non-transitory signal bearing physical media can bear the one or more instructions that when executed can direct performance of the operation o1139. Furthermore, receiving electric vehicle prospective use information associated with prioritized tasks of a work schedule module m1139 depicted in FIG. 5-D as being included in the module m1128, when executed and/or activated, can direct performance of and/or perform the operation o1139. Illustratively, in one or more implementations, the operation o1139 can be carried out, for example, by receiving electric vehicle prospective use information regarding one or more prospective electric vehicle occupants (e.g. receiving information including commute information such as residence location, work location, employment scheduling, or other errand information of one or more passengers associated with one or more drivers of the electric vehicle, etc.) including receiving electric vehicle prospective use information associated with one or more prioritized tasks of a work schedule (e.g. receiving information regarding tasks associated through scheduling documents such as pert, gannt, or other similar planning documents, etc.).

In one or more implementations, as shown in FIG. 9-H, the operation o1128 can include operation o1140 for receiving electric vehicle prospective use information regarding one or more prospective electric vehicle occupants including receiving electric vehicle prospective use information regarding planned prospective number of occupants to use the vehicle before the electric vehicle receives electrical energy transfer. Origination of a physically tangible component group can be accomplished through skilled in the art design choice selection including use of one or more components and/or subsystems explicitly and/or implicitly referred to herein for at least in part implementing execution of one or more instructions operation o1140, for performance of the operation o1140 by an electrical circuitry arrangement as activated thereto, and/or otherwise fulfillment of the operation o1140. One or more non-transitory signal bearing physical media can bear the one or more instructions that when executed can direct performance of the operation o1140. Furthermore, receiving electric vehicle prospective use information regarding planned prospective number of occupants to use the vehicle before the electric vehicle receives electrical energy transfer module m1140 depicted in FIG. 5-D as being included in the module m1128, when executed and/or activated, can direct performance of and/or perform the operation o1140. Illustratively, in one or more implementations, the operation o1140 can be carried out, for example, by receiving electric vehicle prospective use information regarding one or more prospective electric vehicle occupants (e.g. receiving information including commute information such as residence location, work location, employment scheduling, or other errand information of one or more passengers associated with one or more drivers of the electric vehicle, etc.) including receiving electric vehicle prospective use information regarding planned prospective number of occupants to use the vehicle before the electric vehicle receives electrical energy transfer (e.g. receiving information regarding a number of electric vehicle users per day that will be using a commonly shared electric vehicle over a course of one or more days based on reservation scheduling of the number of electric vehicle users, etc.).

In one or more implementations, as shown in FIG. 9-I, the operation o11 can include operation o1141 for electronically receiving electric vehicle prospective use information associated with aspects indicating one or more future travel plans involving prospective use of an electric vehicle, the electric vehicle including one or more electric motors to provide motive force to at least partially propel the electric vehicle during one or more portions of travel of the electric vehicle, the electric vehicle including one or more wireless electrical energy transfer receiving devices and one or more electrical energy storage devices including receiving electric vehicle prospective use information regarding one or more electric vehicle aspects. Origination of a physically tangible component group can be accomplished through skilled in the art design choice selection including use of one or more components and/or subsystems explicitly and/or implicitly referred to herein for at least in part implementing execution of one or more instructions operation o1141, for performance of the operation o1141 by an electrical circuitry arrangement as activated thereto, and/or otherwise fulfillment of the operation o1141. One or more non-transitory signal bearing physical media can bear the one or more instructions that when executed can direct performance of the operation o1141. Furthermore, receiving electric vehicle prospective use information regarding electric vehicle aspects module m1141 depicted in FIG. 5-D as being included in the module m11, when executed and/or activated, can direct performance of and/or perform the operation o1141. Illustratively, in one or more implementations, the operation o1141 can be carried out, for example, by electronically receiving (e.g. by wireless or wired through digitized, packetized or other electronic communication, etc.) electric vehicle (e.g. hybrid or full electric car, truck, cycle or other vehicle, etc.) prospective use information (e.g. tentative, scheduled, projected, estimated, determined, speculative or other regarding long or short term use as driver, passenger through ownership or leasing or borrowing, etc.) associated (e.g. directly or indirectly related, etc.) with aspects (e.g. calendaring, scheduling, topical, itemized, tangential, or other aspects, etc.) indicating (e.g. deductively or inductively signaling, alerting, suggesting, etc.) one or more future (e.g. immediate, advanced in future, etc.) travel plans (e.g. erratic, spontaneous, methodical, commuting, long distance, touring, vacation, errands, ad hoc, etc.) involving (e.g. implicitly or explicitly related, etc.) prospective use (e.g. possible, tentative, routine, etc.) of an electric vehicle (e.g. short range, long range car, truck, van, etc.), the electric vehicle including one or more electric motors (e.g. alternative current, direct current, all wheel propulsion, under hood mounting, inside wheel mounting, etc.) to provide motive force (e.g. partial or full motive force, etc.) to at least partially propel (e.g. intermediate, constant, or backup propulsion, etc.) the electric vehicle (e.g. hybrid or full electric, etc.) during one or more portions (e.g. city driving, acceleration, initial portion of trip, entire trip, etc.) of travel (e.g. road, rail, commute, touring, etc.) of the electric vehicle, the electric vehicle including one or more wireless electrical energy transfer receiving devices (e.g. field magnetic resonance, capacitive charging, etc.) and one or more electrical energy storage devices (e.g. lead acid, nickel cadmium, capacitive, etc.) including receiving electric vehicle prospective use information regarding one or more electric vehicle aspects (e.g. receiving information regarding performance characteristics of the electric vehicle including electrical energy storage capacity, electrical energy demand for representative driving cycles, electrical energy charging throughput rate, etc.).

In one or more implementations, as shown in FIG. 9-I, the operation o1141 can include operation o1142 for receiving electric vehicle prospective use information regarding one or more electric vehicle aspects including receiving electric vehicle aspect information regarding range of the electric vehicle in an all-electric mode. Origination of a physically tangible component group can be accomplished through skilled in the art design choice selection including use of one or more components and/or subsystems explicitly and/or implicitly referred to herein for at least in part implementing execution of one or more instructions operation o1142, for performance of the operation o1142 by an electrical circuitry arrangement as activated thereto, and/or otherwise fulfillment of the operation o1142. One or more non-transitory signal bearing physical media can bear the one or more instructions that when executed can direct performance of the operation o1142. Furthermore, receiving electric vehicle aspect information regarding range of the electric vehicle in an all-electric mode module m1142 depicted in FIG. 5-D as being included in the module m1141, when executed and/or activated, can direct performance of and/or perform the operation o1142. Illustratively, in one or more implementations, the operation o1142 can be carried out, for example, by receiving electric vehicle prospective use information regarding one or more electric vehicle aspects (e.g. receiving information regarding performance characteristics of the electric vehicle including electrical energy storage capacity, electrical energy demand for representative driving cycles, electrical energy charging throughput rate, etc.) including receiving electric vehicle aspect information regarding range of the electric vehicle in an all-electric mode (e.g. receiving information regarding historical use records indicating actual range of the electric vehicle for particular charge levels and routes of travel having various sets of conditions, etc.).

In one or more implementations, as shown in FIG. 9-I, the operation o1141 can include operation o1143 for receiving electric vehicle prospective use information regarding one or more electric vehicle aspects including receiving electric vehicle aspect information regarding range of the electric vehicle in a hybrid electric-fuel mode. Origination of a physically tangible component group can be accomplished through skilled in the art design choice selection including use of one or more components and/or subsystems explicitly and/or implicitly referred to herein for at least in part implementing execution of one or more instructions operation o1143, for performance of the operation o1143 by an electrical circuitry arrangement as activated thereto, and/or otherwise fulfillment of the operation o1143. One or more non-transitory signal bearing physical media can bear the one or more instructions that when executed can direct performance of the operation o1143. Furthermore, receiving electric vehicle aspect information regarding range of the electric vehicle in a hybrid electric-fuel mode module m1143 depicted in FIG. 5-D as being included in the module m1141, when executed and/or activated, can direct performance of and/or perform the operation o1143. Illustratively, in one or more implementations, the operation o1143 can be carried out, for example, by receiving electric vehicle prospective use information regarding one or more electric vehicle aspects (e.g. receiving information regarding performance characteristics of the electric vehicle including electrical energy storage capacity, electrical energy demand for representative driving cycles, electrical energy charging throughput rate, etc.) including receiving electric vehicle aspect information regarding range of the electric vehicle in a hybrid electric-fuel mode (e.g. receiving information regarding distance range capacity for liquid fuel such as gasoline, diesel, other hydrocarbon or hydrogen fuel and distance range capacity for electric mode for a number of varying ratios of fueled versus electric use, etc.).

In one or more implementations, as shown in FIG. 9-I, the operation o1141 can include operation o1144 for receiving electric vehicle prospective use information regarding one or more electric vehicle aspects including receiving electric vehicle aspect information regarding one or more maintenance schedules for the electric vehicle. Origination of a physically tangible component group can be accomplished through skilled in the art design choice selection including use of one or more components and/or subsystems explicitly and/or implicitly referred to herein for at least in part implementing execution of one or more instructions operation o1144, for performance of the operation o1144 by an electrical circuitry arrangement as activated thereto, and/or otherwise fulfillment of the operation o1144. One or more non-transitory signal bearing physical media can bear the one or more instructions that when executed can direct performance of the operation o1144. Furthermore, receiving electric vehicle aspect information regarding maintenance schedules for the electric vehicle module m1144 depicted in FIG. 5-D as being included in the module m1141, when executed and/or activated, can direct performance of and/or perform the operation o1144. Illustratively, in one or more implementations, the operation o1144 can be carried out, for example, by receiving electric vehicle prospective use information regarding one or more electric vehicle aspects (e.g. receiving information regarding performance characteristics of the electric vehicle including electrical energy storage capacity, electrical energy demand for representative driving cycles, electrical energy charging throughput rate, etc.) including receiving electric vehicle aspect information regarding one or more maintenance schedules for the electric vehicle (e.g. receiving information regarding quality of maintenance performed to determine possible future unavailability or other performance issues regarding the electric vehicle including those that may affect reliability of charging the electric vehicle, etc.).

In one or more implementations, as shown in FIG. 9-I, the operation o1141 can include operation o1145 for receiving electric vehicle prospective use information regarding one or more electric vehicle aspects including receiving electric vehicle aspect information regarding fueling capacity of the electric vehicle as a hybrid electric vehicle. Origination of a physically tangible component group can be accomplished through skilled in the art design choice selection including use of one or more components and/or subsystems explicitly and/or implicitly referred to herein for at least in part implementing execution of one or more instructions operation o1145, for performance of the operation o1145 by an electrical circuitry arrangement as activated thereto, and/or otherwise fulfillment of the operation o1145. One or more non-transitory signal bearing physical media can bear the one or more instructions that when executed can direct performance of the operation o1145. Furthermore, receiving electric vehicle aspect information regarding fueling capacity of the electric vehicle as a hybrid electric vehicle module m1145 depicted in FIG. 5-E as being included in the module m1141, when executed and/or activated, can direct performance of and/or perform the operation o1145. Illustratively, in one or more implementations, the operation o1145 can be carried out, for example, by receiving electric vehicle prospective use information regarding one or more electric vehicle aspects (e.g. receiving information regarding performance characteristics of the electric vehicle including electrical energy storage capacity, electrical energy demand for representative driving cycles, electrical energy charging throughput rate, etc.) including receiving electric vehicle aspect information regarding fueling capacity of the electric vehicle as a hybrid electric vehicle (e.g. receiving information regarding range of the electric vehicle in a non-electric mode in relation to location of electric charging stations found along a desired route for the electric vehicle, etc.).

In one or more implementations, as shown in FIG. 9-I, the operation o1141 can include operation o1146 for receiving electric vehicle prospective use information regarding one or more electric vehicle aspects including receiving electric vehicle aspect information regarding specifications of another electric vehicle other than the electric vehicle, the another electric vehicle involved with plans to receive electric energy transfer from electrical equipment shared with the electric vehicle. Origination of a physically tangible component group can be accomplished through skilled in the art design choice selection including use of one or more components and/or subsystems explicitly and/or implicitly referred to herein for at least in part implementing execution of one or more instructions operation o1146, for performance of the operation o1146 by an electrical circuitry arrangement as activated thereto, and/or otherwise fulfillment of the operation o1146. One or more non-transitory signal bearing physical media can bear the one or more instructions that when executed can direct performance of the operation o1146. Furthermore, receiving electric vehicle aspect information regarding specifications of another electric vehicle other than the electric vehicle, the another electric vehicle involved with plans to receive electric energy transfer from electrical equipment shared with the electric vehicle module m1146 depicted in FIG. 5-E as being included in the module m1141, when executed and/or activated, can direct performance of and/or perform the operation o1146. Illustratively, in one or more implementations, the operation o1146 can be carried out, for example, by receiving electric vehicle prospective use information regarding one or more electric vehicle aspects (e.g. receiving information regarding performance characteristics of the electric vehicle including electrical energy storage capacity, electrical energy demand for representative driving cycles, electrical energy charging throughput rate, etc.) including receiving electric vehicle aspect information regarding specifications of another electric vehicle other than the electric vehicle, the another electric vehicle involved with plans to receive electric energy transfer from electrical equipment shared with the electric vehicle (e.g. receiving information regarding another electric vehicle such as length of time to charge the other electric vehicle to a certain capacity to determine availability of charging equipment for the electric vehicle, etc.).

In one or more implementations, as shown in FIG. 9-I, the operation o1141 can include operation o1147 for receiving electric vehicle prospective use information regarding one or more electric vehicle aspects including receiving electric vehicle aspect information regarding the electric vehicle as an all-electric vehicle. Origination of a physically tangible component group can be accomplished through skilled in the art design choice selection including use of one or more components and/or subsystems explicitly and/or implicitly referred to herein for at least in part implementing execution of one or more instructions operation o1147, for performance of the operation o1147 by an electrical circuitry arrangement as activated thereto, and/or otherwise fulfillment of the operation o1147. One or more non-transitory signal bearing physical media can bear the one or more instructions that when executed can direct performance of the operation o1147. Furthermore, receiving electric vehicle aspect information regarding the electric vehicle as an all-electric vehicle module m1147 depicted in FIG. 5-E as being included in the module m1141, when executed and/or activated, can direct performance of and/or perform the operation o1147. Illustratively, in one or more implementations, the operation o1147 can be carried out, for example, by receiving electric vehicle prospective use information regarding one or more electric vehicle aspects (e.g. receiving information regarding performance characteristics of the electric vehicle including electrical energy storage capacity, electrical energy demand for representative driving cycles, electrical energy charging throughput rate, etc.) including receiving electric vehicle aspect information regarding the electric vehicle as an all-electric vehicle (e.g. receiving information regarding charging capacity, length of time to charge, maximum distance available for a particular charge level and driving condition, etc.).

In one or more implementations, as shown in FIG. 9-J, the operation o1141 can include operation o1148 for receiving electric vehicle prospective use information regarding one or more electric vehicle aspects including receiving electric vehicle aspect information regarding the electric vehicle as a hybrid-electric vehicle. Origination of a physically tangible component group can be accomplished through skilled in the art design choice selection including use of one or more components and/or subsystems explicitly and/or implicitly referred to herein for at least in part implementing execution of one or more instructions operation o1148, for performance of the operation o1148 by an electrical circuitry arrangement as activated thereto, and/or otherwise fulfillment of the operation o1148. One or more non-transitory signal bearing physical media can bear the one or more instructions that when executed can direct performance of the operation o1148. Furthermore, receiving electric vehicle aspect information regarding the electric vehicle as a hybrid-electric vehicle module m1148 depicted in FIG. 5-E as being included in the module m1141, when executed and/or activated, can direct performance of and/or perform the operation o1148. Illustratively, in one or more implementations, the operation o1148 can be carried out, for example, by receiving electric vehicle prospective use information regarding one or more electric vehicle aspects (e.g. receiving information regarding performance characteristics of the electric vehicle including electrical energy storage capacity, electrical energy demand for representative driving cycles, electrical energy charging throughput rate, etc.) including receiving electric vehicle aspect information regarding the electric vehicle as a hybrid-electric vehicle (e.g. receiving information regarding maximum distance available for an amount of fuel available for the vehicle given particular driving characteristics, etc.).

In one or more implementations, as shown in FIG. 9-J, the operation o1141 can include operation o1149 for receiving electric vehicle prospective use information regarding one or more electric vehicle aspects including receiving electric vehicle aspect information regarding the electric vehicle including one or more electrical wireless electrical energy transfer receiving devices to receive electrical energy transfer through field magnetic resonance induction. Origination of a physically tangible component group can be accomplished through skilled in the art design choice selection including use of one or more components and/or subsystems explicitly and/or implicitly referred to herein for at least in part implementing execution of one or more instructions operation o1149, for performance of the operation o1149 by an electrical circuitry arrangement as activated thereto, and/or otherwise fulfillment of the operation o1149. One or more non-transitory signal bearing physical media can bear the one or more instructions that when executed can direct performance of the operation o1149. Furthermore, receiving electric vehicle aspect information regarding the electric vehicle including electrical wireless electrical energy transfer receiving devices to receive electrical energy transfer through field magnetic resonance induction module m1149 depicted in FIG. 5-E as being included in the module m1141, when executed and/or activated, can direct performance of and/or perform the operation o1149. Illustratively, in one or more implementations, the operation o1149 can be carried out, for example, by receiving electric vehicle prospective use information regarding one or more electric vehicle aspects (e.g. receiving information regarding performance characteristics of the electric vehicle including electrical energy storage capacity, electrical energy demand for representative driving cycles, electrical energy charging throughput rate, etc.) including receiving electric vehicle aspect information regarding the electric vehicle including one or more electrical wireless electrical energy transfer receiving devices to receive electrical energy transfer through field magnetic resonance induction (e.g. receiving information regarding planned electromagnetic frequency profiles to be used for wireless electrical energy transfer, etc.).

In one or more implementations, as shown in FIG. 9-J, the operation o1141 can include operation o1150 for receiving electric vehicle prospective use information regarding one or more electric vehicle aspects including receiving electric vehicle aspect information regarding the electric vehicle including one or more electrical wireless electrical energy transfer receiving devices to receive electrical energy transfer through highly resonant inductive wireless power transfer. Origination of a physically tangible component group can be accomplished through skilled in the art design choice selection including use of one or more components and/or subsystems explicitly and/or implicitly referred to herein for at least in part implementing execution of one or more instructions operation o1150, for performance of the operation o1150 by an electrical circuitry arrangement as activated thereto, and/or otherwise fulfillment of the operation o1150. One or more non-transitory signal bearing physical media can bear the one or more instructions that when executed can direct performance of the operation o1150. Furthermore, receiving electric vehicle aspect information regarding the electric vehicle including electrical wireless electrical energy transfer receiving devices to receive electrical energy transfer through highly resonant inductive wireless power transfer module m1150 depicted in FIG. 5-E as being included in the module m1141, when executed and/or activated, can direct performance of and/or perform the operation o1150. Illustratively, in one or more implementations, the operation o1150 can be carried out, for example, by receiving electric vehicle prospective use information regarding one or more electric vehicle aspects (e.g. receiving information regarding performance characteristics of the electric vehicle including electrical energy storage capacity, electrical energy demand for representative driving cycles, electrical energy charging throughput rate, etc.) including receiving electric vehicle aspect information regarding the electric vehicle including one or more electrical wireless electrical energy transfer receiving devices to receive electrical energy transfer through highly resonant inductive wireless power transfer (e.g. receiving information regarding electrical energy transfer rate and transfer scheduling for a planned wireless electrical energy transfer to the electric vehicle, etc.).

In one or more implementations, as shown in FIG. 9-J, the operation o1141 can include operation o1151 for receiving electric vehicle prospective use information regarding one or more electric vehicle aspects including receiving electric vehicle aspect information regarding the electric vehicle including one or more electrical wireless electrical energy transfer receiving devices to receive electrical energy transfer through wireless capacitive charging. Origination of a physically tangible component group can be accomplished through skilled in the art design choice selection including use of one or more components and/or subsystems explicitly and/or implicitly referred to herein for at least in part implementing execution of one or more instructions operation o1151, for performance of the operation o1151 by an electrical circuitry arrangement as activated thereto, and/or otherwise fulfillment of the operation o1151. One or more non-transitory signal bearing physical media can bear the one or more instructions that when executed can direct performance of the operation o1151. Furthermore, receiving electric vehicle aspect information regarding the electric vehicle including electrical wireless electrical energy transfer receiving devices to receive electrical energy transfer through wireless capacitive charging module m1151 depicted in FIG. 5-E as being included in the module m1141, when executed and/or activated, can direct performance of and/or perform the operation o1151. Illustratively, in one or more implementations, the operation o1151 can be carried out, for example, by receiving electric vehicle prospective use information regarding one or more electric vehicle aspects (e.g. receiving information regarding performance characteristics of the electric vehicle including electrical energy storage capacity, electrical energy demand for representative driving cycles, electrical energy charging throughput rate, etc.) including receiving electric vehicle aspect information regarding the electric vehicle including one or more electrical wireless electrical energy transfer receiving devices to receive electrical energy transfer through wireless capacitive charging (e.g. receiving information regarding electrical energy transfer rate and capacity of charging over a planned charging duration for wireless electrical energy transfer to the electric vehicle, etc.).

In one or more implementations, as shown in FIG. 9-J, the operation o1141 can include operation o1152 for receiving electric vehicle prospective use information regarding one or more electric vehicle aspects including receiving electric vehicle aspect information regarding the electric vehicle including one or more electrical energy storage devices. Origination of a physically tangible component group can be accomplished through skilled in the art design choice selection including use of one or more components and/or subsystems explicitly and/or implicitly referred to herein for at least in part implementing execution of one or more instructions operation o1152, for performance of the operation o1152 by an electrical circuitry arrangement as activated thereto, and/or otherwise fulfillment of the operation o1152. One or more non-transitory signal bearing physical media can bear the one or more instructions that when executed can direct performance of the operation o1152. Furthermore, receiving electric vehicle aspect information regarding the electric vehicle including electrical energy storage devices module m1152 depicted in FIG. 5-E as being included in the module m1141, when executed and/or activated, can direct performance of and/or perform the operation o1152. Illustratively, in one or more implementations, the operation o1152 can be carried out, for example, by receiving electric vehicle prospective use information regarding one or more electric vehicle aspects (e.g. receiving information regarding performance characteristics of the electric vehicle including electrical energy storage capacity, electrical energy demand for representative driving cycles, electrical energy charging throughput rate, etc.) including receiving electric vehicle aspect information regarding the electric vehicle including one or more electrical energy storage devices (e.g. receiving information regarding current total electrical energy capacity of electrical batteries onboard the electric vehicle currently capable of receiving wireless electrical energy, etc.).

In one or more implementations, as shown in FIG. 9-J, the operation o1152 can include operation o1153 for receiving electric vehicle aspect information regarding the electric vehicle including one or more electrical energy storage devices including receiving electric vehicle aspect information regarding the electric vehicle including the electrical energy storage devices as capacitive electrical energy storage devices. Origination of a physically tangible component group can be accomplished through skilled in the art design choice selection including use of one or more components and/or subsystems explicitly and/or implicitly referred to herein for at least in part implementing execution of one or more instructions operation o1153, for performance of the operation o1153 by an electrical circuitry arrangement as activated thereto, and/or otherwise fulfillment of the operation o1153. One or more non-transitory signal bearing physical media can bear the one or more instructions that when executed can direct performance of the operation o1153. Furthermore, receiving electric vehicle aspect information regarding the electric vehicle including the electrical energy storage devices as capacitive electrical energy storage devices module m1153 depicted in FIG. 5-E as being included in the module m1152, when executed and/or activated, can direct performance of and/or perform the operation o1153. Illustratively, in one or more implementations, the operation o1153 can be carried out, for example, by receiving electric vehicle aspect information regarding the electric vehicle including one or more electrical energy storage devices (e.g. receiving information regarding current total electrical energy capacity of electrical batteries onboard the electric vehicle currently capable of receiving wireless electrical energy, etc.) including receiving electric vehicle aspect information regarding the electric vehicle including the electrical energy storage devices as capacitive electrical energy storage devices (e.g. receiving information regarding charging rate for the capacitive electrical energy storage devices at their current level of electrical charge, etc.).

In one or more implementations, as shown in FIG. 9-K, the operation o1152 can include operation o1154 for receiving electric vehicle aspect information regarding the electric vehicle including one or more electrical energy storage devices including receiving electric vehicle aspect information regarding the electric vehicle including the electrical energy storage devices as lithium ion, lead acid, or nickel cadmium electrical energy storage devices. Origination of a physically tangible component group can be accomplished through skilled in the art design choice selection including use of one or more components and/or subsystems explicitly and/or implicitly referred to herein for at least in part implementing execution of one or more instructions operation o1154, for performance of the operation o1154 by an electrical circuitry arrangement as activated thereto, and/or otherwise fulfillment of the operation o1154. One or more non-transitory signal bearing physical media can bear the one or more instructions that when executed can direct performance of the operation o1154. Furthermore, receiving electric vehicle aspect information regarding the electric vehicle including the electrical energy storage devices as lithium ion, lead acid, or nickel cadmium electrical energy storage devices module m1154 depicted in FIG. 5-E as being included in the module m1152, when executed and/or activated, can direct performance of and/or perform the operation o1154. Illustratively, in one or more implementations, the operation o1154 can be carried out, for example, by receiving electric vehicle aspect information regarding the electric vehicle including one or more electrical energy storage devices (e.g. receiving information regarding current total electrical energy capacity of electrical batteries onboard the electric vehicle currently capable of receiving wireless electrical energy, etc.) including receiving electric vehicle aspect information regarding the electric vehicle including the electrical energy storage devices as lithium ion, lead acid, or nickel cadmium electrical energy storage devices (e.g. receiving information regarding age of storage devices, replacement plans for the storage devices including expiration dates, recall notices, upgrade plans, etc.).

In one or more implementations, as shown in FIG. 9-K, the operation o1152 can include operation o1155 for receiving electric vehicle aspect information regarding the electric vehicle including one or more electrical energy storage devices including receiving electric vehicle aspect information regarding the electric vehicle including storage life aspects of the electrical energy storage devices. Origination of a physically tangible component group can be accomplished through skilled in the art design choice selection including use of one or more components and/or subsystems explicitly and/or implicitly referred to herein for at least in part implementing execution of one or more instructions operation o1155, for performance of the operation o1155 by an electrical circuitry arrangement as activated thereto, and/or otherwise fulfillment of the operation o1155. One or more non-transitory signal bearing physical media can bear the one or more instructions that when executed can direct performance of the operation o1155. Furthermore, receiving electric vehicle aspect information regarding the electric vehicle including storage life aspects of the electrical energy storage devices module m1155 depicted in FIG. 5-F as being included in the module m1152, when executed and/or activated, can direct performance of and/or perform the operation o1155. Illustratively, in one or more implementations, the operation o1155 can be carried out, for example, by receiving electric vehicle aspect information regarding the electric vehicle including one or more electrical energy storage devices (e.g. receiving information regarding current total electrical energy capacity of electrical batteries onboard the electric vehicle currently capable of receiving wireless electrical energy, etc.) including receiving electric vehicle aspect information regarding the electric vehicle including storage life aspects of the electrical energy storage devices (e.g. receiving information regarding historical data for charging of the batteries onboard the electric vehicle to determine reliability and actual present energy capacity of the batteries, etc.).

In one or more implementations, as shown in FIG. 9-K, the operation o11 can include operation o1156 for electronically receiving electric vehicle prospective use information associated with aspects indicating one or more future travel plans involving prospective use of an electric vehicle, the electric vehicle including one or more electric motors to provide motive force to at least partially propel the electric vehicle during one or more portions of travel of the electric vehicle, the electric vehicle including one or more wireless electrical energy transfer receiving devices and one or more electrical energy storage devices including receiving electric vehicle prospective use information regarding one or more user preferences of location for energy transfer to the electric vehicle. Origination of a physically tangible component group can be accomplished through skilled in the art design choice selection including use of one or more components and/or subsystems explicitly and/or implicitly referred to herein for at least in part implementing execution of one or more instructions operation o1156, for performance of the operation o1156 by an electrical circuitry arrangement as activated thereto, and/or otherwise fulfillment of the operation o1156. One or more non-transitory signal bearing physical media can bear the one or more instructions that when executed can direct performance of the operation o1156. Furthermore, receiving electric vehicle prospective use information regarding user preferences of location for energy transfer to the electric vehicle module m1156 depicted in FIG. 5-F as being included in the module m11, when executed and/or activated, can direct performance of and/or perform the operation o1156. Illustratively, in one or more implementations, the operation o1156 can be carried out, for example, by electronically receiving (e.g. by wireless or wired through digitized, packetized or other electronic communication, etc.) electric vehicle (e.g. hybrid or full electric car, truck, cycle or other vehicle, etc.) prospective use information (e.g. tentative, scheduled, projected, estimated, determined, speculative or other regarding long or short term use as driver, passenger through ownership or leasing or borrowing, etc.) associated (e.g. directly or indirectly related, etc.) with aspects (e.g. calendaring, scheduling, topical, itemized, tangential, or other aspects, etc.) indicating (e.g. deductively or inductively signaling, alerting, suggesting, etc.) one or more future (e.g. immediate, advanced in future, etc.) travel plans (e.g. erratic, spontaneous, methodical, commuting, long distance, touring, vacation, errands, ad hoc, etc.) involving (e.g. implicitly or explicitly related, etc.) prospective use (e.g. possible, tentative, routine, etc.) of an electric vehicle (e.g. short range, long range car, truck, van, etc.), the electric vehicle including one or more electric motors (e.g. alternative current, direct current, all wheel propulsion, under hood mounting, inside wheel mounting, etc.) to provide motive force (e.g. partial or full motive force, etc.) to at least partially propel (e.g. intermediate, constant, or backup propulsion, etc.) the electric vehicle (e.g. hybrid or full electric, etc.) during one or more portions (e.g. city driving, acceleration, initial portion of trip, entire trip, etc.) of travel (e.g. road, rail, commute, touring, etc.) of the electric vehicle, the electric vehicle including one or more wireless electrical energy transfer receiving devices (e.g. field magnetic resonance, capacitive charging, etc.) and one or more electrical energy storage devices (e.g. lead acid, nickel cadmium, capacitive, etc.) including receiving electric vehicle prospective use information regarding one or more user preferences of location for energy transfer to the electric vehicle (e.g. receiving information regarding one or more locations that the one or more users historically charge the electric vehicle as to frequency of use of each location and any patterns of use for the one or more chargers at the locations, etc.).

In one or more implementations, as shown in FIG. 9-K, the operation o1156 can include operation o1157 for receiving electric vehicle prospective use information regarding one or more user preferences of location for energy transfer to the electric vehicle including one or more user preferences of location other than one or more home locations of one or more prospective occupants of the vehicle for electrical energy transfer to the electric vehicle. Origination of a physically tangible component group can be accomplished through skilled in the art design choice selection including use of one or more components and/or subsystems explicitly and/or implicitly referred to herein for at least in part implementing execution of one or more instructions operation o1157, for performance of the operation o1157 by an electrical circuitry arrangement as activated thereto, and/or otherwise fulfillment of the operation o1157. One or more non-transitory signal bearing physical media can bear the one or more instructions that when executed can direct performance of the operation o1157. Furthermore, user preferences of location other than home locations of prospective occupants of the vehicle for electrical energy transfer to the electric vehicle module m1157 depicted in FIG. 5-F as being included in the module m1156, when executed and/or activated, can direct performance of and/or perform the operation o1157. Illustratively, in one or more implementations, the operation o1157 can be carried out, for example, by receiving electric vehicle prospective use information regarding one or more user preferences of location for energy transfer to the electric vehicle (e.g. receiving information regarding one or more locations that the one or more users historically charge the electric vehicle as to frequency of use of each location and any patterns of use for the one or more chargers at the locations, etc.) including one or more user preferences of location other than one or more home locations of one or more prospective occupants of the vehicle for electrical energy transfer to the electric vehicle (e.g. receiving information regarding prioritized location information for charging the electric vehicle by the one or more users as associated with planned future use of the electric vehicle, etc.).

In one or more implementations, as shown in FIG. 9-L, the operation o1156 can include operation o1158 for receiving electric vehicle prospective use information regarding one or more user preferences of location for energy transfer to the electric vehicle including one or more user preferences of location for electrical energy transfer to the electric vehicle at one or more locations of vocational employ of one or more prospective occupants of the electric vehicle. Origination of a physically tangible component group can be accomplished through skilled in the art design choice selection including use of one or more components and/or subsystems explicitly and/or implicitly referred to herein for at least in part implementing execution of one or more instructions operation o1158, for performance of the operation o1158 by an electrical circuitry arrangement as activated thereto, and/or otherwise fulfillment of the operation o1158. One or more non-transitory signal bearing physical media can bear the one or more instructions that when executed can direct performance of the operation o1158. Furthermore, user preferences of location for electrical energy transfer to the electric vehicle at locations of vocational employ of prospective occupants of the electric vehicle module m1158 depicted in FIG. 5-F as being included in the module m1156, when executed and/or activated, can direct performance of and/or perform the operation o1158. Illustratively, in one or more implementations, the operation o1158 can be carried out, for example, by receiving electric vehicle prospective use information regarding one or more user preferences of location for energy transfer to the electric vehicle (e.g. receiving information regarding one or more locations that the one or more users historically charge the electric vehicle as to frequency of use of each location and any patterns of use for the one or more chargers at the locations, etc.) including one or more user preferences of location for electrical energy transfer to the electric vehicle at one or more locations of vocational employ of one or more prospective occupants of the electric vehicle (e.g. receiving information regarding employment locations for charging of the electric vehicle such as degree of availability of charging stations, quality of equipment, capacity of equipment, any payment or reimbursement issues with particular charging locations associated with place of employ, etc.).

In one or more implementations, as shown in FIG. 9-L, the operation o1156 can include operation o1159 for receiving electric vehicle prospective use information regarding one or more user preferences of location for energy transfer to the electric vehicle including one or more user preferences of location for electrical energy transfer to the electric vehicle at one or more locations on one or more prospective routes of travel of the electric vehicle. Origination of a physically tangible component group can be accomplished through skilled in the art design choice selection including use of one or more components and/or subsystems explicitly and/or implicitly referred to herein for at least in part implementing execution of one or more instructions operation o1159, for performance of the operation o1159 by an electrical circuitry arrangement as activated thereto, and/or otherwise fulfillment of the operation o1159. One or more non-transitory signal bearing physical media can bear the one or more instructions that when executed can direct performance of the operation o1159. Furthermore, user preferences of location for electrical energy transfer to the electric vehicle at locations on prospective routes of travel of the electric vehicle module m1159 depicted in FIG. 5-F as being included in the module m1156, when executed and/or activated, can direct performance of and/or perform the operation o1159. Illustratively, in one or more implementations, the operation o1159 can be carried out, for example, by receiving electric vehicle prospective use information regarding one or more user preferences of location for energy transfer to the electric vehicle (e.g. receiving information regarding one or more locations that the one or more users historically charge the electric vehicle as to frequency of use of each location and any patterns of use for the one or more chargers at the locations, etc.) including one or more user preferences of location for electrical energy transfer to the electric vehicle at one or more locations on one or more prospective routes of travel of the electric vehicle (e.g. receiving information regarding charging stations for the electric vehicle in terms of integration of particular charging stations with itinerary of planned or otherwise future travel of the electric vehicle regarding timing associated itinerary, scheduling of other electric vehicle using charging stations, ability of charging station to accommodate charging of the electric vehicle involved with the anticipated itinerary, etc.).

In one or more implementations, as shown in FIG. 9-L, the operation o1156 can include operation o1160 for receiving electric vehicle prospective use information regarding one or more user preferences of location for energy transfer to the electric vehicle including one or more user preferences of location for electrical energy transfer to the electric vehicle at one or more garage locations for housing the electric vehicle. Origination of a physically tangible component group can be accomplished through skilled in the art design choice selection including use of one or more components and/or subsystems explicitly and/or implicitly referred to herein for at least in part implementing execution of one or more instructions operation o1160, for performance of the operation o1160 by an electrical circuitry arrangement as activated thereto, and/or otherwise fulfillment of the operation o1160. One or more non-transitory signal bearing physical media can bear the one or more instructions that when executed can direct performance of the operation o1160. Furthermore, user preferences of location for electrical energy transfer to the electric vehicle at garage locations for housing the electric vehicle module m1160 depicted in FIG. 5-F as being included in the module m1156, when executed and/or activated, can direct performance of and/or perform the operation o1160. Illustratively, in one or more implementations, the operation o1160 can be carried out, for example, by receiving electric vehicle prospective use information regarding one or more user preferences of location for energy transfer to the electric vehicle (e.g. receiving information regarding one or more locations that the one or more users historically charge the electric vehicle as to frequency of use of each location and any patterns of use for the one or more chargers at the locations, etc.) including one or more user preferences of location for electrical energy transfer to the electric vehicle at one or more garage locations for housing the electric vehicle (e.g. receiving information regarding frequency, duration, capacity, scheduling, conflicts with other electric vehicles as to historical or anticipated use of the one or more charging stations suited for the electric vehicle at the garage locations that can house the electric vehicle, etc.).

In one or more implementations, as shown in FIG. 9-L, the operation o1156 can include operation o1161 for receiving electric vehicle prospective use information regarding one or more user preferences of location for energy transfer to the electric vehicle including one or more user preferences of location for electrical energy transfer to the electric vehicle at one or more park and ride locations for parking the electric vehicle. Origination of a physically tangible component group can be accomplished through skilled in the art design choice selection including use of one or more components and/or subsystems explicitly and/or implicitly referred to herein for at least in part implementing execution of one or more instructions operation o1161, for performance of the operation o1161 by an electrical circuitry arrangement as activated thereto, and/or otherwise fulfillment of the operation o1161. One or more non-transitory signal bearing physical media can bear the one or more instructions that when executed can direct performance of the operation o1161. Furthermore, user preferences of location for electrical energy transfer to the electric vehicle at park and ride locations for parking the electric vehicle module m1161 depicted in FIG. 5-F as being included in the module m1156, when executed and/or activated, can direct performance of and/or perform the operation o1161. Illustratively, in one or more implementations, the operation o1161 can be carried out, for example, by receiving electric vehicle prospective use information regarding one or more user preferences of location for energy transfer to the electric vehicle (e.g. receiving information regarding one or more locations that the one or more users historically charge the electric vehicle as to frequency of use of each location and any patterns of use for the one or more chargers at the locations, etc.) including one or more user preferences of location for electrical energy transfer to the electric vehicle at one or more park and ride locations for parking the electric vehicle (e.g. receiving information regarding percentage of vehicle charge is satisfactory to be accomplished at any particular location, amount of time desired as buffer to accommodate changes in scheduling or unanticipated events in schedule for each parking location, etc.).

In one or more implementations, as shown in FIG. 9-L, the operation o1156 can include operation o1162 for receiving electric vehicle prospective use information regarding one or more user preferences of location for energy transfer to the electric vehicle including one or more user preferences of location for electrical energy transfer to the electric vehicle at one or more parking lot locations for parking the electric vehicle. Origination of a physically tangible component group can be accomplished through skilled in the art design choice selection including use of one or more components and/or subsystems explicitly and/or implicitly referred to herein for at least in part implementing execution of one or more instructions operation o1162, for performance of the operation o1162 by an electrical circuitry arrangement as activated thereto, and/or otherwise fulfillment of the operation o1162. One or more non-transitory signal bearing physical media can bear the one or more instructions that when executed can direct performance of the operation o1162. Furthermore, user preferences of location for electrical energy transfer to the electric vehicle at parking lot locations for parking the electric vehicle module m1162 depicted in FIG. 5-F as being included in the module m1156, when executed and/or activated, can direct performance of and/or perform the operation o1162. Illustratively, in one or more implementations, the operation o1162 can be carried out, for example, by receiving electric vehicle prospective use information regarding one or more user preferences of location for energy transfer to the electric vehicle (e.g. receiving information regarding one or more locations that the one or more users historically charge the electric vehicle as to frequency of use of each location and any patterns of use for the one or more chargers at the locations, etc.) including one or more user preferences of location for electrical energy transfer to the electric vehicle at one or more parking lot locations for parking the electric vehicle (e.g. receiving information regarding access to one or more electrical charging stations located at the one or more parking locations in association with planned or otherwise potential use of the electric vehicle of the charging stations including availability and potential conflicting issues such as crowding of the parking lots and compatibility of charging equipment found in the parking lots found with the electric vehicle, etc.).

In one or more implementations, as shown in FIG. 9-M, the operation o1156 can include operation o1163 for receiving electric vehicle prospective use information regarding one or more user preferences of location for energy transfer to the electric vehicle including one or more user preferences of location for electrical energy transfer to the electric vehicle at one or more parking garage locations for parking the electric vehicle. Origination of a physically tangible component group can be accomplished through skilled in the art design choice selection including use of one or more components and/or subsystems explicitly and/or implicitly referred to herein for at least in part implementing execution of one or more instructions operation o1163, for performance of the operation o1163 by an electrical circuitry arrangement as activated thereto, and/or otherwise fulfillment of the operation o1163. One or more non-transitory signal bearing physical media can bear the one or more instructions that when executed can direct performance of the operation o1163. Furthermore, user preferences of location for electrical energy transfer to the electric vehicle at parking garage locations for parking the electric vehicle module m1163 depicted in FIG. 5-G as being included in the module m1156, when executed and/or activated, can direct performance of and/or perform the operation o1163. Illustratively, in one or more implementations, the operation o1163 can be carried out, for example, by receiving electric vehicle prospective use information regarding one or more user preferences of location for energy transfer to the electric vehicle (e.g. receiving information regarding one or more locations that the one or more users historically charge the electric vehicle as to frequency of use of each location and any patterns of use for the one or more chargers at the locations, etc.) including one or more user preferences of location for electrical energy transfer to the electric vehicle at one or more parking garage locations for parking the electric vehicle (e.g. receiving information including type of vehicle repair performed at the garage locations associated with impact to accessibility and otherwise use of the charging stations found at the garage locations, etc.).

In one or more implementations, as shown in FIG. 9-M, the operation o1156 can include operation o1164 for receiving electric vehicle prospective use information regarding one or more user preferences of location for energy transfer to the electric vehicle including one or more user preferences of location for non-electrical energy transfer to the electric vehicle as a hybrid-electric vehicle at one or more re-fueling station locations. Origination of a physically tangible component group can be accomplished through skilled in the art design choice selection including use of one or more components and/or subsystems explicitly and/or implicitly referred to herein for at least in part implementing execution of one or more instructions operation o1164, for performance of the operation o1164 by an electrical circuitry arrangement as activated thereto, and/or otherwise fulfillment of the operation o1164. One or more non-transitory signal bearing physical media can bear the one or more instructions that when executed can direct performance of the operation o1164. Furthermore, user preferences of location for non-electrical energy transfer to the electric vehicle as a hybrid-electric vehicle at re-fueling station locations module m1164 depicted in FIG. 5-G as being included in the module m1156, when executed and/or activated, can direct performance of and/or perform the operation o1164. Illustratively, in one or more implementations, the operation o1164 can be carried out, for example, by receiving electric vehicle prospective use information regarding one or more user preferences of location for energy transfer to the electric vehicle (e.g. receiving information regarding one or more locations that the one or more users historically charge the electric vehicle as to frequency of use of each location and any patterns of use for the one or more chargers at the locations, etc.) including one or more user preferences of location for non-electrical energy transfer to the electric vehicle as a hybrid-electric vehicle at one or more re-fueling station locations (e.g. receiving information regarding liquid fueling stations, gaseous fueling stations, chemical fueling stations, mechanical energy fuel stations, carbon-based fueling stations, or other non-electrical based energy imparting stations regarding hours of operation, types of equipment used, historical or estimated future demand of other electric vehicles or other types of vehicles upon the equipment, etc.).

In one or more implementations, as shown in FIG. 9-M, the operation o1156 can include operation o1165 for receiving electric vehicle prospective use information regarding one or more user preferences of location for energy transfer to the electric vehicle including one or more user preferences of location for electrical energy transfer to the electric vehicle at one or more static charging locations along one or more routes of travel of the electric vehicle. Origination of a physically tangible component group can be accomplished through skilled in the art design choice selection including use of one or more components and/or subsystems explicitly and/or implicitly referred to herein for at least in part implementing execution of one or more instructions operation o1165, for performance of the operation o1165 by an electrical circuitry arrangement as activated thereto, and/or otherwise fulfillment of the operation o1165. One or more non-transitory signal bearing physical media can bear the one or more instructions that when executed can direct performance of the operation o1165. Furthermore, user preferences of location for electrical energy transfer to the electric vehicle at static charging locations along routes of travel of the electric vehicle module m1165 depicted in FIG. 5-G as being included in the module m1156, when executed and/or activated, can direct performance of and/or perform the operation o1165. Illustratively, in one or more implementations, the operation o1165 can be carried out, for example, by receiving electric vehicle prospective use information regarding one or more user preferences of location for energy transfer to the electric vehicle (e.g. receiving information regarding one or more locations that the one or more users historically charge the electric vehicle as to frequency of use of each location and any patterns of use for the one or more chargers at the locations, etc.) including one or more user preferences of location for electrical energy transfer to the electric vehicle at one or more static charging locations along one or more routes of travel of the electric vehicle (e.g. receiving information regarding location, charging rates, or equipment compatibility regarding charging stations located at traffic signals, locations of heavy traffic congestion, locations where vehicles wait temporarily for relatively brief periods or other locations where electric vehicle charging stations are located to provide intermittent charging along a route of travel for relatively short periods of time such as for less than a minute to a few minutes or tens of minutes, etc.).

In one or more implementations, as shown in FIG. 9-M, the operation o1156 can include operation o1166 for receiving electric vehicle prospective use information regarding one or more user preferences of location for energy transfer to the electric vehicle including one or more user preferences of location for electrical energy transfer to the electric vehicle based on historical or predicted availability of one or more electrical energy transfer stations provided by an organization employing one or more prospective occupants of the electric vehicle. Origination of a physically tangible component group can be accomplished through skilled in the art design choice selection including use of one or more components and/or subsystems explicitly and/or implicitly referred to herein for at least in part implementing execution of one or more instructions operation o1166, for performance of the operation o1166 by an electrical circuitry arrangement as activated thereto, and/or otherwise fulfillment of the operation o1166. One or more non-transitory signal bearing physical media can bear the one or more instructions that when executed can direct performance of the operation o1166. Furthermore, user preferences of location for electrical energy transfer to the electric vehicle based on historical or predicted availability of electrical energy transfer stations provided by an organization employing prospective occupants of the electric vehicle module m1166 depicted in FIG. 5-G as being included in the module m1156, when executed and/or activated, can direct performance of and/or perform the operation o1166. Illustratively, in one or more implementations, the operation o1166 can be carried out, for example, by receiving electric vehicle prospective use information regarding one or more user preferences of location for energy transfer to the electric vehicle (e.g. receiving information regarding one or more locations that the one or more users historically charge the electric vehicle as to frequency of use of each location and any patterns of use for the one or more chargers at the locations, etc.) including one or more user preferences of location for electrical energy transfer to the electric vehicle based on historical or predicted availability of one or more electrical energy transfer stations provided by an organization employing one or more prospective occupants of the electric vehicle (e.g. receiving information regarding capacity, availability, equipment type of electric vehicle charging stations that are potentially available for charging of the electric vehicle for short or long duration charging dependent upon how drivers or passengers of vehicle are associated with each other in use of the electric vehicle such as whether the electric vehicle is shared concurrently or serially, etc.).

In one or more implementations, as shown in FIG. 9-M, the operation o1156 can include operation o1167 for receiving electric vehicle prospective use information regarding one or more user preferences of location for energy transfer to the electric vehicle including one or more user preferences of location for electrical energy transfer to the electric vehicle at one or more locations for mechanical maintenance of the electric vehicle. Origination of a physically tangible component group can be accomplished through skilled in the art design choice selection including use of one or more components and/or subsystems explicitly and/or implicitly referred to herein for at least in part implementing execution of one or more instructions operation o1167, for performance of the operation o1167 by an electrical circuitry arrangement as activated thereto, and/or otherwise fulfillment of the operation o1167. One or more non-transitory signal bearing physical media can bear the one or more instructions that when executed can direct performance of the operation o1167. Furthermore, user preferences of location for electrical energy transfer to the electric vehicle at locations for mechanical maintenance of the electric vehicle module m1167 depicted in FIG. 5-G as being included in the module m1156, when executed and/or activated, can direct performance of and/or perform the operation o1167. Illustratively, in one or more implementations, the operation o1167 can be carried out, for example, by receiving electric vehicle prospective use information regarding one or more user preferences of location for energy transfer to the electric vehicle (e.g. receiving information regarding one or more locations that the one or more users historically charge the electric vehicle as to frequency of use of each location and any patterns of use for the one or more chargers at the locations, etc.) including one or more user preferences of location for electrical energy transfer to the electric vehicle at one or more locations for mechanical maintenance of the electric vehicle (e.g. amount of time to factor into delays in repairs or unexpected events regarding the repairs to allow for additional charging, etc.).

In one or more implementations, as shown in FIG. 9-N, the operation o1156 can include operation o1168 for receiving electric vehicle prospective use information regarding one or more user preferences of location for energy transfer to the electric vehicle including preferences for one or more fuels used to re-fuel the electric vehicle as a hybrid electric vehicle. Origination of a physically tangible component group can be accomplished through skilled in the art design choice selection including use of one or more components and/or subsystems explicitly and/or implicitly referred to herein for at least in part implementing execution of one or more instructions operation o1168, for performance of the operation o1168 by an electrical circuitry arrangement as activated thereto, and/or otherwise fulfillment of the operation o1168. One or more non-transitory signal bearing physical media can bear the one or more instructions that when executed can direct performance of the operation o1168. Furthermore, preferences for fuels used to re-fuel the electric vehicle as a hybrid electric vehicle module m1168 depicted in FIG. 5-G as being included in the module m1156, when executed and/or activated, can direct performance of and/or perform the operation o1168. Illustratively, in one or more implementations, the operation o1168 can be carried out, for example, by receiving electric vehicle prospective use information regarding one or more user preferences of location for energy transfer to the electric vehicle (e.g. receiving information regarding one or more locations that the one or more users historically charge the electric vehicle as to frequency of use of each location and any patterns of use for the one or more chargers at the locations, etc.) including preferences for one or more fuels used to re-fuel the electric vehicle as a hybrid electric vehicle (e.g. receiving information regarding price, quality, additional ingredients such as cleansing agents, acceptable contaminant levels or other parameters regarding the fuels, etc.).

In one or more implementations, as shown in FIG. 9-N, the operation o1156 can include operation o1169 for receiving electric vehicle prospective use information regarding one or more user preferences of location for energy transfer to the electric vehicle including preferences for contingency plans for unplanned unavailability to the electric vehicle of one or more electrical energy transfer stations. Origination of a physically tangible component group can be accomplished through skilled in the art design choice selection including use of one or more components and/or subsystems explicitly and/or implicitly referred to herein for at least in part implementing execution of one or more instructions operation o1169, for performance of the operation o1169 by an electrical circuitry arrangement as activated thereto, and/or otherwise fulfillment of the operation o1169. One or more non-transitory signal bearing physical media can bear the one or more instructions that when executed can direct performance of the operation o1169. Furthermore, preferences for contingency plans for unplanned unavailability to the electric vehicle of electrical energy transfer stations module m1169 depicted in FIG. 5-G as being included in the module m1156, when executed and/or activated, can direct performance of and/or perform the operation o1169. Illustratively, in one or more implementations, the operation o1169 can be carried out, for example, by receiving electric vehicle prospective use information regarding one or more user preferences of location for energy transfer to the electric vehicle (e.g. receiving information regarding one or more locations that the one or more users historically charge the electric vehicle as to frequency of use of each location and any patterns of use for the one or more chargers at the locations, etc.) including preferences for contingency plans for unplanned unavailability to the electric vehicle of one or more electrical energy transfer stations (e.g. receiving information regarding alternative routes that can be taken, additional time available by the electric vehicle user for travel, other modes of transportation available to the electric vehicle user, etc.).

In one or more implementations, as shown in FIG. 9-N, the operation o11 can include operation o1170 for electronically receiving electric vehicle prospective use information associated with aspects indicating one or more future travel plans involving prospective use of an electric vehicle, the electric vehicle including one or more electric motors to provide motive force to at least partially propel the electric vehicle during one or more portions of travel of the electric vehicle, the electric vehicle including one or more wireless electrical energy transfer receiving devices and one or more electrical energy storage devices including receiving electric vehicle prospective use information regarding one or more uses of the electric vehicle. Origination of a physically tangible component group can be accomplished through skilled in the art design choice selection including use of one or more components and/or subsystems explicitly and/or implicitly referred to herein for at least in part implementing execution of one or more instructions operation o1170, for performance of the operation o1170 by an electrical circuitry arrangement as activated thereto, and/or otherwise fulfillment of the operation o1170. One or more non-transitory signal bearing physical media can bear the one or more instructions that when executed can direct performance of the operation o1170. Furthermore, receiving electric vehicle prospective use information regarding uses of the electric vehicle module m1170 depicted in FIG. 5-G as being included in the module m11, when executed and/or activated, can direct performance of and/or perform the operation o1170. Illustratively, in one or more implementations, the operation o1170 can be carried out, for example, by electronically receiving (e.g. by wireless or wired through digitized, packetized or other electronic communication, etc.) electric vehicle (e.g. hybrid or full electric car, truck, cycle or other vehicle, etc.) prospective use information (e.g. tentative, scheduled, projected, estimated, determined, speculative or other regarding long or short term use as driver, passenger through ownership or leasing or borrowing, etc.) associated (e.g. directly or indirectly related, etc.) with aspects (e.g. calendaring, scheduling, topical, itemized, tangential, or other aspects, etc.) indicating (e.g. deductively or inductively signaling, alerting, suggesting, etc.) one or more future (e.g. immediate, advanced in future, etc.) travel plans (e.g. erratic, spontaneous, methodical, commuting, long distance, touring, vacation, errands, ad hoc, etc.) involving (e.g. implicitly or explicitly related, etc.) prospective use (e.g. possible, tentative, routine, etc.) of an electric vehicle (e.g. short range, long range car, truck, van, etc.), the electric vehicle including one or more electric motors (e.g. alternative current, direct current, all wheel propulsion, under hood mounting, inside wheel mounting, etc.) to provide motive force (e.g. partial or full motive force, etc.) to at least partially propel (e.g. intermediate, constant, or backup propulsion, etc.) the electric vehicle (e.g. hybrid or full electric, etc.) during one or more portions (e.g. city driving, acceleration, initial portion of trip, entire trip, etc.) of travel (e.g. road, rail, commute, touring, etc.) of the electric vehicle, the electric vehicle including one or more wireless electrical energy transfer receiving devices (e.g. field magnetic resonance, capacitive charging, etc.) and one or more electrical energy storage devices (e.g. lead acid, nickel cadmium, capacitive, etc.) including receiving electric vehicle prospective use information regarding one or more uses of the electric vehicle (e.g. receiving information regarding potential for sharing of the electric vehicle among one or more groups of electric vehicle owners, economic status of the electric vehicle owner, health or contagion condition of the electric vehicle users, physical accessibility or disability issues of the electric vehicle users, etc.).

In one or more implementations, as shown in FIG. 9-N, the operation o1170 can include operation o1171 for receiving electric vehicle prospective use information regarding one or more uses of the electric vehicle including receiving terrain or traffic information regarding routes of travel for the electric vehicle. Origination of a physically tangible component group can be accomplished through skilled in the art design choice selection including use of one or more components and/or subsystems explicitly and/or implicitly referred to herein for at least in part implementing execution of one or more instructions operation o1171, for performance of the operation o1171 by an electrical circuitry arrangement as activated thereto, and/or otherwise fulfillment of the operation o1171. One or more non-transitory signal bearing physical media can bear the one or more instructions that when executed can direct performance of the operation o1171. Furthermore, receiving terrain or traffic information regarding routes of travel for the electric vehicle module m1171 depicted in FIG. 5-G as being included in the module m1170, when executed and/or activated, can direct performance of and/or perform the operation o1171. Illustratively, in one or more implementations, the operation o1171 can be carried out, for example, by receiving electric vehicle prospective use information regarding one or more uses of the electric vehicle (e.g. receiving information regarding potential for sharing of the electric vehicle among one or more groups of electric vehicle owners, economic status of the electric vehicle owner, health or contagion condition of the electric vehicle users, physical accessibility or disability issues of the electric vehicle users, etc.) including receiving terrain or traffic information regarding routes of travel for the electric vehicle (e.g. receiving information regarding anticipated or unannounced changes in road conditions, traffic delays, accident reports, detours or re-routing of traffic, weather influenced delays, etc.).

In one or more implementations, as shown in FIG. 9-N, the operation o1170 can include operation o1172 for receiving electric vehicle prospective use information regarding one or more uses of the electric vehicle including receiving commuter routing information for the electric vehicle. Origination of a physically tangible component group can be accomplished through skilled in the art design choice selection including use of one or more components and/or subsystems explicitly and/or implicitly referred to herein for at least in part implementing execution of one or more instructions operation o1172, for performance of the operation o1172 by an electrical circuitry arrangement as activated thereto, and/or otherwise fulfillment of the operation o1172. One or more non-transitory signal bearing physical media can bear the one or more instructions that when executed can direct performance of the operation o1172. Furthermore, receiving commuter routing information for the electric vehicle module m1172 depicted in FIG. 5-G as being included in the module m1170, when executed and/or activated, can direct performance of and/or perform the operation o1172. Illustratively, in one or more implementations, the operation o1172 can be carried out, for example, by receiving electric vehicle prospective use information regarding one or more uses of the electric vehicle (e.g. receiving information regarding potential for sharing of the electric vehicle among one or more groups of electric vehicle owners, economic status of the electric vehicle owner, health or contagion condition of the electric vehicle users, physical accessibility or disability issues of the electric vehicle users, etc.) including receiving commuter routing information for the electric vehicle (e.g. receiving information regarding traffic congestion, road work issues, weather issues, vehicle accident issues and other issues associated with the planned or estimated routes for commuter use of the electric vehicle, etc.).

In one or more implementations, as shown in FIG. 9-N, the operation o1170 can include operation o1173 for receiving electric vehicle prospective use information regarding one or more uses of the electric vehicle including receiving trip advisory information regarding routes of travel for the electric vehicle. Origination of a physically tangible component group can be accomplished through skilled in the art design choice selection including use of one or more components and/or subsystems explicitly and/or implicitly referred to herein for at least in part implementing execution of one or more instructions operation o1173, for performance of the operation o1173 by an electrical circuitry arrangement as activated thereto, and/or otherwise fulfillment of the operation o1173. One or more non-transitory signal bearing physical media can bear the one or more instructions that when executed can direct performance of the operation o1173. Furthermore, receiving trip advisory information regarding routes of travel for the electric vehicle module m1173 depicted in FIG. 5-H as being included in the module m1170, when executed and/or activated, can direct performance of and/or perform the operation o1173. Illustratively, in one or more implementations, the operation o1173 can be carried out, for example, by receiving electric vehicle prospective use information regarding one or more uses of the electric vehicle (e.g. receiving information regarding potential for sharing of the electric vehicle among one or more groups of electric vehicle owners, economic status of the electric vehicle owner, health or contagion condition of the electric vehicle users, physical accessibility or disability issues of the electric vehicle users, etc.) including receiving trip advisory information regarding routes of travel for the electric vehicle (e.g. receiving information regarding sight-seeing, shopping, restaurant, etc. potential availability of the routes involved as associated with delays due to charging requirements, etc.).

In one or more implementations, as shown in FIG. 9-0, the operation o1170 can include operation o1174 for receiving electric vehicle prospective use information regarding one or more uses of the electric vehicle including receiving information regarding alternative modes of transportation along one or more routes travel for the electric vehicle. Origination of a physically tangible component group can be accomplished through skilled in the art design choice selection including use of one or more components and/or subsystems explicitly and/or implicitly referred to herein for at least in part implementing execution of one or more instructions operation o1174, for performance of the operation o1174 by an electrical circuitry arrangement as activated thereto, and/or otherwise fulfillment of the operation o1174. One or more non-transitory signal bearing physical media can bear the one or more instructions that when executed can direct performance of the operation o1174. Furthermore, receiving information regarding alternative modes of transportation along routes travel for the electric vehicle module m1174 depicted in FIG. 5-H as being included in the module m1170, when executed and/or activated, can direct performance of and/or perform the operation o1174. Illustratively, in one or more implementations, the operation o1174 can be carried out, for example, by receiving electric vehicle prospective use information regarding one or more uses of the electric vehicle (e.g. receiving information regarding potential for sharing of the electric vehicle among one or more groups of electric vehicle owners, economic status of the electric vehicle owner, health or contagion condition of the electric vehicle users, physical accessibility or disability issues of the electric vehicle users, etc.) including receiving information regarding alternative modes of transportation along one or more routes travel for the electric vehicle (e.g. receiving information regarding taxi, public transportation, rail, ride-share, etc. associated with planned or estimated travel routes of the electric vehicle, etc.).

In one or more implementations, as shown in FIG. 9-0, the operation o1170 can include operation o1175 for receiving electric vehicle prospective use information regarding one or more uses of the electric vehicle including receiving information regarding one or more periods in which the electric vehicle will be unavailable for use. Origination of a physically tangible component group can be accomplished through skilled in the art design choice selection including use of one or more components and/or subsystems explicitly and/or implicitly referred to herein for at least in part implementing execution of one or more instructions operation o1175, for performance of the operation o1175 by an electrical circuitry arrangement as activated thereto, and/or otherwise fulfillment of the operation o1175. One or more non-transitory signal bearing physical media can bear the one or more instructions that when executed can direct performance of the operation o1175. Furthermore, receiving information regarding periods in which the electric vehicle will be unavailable for use module m1175 depicted in FIG. 5-H as being included in the module m1170, when executed and/or activated, can direct performance of and/or perform the operation o1175. Illustratively, in one or more implementations, the operation o1175 can be carried out, for example, by receiving electric vehicle prospective use information regarding one or more uses of the electric vehicle (e.g. receiving information regarding potential for sharing of the electric vehicle among one or more groups of electric vehicle owners, economic status of the electric vehicle owner, health or contagion condition of the electric vehicle users, physical accessibility or disability issues of the electric vehicle users, etc.) including receiving information regarding one or more periods in which the electric vehicle will be unavailable for use (e.g. receiving information as to reserved wait times, maintenance scheduling, use by others, planned or estimated charging times, for the electric vehicle, etc.).

In one or more implementations, as shown in FIG. 9-0, the operation o1170 can include operation o1176 for receiving electric vehicle prospective use information regarding one or more uses of the electric vehicle including receiving information regarding planned errands to be run by one or more users of the electric vehicle. Origination of a physically tangible component group can be accomplished through skilled in the art design choice selection including use of one or more components and/or subsystems explicitly and/or implicitly referred to herein for at least in part implementing execution of one or more instructions operation o1176, for performance of the operation o1176 by an electrical circuitry arrangement as activated thereto, and/or otherwise fulfillment of the operation o1176. One or more non-transitory signal bearing physical media can bear the one or more instructions that when executed can direct performance of the operation o1176. Furthermore, receiving information regarding planned errands to be run by users of the electric vehicle module m1176 depicted in FIG. 5-H as being included in the module m1170, when executed and/or activated, can direct performance of and/or perform the operation o1176. Illustratively, in one or more implementations, the operation o1176 can be carried out, for example, by receiving electric vehicle prospective use information regarding one or more uses of the electric vehicle (e.g. receiving information regarding potential for sharing of the electric vehicle among one or more groups of electric vehicle owners, economic status of the electric vehicle owner, health or contagion condition of the electric vehicle users, physical accessibility or disability issues of the electric vehicle users, etc.) including receiving information regarding planned errands to be run by one or more users of the electric vehicle (e.g. receiving information regarding store hours, office hours, traffic congestion issues, service provider availability, shopping lists, shopping ordering information associated with planned or estimated itinerary of use of the electric vehicle, etc.).

In one or more implementations, as shown in FIG. 9-0, the operation o1170 can include operation o1177 for receiving electric vehicle prospective use information regarding one or more uses of the electric vehicle including receiving information regarding one or more commercial delivery schedules utilizing the electric vehicle. Origination of a physically tangible component group can be accomplished through skilled in the art design choice selection including use of one or more components and/or subsystems explicitly and/or implicitly referred to herein for at least in part implementing execution of one or more instructions operation o1177, for performance of the operation o1177 by an electrical circuitry arrangement as activated thereto, and/or otherwise fulfillment of the operation o1177. One or more non-transitory signal bearing physical media can bear the one or more instructions that when executed can direct performance of the operation o1177. Furthermore, receiving information regarding commercial delivery schedules utilizing the electric vehicle module m1177 depicted in FIG. 5-H as being included in the module m1170, when executed and/or activated, can direct performance of and/or perform the operation o1177. Illustratively, in one or more implementations, the operation o1177 can be carried out, for example, by receiving electric vehicle prospective use information regarding one or more uses of the electric vehicle (e.g. receiving information regarding potential for sharing of the electric vehicle among one or more groups of electric vehicle owners, economic status of the electric vehicle owner, health or contagion condition of the electric vehicle users, physical accessibility or disability issues of the electric vehicle users, etc.) including receiving information regarding one or more commercial delivery schedules utilizing the electric vehicle (e.g. receiving information regarding planned or estimated routes for delivery, prioritization of various deliveries along the routes, any breaks allowed the driver along the route, one or more driving history or other factors involved with the planned electric vehicle drivers along the route, etc.).

In one or more implementations, as shown in FIG. 9-0, the operation o1170 can include operation o1178 for receiving electric vehicle prospective use information regarding one or more uses of the electric vehicle including receiving information regarding one or more courier service use for the electric vehicle. Origination of a physically tangible component group can be accomplished through skilled in the art design choice selection including use of one or more components and/or subsystems explicitly and/or implicitly referred to herein for at least in part implementing execution of one or more instructions operation o1178, for performance of the operation o1178 by an electrical circuitry arrangement as activated thereto, and/or otherwise fulfillment of the operation o1178. One or more non-transitory signal bearing physical media can bear the one or more instructions that when executed can direct performance of the operation o1178. Furthermore, receiving information regarding courier service use for the electric vehicle module m1178 depicted in FIG. 5-H as being included in the module m1170, when executed and/or activated, can direct performance of and/or perform the operation o1178. Illustratively, in one or more implementations, the operation o1178 can be carried out, for example, by receiving electric vehicle prospective use information regarding one or more uses of the electric vehicle (e.g. receiving information regarding potential for sharing of the electric vehicle among one or more groups of electric vehicle owners, economic status of the electric vehicle owner, health or contagion condition of the electric vehicle users, physical accessibility or disability issues of the electric vehicle users, etc.) including receiving information regarding one or more courier service use for the electric vehicle (e.g. receiving information regarding urgency, level of payment, arrangement for delivery associated with the courier service, etc.).

In one or more implementations, as shown in FIG. 9-0, the operation o1170 can include operation o1179 for receiving electric vehicle prospective use information regarding one or more uses of the electric vehicle including receiving information regarding industrial cargo transport by the electric vehicle. Origination of a physically tangible component group can be accomplished through skilled in the art design choice selection including use of one or more components and/or subsystems explicitly and/or implicitly referred to herein for at least in part implementing execution of one or more instructions operation o1179, for performance of the operation o1179 by an electrical circuitry arrangement as activated thereto, and/or otherwise fulfillment of the operation o1179. One or more non-transitory signal bearing physical media can bear the one or more instructions that when executed can direct performance of the operation o1179. Furthermore, receiving information regarding industrial cargo transport by the electric vehicle module m1179 depicted in FIG. 5-H as being included in the module m1170, when executed and/or activated, can direct performance of and/or perform the operation o1179. Illustratively, in one or more implementations, the operation o1179 can be carried out, for example, by receiving electric vehicle prospective use information regarding one or more uses of the electric vehicle (e.g. receiving information regarding potential for sharing of the electric vehicle among one or more groups of electric vehicle owners, economic status of the electric vehicle owner, health or contagion condition of the electric vehicle users, physical accessibility or disability issues of the electric vehicle users, etc.) including receiving information regarding industrial cargo transport by the electric vehicle (e.g. receiving information regarding shipment urgency, hazardous materials issues, inspection issues, contractual obligations for delivery, etc.).

In one or more implementations, as shown in FIG. 9-O, the operation o1170 can include operation o1180 for receiving electric vehicle prospective use information regarding one or more uses of the electric vehicle including receiving information regarding one or more driving habits of one or more users of the electric vehicle. Origination of a physically tangible component group can be accomplished through skilled in the art design choice selection including use of one or more components and/or subsystems explicitly and/or implicitly referred to herein for at least in part implementing execution of one or more instructions operation o1180, for performance of the operation o1180 by an electrical circuitry arrangement as activated thereto, and/or otherwise fulfillment of the operation o1180. One or more non-transitory signal bearing physical media can bear the one or more instructions that when executed can direct performance of the operation o1180. Furthermore, receiving information regarding driving habits of users of the electric vehicle module m1180 depicted in FIG. 5-H as being included in the module m1170, when executed and/or activated, can direct performance of and/or perform the operation o1180. Illustratively, in one or more implementations, the operation o1180 can be carried out, for example, by receiving electric vehicle prospective use information regarding one or more uses of the electric vehicle (e.g. receiving information regarding potential for sharing of the electric vehicle among one or more groups of electric vehicle owners, economic status of the electric vehicle owner, health or contagion condition of the electric vehicle users, physical accessibility or disability issues of the electric vehicle users, etc.) including receiving information regarding one or more driving habits of one or more users of the electric vehicle (e.g. receiving information regarding historical punctuality of users, traffic violation histories of the users, tendency to exceed speed limits of the users, braking habits of the users, etc.).

In one or more implementations, as shown in FIG. 9-P, the operation o1170 can include operation o1181 for receiving electric vehicle prospective use information regarding one or more uses of the electric vehicle including receiving information regarding one or more itineraries associated with use of the electric vehicle. Origination of a physically tangible component group can be accomplished through skilled in the art design choice selection including use of one or more components and/or subsystems explicitly and/or implicitly referred to herein for at least in part implementing execution of one or more instructions operation o1181, for performance of the operation o1181 by an electrical circuitry arrangement as activated thereto, and/or otherwise fulfillment of the operation o1181. One or more non-transitory signal bearing physical media can bear the one or more instructions that when executed can direct performance of the operation o1181. Furthermore, receiving information regarding itineraries associated with use of the electric vehicle module m1181 depicted in FIG. 5-H as being included in the module m1170, when executed and/or activated, can direct performance of and/or perform the operation o1181. Illustratively, in one or more implementations, the operation o1181 can be carried out, for example, by receiving electric vehicle prospective use information regarding one or more uses of the electric vehicle (e.g. receiving information regarding potential for sharing of the electric vehicle among one or more groups of electric vehicle owners, economic status of the electric vehicle owner, health or contagion condition of the electric vehicle users, physical accessibility or disability issues of the electric vehicle users, etc.) including receiving information regarding one or more itineraries associated with use of the electric vehicle (e.g. receiving information start times, stop times, wait times, characterization of priority levels for arrival, etc.).

In one or more implementations, as shown in FIG. 9-P, the operation o1170 can include operation o1182 for receiving electric vehicle prospective use information regarding one or more uses of the electric vehicle including receiving information regarding one or more weather forecasts associated with travel through use of the electric vehicle. Origination of a physically tangible component group can be accomplished through skilled in the art design choice selection including use of one or more components and/or subsystems explicitly and/or implicitly referred to herein for at least in part implementing execution of one or more instructions operation o1182, for performance of the operation o1182 by an electrical circuitry arrangement as activated thereto, and/or otherwise fulfillment of the operation o1182. One or more non-transitory signal bearing physical media can bear the one or more instructions that when executed can direct performance of the operation o1182. Furthermore, receiving information regarding weather forecasts associated with travel through use of the electric vehicle module m1182 depicted in FIG. 5-H as being included in the module m1170, when executed and/or activated, can direct performance of and/or perform the operation o1182. Illustratively, in one or more implementations, the operation o1182 can be carried out, for example, by receiving electric vehicle prospective use information regarding one or more uses of the electric vehicle (e.g. receiving information regarding potential for sharing of the electric vehicle among one or more groups of electric vehicle owners, economic status of the electric vehicle owner, health or contagion condition of the electric vehicle users, physical accessibility or disability issues of the electric vehicle users, etc.) including receiving information regarding one or more weather forecasts associated with travel through use of the electric vehicle (e.g. receiving information regarding current or forecast weather issues such as storms, flooding, road conditions, traffic congestion duet to weather related aspects, etc.).

In one or more implementations, as shown in FIG. 9-P, the operation o1170 can include operation o1183 for receiving electric vehicle prospective use information regarding one or more uses of the electric vehicle including receiving information regarding one or more news broadcasts associated with travel through use of the electric vehicle. Origination of a physically tangible component group can be accomplished through skilled in the art design choice selection including use of one or more components and/or subsystems explicitly and/or implicitly referred to herein for at least in part implementing execution of one or more instructions operation o1183, for performance of the operation o1183 by an electrical circuitry arrangement as activated thereto, and/or otherwise fulfillment of the operation o1183. One or more non-transitory signal bearing physical media can bear the one or more instructions that when executed can direct performance of the operation o1183. Furthermore, receiving information regarding news broadcasts associated with travel through use of the electric vehicle module m1183 depicted in FIG. 5-H as being included in the module m1170, when executed and/or activated, can direct performance of and/or perform the operation o1183. Illustratively, in one or more implementations, the operation o1183 can be carried out, for example, by receiving electric vehicle prospective use information regarding one or more uses of the electric vehicle (e.g. receiving information regarding potential for sharing of the electric vehicle among one or more groups of electric vehicle owners, economic status of the electric vehicle owner, health or contagion condition of the electric vehicle users, physical accessibility or disability issues of the electric vehicle users, etc.) including receiving information regarding one or more news broadcasts associated with travel through use of the electric vehicle (e.g. receiving information regarding sports events, political events, business events, unpredictable or catastrophic events impacting traffic or road conditions, etc.).

In one or more implementations, as shown in FIG. 9-P, the operation o1170 can include operation o1184 for receiving electric vehicle prospective use information regarding one or more uses of the electric vehicle including receiving information regarding emergency warning messages associated with use of the electric vehicle. Origination of a physically tangible component group can be accomplished through skilled in the art design choice selection including use of one or more components and/or subsystems explicitly and/or implicitly referred to herein for at least in part implementing execution of one or more instructions operation o1184, for performance of the operation o1184 by an electrical circuitry arrangement as activated thereto, and/or otherwise fulfillment of the operation o1184. One or more non-transitory signal bearing physical media can bear the one or more instructions that when executed can direct performance of the operation o1184. Furthermore, receiving information regarding emergency warning messages associated with use of the electric vehicle module m1184 depicted in FIG. 5-H as being included in the module m1170, when executed and/or activated, can direct performance of and/or perform the operation o1184. Illustratively, in one or more implementations, the operation o1184 can be carried out, for example, by receiving electric vehicle prospective use information regarding one or more uses of the electric vehicle (e.g. receiving information regarding potential for sharing of the electric vehicle among one or more groups of electric vehicle owners, economic status of the electric vehicle owner, health or contagion condition of the electric vehicle users, physical accessibility or disability issues of the electric vehicle users, etc.) including receiving information regarding emergency warning messages associated with use of the electric vehicle (e.g. receiving information regarding fire, police, ambulance, military or other response team issues associated with travel conditions, etc.).

In one or more implementations, as shown in FIG. 9-P, the operation o1170 can include operation o1185 for receiving electric vehicle prospective use information regarding one or more uses of the electric vehicle including receiving information regarding availability of alternate transportation within a designated distance from one or more electrical energy transfer stations for transferring electrical energy to the electric vehicle. Origination of a physically tangible component group can be accomplished through skilled in the art design choice selection including use of one or more components and/or subsystems explicitly and/or implicitly referred to herein for at least in part implementing execution of one or more instructions operation o1185, for performance of the operation o1185 by an electrical circuitry arrangement as activated thereto, and/or otherwise fulfillment of the operation o1185. One or more non-transitory signal bearing physical media can bear the one or more instructions that when executed can direct performance of the operation o1185. Furthermore, receiving information regarding availability of alternate transportation within a designated distance from electrical energy transfer stations for transferring electrical energy to the electric vehicle module m1185 depicted in FIG. 5-H as being included in the module m1170, when executed and/or activated, can direct performance of and/or perform the operation o1185. Illustratively, in one or more implementations, the operation o1185 can be carried out, for example, by receiving electric vehicle prospective use information regarding one or more uses of the electric vehicle (e.g. receiving information regarding potential for sharing of the electric vehicle among one or more groups of electric vehicle owners, economic status of the electric vehicle owner, health or contagion condition of the electric vehicle users, physical accessibility or disability issues of the electric vehicle users, etc.) including receiving information regarding availability of alternate transportation within a designated distance from one or more electrical energy transfer stations for transferring electrical energy to the electric vehicle (e.g. receiving information regarding bus, train, taxi, hitch-hiking, carpool, rideshare or other access points to transportation alternate to that provided by the electric vehicle, etc.).

In one or more implementations, as shown in FIG. 9-P, the operation o1170 can include operation o1186 for receiving electric vehicle prospective use information regarding one or more uses of the electric vehicle including receiving information regarding ride-share programs associated with travel routes traveled by the electric vehicle. Origination of a physically tangible component group can be accomplished through skilled in the art design choice selection including use of one or more components and/or subsystems explicitly and/or implicitly referred to herein for at least in part implementing execution of one or more instructions operation o1186, for performance of the operation o1186 by an electrical circuitry arrangement as activated thereto, and/or otherwise fulfillment of the operation o1186. One or more non-transitory signal bearing physical media can bear the one or more instructions that when executed can direct performance of the operation o1186. Furthermore, receiving information regarding ride-share programs associated with travel routes traveled by the electric vehicle module m1186 depicted in FIG. 5-H as being included in the module m1170, when executed and/or activated, can direct performance of and/or perform the operation o1186. Illustratively, in one or more implementations, the operation o1186 can be carried out, for example, by receiving electric vehicle prospective use information regarding one or more uses of the electric vehicle (e.g. receiving information regarding potential for sharing of the electric vehicle among one or more groups of electric vehicle owners, economic status of the electric vehicle owner, health or contagion condition of the electric vehicle users, physical accessibility or disability issues of the electric vehicle users, etc.) including receiving information regarding ride-share programs associated with travel routes traveled by the electric vehicle (e.g. receiving information regarding passenger biographical information, historical travel information of ride-share participants, availability of ride-share participants, etc.).

In one or more implementations, as shown in FIG. 10-A, the operation o12 can include operation o1201 for electronically obtaining electrical energy transfer aspect information regarding wireless electrical energy transfer from one or more wireless electrical energy transfer imparting stations to the one or more wireless electrical energy transfer receiving devices of the electric vehicle for storage by the one or more electrical energy storage devices of the electric vehicle including obtaining electrical energy transfer aspect information from one or more wireless electrical energy transfer imparting stations. Origination of a physically tangible component group can be accomplished through skilled in the art design choice selection including use of one or more components and/or subsystems explicitly and/or implicitly referred to herein for at least in part implementing execution of one or more instructions operation o1201, for performance of the operation o1201 by an electrical circuitry arrangement as activated thereto, and/or otherwise fulfillment of the operation o1201. One or more non-transitory signal bearing physical media can bear the one or more instructions that when executed can direct performance of the operation o1201. Furthermore, obtaining electrical energy transfer aspect information from wireless electrical energy transfer imparting stations module m1201 depicted in FIG. 6-A as being included in the module m12, when executed and/or activated, can direct performance of and/or perform the operation o1201. Illustratively, in one or more implementations, the operation o1201 can be carried out, for example, by electronically obtaining (e.g. data calls, search queries, response receipt, etc.) electrical energy transfer aspect information (e.g. energy transfer rates, transfer scheduling, timing, synchronizing data, frequency matching of sending and receiving equipment, etc.) regarding wireless (e.g. magnetic resonance frequency, capacitive charging, etc.) electrical energy transfer (e.g. electrical charge transfer, etc.) from one or more wireless electrical energy transfer imparting stations (e.g. mounted in floor, portable, in parking stall, in private garage, in employer's parking lots, in service station, etc.) to the one or more wireless electrical energy transfer receiving devices (e.g. mounted in vehicle interior, attachable and detachable from vehicle, etc.) of the electric vehicle (e.g. car, van, scooter, truck, hybrid, full electric, etc.) for storage (e.g. quick charging for short term storage for small distance trips, lengthy charging for long distance trips, etc.) by the one or more electrical energy storage devices (e.g. lead acid, nickel hydride, high density capacitors, etc.) of the electric vehicle (e.g. truck, car, cycle, van, etc.) including obtaining electrical energy transfer aspect information from one or more wireless electrical energy transfer imparting stations (e.g. obtaining information regarding planned or estimated one or more electromagnetic frequencies, energy transfer rates available, positioning of wireless energy transmitters, etc.).

In one or more implementations, as shown in FIG. 10-A, the operation o1201 can include operation o1202 for obtaining electrical energy transfer aspect information from one or more wireless electrical energy transfer imparting stations including obtaining information regarding one or more schedules for electrical load sharing for one or more electrical devices sharing one or more electrical power sources with one or more electrical energy transfer stations associated with the electric vehicle. Origination of a physically tangible component group can be accomplished through skilled in the art design choice selection including use of one or more components and/or subsystems explicitly and/or implicitly referred to herein for at least in part implementing execution of one or more instructions operation o1202, for performance of the operation o1202 by an electrical circuitry arrangement as activated thereto, and/or otherwise fulfillment of the operation o1202. One or more non-transitory signal bearing physical media can bear the one or more instructions that when executed can direct performance of the operation o1202. Furthermore, obtaining information regarding schedules for electrical load sharing for electrical devices sharing electrical power sources with electrical energy transfer stations associated with the electric vehicle module m1202 depicted in FIG. 6-A as being included in the module m1201, when executed and/or activated, can direct performance of and/or perform the operation o1202. Illustratively, in one or more implementations, the operation o1202 can be carried out, for example, by obtaining electrical energy transfer aspect information from one or more wireless electrical energy transfer imparting stations (e.g. obtaining information regarding planned or estimated one or more electromagnetic frequencies, energy transfer rates available, positioning of wireless energy transmitters, etc.) including obtaining information regarding one or more schedules for electrical load sharing for one or more electrical devices sharing one or more electrical power sources with one or more electrical energy transfer stations associated with the electric vehicle (e.g. obtaining information regarding types, capacities, demand cycles of equipment, appliances, and other equipment to share electrical energy resources with the one or more electrical charging stations for the electric vehicle, etc.).

In one or more implementations, as shown in FIG. 10-A, the operation o1201 can include operation o1203 for obtaining electrical energy transfer aspect information from one or more wireless electrical energy transfer imparting stations including obtaining information regarding charging rate capacity of one or more electrical energy transfer stations for the electric vehicle. Origination of a physically tangible component group can be accomplished through skilled in the art design choice selection including use of one or more components and/or subsystems explicitly and/or implicitly referred to herein for at least in part implementing execution of one or more instructions operation o1203, for performance of the operation o1203 by an electrical circuitry arrangement as activated thereto, and/or otherwise fulfillment of the operation o1203. One or more non-transitory signal bearing physical media can bear the one or more instructions that when executed can direct performance of the operation o1203. Furthermore, obtaining information regarding charging rate capacity of electrical energy transfer stations for the electric vehicle module m1203 depicted in FIG. 6-A as being included in the module m1201, when executed and/or activated, can direct performance of and/or perform the operation o1203. Illustratively, in one or more implementations, the operation o1203 can be carried out, for example, by obtaining electrical energy transfer aspect information from one or more wireless electrical energy transfer imparting stations (e.g. obtaining information regarding planned or estimated one or more electromagnetic frequencies, energy transfer rates available, positioning of wireless energy transmitters, etc.) including obtaining information regarding charging rate capacity of one or more electrical energy transfer stations for the electric vehicle (e.g. obtaining information regarding short burst capacity, or long term durational levels for transfer of electrical energy wirelessly from charging stations for the electric vehicle, etc.).

In one or more implementations, as shown in FIG. 10-A, the operation o1201 can include operation o1204 for obtaining electrical energy transfer aspect information from one or more wireless electrical energy transfer imparting stations including obtaining information regarding one or more consumer incentive programs based on one or more electricity cost schedules. Origination of a physically tangible component group can be accomplished through skilled in the art design choice selection including use of one or more components and/or subsystems explicitly and/or implicitly referred to herein for at least in part implementing execution of one or more instructions operation o1204, for performance of the operation o1204 by an electrical circuitry arrangement as activated thereto, and/or otherwise fulfillment of the operation o1204. One or more non-transitory signal bearing physical media can bear the one or more instructions that when executed can direct performance of the operation o1204. Furthermore, obtaining information regarding consumer incentive programs based on electricity cost schedules module m1204 depicted in FIG. 6-A as being included in the module m1201, when executed and/or activated, can direct performance of and/or perform the operation o1204. Illustratively, in one or more implementations, the operation o1204 can be carried out, for example, by obtaining electrical energy transfer aspect information from one or more wireless electrical energy transfer imparting stations (e.g. obtaining information regarding planned or estimated one or more electromagnetic frequencies, energy transfer rates available, positioning of wireless energy transmitters, etc.) including obtaining information regarding one or more consumer incentive programs based on one or more electricity cost schedules (e.g. obtaining information timing, duration, scheduling, percentages of cost reductions associated with the consumer incentive programs, etc.).

In one or more implementations, as shown in FIG. 10-A, the operation o1201 can include operation o1205 for obtaining electrical energy transfer aspect information from one or more wireless electrical energy transfer imparting stations including obtaining information regarding one or more electricity financial cost rate schedules. Origination of a physically tangible component group can be accomplished through skilled in the art design choice selection including use of one or more components and/or subsystems explicitly and/or implicitly referred to herein for at least in part implementing execution of one or more instructions operation o1205, for performance of the operation o1205 by an electrical circuitry arrangement as activated thereto, and/or otherwise fulfillment of the operation o1205. One or more non-transitory signal bearing physical media can bear the one or more instructions that when executed can direct performance of the operation o1205. Furthermore, obtaining information regarding electricity financial cost rate schedules module m1205 depicted in FIG. 6-A as being included in the module m1201, when executed and/or activated, can direct performance of and/or perform the operation o1205. Illustratively, in one or more implementations, the operation o1205 can be carried out, for example, by obtaining electrical energy transfer aspect information from one or more wireless electrical energy transfer imparting stations (e.g. obtaining information regarding planned or estimated one or more electromagnetic frequencies, energy transfer rates available, positioning of wireless energy transmitters, etc.) including obtaining information regarding one or more electricity financial cost rate schedules (e.g. obtaining information regarding historical, planned, estimated or other cost data as to cost structures for electrical energy pricing from utility or onsite electrical energy resource providers, etc.).

In one or more implementations, as shown in FIG. 10-A, the operation o1201 can include operation o1206 for obtaining electrical energy transfer aspect information from one or more wireless electrical energy transfer imparting stations including obtaining information regarding one or more electricity load share capacity schedules. Origination of a physically tangible component group can be accomplished through skilled in the art design choice selection including use of one or more components and/or subsystems explicitly and/or implicitly referred to herein for at least in part implementing execution of one or more instructions operation o1206, for performance of the operation o1206 by an electrical circuitry arrangement as activated thereto, and/or otherwise fulfillment of the operation o1206. One or more non-transitory signal bearing physical media can bear the one or more instructions that when executed can direct performance of the operation o1206. Furthermore, obtaining information regarding electricity load share capacity schedules module m1206 depicted in FIG. 6-A as being included in the module m1201, when executed and/or activated, can direct performance of and/or perform the operation o1206. Illustratively, in one or more implementations, the operation o1206 can be carried out, for example, by obtaining electrical energy transfer aspect information from one or more wireless electrical energy transfer imparting stations (e.g. obtaining information regarding planned or estimated one or more electromagnetic frequencies, energy transfer rates available, positioning of wireless energy transmitters, etc.) including obtaining information regarding one or more electricity load share capacity schedules (e.g. obtaining information regarding historical, planned, or estimated use of electrical energy resource provider equipment for providing electrical energy to appliances, HVAC, industrial equipment and other demands for electrical energy including other electric vehicles, etc.).

In one or more implementations, as shown in FIG. 10-B, the operation o1201 can include operation o1207 for obtaining electrical energy transfer aspect information from one or more wireless electrical energy transfer imparting stations including obtaining information regarding electric utility capacity information passed through communication channels of one or more electrical energy transfer stations for the electric vehicle. Origination of a physically tangible component group can be accomplished through skilled in the art design choice selection including use of one or more components and/or subsystems explicitly and/or implicitly referred to herein for at least in part implementing execution of one or more instructions operation o1207, for performance of the operation o1207 by an electrical circuitry arrangement as activated thereto, and/or otherwise fulfillment of the operation o1207. One or more non-transitory signal bearing physical media can bear the one or more instructions that when executed can direct performance of the operation o1207. Furthermore, obtaining information regarding electric utility capacity information passed through communication channels of electrical energy transfer stations for the electric vehicle module m1207 depicted in FIG. 6-A as being included in the module m1201, when executed and/or activated, can direct performance of and/or perform the operation o1207. Illustratively, in one or more implementations, the operation o1207 can be carried out, for example, by obtaining electrical energy transfer aspect information from one or more wireless electrical energy transfer imparting stations (e.g. obtaining information regarding planned or estimated one or more electromagnetic frequencies, energy transfer rates available, positioning of wireless energy transmitters, etc.) including obtaining information regarding electric utility capacity information passed through communication channels of one or more electrical energy transfer stations for the electric vehicle (e.g. obtaining information from wide area network, local area network, cellular network, point-to-point direct network communication, etc.).

In one or more implementations, as shown in FIG. 10-B, the operation o1201 can include operation o1208 for obtaining electrical energy transfer aspect information from one or more wireless electrical energy transfer imparting stations including obtaining information regarding one or more electrical energy charging appointments reserved for electrical vehicles other than the electric vehicle. Origination of a physically tangible component group can be accomplished through skilled in the art design choice selection including use of one or more components and/or subsystems explicitly and/or implicitly referred to herein for at least in part implementing execution of one or more instructions operation o1208, for performance of the operation o1208 by an electrical circuitry arrangement as activated thereto, and/or otherwise fulfillment of the operation o1208. One or more non-transitory signal bearing physical media can bear the one or more instructions that when executed can direct performance of the operation o1208. Furthermore, obtaining information regarding electrical energy charging appointments reserved for electrical vehicles other than the electric vehicle module m1208 depicted in FIG. 6-A as being included in the module m1201, when executed and/or activated, can direct performance of and/or perform the operation o1208. Illustratively, in one or more implementations, the operation o1208 can be carried out, for example, by obtaining electrical energy transfer aspect information from one or more wireless electrical energy transfer imparting stations (e.g. obtaining information regarding planned or estimated one or more electromagnetic frequencies, energy transfer rates available, positioning of wireless energy transmitters, etc.) including obtaining information regarding one or more electrical energy charging appointments reserved for electrical vehicles other than the electric vehicle (e.g. obtaining information associated with planned or estimated itineraries of users of electric vehicles other than the electric vehicle as associated with use or availability of charging stations planned or estimated to be used by the electric vehicle, etc.).

In one or more implementations, as shown in FIG. 10-B, the operation o1201 can include operation o1209 for obtaining electrical energy transfer aspect information from one or more wireless electrical energy transfer imparting stations including obtaining information regarding maximum charging rate capacities of one or more electrical energy transfer stations useable by the electric. Origination of a physically tangible component group can be accomplished through skilled in the art design choice selection including use of one or more components and/or subsystems explicitly and/or implicitly referred to herein for at least in part implementing execution of one or more instructions operation o1209, for performance of the operation o1209 by an electrical circuitry arrangement as activated thereto, and/or otherwise fulfillment of the operation o1209. One or more non-transitory signal bearing physical media can bear the one or more instructions that when executed can direct performance of the operation o1209. Furthermore, obtaining information regarding maximum charging rate capacities of electrical energy transfer stations useable by the electric module m1209 depicted in FIG. 6-A as being included in the module m1201, when executed and/or activated, can direct performance of and/or perform the operation o1209. Illustratively, in one or more implementations, the operation o1209 can be carried out, for example, by obtaining electrical energy transfer aspect information from one or more wireless electrical energy transfer imparting stations (e.g. obtaining information regarding planned or estimated one or more electromagnetic frequencies, energy transfer rates available, positioning of wireless energy transmitters, etc.) including obtaining information regarding maximum charging rate capacities of one or more electrical energy transfer stations useable by the electric (e.g. obtaining information regarding planned, estimated, or historical maximum charging rate capacities for the electrical charging stations with regard to charging the electric vehicle at planned or estimated charging times given factors such as load sharing for the electrical energy transfer stations with other stations and factors concerning interfacing of the electric vehicle with the stations, etc.).

In one or more implementations, as shown in FIG. 10-B, the operation o1201 can include operation o1210 for obtaining electrical energy transfer aspect information from one or more wireless electrical energy transfer imparting stations including obtaining information regarding cost information for priority handling of charging of the electric vehicle by one or more of the electrical energy transfer stations. Origination of a physically tangible component group can be accomplished through skilled in the art design choice selection including use of one or more components and/or subsystems explicitly and/or implicitly referred to herein for at least in part implementing execution of one or more instructions operation o1210, for performance of the operation o1210 by an electrical circuitry arrangement as activated thereto, and/or otherwise fulfillment of the operation o1210. One or more non-transitory signal bearing physical media can bear the one or more instructions that when executed can direct performance of the operation o1210. Furthermore, obtaining information regarding cost information for priority handling of charging of the electric vehicle by of the electrical energy transfer stations module m1210 depicted in FIG. 6-A as being included in the module m1201, when executed and/or activated, can direct performance of and/or perform the operation o1210. Illustratively, in one or more implementations, the operation o1210 can be carried out, for example, by obtaining electrical energy transfer aspect information from one or more wireless electrical energy transfer imparting stations (e.g. obtaining information regarding planned or estimated one or more electromagnetic frequencies, energy transfer rates available, positioning of wireless energy transmitters, etc.) including obtaining information regarding cost information for priority handling of charging of the electric vehicle by one or more of the electrical energy transfer stations (e.g. obtaining information regarding pricing for providing of electrical energy based on charge scheduling, load sharing of other energy consuming devices, and capacity of the electrical energy providing utility stations, etc.).

In one or more implementations, as shown in FIG. 10-B, the operation o1201 can include operation o1211 for obtaining electrical energy transfer aspect information from one or more wireless electrical energy transfer imparting stations including obtaining information regarding one or more electrical energy transfer station availability schedules for the electric vehicle. Origination of a physically tangible component group can be accomplished through skilled in the art design choice selection including use of one or more components and/or subsystems explicitly and/or implicitly referred to herein for at least in part implementing execution of one or more instructions operation o1211, for performance of the operation o1211 by an electrical circuitry arrangement as activated thereto, and/or otherwise fulfillment of the operation o1211. One or more non-transitory signal bearing physical media can bear the one or more instructions that when executed can direct performance of the operation o1211. Furthermore, obtaining information regarding electrical energy transfer station availability schedules for the electric vehicle module m1211 depicted in FIG. 6-A as being included in the module m1201, when executed and/or activated, can direct performance of and/or perform the operation o1211. Illustratively, in one or more implementations, the operation o1211 can be carried out, for example, by obtaining electrical energy transfer aspect information from one or more wireless electrical energy transfer imparting stations (e.g. obtaining information regarding planned or estimated one or more electromagnetic frequencies, energy transfer rates available, positioning of wireless energy transmitters, etc.) including obtaining information regarding one or more electrical energy transfer station availability schedules for the electric vehicle (e.g. obtaining information regarding actual, estimated, or historical scheduling for electrical energy transfer stations concerning the electric vehicle, users of the stations, other electric vehicles, and other users of the stations, etc.).

In one or more implementations, as shown in FIG. 10-C, the operation o1201 can include operation o1212 for obtaining electrical energy transfer aspect information from one or more wireless electrical energy transfer imparting stations including obtaining information regarding one or more histories of electrical energy consumption by one or more electrical energy transfer stations for the electric vehicle. Origination of a physically tangible component group can be accomplished through skilled in the art design choice selection including use of one or more components and/or subsystems explicitly and/or implicitly referred to herein for at least in part implementing execution of one or more instructions operation o1212, for performance of the operation o1212 by an electrical circuitry arrangement as activated thereto, and/or otherwise fulfillment of the operation o1212. One or more non-transitory signal bearing physical media can bear the one or more instructions that when executed can direct performance of the operation o1212. Furthermore, obtaining information regarding histories of electrical energy consumption by electrical energy transfer stations for the electric vehicle module m1212 depicted in FIG. 6-A as being included in the module m1201, when executed and/or activated, can direct performance of and/or perform the operation o1212. Illustratively, in one or more implementations, the operation o1212 can be carried out, for example, by obtaining electrical energy transfer aspect information from one or more wireless electrical energy transfer imparting stations (e.g. obtaining information regarding planned or estimated one or more electromagnetic frequencies, energy transfer rates available, positioning of wireless energy transmitters, etc.) including obtaining information regarding one or more histories of electrical energy consumption by one or more electrical energy transfer stations for the electric vehicle (e.g. obtaining information regarding short term, long term, peak demand, average demand, mix of electric vehicle type, mix of user type as associated with the electrical energy transfer stations for the electric vehicle, etc.).

In one or more implementations, as shown in FIG. 10-C, the operation o1201 can include operation o1213 for obtaining electrical energy transfer aspect information from one or more wireless electrical energy transfer imparting stations including obtaining information regarding one or more requests for use data of the electric vehicle for remote reporting to one or more electric utility databases. Origination of a physically tangible component group can be accomplished through skilled in the art design choice selection including use of one or more components and/or subsystems explicitly and/or implicitly referred to herein for at least in part implementing execution of one or more instructions operation o1213, for performance of the operation o1213 by an electrical circuitry arrangement as activated thereto, and/or otherwise fulfillment of the operation o1213. One or more non-transitory signal bearing physical media can bear the one or more instructions that when executed can direct performance of the operation o1213. Furthermore, obtaining information regarding requests for use data of the electric vehicle for remote reporting to electric utility databases module m1213 depicted in FIG. 6-B as being included in the module m1201, when executed and/or activated, can direct performance of and/or perform the operation o1213. Illustratively, in one or more implementations, the operation o1213 can be carried out, for example, by obtaining electrical energy transfer aspect information from one or more wireless electrical energy transfer imparting stations (e.g. obtaining information regarding planned or estimated one or more electromagnetic frequencies, energy transfer rates available, positioning of wireless energy transmitters, etc.) including obtaining information regarding one or more requests for use data of the electric vehicle for remote reporting to one or more electric utility databases (e.g. obtaining information regarding frequency of occurrence, length of time associated, profile of individual users or groups of users associated with remote reporting requests, etc.).

In one or more implementations, as shown in FIG. 10-C, the operation o1201 can include operation o1214 for obtaining electrical energy transfer aspect information from one or more wireless electrical energy transfer imparting stations including obtaining information regarding peak demand and reserve capacity of one or more electrical energy transfer stations for use by the electric vehicle. Origination of a physically tangible component group can be accomplished through skilled in the art design choice selection including use of one or more components and/or subsystems explicitly and/or implicitly referred to herein for at least in part implementing execution of one or more instructions operation o1214, for performance of the operation o1214 by an electrical circuitry arrangement as activated thereto, and/or otherwise fulfillment of the operation o1214. One or more non-transitory signal bearing physical media can bear the one or more instructions that when executed can direct performance of the operation o1214. Furthermore, obtaining information regarding peak demand and reserve capacity of electrical energy transfer stations for use by the electric vehicle module m1214 depicted in FIG. 6-B as being included in the module m1201, when executed and/or activated, can direct performance of and/or perform the operation o1214. Illustratively, in one or more implementations, the operation o1214 can be carried out, for example, by obtaining electrical energy transfer aspect information from one or more wireless electrical energy transfer imparting stations (e.g. obtaining information regarding planned or estimated one or more electromagnetic frequencies, energy transfer rates available, positioning of wireless energy transmitters, etc.) including obtaining information regarding peak demand and reserve capacity of one or more electrical energy transfer stations for use by the electric vehicle (e.g. obtaining information regarding statistical data for differences in demand and capacity regarding outages, scheduled maintenance, recognized patterns of demand, recognized patterns for capacity, etc.).

In one or more implementations, as shown in FIG. 10-C, the operation o1201 can include operation o1215 for obtaining electrical energy transfer aspect information from one or more wireless electrical energy transfer imparting stations including obtaining information regarding communication with electric utility smart grid information systems to update electric utility databases regarding electricity use by the electric vehicle. Origination of a physically tangible component group can be accomplished through skilled in the art design choice selection including use of one or more components and/or subsystems explicitly and/or implicitly referred to herein for at least in part implementing execution of one or more instructions operation o1215, for performance of the operation o1215 by an electrical circuitry arrangement as activated thereto, and/or otherwise fulfillment of the operation o1215. One or more non-transitory signal bearing physical media can bear the one or more instructions that when executed can direct performance of the operation o1215. Furthermore, obtaining information regarding communication with electric utility smart grid information systems to update electric utility databases regarding electricity use by the electric vehicle module m1215 depicted in FIG. 6-B as being included in the module m1201, when executed and/or activated, can direct performance of and/or perform the operation o1215. Illustratively, in one or more implementations, the operation o1215 can be carried out, for example, by obtaining electrical energy transfer aspect information from one or more wireless electrical energy transfer imparting stations (e.g. obtaining information regarding planned or estimated one or more electromagnetic frequencies, energy transfer rates available, positioning of wireless energy transmitters, etc.) including obtaining information regarding communication with electric utility smart grid information systems to update electric utility databases regarding electricity use by the electric vehicle (e.g. obtaining information from household appliances, from industrial equipment, from other electric vehicles, office equipment, etc. tied in with one or more electrical energy transfer stations supplying charging capacity for the electric vehicle, etc.).

In one or more implementations, as shown in FIG. 10-C, the operation o1201 can include operation o1216 for obtaining electrical energy transfer aspect information from one or more wireless electrical energy transfer imparting stations including obtaining information regarding priority classification for electric vehicle charging scheduling requests of one or more electrical energy transfer stations. Origination of a physically tangible component group can be accomplished through skilled in the art design choice selection including use of one or more components and/or subsystems explicitly and/or implicitly referred to herein for at least in part implementing execution of one or more instructions operation o1216, for performance of the operation o1216 by an electrical circuitry arrangement as activated thereto, and/or otherwise fulfillment of the operation o1216. One or more non-transitory signal bearing physical media can bear the one or more instructions that when executed can direct performance of the operation o1216. Furthermore, obtaining information regarding priority classification for electric vehicle charging scheduling requests of electrical energy transfer stations module m1216 depicted in FIG. 6-B as being included in the module m1201, when executed and/or activated, can direct performance of and/or perform the operation o1216. Illustratively, in one or more implementations, the operation o1216 can be carried out, for example, by obtaining electrical energy transfer aspect information from one or more wireless electrical energy transfer imparting stations (e.g. obtaining information regarding planned or estimated one or more electromagnetic frequencies, energy transfer rates available, positioning of wireless energy transmitters, etc.) including obtaining information regarding priority classification for electric vehicle charging scheduling requests of one or more electrical energy transfer stations (e.g. obtaining information regarding historical, planned, or estimated use by electric vehicles other than the electric vehicle of electrical energy transfer stations historically, planned, or estimated to be used by the electric vehicle, etc.).

In one or more implementations, as shown in FIG. 10-D, the operation o1201 can include operation o1217 for obtaining electrical energy transfer aspect information from one or more wireless electrical energy transfer imparting stations including obtaining information regarding one or more user profile classifications for communication with one or more electrical energy transfer stations. Origination of a physically tangible component group can be accomplished through skilled in the art design choice selection including use of one or more components and/or subsystems explicitly and/or implicitly referred to herein for at least in part implementing execution of one or more instructions operation o1217, for performance of the operation o1217 by an electrical circuitry arrangement as activated thereto, and/or otherwise fulfillment of the operation o1217. One or more non-transitory signal bearing physical media can bear the one or more instructions that when executed can direct performance of the operation o1217. Furthermore, obtaining information regarding user profile classifications for communication with electrical energy transfer stations module m1217 depicted in FIG. 6-B as being included in the module m1201, when executed and/or activated, can direct performance of and/or perform the operation o1217. Illustratively, in one or more implementations, the operation o1217 can be carried out, for example, by obtaining electrical energy transfer aspect information from one or more wireless electrical energy transfer imparting stations (e.g. obtaining information regarding planned or estimated one or more electromagnetic frequencies, energy transfer rates available, positioning of wireless energy transmitters, etc.) including obtaining information regarding one or more user profile classifications for communication with one or more electrical energy transfer stations (e.g. obtaining information regarding user profiles associated with employment information, benefits information, electric vehicle use information, user demographic information, user geographic information, etc.).

In one or more implementations, as shown in FIG. 10-D, the operation o1201 can include operation o1218 for obtaining electrical energy transfer aspect information from one or more wireless electrical energy transfer imparting stations including obtaining information regarding electrical energy use of associated local grid electrical energy provider resources for other than for charging of the electric vehicle. Origination of a physically tangible component group can be accomplished through skilled in the art design choice selection including use of one or more components and/or subsystems explicitly and/or implicitly referred to herein for at least in part implementing execution of one or more instructions operation o1218, for performance of the operation o1218 by an electrical circuitry arrangement as activated thereto, and/or otherwise fulfillment of the operation o1218. One or more non-transitory signal bearing physical media can bear the one or more instructions that when executed can direct performance of the operation o1218. Furthermore, obtaining information regarding electrical energy use of associated local grid electrical energy provider resources for other than for charging of the electric vehicle module m1218 depicted in FIG. 6-B as being included in the module m1201, when executed and/or activated, can direct performance of and/or perform the operation o1218. Illustratively, in one or more implementations, the operation o1218 can be carried out, for example, by obtaining electrical energy transfer aspect information from one or more wireless electrical energy transfer imparting stations (e.g. obtaining information regarding planned or estimated one or more electromagnetic frequencies, energy transfer rates available, positioning of wireless energy transmitters, etc.) including obtaining information regarding electrical energy use of associated local grid electrical energy provider resources for other than for charging of the electric vehicle (e.g. obtaining information overall household electrical energy demand, overall industrial electrical energy demand, overall office electrical energy demand, overall service provider electrical energy demand as associated with local electrical grid facilities of one or more charging stations for the electric vehicle, etc.).

In one or more implementations, as shown in FIG. 10-D, the operation o1201 can include operation o1219 for obtaining electrical energy transfer aspect information from one or more wireless electrical energy transfer imparting stations including obtaining information regarding one or more plans for charging of one or more electric vehicles other than the electric vehicle for one or more electrical energy transfer stations. Origination of a physically tangible component group can be accomplished through skilled in the art design choice selection including use of one or more components and/or subsystems explicitly and/or implicitly referred to herein for at least in part implementing execution of one or more instructions operation o1219, for performance of the operation o1219 by an electrical circuitry arrangement as activated thereto, and/or otherwise fulfillment of the operation o1219. One or more non-transitory signal bearing physical media can bear the one or more instructions that when executed can direct performance of the operation o1219. Furthermore, obtaining information regarding plans for charging of electric vehicles other than the electric vehicle for electrical energy transfer stations module m1219 depicted in FIG. 6-B as being included in the module m1201, when executed and/or activated, can direct performance of and/or perform the operation o1219. Illustratively, in one or more implementations, the operation o1219 can be carried out, for example, by obtaining electrical energy transfer aspect information from one or more wireless electrical energy transfer imparting stations (e.g. obtaining information regarding planned or estimated one or more electromagnetic frequencies, energy transfer rates available, positioning of wireless energy transmitters, etc.) including obtaining information regarding one or more plans for charging of one or more electric vehicles other than the electric vehicle for one or more electrical energy transfer stations (e.g. obtaining information as associated with planned or estimated travel for users of electric vehicles other than the electric vehicle, etc.).

In one or more implementations, as shown in FIG. 10-D, the operation o1201 can include operation o1220 for obtaining electrical energy transfer aspect information from one or more wireless electrical energy transfer imparting stations including obtaining information regarding one or more technical specifications of one or more electrical energy transfer stations for the electric vehicle. Origination of a physically tangible component group can be accomplished through skilled in the art design choice selection including use of one or more components and/or subsystems explicitly and/or implicitly referred to herein for at least in part implementing execution of one or more instructions operation o1220, for performance of the operation o1220 by an electrical circuitry arrangement as activated thereto, and/or otherwise fulfillment of the operation o1220. One or more non-transitory signal bearing physical media can bear the one or more instructions that when executed can direct performance of the operation o1220. Furthermore, obtaining information regarding technical specifications of electrical energy transfer stations for the electric vehicle module m1220 depicted in FIG. 6-B as being included in the module m1201, when executed and/or activated, can direct performance of and/or perform the operation o1220. Illustratively, in one or more implementations, the operation o1220 can be carried out, for example, by obtaining electrical energy transfer aspect information from one or more wireless electrical energy transfer imparting stations (e.g. obtaining information regarding planned or estimated one or more electromagnetic frequencies, energy transfer rates available, positioning of wireless energy transmitters, etc.) including obtaining information regarding one or more technical specifications of one or more electrical energy transfer stations for the electric vehicle (e.g. obtaining information regarding electromagnetic frequencies used for wireless transfer of electrical energy, electrical energy peak and sustained charging rates available, associated equipment capability standards, etc.).

In one or more implementations, as shown in FIG. 10-D, the operation o1201 can include operation o1221 for obtaining electrical energy transfer aspect information from one or more wireless electrical energy transfer imparting stations including obtaining information through computer network communication linking one or more electrical energy transfer stations for the electric vehicle. Origination of a physically tangible component group can be accomplished through skilled in the art design choice selection including use of one or more components and/or subsystems explicitly and/or implicitly referred to herein for at least in part implementing execution of one or more instructions operation o1221, for performance of the operation o1221 by an electrical circuitry arrangement as activated thereto, and/or otherwise fulfillment of the operation o1221. One or more non-transitory signal bearing physical media can bear the one or more instructions that when executed can direct performance of the operation o1221. Furthermore, obtaining information through computer network communication linking electrical energy transfer stations for the electric vehicle module m1221 depicted in FIG. 6-B as being included in the module m1201, when executed and/or activated, can direct performance of and/or perform the operation o1221. Illustratively, in one or more implementations, the operation o1221 can be carried out, for example, by obtaining electrical energy transfer aspect information from one or more wireless electrical energy transfer imparting stations (e.g. obtaining information regarding planned or estimated one or more electromagnetic frequencies, energy transfer rates available, positioning of wireless energy transmitters, etc.) including obtaining information through computer network communication linking one or more electrical energy transfer stations for the electric vehicle (e.g. obtaining information associated with communication sent over wired, wireless, packetized, cellular, direct point-to-point, or other computer network communication systems, etc.).

In one or more implementations, as shown in FIG. 11-A, the operation o13 can include operation o1301 for electronically providing electrical energy transfer guidance information to at least in part provide possible guidance for the wireless electrical energy transfer from the one or more wireless electrical energy transfer imparting stations to the one or more wireless electrical energy transfer receiving devices of the electric vehicle for storage by the one or more electrical energy storage devices of the electric vehicle based at least in part on the electric vehicle prospective use information and the electrical energy transfer aspect information including providing electrical energy transfer guidance information to one or more electrical energy transfer stations for the electric vehicle. Origination of a physically tangible component group can be accomplished through skilled in the art design choice selection including use of one or more components and/or subsystems explicitly and/or implicitly referred to herein for at least in part implementing execution of one or more instructions operation o1301, for performance of the operation o1301 by an electrical circuitry arrangement as activated thereto, and/or otherwise fulfillment of the operation o1301. One or more non-transitory signal bearing physical media can bear the one or more instructions that when executed can direct performance of the operation o1301. Furthermore, providing electrical energy transfer guidance information to electrical energy transfer stations for the electric vehicle module m1301 depicted in FIG. 7-A as being included in the module m13, when executed and/or activated, can direct performance of and/or perform the operation o1301. Illustratively, in one or more implementations, the operation o1301 can be carried out, for example, by electronically providing (e.g. transmission, displaying, report generation, etc. through vehicle console, communication device associated with vehicle, etc.) electrical energy transfer guidance information (e.g. how much electrical energy vehicle requires, or requests, or minimally sufficient, etc., with specified transfer rate, timing of transfer, calendaring of transfer, one or more frequencies used for transfer, etc.) to at least in part provide possible guidance (e.g. transfer specification for use by imparting equipment, for use by vehicle owner, for use by utility management system, etc.) for the wireless electrical energy transfer (e.g. through frequency magnetic resonance or capacitive charging, etc.) from the one or more wireless electrical energy transfer imparting stations (e.g. floor mounted, portable, parking lot installed, etc.) to the one or more wireless electrical energy transfer receiving devices (e.g. integral with vehicle, detachable from vehicle, etc.) of the electric vehicle (e.g. truck, van, car, cycle, hybrid, full electric, etc.) for storage (e.g. for commuting or long distance, etc.) by the one or more electrical energy storage devices (e.g. deep cycle, minimal cycle, etc.) of the electric vehicle (e.g. commuter vehicle, delivery vehicle, commercial vehicle, etc.) based at least in part on the electric vehicle prospective use information (e.g. projected, estimated, forecast, intended, scheduled driving or passenger use, etc.) and the electrical energy transfer aspect information (e.g. information regarding wireless transfer from ground installed or portable stations, etc.) including providing electrical energy transfer guidance information to one or more electrical energy transfer stations for the electric vehicle (e.g. providing guidance information to electrical energy transfer stations as associated with a planned or estimated itinerary for the electric vehicle, etc.).

In one or more implementations, as shown in FIG. 11-A, the operation o1301 can include operation o1302 for providing electrical energy transfer guidance information to one or more electrical energy transfer stations for the electric vehicle including providing guidance information from one or more communication systems of the electric vehicle. Origination of a physically tangible component group can be accomplished through skilled in the art design choice selection including use of one or more components and/or subsystems explicitly and/or implicitly referred to herein for at least in part implementing execution of one or more instructions operation o1302, for performance of the operation o1302 by an electrical circuitry arrangement as activated thereto, and/or otherwise fulfillment of the operation o1302. One or more non-transitory signal bearing physical media can bear the one or more instructions that when executed can direct performance of the operation o1302. Furthermore, providing guidance information regarding itinerary and route information of the electric vehicle module m1302 depicted in FIG. 7-A as being included in the module m1301, when executed and/or activated, can direct performance of and/or perform the operation o1302. Illustratively, in one or more implementations, the operation o1302 can be carried out, for example, by providing electrical energy transfer guidance information to one or more electrical energy transfer stations for the electric vehicle (e.g. providing guidance information to electrical energy transfer stations as associated with a planned or estimated itinerary for the electric vehicle, etc.) including providing guidance information from one or more communication systems of the electric vehicle (e.g. providing guidance information from a dashboard console system of the electric vehicle, etc.).

In one or more implementations, as shown in FIG. 11-A, the operation o1301 can include operation o1303 for providing electrical energy transfer guidance information to one or more electrical energy transfer stations for the electric vehicle including providing guidance information regarding verification of identification of one or more users of the electric vehicle. Origination of a physically tangible component group can be accomplished through skilled in the art design choice selection including use of one or more components and/or subsystems explicitly and/or implicitly referred to herein for at least in part implementing execution of one or more instructions operation o1303, for performance of the operation o1303 by an electrical circuitry arrangement as activated thereto, and/or otherwise fulfillment of the operation o1303. One or more non-transitory signal bearing physical media can bear the one or more instructions that when executed can direct performance of the operation o1303. Furthermore, providing guidance information regarding verification of identification of users of the electric vehicle module m1303 depicted in FIG. 7-A as being included in the module m1301, when executed and/or activated, can direct performance of and/or perform the operation o1303. Illustratively, in one or more implementations, the operation o1303 can be carried out, for example, by providing electrical energy transfer guidance information to one or more electrical energy transfer stations for the electric vehicle (e.g. providing guidance information to electrical energy transfer stations as associated with a planned or estimated itinerary for the electric vehicle, etc.) including providing guidance information regarding verification of identification of one or more users of the electric vehicle (e.g. providing guidance information regarding employee identification, electric utility consumer identification, industrial electric user identification, banking identification, electric consumer club identification, etc.).

In one or more implementations, as shown in FIG. 11-A, the operation o1301 can include operation o1304 for providing electrical energy transfer guidance information to one or more electrical energy transfer stations for the electric vehicle including providing guidance information regarding verification of selection of one or more electrical energy transfer stations for the electrical vehicle. Origination of a physically tangible component group can be accomplished through skilled in the art design choice selection including use of one or more components and/or subsystems explicitly and/or implicitly referred to herein for at least in part implementing execution of one or more instructions operation o1304, for performance of the operation o1304 by an electrical circuitry arrangement as activated thereto, and/or otherwise fulfillment of the operation o1304. One or more non-transitory signal bearing physical media can bear the one or more instructions that when executed can direct performance of the operation o1304. Furthermore, providing guidance information regarding verification of selection of electrical energy transfer stations for the electrical vehicle module m1304 depicted in FIG. 7-A as being included in the module m1301, when executed and/or activated, can direct performance of and/or perform the operation o1304. Illustratively, in one or more implementations, the operation o1304 can be carried out, for example, by providing electrical energy transfer guidance information to one or more electrical energy transfer stations for the electric vehicle (e.g. providing guidance information to electrical energy transfer stations as associated with a planned or estimated itinerary for the electric vehicle, etc.) including providing guidance information regarding verification of selection of one or more electrical energy transfer stations for the electrical vehicle (e.g. providing guidance information regarding electrical energy transfer specifications of the electric vehicle such as use of electromagnetic frequencies, peak and sustained electrical energy transfer capacities, charge duration allowable, etc.).

In one or more implementations, as shown in FIG. 11-A, the operation o1301 can include operation o1305 for providing electrical energy transfer guidance information to one or more electrical energy transfer stations for the electric vehicle including providing guidance information regarding financial status information for one or more user accounts of the electric vehicle. Origination of a physically tangible component group can be accomplished through skilled in the art design choice selection including use of one or more components and/or subsystems explicitly and/or implicitly referred to herein for at least in part implementing execution of one or more instructions operation o1305, for performance of the operation o1305 by an electrical circuitry arrangement as activated thereto, and/or otherwise fulfillment of the operation o1305. One or more non-transitory signal bearing physical media can bear the one or more instructions that when executed can direct performance of the operation o1305. Furthermore, providing guidance information regarding financial status information for user accounts of the electric vehicle module m1305 depicted in FIG. 7-A as being included in the module m1301, when executed and/or activated, can direct performance of and/or perform the operation o1305. Illustratively, in one or more implementations, the operation o1305 can be carried out, for example, by providing electrical energy transfer guidance information to one or more electrical energy transfer stations for the electric vehicle (e.g. providing guidance information to electrical energy transfer stations as associated with a planned or estimated itinerary for the electric vehicle, etc.) including providing guidance information regarding financial status information for one or more user accounts of the electric vehicle (e.g. providing guidance information regarding banking information, credit information, security information, coupon information, credit information, reimbursement information, payment plan information, employee benefit information, etc.).

In one or more implementations, as shown in FIG. 11-B, the operation o1301 can include operation o1306 for providing electrical energy transfer guidance information to one or more electrical energy transfer stations for the electric vehicle including providing guidance information regarding one or more information requests as to charging rate capacity of one or more electrical energy transfer stations for the electric vehicle. Origination of a physically tangible component group can be accomplished through skilled in the art design choice selection including use of one or more components and/or subsystems explicitly and/or implicitly referred to herein for at least in part implementing execution of one or more instructions operation o1306, for performance of the operation o1306 by an electrical circuitry arrangement as activated thereto, and/or otherwise fulfillment of the operation o1306. One or more non-transitory signal bearing physical media can bear the one or more instructions that when executed can direct performance of the operation o1306. Furthermore, providing guidance information regarding information requests as to charging rate capacity of electrical energy transfer stations for the electric vehicle module m1306 depicted in FIG. 7-A as being included in the module m1301, when executed and/or activated, can direct performance of and/or perform the operation o1306. Illustratively, in one or more implementations, the operation o1306 can be carried out, for example, by providing electrical energy transfer guidance information to one or more electrical energy transfer stations for the electric vehicle (e.g. providing guidance information to electrical energy transfer stations as associated with a planned or estimated itinerary for the electric vehicle, etc.) including providing guidance information regarding one or more information requests as to charging rate capacity of one or more electrical energy transfer stations for the electric vehicle (e.g. providing guidance information regarding steady state transfer rates, peak transfer rates, burst transfer rates, historical, estimated, or planned brownout or blackout conditions, etc.).

In one or more implementations, as shown in FIG. 11-B, the operation o1301 can include operation o1307 for providing electrical energy transfer guidance information to one or more electrical energy transfer stations for the electric vehicle including providing guidance information concerning electrical charge status of one or more electrical energy storage devices of the electric vehicle. Origination of a physically tangible component group can be accomplished through skilled in the art design choice selection including use of one or more components and/or subsystems explicitly and/or implicitly referred to herein for at least in part implementing execution of one or more instructions operation o1307, for performance of the operation o1307 by an electrical circuitry arrangement as activated thereto, and/or otherwise fulfillment of the operation o1307. One or more non-transitory signal bearing physical media can bear the one or more instructions that when executed can direct performance of the operation o1307. Furthermore, providing guidance information concerning electrical charge status of electrical energy storage devices of the electric vehicle module m1307 depicted in FIG. 7-A as being included in the module m1301, when executed and/or activated, can direct performance of and/or perform the operation o1307. Illustratively, in one or more implementations, the operation o1307 can be carried out, for example, by providing electrical energy transfer guidance information to one or more electrical energy transfer stations for the electric vehicle (e.g. providing guidance information to electrical energy transfer stations as associated with a planned or estimated itinerary for the electric vehicle, etc.) including providing guidance information concerning electrical charge status of one or more electrical energy storage devices of the electric vehicle (e.g. providing guidance information regarding historical, planned, or estimated charging capacity, offline cycling, downtime for maintenance, availability due to demand of the electric vehicle, etc.).

In one or more implementations, as shown in FIG. 11-B, the operation o1301 can include operation o1308 for providing electrical energy transfer guidance information to one or more electrical energy transfer stations for the electric vehicle including providing guidance information concerning use data for the electric vehicle. Origination of a physically tangible component group can be accomplished through skilled in the art design choice selection including use of one or more components and/or subsystems explicitly and/or implicitly referred to herein for at least in part implementing execution of one or more instructions operation o1308, for performance of the operation o1308 by an electrical circuitry arrangement as activated thereto, and/or otherwise fulfillment of the operation o1308. One or more non-transitory signal bearing physical media can bear the one or more instructions that when executed can direct performance of the operation o1308. Furthermore, providing guidance information concerning use data for the electric vehicle module m1308 depicted in FIG. 7-A as being included in the module m1301, when executed and/or activated, can direct performance of and/or perform the operation o1308. Illustratively, in one or more implementations, the operation o1308 can be carried out, for example, by providing electrical energy transfer guidance information to one or more electrical energy transfer stations for the electric vehicle (e.g. providing guidance information to electrical energy transfer stations as associated with a planned or estimated itinerary for the electric vehicle, etc.) including providing guidance information concerning use data for the electric vehicle (e.g. providing guidance information associated with reliability of information collection, variability of statistical veracity of the data collected, population spectrum for data samples collected, etc.).

In one or more implementations, as shown in FIG. 11-B, the operation o1301 can include operation o1309 for providing electrical energy transfer guidance information to one or more electrical energy transfer stations for the electric vehicle including providing guidance information concerning amount of time the electric vehicle is available for charging by one or more electrical energy transfer stations. Origination of a physically tangible component group can be accomplished through skilled in the art design choice selection including use of one or more components and/or subsystems explicitly and/or implicitly referred to herein for at least in part implementing execution of one or more instructions operation o1309, for performance of the operation o1309 by an electrical circuitry arrangement as activated thereto, and/or otherwise fulfillment of the operation o1309. One or more non-transitory signal bearing physical media can bear the one or more instructions that when executed can direct performance of the operation o1309. Furthermore, providing guidance information concerning amount of time the electric vehicle is available for charging by electrical energy transfer stations module m1309 depicted in FIG. 7-A as being included in the module m1301, when executed and/or activated, can direct performance of and/or perform the operation o1309. Illustratively, in one or more implementations, the operation o1309 can be carried out, for example, by providing electrical energy transfer guidance information to one or more electrical energy transfer stations for the electric vehicle (e.g. providing guidance information to electrical energy transfer stations as associated with a planned or estimated itinerary for the electric vehicle, etc.) including providing guidance information concerning amount of time the electric vehicle is available for charging by one or more electrical energy transfer stations (e.g. providing guidance information regarding historical, planned, or estimated availability of electric vehicle for charging by one or more electrical energy transfer stations based on historical, planned, or estimated one or more itineraries of travel associated with the electric vehicle, etc.).

In one or more implementations, as shown in FIG. 11-B, the operation o1301 can include operation o1310 for providing electrical energy transfer guidance information to one or more electrical energy transfer stations for the electric vehicle including providing guidance information regarding amount of electrical energy required to be transferred to the electric vehicle by one or more electrical energy transfer stations. Origination of a physically tangible component group can be accomplished through skilled in the art design choice selection including use of one or more components and/or subsystems explicitly and/or implicitly referred to herein for at least in part implementing execution of one or more instructions operation o1310, for performance of the operation o1310 by an electrical circuitry arrangement as activated thereto, and/or otherwise fulfillment of the operation o1310. One or more non-transitory signal bearing physical media can bear the one or more instructions that when executed can direct performance of the operation o1310. Furthermore, providing guidance information regarding amount of electrical energy required to be transferred to the electric vehicle by electrical energy transfer stations module m1310 depicted in FIG. 7-A as being included in the module m1301, when executed and/or activated, can direct performance of and/or perform the operation o1310. Illustratively, in one or more implementations, the operation o1310 can be carried out, for example, by providing electrical energy transfer guidance information to one or more electrical energy transfer stations for the electric vehicle (e.g. providing guidance information to electrical energy transfer stations as associated with a planned or estimated itinerary for the electric vehicle, etc.) including providing guidance information regarding amount of electrical energy required to be transferred to the electric vehicle by one or more electrical energy transfer stations (e.g. providing information as to preferred safety margins to provide an additional percentage of charge over the minimum required to accomplish a given itinerary for each of the one or more electrical energy transfer stations, etc.).

In one or more implementations, as shown in FIG. 11-B, the operation o1301 can include operation o1311 for providing electrical energy transfer guidance information to one or more electrical energy transfer stations for the electric vehicle including providing guidance information regarding consumer profile of one or more users of the electric vehicle. Origination of a physically tangible component group can be accomplished through skilled in the art design choice selection including use of one or more components and/or subsystems explicitly and/or implicitly referred to herein for at least in part implementing execution of one or more instructions operation o1311, for performance of the operation o1311 by an electrical circuitry arrangement as activated thereto, and/or otherwise fulfillment of the operation o1311. One or more non-transitory signal bearing physical media can bear the one or more instructions that when executed can direct performance of the operation o1311. Furthermore, providing guidance information regarding consumer profile of users of the electric vehicle module m1311 depicted in FIG. 7-A as being included in the module m1301, when executed and/or activated, can direct performance of and/or perform the operation o1311. Illustratively, in one or more implementations, the operation o1311 can be carried out, for example, by providing electrical energy transfer guidance information to one or more electrical energy transfer stations for the electric vehicle (e.g. providing guidance information to electrical energy transfer stations as associated with a planned or estimated itinerary for the electric vehicle, etc.) including providing guidance information regarding consumer profile of one or more users of the electric vehicle (e.g. providing guidance information regarding general demographic, consumer oriented shopping detail, employment work history, financial data, historical itinerary information, etc.).

In one or more implementations, as shown in FIG. 11-C, the operation o1301 can include operation o1312 for providing electrical energy transfer guidance information to one or more electrical energy transfer stations for the electric vehicle including providing guidance information regarding itinerary and route information of the electric vehicle. Origination of a physically tangible component group can be accomplished through skilled in the art design choice selection including use of one or more components and/or subsystems explicitly and/or implicitly referred to herein for at least in part implementing execution of one or more instructions operation o1312, for performance of the operation o1312 by an electrical circuitry arrangement as activated thereto, and/or otherwise fulfillment of the operation o1312. One or more non-transitory signal bearing physical media can bear the one or more instructions that when executed can direct performance of the operation o1312. Furthermore, providing guidance information regarding itinerary and route information of the electric vehicle module m1312 depicted in FIG. 7-A as being included in the module m1301, when executed and/or activated, can direct performance of and/or perform the operation o1312. Illustratively, in one or more implementations, the operation o1312 can be carried out, for example, by providing electrical energy transfer guidance information to one or more electrical energy transfer stations for the electric vehicle (e.g. providing guidance information to electrical energy transfer stations as associated with a planned or estimated itinerary for the electric vehicle, etc.) including providing guidance information regarding itinerary and route information of the electric vehicle (e.g. providing guidance information historical, planned, or estimated itinerary information associated with one or more users of the electric vehicle as individual or shared use, etc.).

In one or more implementations, as shown in FIG. 11-C, the operation o13 can include operation o1313 for electronically providing electrical energy transfer guidance information to at least in part provide possible guidance for the wireless electrical energy transfer from the one or more wireless electrical energy transfer imparting stations to the one or more wireless electrical energy transfer receiving devices of the electric vehicle for storage by the one or more electrical energy storage devices of the electric vehicle based at least in part on the electric vehicle prospective use information and the electrical energy transfer aspect information including providing guidance information to one or more communication links between the electric vehicle and one or more electrical energy transfer stations. Origination of a physically tangible component group can be accomplished through skilled in the art design choice selection including use of one or more components and/or subsystems explicitly and/or implicitly referred to herein for at least in part implementing execution of one or more instructions operation o1313, for performance of the operation o1313 by an electrical circuitry arrangement as activated thereto, and/or otherwise fulfillment of the operation o1313. One or more non-transitory signal bearing physical media can bear the one or more instructions that when executed can direct performance of the operation o1313. Furthermore, providing guidance information to communication links between the electric vehicle and electrical energy transfer stations module m1313 depicted in FIG. 7-B as being included in the module m13, when executed and/or activated, can direct performance of and/or perform the operation o1313. Illustratively, in one or more implementations, the operation o1313 can be carried out, for example, by electronically providing (e.g. transmission, displaying, report generation, etc. through vehicle console, communication device associated with vehicle, etc.) electrical energy transfer guidance information (e.g. how much electrical energy vehicle requires, or requests, or minimally sufficient, etc., with specified transfer rate, timing of transfer, calendaring of transfer, one or more frequencies used for transfer, etc.) to at least in part provide possible guidance (e.g. transfer specification for use by imparting equipment, for use by vehicle owner, for use by utility management system, etc.) for the wireless electrical energy transfer (e.g. through frequency magnetic resonance or capacitive charging, etc.) from the one or more wireless electrical energy transfer imparting stations or more wireless electrical energy transfer receiving devices (e.g. integral with vehicle, detachable from vehicle, etc.) of the electric vehicle (e.g. truck, van, car, cycle, hybrid, full electric, etc.) for storage (e.g. for commuting or long distance, etc.) by the one or more electrical energy storage devices (e.g. deep cycle, minimal cycle, etc.) of the electric vehicle (e.g. commuter vehicle, delivery vehicle, commercial vehicle, etc.) based at least in part on the electric vehicle prospective use information (e.g. projected, estimated, forecast, intended, scheduled driving or passenger use, etc.) and the electrical energy transfer aspect information (e.g. information regarding wireless transfer from ground installed or portable stations, etc.) including providing guidance information to one or more communication links between the electric vehicle and one or more electrical energy transfer stations (e.g. providing guidance information to one or more wired, wireless, cellular, packetized, direct point-to-point, internet, wide area network, local area network, or other communication links, etc.).

In one or more implementations, as shown in FIG. 11-C, the operation o1313 can include operation o1314 for providing guidance information to one or more communication links between the electric vehicle and one or more electrical energy transfer stations including providing guidance information to one or more contactless smart card readers. Origination of a physically tangible component group can be accomplished through skilled in the art design choice selection including use of one or more components and/or subsystems explicitly and/or implicitly referred to herein for at least in part implementing execution of one or more instructions operation o1314, for performance of the operation o1314 by an electrical circuitry arrangement as activated thereto, and/or otherwise fulfillment of the operation o1314. One or more non-transitory signal bearing physical media can bear the one or more instructions that when executed can direct performance of the operation o1314. Furthermore, providing guidance information to contactless smart card readers module m1314 depicted in FIG. 7-B as being included in the module m1313, when executed and/or activated, can direct performance of and/or perform the operation o1314. Illustratively, in one or more implementations, the operation o1314 can be carried out, for example, by providing guidance information to one or more communication links between the electric vehicle and one or more electrical energy transfer stations (e.g. providing guidance information to one or more wired, wireless, cellular, packetized, direct point-to-point, internet, wide area network, local area network, or other communication links, etc.) including providing guidance information to one or more contactless smart card readers (e.g. providing guidance information to the contactless smart card readers located within the electric vehicle as accessed through a dashboard console of the electric vehicle, door panel of the electric vehicle, exterior surface of the electric vehicle, located near one or more electrical energy transfer stations adjacent to locations for charging of the electric vehicle, etc.).

In one or more implementations, as shown in FIG. 11-C, the operation o1313 can include operation o1315 for providing guidance information to one or more communication links between the electric vehicle and one or more electrical energy transfer stations including providing guidance information to one or more RFID tag readers. Origination of a physically tangible component group can be accomplished through skilled in the art design choice selection including use of one or more components and/or subsystems explicitly and/or implicitly referred to herein for at least in part implementing execution of one or more instructions operation o1315, for performance of the operation o1315 by an electrical circuitry arrangement as activated thereto, and/or otherwise fulfillment of the operation o1315. One or more non-transitory signal bearing physical media can bear the one or more instructions that when executed can direct performance of the operation o1315. Furthermore, providing guidance information to RFID tag readers module m1315 depicted in FIG. 7-B as being included in the module m1313, when executed and/or activated, can direct performance of and/or perform the operation o1315. Illustratively, in one or more implementations, the operation o1315 can be carried out, for example, by providing guidance information to one or more communication links between the electric vehicle and one or more electrical energy transfer stations (e.g. providing guidance information to one or more wired, wireless, cellular, packetized, direct point-to-point, internet, wide area network, local area network, or other communication links, etc.) including providing guidance information to one or more RFID tag readers (e.g. providing guidance information regarding RFID tag readers located within the electric vehicle as accessed through a dashboard console of the electric vehicle, door panel of the electric vehicle, exterior surface of the electric vehicle, located near one or more electrical energy transfer stations adjacent to locations for charging of the electric vehicle, etc.).

In one or more implementations, as shown in FIG. 11-C, the operation o1313 can include operation o1316 for providing guidance information to one or more communication links between the electric vehicle and one or more electrical energy transfer stations including providing guidance information to one or more manual entry keypads. Origination of a physically tangible component group can be accomplished through skilled in the art design choice selection including use of one or more components and/or subsystems explicitly and/or implicitly referred to herein for at least in part implementing execution of one or more instructions operation o1316, for performance of the operation o1316 by an electrical circuitry arrangement as activated thereto, and/or otherwise fulfillment of the operation o1316. One or more non-transitory signal bearing physical media can bear the one or more instructions that when executed can direct performance of the operation o1316. Furthermore, providing guidance information to manual entry keypads module m1316 depicted in FIG. 7-B as being included in the module m1313, when executed and/or activated, can direct performance of and/or perform the operation o1316. Illustratively, in one or more implementations, the operation o1316 can be carried out, for example, by providing guidance information to one or more communication links between the electric vehicle and one or more electrical energy transfer stations (e.g. providing guidance information to one or more wired, wireless, cellular, packetized, direct point-to-point, internet, wide area network, local area network, or other communication links, etc.) including providing guidance information to one or more manual entry keypads (e.g. providing guidance information regarding the manual entry keypads located within the electric vehicle as accessed through a dashboard console of the electric vehicle, door panel of the electric vehicle, exterior surface of the electric vehicle, located near one or more electrical energy transfer stations adjacent to locations for charging of the electric vehicle, etc.).

In one or more implementations, as shown in FIG. 11-C, the operation o1313 can include operation o1317 for providing guidance information to one or more communication links between the electric vehicle and one or more electrical energy transfer stations including providing guidance information to one or more blue tooth communication devices. Origination of a physically tangible component group can be accomplished through skilled in the art design choice selection including use of one or more components and/or subsystems explicitly and/or implicitly referred to herein for at least in part implementing execution of one or more instructions operation o1317, for performance of the operation o1317 by an electrical circuitry arrangement as activated thereto, and/or otherwise fulfillment of the operation o1317. One or more non-transitory signal bearing physical media can bear the one or more instructions that when executed can direct performance of the operation o1317. Furthermore, providing guidance information to blue tooth communication devices module m1317 depicted in FIG. 7-B as being included in the module m1313, when executed and/or activated, can direct performance of and/or perform the operation o1317. Illustratively, in one or more implementations, the operation o1317 can be carried out, for example, by providing guidance information to one or more communication links between the electric vehicle and one or more electrical energy transfer stations (e.g. providing guidance information to one or more wired, wireless, cellular, packetized, direct point-to-point, internet, wide area network, local area network, or other communication links, etc.) including providing guidance information to one or more blue tooth communication devices (e.g. providing guidance information regarding blue tooth communication devices located within the electric vehicle as accessed through a dashboard console of the electric vehicle, door panel of the electric vehicle, exterior surface of the electric vehicle, located near one or more electrical energy transfer stations adjacent to locations for charging of the electric vehicle, etc.).

In one or more implementations, as shown in FIG. 11-D, the operation o1313 can include operation o1318 for providing guidance information to one or more communication links between the electric vehicle and one or more electrical energy transfer stations including providing guidance information to one or more WiFi communication devices. Origination of a physically tangible component group can be accomplished through skilled in the art design choice selection including use of one or more components and/or subsystems explicitly and/or implicitly referred to herein for at least in part implementing execution of one or more instructions operation o1318, for performance of the operation o1318 by an electrical circuitry arrangement as activated thereto, and/or otherwise fulfillment of the operation o1318. One or more non-transitory signal bearing physical media can bear the one or more instructions that when executed can direct performance of the operation o1318. Furthermore, providing guidance information to WiFi communication devices module m1318 depicted in FIG. 7-B as being included in the module m1313, when executed and/or activated, can direct performance of and/or perform the operation o1318. Illustratively, in one or more implementations, the operation o1318 can be carried out, for example, by providing guidance information to one or more communication links between the electric vehicle and one or more electrical energy transfer stations (e.g. providing guidance information to one or more wired, wireless, cellular, packetized, direct point-to-point, internet, wide area network, local area network, or other communication links, etc.) including providing guidance information to one or more WiFi communication devices (e.g. providing guidance information regarding WiFi communication devices located within the electric vehicle as accessed through a dashboard console of the electric vehicle, door panel of the electric vehicle, exterior surface of the electric vehicle, located near one or more electrical energy transfer stations adjacent to locations for charging of the electric vehicle, etc.).

In one or more implementations, as shown in FIG. 11-D, the operation o1313 can include operation o1319 for providing guidance information to one or more communication links between the electric vehicle and one or more electrical energy transfer stations including providing guidance information to one or more FM radio communication devices. Origination of a physically tangible component group can be accomplished through skilled in the art design choice selection including use of one or more components and/or subsystems explicitly and/or implicitly referred to herein for at least in part implementing execution of one or more instructions operation o1319, for performance of the operation o1319 by an electrical circuitry arrangement as activated thereto, and/or otherwise fulfillment of the operation o1319. One or more non-transitory signal bearing physical media can bear the one or more instructions that when executed can direct performance of the operation o1319. Furthermore, providing guidance information to FM radio communication devices module m1319 depicted in FIG. 7-B as being included in the module m1313, when executed and/or activated, can direct performance of and/or perform the operation o1319. Illustratively, in one or more implementations, the operation o1319 can be carried out, for example, by providing guidance information to one or more communication links between the electric vehicle and one or more electrical energy transfer stations (e.g. providing guidance information to one or more wired, wireless, cellular, packetized, direct point-to-point, internet, wide area network, local area network, or other communication links, etc.) including providing guidance information to one or more FM radio communication devices (e.g. providing guidance information regarding FM radio communication devices located within the electric vehicle as accessed through a dashboard console of the electric vehicle, door panel of the electric vehicle, exterior surface of the electric vehicle, located near one or more electrical energy transfer stations adjacent to locations for charging of the electric vehicle, etc.).

In one or more implementations, as shown in FIG. 11-D, the operation o1313 can include operation o1320 for providing guidance information to one or more communication links between the electric vehicle and one or more electrical energy transfer stations including providing guidance information to one or more infrared communication devices. Origination of a physically tangible component group can be accomplished through skilled in the art design choice selection including use of one or more components and/or subsystems explicitly and/or implicitly referred to herein for at least in part implementing execution of one or more instructions operation o1320, for performance of the operation o1320 by an electrical circuitry arrangement as activated thereto, and/or otherwise fulfillment of the operation o1320. One or more non-transitory signal bearing physical media can bear the one or more instructions that when executed can direct performance of the operation o1320. Furthermore, providing guidance information to infrared communication devices module m1320 depicted in FIG. 7-B as being included in the module m1313, when executed and/or activated, can direct performance of and/or perform the operation o1320. Illustratively, in one or more implementations, the operation o1320 can be carried out, for example, by providing guidance information to one or more communication links between the electric vehicle and one or more electrical energy transfer stations (e.g. providing guidance information to one or more wired, wireless, cellular, packetized, direct point-to-point, internet, wide area network, local area network, or other communication links, etc.) including providing guidance information to one or more infrared communication devices (e.g. providing guidance information regarding infrared communication devices located within the electric vehicle as accessed through a dashboard console of the electric vehicle, door panel of the electric vehicle, exterior surface of the electric vehicle, located near one or more electrical energy transfer stations adjacent to locations for charging of the electric vehicle, etc.).

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

The one or more instructions discussed herein may be, for example, computer executable and/or logic-implemented instructions. In some implementations, signal-bearing medium as articles of manufacture may store the one or more instructions. In some implementations, the signal bearing medium may include a computer-readable medium. In some implementations, the signal-bearing medium may include a recordable medium. In some implementations, the signal-bearing medium may include a communication medium.

Those having skill in the art will recognize that the state of the art has progressed to the point where there is little distinction left between hardware and software implementations of aspects of systems; the use of hardware or software is generally (but not always, in that in certain contexts the choice between hardware an d software can become significant) a design choice representing cost vs. efficiency tradeoffs. Those having skill in the art will appreciate that there are various vehicles by which processes and/or systems and/or other technologies described herein can be effected (e.g., hardware, software, and/or firmware in one or more machines or articles of manufacture), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation that is implemented in one or more machines or articles of manufacture; or, yet again alternatively, the implementer may opt for some combination of hardware, software, and/or firmware in one or more machines or articles of manufacture (limited to patentable subject matter under 35 USC 101). Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware in one or more machines or articles of manufacture.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof (limited to patentable subject matter under 35 U.S.C. 101). In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure (limited to patentable subject matter under 35 USC 101). In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, (e.g., transmitter, receiver, transmission logic, reception logic, etc.), etc.).

Electro-Mechanical System Support

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electromagnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

Electrical Circuitry Support

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Image Processing System Support

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Data Processing System Support

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Software as Patentable Subject Matter Support

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Mote System Support

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

Licensing System Support Language

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

Extraterritorial Use Language

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory.

Residual Incorporation Language

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

Not Limited to Implementations Described Language

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Not Limited to Human User Language

Although user XXX is shown/described herein as a single illustrated figure, those skilled in the art will appreciate that user XXX may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

Plural Terms Language

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

Operably-Coupled Language

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangementmponents to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/ or logically interacting, and/or logically interactable components.

Active/Inactive Component Language

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

Cloud Computing Standard Language

For the purposes of this application, "cloud" computing may be understood as described in the cloud computing literature. For example, cloud computing may be methods and/ or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scalable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a nonexclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/ or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

Use of Trademarks in Specification Language

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Caselaw-Driven Clarification Language

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A system, comprising:
one or more electronically collecting evidential support to suggest events to involve a conveyance moved by force derived from electrical energy delivered wirelessly to be stored onboard the conveyance modules configured to operate in accordance with electronically collecting evidential support to at least suggest one or more events to involve a conveyance at least partially moved by force derived from electrical energy delivered wirelessly to be stored onboard the conveyance;
one or more electronically acquiring specification information for electrically charging the conveyance with wireless chargers modules configured to operate in accordance with electronically acquiring specification information for electrically charging the conveyance with one or more wireless chargers; and
one or more electronically delivering instructions for wireless charging of the conveyance related to the evidential support and the specification information modules configured to operate in accordance with electronically delivering instructions for wireless charging of the conveyance related at least in part to the evidential support and the specification information.

2. The system of claim 1, wherein the one or more electronically collecting evidential support to suggest events to involve a conveyance moved by force derived from electrical energy delivered wirelessly to be stored onboard the conveyance modules configured to operate in accordance with electronically collecting evidential support to at least suggest one or more events to involve a conveyance at least partially moved by force derived from electrical energy delivered wirelessly to be stored onboard the conveyance comprises:
one or more collecting evidential support electronically through other than overt action by prospective conveyance users to provide for the collecting modules configured to operate in accordance with electronically collecting evidential support to at least suggest one or more events to involve a conveyance at least partially moved by force derived from electrical energy delivered wirelessly to be stored onboard the conveyance including collecting evidential support electronically through other than overt action by one or more prospective conveyance users to provide for the collecting.

3. The system of claim 2, wherein the one or more collecting evidential support electronically through other than overt action by prospective conveyance users to provide for the collecting modules configured to operate in accordance with electronically collecting evidential support to at least suggest one or more events to involve a conveyance at least partially moved by force derived from electrical energy delivered wirelessly to be stored onboard the conveyance including collecting evidential support electronically through other than overt action by one or more prospective conveyance users to provide for the collecting comprises:

one or more collecting evidential support through data calls to electronic calendaring systems modules configured to operate in accordance with collecting evidential support electronically through other than overt action by one or more prospective conveyance users to provide for the collecting including collecting evidential support through data calls to one or more electronic calendaring systems.

4. The system of claim 2, wherein the one or more collecting evidential support electronically through other than overt action by prospective conveyance users to provide for the collecting modules configured to operate in accordance with electronically collecting evidential support to at least suggest one or more events to involve a conveyance at least partially moved by force derived from electrical energy delivered wirelessly to be stored onboard the conveyance including collecting evidential support electronically through other than overt action by one or more prospective conveyance users to provide for the collecting comprises:

one or more collecting evidential support through electronic recordings of in-person conversations modules configured to operate in accordance with collecting evidential support electronically through other than overt action by one or more prospective conveyance users to provide for the collecting including collecting evidential support through one or more electronic recordings of in-person conversations.

5. The system of claim 2, wherein the one or more collecting evidential support electronically through other than overt action by prospective conveyance users to provide for the collecting modules configured to operate in accordance with electronically collecting evidential support to at least suggest one or more events to involve a conveyance at least partially moved by force derived from electrical energy delivered wirelessly to be stored onboard the conveyance including collecting evidential support electronically through other than overt action by one or more prospective conveyance users to provide for the collecting comprises:

one or more collecting evidential support through electronic access to internet cloud-based collaboration systems modules configured to operate in accordance with collecting evidential support electronically through other than overt action by one or more prospective conveyance users to provide for the collecting including collecting evidential support through electronic access to internet cloud-based collaboration systems.

6. The system of claim 2, wherein the one or more collecting evidential support electronically through other than overt action by prospective conveyance users to provide for the collecting modules configured to operate in accordance with electronically collecting evidential support to at least suggest one or more events to involve a conveyance at least partially moved by force derived from electrical energy delivered wirelessly to be stored onboard the conveyance including collecting evidential support electronically through other than overt action by one or more prospective conveyance users to provide for the collecting comprises:

one or more collecting evidential support through conveyance use logs from wireless electrical energy delivery facilities modules configured to operate in accordance with collecting evidential support electronically through other than overt action by one or more prospective conveyance users to provide for the collecting including collecting evidential support through one or more conveyance use logs from one or more wireless electrical energy delivery facilities.

7. The system of claim 1, wherein the one or more electronically collecting evidential support to suggest events to involve a conveyance moved by force derived from electrical energy delivered wirelessly to be stored onboard the conveyance modules configured to operate in accordance with electronically collecting evidential support to at least suggest one or more events to involve a conveyance at least partially moved by force derived from electrical energy delivered wirelessly to be stored onboard the conveyance comprises:

one or more collecting evidential support through explicit actions by prospective conveyance users to provide the collecting modules configured to operate in accordance with electronically collecting evidential support to at least suggest one or more events to involve a conveyance at least partially moved by force derived from electrical energy delivered wirelessly to be stored onboard the conveyance including collecting evidential support through one or more explicit actions by one or more prospective conveyance users to provide the collecting.

8. The system of claim 7, wherein the one or more collecting evidential support through explicit actions by prospective conveyance users to provide the collecting modules configured to operate in accordance with electronically collecting evidential support to at least suggest one or more events to involve a conveyance at least partially moved by force derived from electrical energy delivered wirelessly to be stored onboard the conveyance including collecting evidential support through one or more explicit actions by one or more prospective conveyance users to provide the collecting comprises:

one or more collecting evidential support through humans announcing information directed in reply to conveyance audio reception systems modules configured to operate in accordance with collecting evidential support through one or more explicit actions by one or more prospective conveyance users to provide the collecting including collecting evidential support through one or more humans announcing information directed in reply to one or more conveyance audio reception systems.

9. The system of claim 1, wherein the one or more electronically collecting evidential support to suggest events to involve a conveyance moved by force derived from electrical energy delivered wirelessly to be stored onboard the conveyance modules configured to operate in accordance with electronically collecting evidential support to at least suggest one or more events to involve a conveyance at least partially moved by force derived from electrical energy delivered wirelessly to be stored onboard the conveyance comprises:

one or more collecting evidential support regarding prospective conveyance occupants modules configured to operate in accordance with electronically collecting evidential support to at least suggest one or more events to involve a conveyance at least partially moved by force derived from electrical energy delivered wirelessly to be stored onboard the conveyance including collecting evidential support regarding one or more prospective conveyance occupants.

10. The system of claim 9, wherein the one or more collecting evidential support regarding prospective conveyance occupants modules configured to operate in accordance with electronically collecting evidential support to at least suggest one or more events to involve a conveyance at least partially moved by force derived from electrical energy delivered wirelessly to be stored onboard the conveyance including collecting evidential support regarding one or more prospective conveyance occupants comprises:

one or more collecting evidential support regarding occupants of multiple conveyances to receive electrical energy from a local electrical grid substation modules configured to operate in accordance with collecting evidential support regarding one or more prospective conveyance occupants including collecting evidential support regarding occupants of multiple conveyances to receive electrical energy from a local electrical grid substation.

11. The system of claim 9, wherein the one or more collecting evidential support regarding prospective conveyance occupants modules configured to operate in accordance with electronically collecting evidential support to at least suggest one or more events to involve a conveyance at least partially moved by force derived from electrical energy delivered wirelessly to be stored onboard the conveyance including collecting evidential support regarding one or more prospective conveyance occupants comprises:

one or more collecting evidential support regarding recording driving patterns associated with conveyance drivers modules configured to operate in accordance with collecting evidential support regarding one or more prospective conveyance occupants including collecting evidential support regarding recording driving patterns associated with one or more conveyance drivers.

12. The system of claim 9, wherein the one or more collecting evidential support regarding prospective conveyance occupants modules configured to operate in accordance with electronically collecting evidential support to at least suggest one or more events to involve a conveyance at least partially moved by force derived from electrical energy delivered wirelessly to be stored onboard the conveyance including collecting evidential support regarding one or more prospective conveyance occupants comprises:

one or more collecting evidential support regarding prospective conveyance occupants including collecting evidential support regarding use of the conveyance by drivers before electrical energy transfer to the conveyance occurs after the conveyance is driven by another driver modules configured to operate in accordance with collecting evidential support regarding one or more prospective conveyance occupants including collecting evidential support regarding use of the conveyance by one or more drivers before electrical energy transfer to the conveyance occurs after the conveyance is driven by another driver.

13. The system of claim 9, wherein the one or more collecting evidential support regarding prospective conveyance occupants modules configured to operate in accordance with electronically collecting evidential support to at least suggest one or more events to involve a conveyance at least partially moved by force derived from electrical energy delivered wirelessly to be stored onboard the conveyance including collecting evidential support regarding one or more prospective conveyance occupants comprises:

one or more collecting evidential support as merged plans of multiple prospective drivers of the conveyance for consecutive periods of use planned to occur before the conveyance is returned to receive electrical energy transfer modules configured to operate in accordance with collecting evidential support regarding one or more prospective conveyance occupants including collecting evidential support as merged plans of multiple prospective drivers of the conveyance for consecutive periods of use planned to occur before the conveyance is returned to receive electrical energy transfer.

14. The system of claim 1, wherein the one or more electronically collecting evidential support to suggest events to involve a conveyance moved by force derived from electrical energy delivered wirelessly to be stored onboard the conveyance modules configured to operate in accordance with electronically collecting evidential support to at least suggest one or more events to involve a conveyance at least partially moved by force derived from electrical energy delivered wirelessly to be stored onboard the conveyance comprises:

one or more collecting evidential support regarding conveyance aspects modules configured to operate in accordance with electronically collecting evidential support to at least suggest one or more events to involve a conveyance at least partially moved by force derived from electrical energy delivered wirelessly to be stored onboard the conveyance including collecting evidential support regarding one or more conveyance aspects.

15. The system of claim 14, wherein the one or more collecting evidential support regarding conveyance aspects modules configured to operate in accordance with electronically collecting evidential support to at least suggest one or more events to involve a conveyance at least partially moved by force derived from electrical energy delivered wirelessly to be stored onboard the conveyance including collecting evidential support regarding one or more conveyance aspects comprises:

one or more collecting evidential support regarding specifications of another conveyance other than the conveyance, the another conveyance involved with plans to receive electric energy transfer from electrical equipment shared with the conveyance modules configured to operate in accordance with collecting evidential support regarding one or more conveyance aspects including collecting evidential support regarding specifications of another conveyance other than the conveyance, the another conveyance involved with plans to receive electric energy transfer from electrical equipment shared with the conveyance.

16. The system of claim 14, wherein the one or more collecting evidential support regarding conveyance aspects modules configured to operate in accordance with electronically collecting evidential support to at least suggest one or more events to involve a conveyance at least partially moved by force derived from electrical energy delivered wirelessly to be stored onboard the conveyance including collecting evidential support regarding one or more conveyance aspects comprises:

one or more collecting evidential support regarding the conveyance including electrical wireless electrical energy transfer collecting devices to receive electrical energy transfer through field magnetic resonance induction modules configured to operate in accordance with collecting evidential support regarding one or more conveyance aspects including collecting evidential support regarding the conveyance including one or more electrical wireless electrical energy transfer collecting devices to receive electrical energy transfer through field magnetic resonance induction.

17. The system of claim 1, wherein the one or more electronically collecting evidential support to suggest events to involve a conveyance moved by force derived from electrical energy delivered wirelessly to be stored onboard the conveyance modules configured to operate in accordance with electronically collecting evidential support to at least suggest one or more events to involve a conveyance at least partially moved by force derived from electrical energy delivered wirelessly to be stored onboard the conveyance comprises:

one or more collecting evidential support regarding user preferences of location for energy transfer to the conveyance modules configured to operate in accordance with electronically collecting evidential support to at least suggest one or more events to involve a conveyance at least partially moved by force derived from electrical energy delivered wirelessly to be stored onboard the conveyance including collecting evidential support regarding one or more user preferences of location for energy transfer to the conveyance.

18. The system of claim 17, wherein the one or more collecting evidential support regarding user preferences of location for energy transfer to the conveyance modules configured to operate in accordance with electronically collecting evidential support to at least suggest one or more events to involve a conveyance at least partially moved by force derived from electrical energy delivered wirelessly to be stored onboard the conveyance including collecting evidential support regarding one or more user preferences of location for energy transfer to the conveyance comprises:

one or more user preferences of location other than home locations of prospective occupants of the conveyance for electrical energy transfer to the conveyance modules configured to operate in accordance with collecting evidential support regarding one or more user preferences of location for energy transfer to the conveyance including one or more user preferences of location other than one or more home locations of one or more prospective occupants of the conveyance for electrical energy transfer to the conveyance.

19. The system of claim 17, wherein the one or more collecting evidential support regarding user preferences of location for energy transfer to the conveyance modules configured to operate in accordance with electronically collecting evidential support to at least suggest one or more events to involve a conveyance at least partially moved by force derived from electrical energy delivered wirelessly to be stored onboard the conveyance including collecting evidential support regarding one or more user preferences of location for energy transfer to the conveyance comprises:

one or more user preferences of location for electrical energy transfer to the conveyance at locations on prospective routes of travel of the conveyance modules configured to operate in accordance with collecting evidential support regarding one or more user preferences of location for energy transfer to the conveyance including one or more user preferences of location for electrical energy transfer to the conveyance at one or more locations on one or more prospective routes of travel of the conveyance.

20. The system of claim 17, wherein the one or more collecting evidential support regarding user preferences of location for energy transfer to the conveyance modules configured to operate in accordance with electronically collecting evidential support to at least suggest one or more events to involve a conveyance at least partially moved by force derived from electrical energy delivered wirelessly to be stored onboard the conveyance including collecting evidential support regarding one or more user preferences of location for energy transfer to the conveyance comprises:

one or more preferences for fuels used to re-fuel the conveyance as a hybrid-electric conveyance modules configured to operate in accordance with collecting evidential support regarding one or more user preferences of location for energy transfer to the conveyance including preferences for one or more fuels used to re-fuel the conveyance as a hybrid-electric conveyance.

21. The system of claim 17, wherein the one or more collecting evidential support regarding user preferences of location for energy transfer to the conveyance modules configured to operate in accordance with electronically collecting evidential support to at least suggest one or more events to involve a conveyance at least partially moved by force derived from electrical energy delivered wirelessly to be stored onboard the conveyance including collecting evidential support regarding one or more user preferences of location for energy transfer to the conveyance comprises:

one or more preferences for contingency plans for unplanned unavailability to the conveyance of electrical energy charging stations modules configured to operate in accordance with collecting evidential support regarding one or more user preferences of location for energy transfer to the conveyance including preferences for contingency plans for unplanned unavailability to the conveyance of one or more electrical energy charging stations.

22. The system of claim 1, wherein the one or more electronically collecting evidential support to suggest events to involve a conveyance moved by force derived from electrical energy delivered wirelessly to be stored onboard the conveyance modules configured to operate in accordance with electronically collecting evidential support to at least suggest one or more events to involve a conveyance at least partially moved by force derived from electrical energy delivered wirelessly to be stored onboard the conveyance comprises:

one or more collecting evidential support regarding uses of the conveyance modules configured to operate in accordance with electronically collecting evidential support to at least suggest one or more events to involve a conveyance at least partially moved by force derived from electrical energy delivered wirelessly to be stored onboard the conveyance including collecting evidential support regarding one or more uses of the conveyance.

23. The system of claim 22, wherein the one or more collecting evidential support regarding uses of the conveyance modules configured to operate in accordance with electronically collecting evidential support to at least suggest one or more events to involve a conveyance at least partially moved by force derived from electrical energy delivered wirelessly to be stored onboard the conveyance including collecting evidential support regarding one or more uses of the conveyance comprises:

one or more collecting terrain or traffic evidential support regarding routes of travel for the conveyance modules configured to operate in accordance with collecting evidential support regarding one or more uses of the conveyance including collecting terrain or traffic evidential support regarding routes of travel for the conveyance.

24. The system of claim 22, wherein the one or more collecting evidential support regarding uses of the conveyance modules configured to operate in accordance with electronically collecting evidential support to at least suggest one or more events to involve a conveyance at least partially moved by force derived from electrical energy delivered wirelessly to be stored onboard the conveyance including collecting evidential support regarding one or more uses of the conveyance comprises:

one or more collecting evidential support regarding alternative modes of transportation along routes travel for the conveyance modules configured to operate in accordance with collecting evidential support regarding one or more uses of the conveyance including collecting evidential support regarding alternative modes of transportation along one or more routes travel for the conveyance.

25. The system of claim 22, wherein the one or more collecting evidential support regarding uses of the conveyance modules configured to operate in accordance with electronically collecting evidential support to at least suggest one or more events to involve a conveyance at least partially moved by force derived from electrical energy delivered wirelessly to be stored onboard the conveyance including collecting evidential support regarding one or more uses of the conveyance comprises:
  one or more collecting evidential support regarding driving habits of users of the conveyance modules configured to operate in accordance with collecting evidential support regarding one or more uses of the conveyance including collecting evidential support regarding one or more driving habits of one or more users of the conveyance.

26. The system of claim 1, wherein the one or more electronically acquiring specification information for electrically charging the conveyance with wireless chargers modules configured to operate in accordance with electronically acquiring specification information for electrically charging the conveyance with one or more wireless chargers comprises:
  one or more acquiring specification information from wireless electrical energy delivery facilities modules configured to operate in accordance with electronically acquiring specification information for electrically charging the conveyance with one or more wireless chargers including acquiring specification information from one or more wireless electrical energy delivery facilities.

27. The system of claim 26, wherein the one or more acquiring specification information from wireless electrical energy delivery facilities modules configured to operate in accordance with electronically acquiring specification information for electrically charging the conveyance with one or more wireless chargers including acquiring specification information from one or more wireless electrical energy delivery facilities comprises:
  one or more acquiring specification information regarding schedules for electrical load sharing for electrical devices sharing electrical power sources with electrical energy transfer stations associated with the conveyance modules configured to operate in accordance with acquiring specification information from one or more wireless electrical energy delivery facilities including acquiring specification information regarding one or more schedules for electrical load sharing for one or more electrical devices sharing one or more electrical power sources with one or more electrical energy transfer stations associated with the conveyance.

28. The system of claim 26, wherein the one or more acquiring specification information from wireless electrical energy delivery facilities modules configured to operate in accordance with electronically acquiring specification information for electrically charging the conveyance with one or more wireless chargers including acquiring specification information from one or more wireless electrical energy delivery facilities comprises:
  one or more acquiring specification information regarding electricity financial cost rate schedules modules configured to operate in accordance with acquiring specification information from one or more wireless electrical energy delivery facilities including acquiring specification information regarding one or more electricity financial cost rate schedules.

29. The system of claim 26, wherein the one or more acquiring specification information from wireless electrical energy delivery facilities modules configured to operate in accordance with electronically acquiring specification information for electrically charging the conveyance with one or more wireless chargers including acquiring specification information from one or more wireless electrical energy delivery facilities comprises:
  one or more acquiring specification information regarding electrical energy charging appointments reserved for electrical conveyances other than the conveyance modules configured to operate in accordance with acquiring specification information from one or more wireless electrical energy delivery facilities including acquiring specification information regarding one or more electrical energy charging appointments reserved for electrical conveyances other than the conveyance.

30. The system of claim 26, wherein the one or more acquiring specification information from wireless electrical energy delivery facilities modules configured to operate in accordance with electronically acquiring specification information for electrically charging the conveyance with one or more wireless chargers including acquiring specification information from one or more wireless electrical energy delivery facilities comprises:
  one or more acquiring specification information regarding electrical energy transfer station availability schedules for the conveyance modules configured to operate in accordance with acquiring specification information from one or more wireless electrical energy delivery facilities including acquiring specification information regarding one or more electrical energy transfer station availability schedules for the conveyance.

31. The system of claim 26, wherein the one or more acquiring specification information from wireless electrical energy delivery facilities modules configured to operate in accordance with electronically acquiring specification information for electrically charging the conveyance with one or more wireless chargers including acquiring specification information from one or more wireless electrical energy delivery facilities comprises:
  one or more acquiring specification information regarding priority classification for conveyance charging scheduling requests of electrical energy transfer stations modules configured to operate in accordance with acquiring specification information from one or more wireless electrical energy delivery facilities including acquiring specification information regarding priority classification for conveyance charging scheduling requests of one or more electrical energy transfer stations.

32. The system of claim 26, wherein the one or more acquiring specification information from wireless electrical energy delivery facilities modules configured to operate in accordance with electronically acquiring specification information for electrically charging the conveyance with one or more wireless chargers including acquiring specification information from one or more wireless electrical energy delivery facilities comprises:
  one or more acquiring specification information regarding plans for charging of conveyances other than the conveyance for electrical energy transfer stations modules configured to operate in accordance with acquiring specification information from one or more wireless electrical energy delivery facilities including acquiring specification information regarding one or more plans for charging of one or more conveyances other than the conveyance for one or more electrical energy transfer stations.

33. The system of claim 1, wherein the one or more electronically delivering instructions for wireless charging of the conveyance related to the evidential support and the specification information modules configured to operate in accordance with electronically delivering instructions for wireless charging of the conveyance related at least in part to the evidential support and the specification information comprises:
  one or more delivering instructions for wireless charging the conveyance to electrical energy transfer stations for the conveyance modules configured to operate in accordance with electronically delivering instructions for wireless charging of the conveyance related at least in part to the evidential support and the specification information including delivering instructions for wireless charging the conveyance to one or more electrical energy transfer stations for the conveyance.

34. The system of claim 33, wherein the one or more delivering instructions for wireless charging the conveyance to electrical energy transfer stations for the conveyance modules configured to operate in accordance with electronically delivering instructions for wireless charging of the conveyance related at least in part to the evidential support and the specification information including delivering instructions for wireless charging the conveyance to one or more electrical energy transfer stations for the conveyance comprises:
  one or more including delivering instructions regarding verification of identification of users of the conveyance modules configured to operate in accordance with delivering instructions for wireless charging the conveyance to one or more electrical energy transfer stations for the conveyance including delivering instructions regarding verification of identification of one or more users of the conveyance.

35. The system of claim 33, wherein the one or more delivering instructions for wireless charging the conveyance to electrical energy transfer stations for the conveyance modules configured to operate in accordance with electronically delivering instructions for wireless charging of the conveyance related at least in part to the evidential support and the specification information including delivering instructions for wireless charging the conveyance to one or more electrical energy transfer stations for the conveyance comprises:
  one or more delivering instructions regarding verification of selection of electrical energy transfer stations for the electrical conveyance modules configured to operate in accordance with delivering instructions for wireless charging the conveyance to one or more electrical energy transfer stations for the conveyance including delivering instructions regarding verification of selection of one or more electrical energy transfer stations for the electrical conveyance.

36. The system of claim 33, wherein the one or more delivering instructions for wireless charging the conveyance to electrical energy transfer stations for the conveyance modules configured to operate in accordance with electronically delivering instructions for wireless charging of the conveyance related at least in part to the evidential support and the specification information including delivering instructions for wireless charging the conveyance to one or more electrical energy transfer stations for the conveyance comprises:
  one or more including delivering instructions regarding information requests as to charging rate capacity of electrical energy transfer stations for the conveyance modules configured to operate in accordance with delivering instructions for wireless charging the conveyance to one or more electrical energy transfer stations for the conveyance including delivering instructions regarding one or more information requests as to charging rate capacity of one or more electrical energy transfer stations for the conveyance.

37. The system of claim 33, wherein the one or more delivering instructions for wireless charging the conveyance to electrical energy transfer stations for the conveyance modules configured to operate in accordance with electronically delivering instructions for wireless charging of the conveyance related at least in part to the evidential support and the specification information including delivering instructions for wireless charging the conveyance to one or more electrical energy transfer stations for the conveyance comprises:
  one or more delivering instructions concerning use data for the conveyance modules configured to operate in accordance with delivering instructions for wireless charging the conveyance to one or more electrical energy transfer stations for the conveyance including delivering instructions concerning use data for the conveyance.

38. The system of claim 33, wherein the one or more delivering instructions for wireless charging the conveyance to electrical energy transfer stations for the conveyance modules configured to operate in accordance with electronically delivering instructions for wireless charging of the conveyance related at least in part to the evidential support and the specification information including delivering instructions for wireless charging the conveyance to one or more electrical energy transfer stations for the conveyance comprises:
  one or more delivering instructions concerning amount of time the conveyance is available for charging by electrical energy transfer stations modules configured to operate in accordance with delivering instructions for wireless charging the conveyance to one or more electrical energy transfer stations for the conveyance including delivering instructions concerning amount of time the conveyance is available for charging by one or more electrical energy transfer stations.

39. The system of claim 33, wherein the one or more delivering instructions for wireless charging the conveyance to electrical energy transfer stations for the conveyance modules configured to operate in accordance with electronically delivering instructions for wireless charging of the conveyance related at least in part to the evidential support and the specification information including delivering instructions for wireless charging the conveyance to one or more electrical energy transfer stations for the conveyance comprises:
  one or more delivering instructions regarding amount of electrical energy required to be transferred to the conveyance by electrical energy transfer stations modules configured to operate in accordance with delivering instructions for wireless charging the conveyance to one or more electrical energy transfer stations for the conveyance including delivering instructions regarding amount of electrical energy required to be transferred to the conveyance by one or more electrical energy transfer stations.

40. The system of claim 33, wherein the one or more delivering instructions for wireless charging the conveyance to electrical energy transfer stations for the conveyance modules configured to operate in accordance with electronically delivering instructions for wireless charging of the conveyance related at least in part to the evidential support and the specification information including delivering instructions for wireless charging the conveyance to one or more electrical energy transfer stations for the conveyance comprises:
one or more delivering instructions regarding consumer profile of users of the conveyance modules configured to operate in accordance with delivering instructions for wireless charging the conveyance to one or more electrical energy transfer stations for the conveyance including delivering instructions regarding consumer profile of one or more users of the conveyance.

41. The system of claim 33, wherein the one or more delivering instructions for wireless charging the conveyance to electrical energy transfer stations for the conveyance modules configured to operate in accordance with electronically delivering instructions for wireless charging of the conveyance related at least in part to the evidential support and the specification information including delivering instructions for wireless charging the conveyance to one or more electrical energy transfer stations for the conveyance comprises:
one or more delivering instructions regarding itinerary and route information of the conveyance modules configured to operate in accordance with delivering instructions for wireless charging the conveyance to one or more electrical energy transfer stations for the conveyance including delivering instructions regarding itinerary and route information of the conveyance.

42. An article of manufacture comprising:
one or more non-transitory signal bearing storage media bearing:
one or more electronically collecting evidential support to suggest events to involve a conveyance moved by force derived from electrical energy delivered wirelessly to be stored onboard the conveyance instructions for electronically collecting evidential support to at least suggest one or more events to involve a conveyance at least partially moved by force derived from electrical energy delivered wirelessly to be stored onboard the conveyance;
one or more electronically acquiring specification information for electrically charging the conveyance with wireless chargers instructions for electronically acquiring specification information for electrically charging the conveyance with one or more wireless chargers; and
one or more electronically delivering instructions for wireless charging of the conveyance related to the evidential support and the specification information instructions for electronically delivering instructions for wireless charging of the conveyance related at least in part to the evidential support and the specification information.

43. A system comprising:
one or more computing devices; and
one or more instructions when executed on the one or more computing devices cause the one or more computing devices to perform
electronically collecting evidential support to at least suggest one or more events to involve a conveyance at least partially moved by force derived from electrical energy delivered wirelessly to be stored onboard the conveyance;
electronically acquiring specification information for electrically charging the conveyance with one or more wireless chargers; and
electronically delivering instructions for wireless charging of the conveyance related at least in part to the evidential support and the specification information.

* * * * *